(12) United States Patent
Kim et al.

(10) Patent No.: US 10,387,857 B2
(45) Date of Patent: Aug. 20, 2019

(54) APPARATUS AND METHOD FOR PROCESSING A MULTIMEDIA COMMERCE SERVICE

(71) Applicant: LG ELECTRONICS INC., Seoul (KR)

(72) Inventors: Youngah Kim, Seoul (KR); Hojoo Park, Seoul (KR); Junhee Kim, Seoul (KR); Hanseok Kim, Seoul (KR); Jungnam Park, Seoul (KR); Jim Clayton, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 890 days.

(21) Appl. No.: 14/194,132

(22) Filed: Feb. 28, 2014

(65) Prior Publication Data

US 2014/0244488 A1    Aug. 28, 2014

Related U.S. Application Data

(60) Provisional application No. 61/770,325, filed on Feb. 28, 2013, provisional application No. 61/805,123, (Continued)

(30) Foreign Application Priority Data

Feb. 27, 2014    (KR) .......................... 10-2014-0023198
Feb. 27, 2014    (KR) .......................... 10-2014-0023202
Feb. 27, 2014    (KR) .......................... 10-2014-0023213

(51) Int. Cl.
*G06Q 20/00* (2012.01)
*G06Q 20/12* (2012.01)
(Continued)

(52) U.S. Cl.
CPC .......... *G06Q 20/123* (2013.01); *G06Q 20/02* (2013.01); *G06Q 40/00* (2013.01); *H04L 1/1614* (2013.01); *G06Q 2220/123* (2013.01)

(58) Field of Classification Search
USPC .......................................................... 705/64
See application file for complete search history.

(56) References Cited

U.S. PATENT DOCUMENTS 6,163,771 A *  12/2000  Walker ................... G06Q 20/04
                                                                     705/18
2003/0019770 A1 *  1/2003  Hodes ..................... G06F 1/184
                                                                     206/308.2
(Continued)

FOREIGN PATENT DOCUMENTS

CN          1987938 A      6/2007
CN        101482962 A      7/2009
(Continued)

OTHER PUBLICATIONS

Jakcel; Optical Character Recognition for Self-Service Banking, AT& T technical journal, Jul. Aug. 1995, pp. 18, 21 (Year: 1995).*
(Continued)

*Primary Examiner* — James D Nigh
*Assistant Examiner* — Isidora I Immanuel
(74) *Attorney, Agent, or Firm* — Birch, Stewart, Kolasch & Birch, LLP

(57) ABSTRACT

A method of processing a commerce service in a commerce processor communicating with a customer premises equipment (CPE), the method including executing a first browser and outputting a coordinate corresponding to a bitmap associated with inputted payment data on a screen of the first browser, receiving coordinate values corresponding to payment data through the output coordinate, transmitting the received coordinate values based on a communication protocol to a second browser, unscrambling the transmitted
(Continued)

coordinate values corresponding to the payment data and retrieving payment data from the unscrambled coordinate values, and performing a payment process for a product item corresponding to the retrieved payment data.

10 Claims, 74 Drawing Sheets

Related U.S. Application Data filed on Mar. 25, 2013, provisional application No. 61/805,125, filed on Mar. 25, 2013, provisional application No. 61/816,172, filed on Apr. 26, 2013, provisional application No. 61/816,173, filed on Apr. 26, 2013, provisional application No. 61/836,674, filed on Jun. 19, 2013.

(51) Int. Cl.
*G06Q 40/00* (2012.01)
*H04L 1/16* (2006.01)
*G06Q 20/02* (2012.01)

(56) References Cited

U.S. PATENT DOCUMENTS

| | | | |
|---|---|---|---|
| 2010/0121737 A1* | 5/2010 | Yoshida | G06F 3/0418 705/26.1 |
| 2012/0036522 A1 | 2/2012 | Wang | |
| 2012/0096503 A1 | 4/2012 | Slothouber et al. | |
| 2012/0191522 A1* | 7/2012 | McLaughlin | G06Q 50/01 705/14.23 |
| 2013/0110607 A1* | 5/2013 | Basmajian | G06Q 30/0234 705/14.26 |
| 2014/0019358 A1* | 1/2014 | Priebatsch | G06Q 20/322 705/44 |
| 2014/0180906 A1* | 6/2014 | Paisley | G06Q 40/00 705/38 |

FOREIGN PATENT DOCUMENTS

| | | |
|---|---|---|
| CN | 101488212 A | 7/2009 |
| CN | 101710407 A | 5/2010 |
| CN | 101958916 A | 1/2011 |
| KR | 10-1070727 B1 | 10/2011 |
| KR | 10-2011-0119521 A | 11/2011 |
| KR | 10-2012-0047075 A | 5/2012 |

OTHER PUBLICATIONS

Malakooti et al., "A Lossless Secure Data Embedding in Image Using DCT and Randomize Key Generator," IEEE, 2012 Second International Conference on Digital Information and Communication Technology and It's Applications (DICTAP), May 16, 2012, pp. 236-239, XP032185953.

* cited by examiner

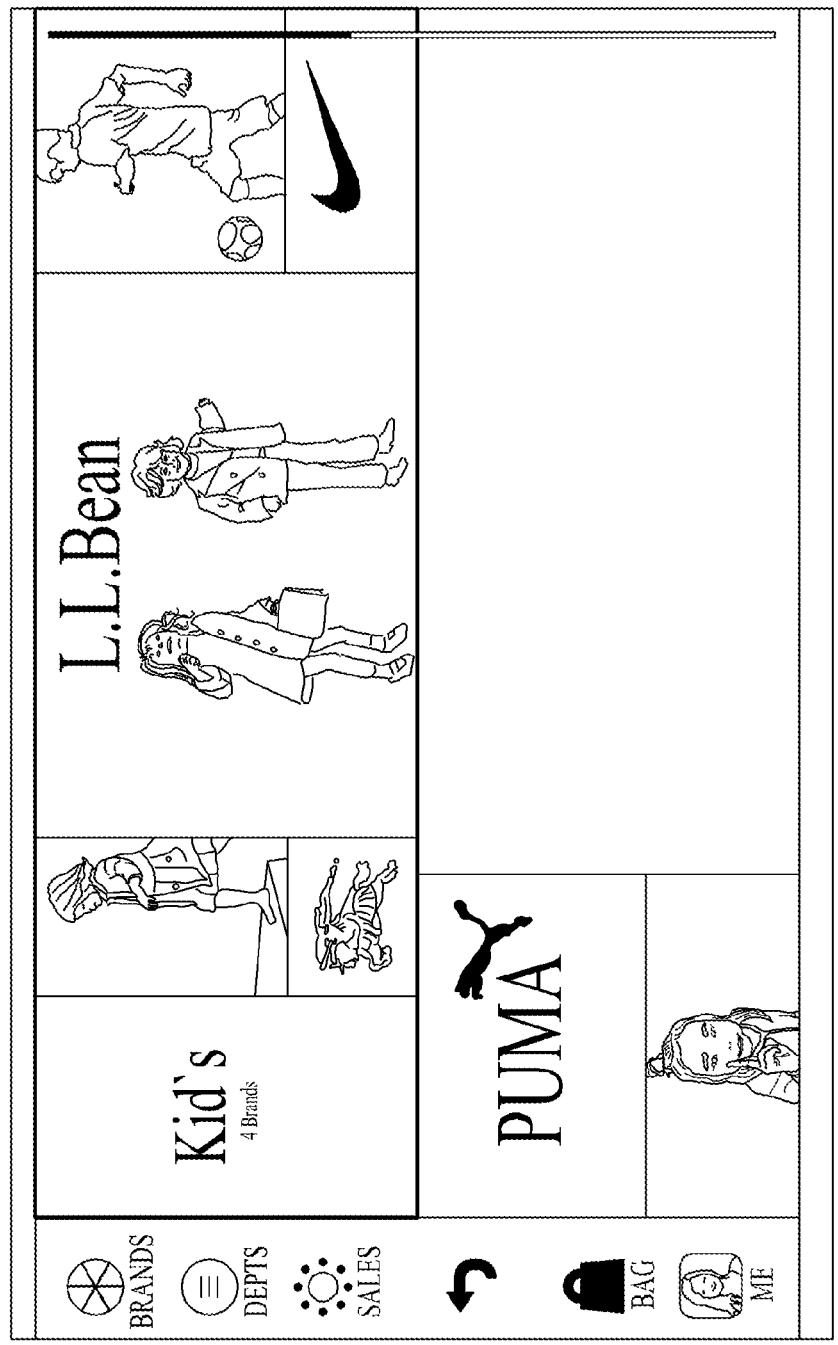

FIG. 61

| CPE ID | Household ID | CPE Type |
|--------|--------------|----------|
| MAC 1  | H 1          | TV       |
| MAC 2  | H 1          | TV       |
| MAC 3  | H 1          | TV       |
| MAC 4  | H 2          | TV       |
| MAC 5  | H 2          | TV       |
| MAC 6  | MAC 6        | TV       |

FIG. 62

| UID | User Identifier | CPE Type |
|---|---|---|
| JK - 674 - HJ | H 1 - Dad | Loain ID - 1 |
| JK - 675 - HJ | H 1 - Mom | |
| JK - 676 - HJ | H 1 - Dauahter | Loain ID - 2 |
| JK - 677 - HJ | H 1 - Son | |
| JK - 678 - HJ | H 2 - Dad | Loain ID - 3 |
| JK - 679 - HJ | H 2 - Mom | Loain ID - 4 |
| JK - 680 - HJ | H 2 - Son | |
| JK - 681 - HJ | MAC 6 - Dauahter | |

FIG. 63

| UID | Brands |
|---|---|
| JK - 674 - HJ | BR 1 |
| JK - 675 - HJ | BR 2 |
| JK - 676 - HJ | BR 1 |
| JK - 677 - HJ | BR 3 |
| JK - 678 - HJ | BR 4 |
| JK - 679 - HJ | BR 10 |
| JK - 680 - HJ | BR 9 |
| JK - 681 - HJ | BR 5 |

APPARATUS AND METHOD FOR PROCESSING A MULTIMEDIA COMMERCE SERVICE

CROSS-REFERENCE TO RELATED APPLICATIONS

This application claims the benefit of the following U.S. provisional patent application and Korean patent applications, which are hereby incorporated by reference in its entirety: U.S. Patent Application No. 61/770,325 filed on Feb. 28, 2013, U.S. Patent Application No. 61/805,123 filed on Mar. 25, 2013, U.S. Patent Application No. 61/805,125 filed on Mar. 25, 2013, U.S. Patent Application No. 61/816,172 filed on Apr. 26, 2013, U.S. Patent Application No. 61/816,173 filed on Apr. 26, 2013, U.S. Patent Application No. 61/836,674 filed on Jun. 19, 2013, Korean Patent Application No. 10-2014-0023198 filed on Feb. 27, 2014, Korean Patent Application No. 10-2014-0023202 filed on Feb. 27, 2014, and Korean Patent Application No. 10-2014-0023213 filed on Feb. 27, 2014.

BACKGROUND

Field

This invention relates to multimedia commerce delivery to end-users, and more specifically to delivery of a branded commerce environment to end-user devices, such as a 'smart TV.'

Description of Related Art

As the Internet came to its first platform, the connected PC, online commerce emerged as an incredible economic powerhouse. The business-use paradigm of the PC, with its powerful capabilities, enabled the emergence of the browser, a processing and memory hungry on-line client. Along with the application server, which could be placed in a hosting location and accessed worldwide, the browser became a full-blown applications platform. Complicated shopping and purchasing functions could be accommodated, yielding a chapter in history generally referred to as 'e-commerce'.

The browser has continued to emerge as a flexible client-side applications platform, capable of handling a mixture of all kinds of content (e.g., with HTML5 for example), downloaded code to enhance the user experience (e.g., Java-script), and different types of media (e.g., audio, video, and animation such as Flash). The browser becomes a very specific application, depending on where you 'point' it. The browser paradigm is perfectly suited to the PC.

As mobile technologies emerged, several attempts where made to re-create the e-commerce platform of the PC. However, mobile devices have significant limitations. For instance, the screen and keyboard capabilities were much more limited than the PC. In addition, the processing power in a mobile device is limited both by the target cost of the device and by the available power consumption. First attempts at text-based browsers, such as wireless application protocol (WAP), were very limiting. When smart-phones emerged, ports of the full browser to the mobile environment also yielded poor results. Full browser applications were very slow, inappropriately matched to screen size, and provided an overall unsatisfactory application user experience compared to 'native' phone applications. Certain aspects of the phone also changed the application possibilities radically, such as the SMS capabilities, the location awareness capabilities, and the ability to integrate with voice in several dimensions.

As mobile devices became more powerful, essentially providing PC power in a small form factor, even though the browser could be made to work well enough, what emerged was an 'app' paradigm, which doesn't look like a browser at all. In stark contrast with the PC, the model of the 'there's an app for that', where the app is precisely tailored to one task or one brand, with the application being location or voice enabled in just the right way, proved to be a good use-model for the smart phone. In fact, when one looks at the other mobile platforms, such as tablets, and the like, this use-mode only represents an incremental improvement. Even given its limitation, every retailer and company rushed out to build an app that would provide 'brand identity' into the mobile marketplace. They could use their app to capture e-commerce on the phone, and through the app, build a relationship directly with the consumer.

For mobile environments and technology infrastructure, app developers realized that the server side was generating a great deal of content and would still require the networked technologies of the application server. It was also realized that to handle a mixture of all kinds of content, downloaded code, and several types of media in the app, the app could be built out of the same parts that the browser was constructed out of, but in the final build process the elements could be bound together as a purpose-built 'native' phone app. And so many of today's apps are built using 'web kit' technology, which are browser modules connected together as such. In fact, the modern open source browsers themselves are constructed out of the same web kit. So while there is quite a different use-model for applications on the PC (e.g., websites through the browser) as compared to mobile (i.e., a focused-purpose app), the actual client-side technology is largely shared.

Recently, the television has become an Internet-connected device. For instance, an Internet-connected game console extends the console gaming experience to a network gaming experience. An Internet-connected Blu-Ray player and some of the first 'smart TVs' were host to 'alternate channels' for entertainment content. For the same reason as with mobile, when the browsers were developed on the TV, they were resource constrained. As a result, they didn't provide an optimal consumer experience, and were certainly not capable of being the powerful platform that they were for the PC. So the 'apps' model was utilized, lifted from mobile environment for use with 'smart televisions'. For instance, one could rent or watch movies and shows from on-line sites such as NetFlix or Hulu, or listen to Internet Radio from places such as Pandora. One could use media sources such as iTunes for video and music and sources like Flickr for viewing photos uploaded to the Internet. Also, viewing platforms such as YouTube were available for viewing user-posted videos.

Many platforms emerged enabling developers to create TV apps much in the same way as mobile apps were created. Some of the first smart TVs actually utilized a mobile operating system mimicking precisely the app-use model. The 'one app, one channel' model was a simple first paradigm. The lack of a keyboard or a precision pointing device, such as a mouse, did not detract from the value proposition, because on the TV the interaction mode was largely passive, and more of the apps were just for passive watching of video, allowing users access to Internet video content for free or very low 'all-you-can-eat' subscription models. Despite the rather limited capabilities, they provided the novelty of Internet content on 'the big screen', and the interest of the consumer in these new 'internet video on-demand' and 'Internet channels' became popular. With well-understood on-demand and subscription rate business models, simple apps and the services behind them have been popular for consumers looking for alternative entertainment.

But for television, the success of the mobile app paradigm proved more challenging. If an app only provided video, then sufficient performance was available, where even if the menus on the app seemed sparse on the big screen, eventually the video filled it. But other apps, adapted from mobile, provided poor quality on the big screen. The use of low-resolution graphics, the lack of streaming embedded video, and the sparse and simple visual presentation were clear mismatches for the television platform. For instance, the 'home theater' environment is expected to provide an ear-popping audio experience, but web sites and mobile apps didn't typically utilize audio, and if they did, it wasn't surround sound. The mobile apps that ended up specifically adapted to location-based services, or communications such as SMS, video calling, and email, found themselves without these features on the television.

The expectation of the experience on the TV, Internet connected or not, is so much higher, that even a high fidelity rendering of a web site designed for a PC, or TV adaptation of a mobile app, may not be compelling in this more passive entertainment-driven interaction mode. The television is capable of displaying not only the highest quality, studio mastered video and audio content to the consumer, but also equally spectacular studio-polished production content and experience in television advertising. In fact, television advertising very much drives television programming. Television is ideal for brands as a portal to the consumer. Of all media available to brands and advertisers, from print to radio to web sites to billboards and everything in between, television is the premier vehicle by which a brand and advertisers can get their most sophisticated and polished message and position to the consumer. The current Internet connected TV has neglected this. The Internet banner ad is simply not sufficient for brand ad advertisers in the television domain.

Therefore, a new paradigm is needed for the TV, which, like mobile, does not rely on a paradigm of an all-powerful local browser, where the specific capabilities of the television are leveraged, and where brands and advertisers are provided a platform that can scale up to the high resolutions TVs, and can deliver the spectacular studio-polished production visual and audio experiences that they are accustomed to delivering.

SUMMARY

Web-based delivery of brand content through computer devices is straightforward, as the computing device is specifically adapted to interface through the Internet directly with brand websites, such as for a user selecting and purchasing a brand product over the Internet. However, entertainment devices such as televisions have not traditionally been adapted for web-based delivery of content, and especially not suited for the multimedia presentation of a brand product through the television from a brand site. Smart TVs (and other customer premise equipment) have begun to enable this capability, but the computing infrastructure for providing the high-resolution multimedia content to a user through their television, especially brand site content, is inadequate. The present disclosure describes improved methods and systems for providing a branded commerce infrastructure for the delivery of multimedia brand product offerings.

The present disclosure describes a system that meets the challenging delivery environment of the TV, where consumers are becoming used to keyboards appearing on screens, paired tablets, smartphones, and the like. However, the television platform itself, unlike the PC or the mobile device, has a severe economic challenge. For instance, most of the cost and most of the value in a TV is in the screen. This is what consumers mainly pay for, and this is the primary metric of competition for TV vendors, leaving less room for cost of goods investment in processors and memory for software. Unlike in the mobile device ecosystem, there is not a subsidy/contracts model for refreshing the device. Televisions tend to stay in place and operation ten times longer than an average mobile device (roughly 10 years versus 1 year, respectively). This leads to what we can be viewed as a profound paradox in the delivery of TV based Internet services. The TV is setting high expectations for extreme visual content with larger and larger screen real estate with visual capabilities going from 2D to 3D and resolutions beyond high definition, but processors and memory are relatively weak compared to other content delivery platforms.

An application delivering a multi-part, media rich visual experience to this much screen real estate is a processor- and memory-intensive job. The present disclosure describes methods and systems that deliver applications in a computing-power constrained environment, as well as the need to provide this delivery to a TV that typically has a long life with the consumer. For instance, users expect a ten-year-old TV to still play videos, and expect it to still tune-in to a channel or app that is driven by the Internet. With the PC, a processor refresh (PC replacement) is likely to come in three years. For the mobile device, in one year. This is how PC and mobile developers keep the processor and memory footprint capable enough on these computing devices. With the TV, it might be ten years. When thought of this way, the profound paradox provides an order of magnitude challenge, where there is a need to do so much more with so much less, and even then, for so much longer. To solve this profound paradox, the present disclosure describes a system that approaches the television environment differently then as in the PC and mobile environments. The TV is not going to be a full computer like the PC or the mobile device. The system described herein enables high performance client-side technology for the life of the TV and create a new use-paradigm that is suitable for the TV experience.

The system does not rely on a TV to be a powerful, up-to-date, on-line 'computer'. The browser, even in a web kit form, is too complicated to run on the TV, such that brands and advertisers will see it as a platform that can scale-up to the high resolution TVs, delivering the high-quality studio-polished production visual and audio experiences that they are accustomed to delivering, and in every way be the showcase media for their products. Given the pressures on cost of goods for the TV, it's longevity in the hands of the consumer, and the extreme video and audio performance expected from the system, the system utilizes processing capability outside the TV, such as in the server-based cloud, pushing the processing of the app to the server. Given the modest bandwidth requirements, the application may run where there is ample processing capacity, memory, and cache for the application.

In embodiments, the T-commerce system may provide for remote browser rendering of T-commerce content to user equipment in a brand offering product environment, including the determination of the native capabilities of customer premises equipment (CPE), and rending content through a remote browser to the CPE so that the user may utilize the brand content services of the T-commerce system even when the CPE does not have native capabilities, such as a native full web browser, for direct viewing of web formatted content. In the instance when the CPE has native capabilities, the T-commerce system may provide the CPE with an interface to the brand content services of the T-commerce system without the use of a remote browser.

In embodiments, the T-commerce system may comprise a server-based multi-media content delivery platform (DP) comprising a plurality of browsers, adapted to serve a plurality of a television-based CPE through a remote protocol across the Internet, and where the browser renders web-based multi-media content to the CPE on a display based on whether the CPE is adapted to render web-based content with CPE native facilities; a television-based e-commerce (T-commerce) facility in communicative connection with the DP, and through at least one of the browsers to the CPE, the T-commerce facility providing access to a plurality of e-commerce content offerings through a CPE graphical user interface; and at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise. The determination of whether the CPE is adapted to render web-based content with CPE native facilities may be determined when the CPE connects with the DP, where if CPE native facilities do not meet a minimum set of predetermined criteria, a browser is assigned to the CPE for rendering content. The display may be comprised within the CPE. The display may be connected to the CPE, such as when the CPE is a television and the display is the display of the television (e.g., the CPE is a Blu-Ray player connected to a television.

In embodiments, the CPE may be a smart television, a Blu-ray device, a digital media-streaming device, and the like. The CPE may comprise a television client through which the CPE is capable of connecting to networked computer devices on the Internet. A user of the CPE may interface with the CPE through the CPE graphical user interface with a remote device, the remote device adapted to provide point-and-click functionality through sensor-based control, where the sensor-based control is through a motion-sensing sensor, such as the sensor may be an inertial measurement unit, accelerometer, and the like. Brands may be enabled to serve relevant libraries of brand-related video and image content to the CPE. Users of the CPE may be enabled to browse and shop through libraries of brand content using the CPE. User navigation may be tracked as a user of the CPE navigates amongst the e-commerce content offerings where brand content may reside. The DP may deliver content to the CPE dependent on the type of device the user is operating as a CPE.

To achieve these objects and other advantages and in accordance with the purpose of the invention, as embodied and broadly described herein, a method of processing a commerce service in a commerce processor communicating with a customer premises equipment (CPE), the method comprising: executing a first browser and outputting a coordinate corresponding to a bitmap associated with inputted payment data on a screen of the first browser; receiving coordinate values corresponding to payment data through the output coordinate; transmitting the received coordinate values based on a communication protocol to a second browser; unscrambling the transmitted coordinate values corresponding to the payment data and retrieving payment data from the unscrambled coordinate values; and performing a payment process for a product item corresponding to the retrieved payment data.

The first browser may include an embedded browser included in the CPE.

The second browser may include a remote browser included in the commerce processor.

The coordinate values corresponding to the payment data may include a code which corresponds to a credit card number associated with the payment data.

The retrieved payment data may be included in a number transformed from the code via the unscrambling.

The payment data may be retrieved from a third-party element.

The third-party element may generate geometries of bitmap corresponding to the retrieved payment data.

The method may be further comprised receiving a result of the performed payment process, returning the received result of the performed payment process to the CPE and controlling the CPE to be outputted the returned result.

The communication protocol may include remote protocol.

A method of processing a commerce service in a commerce processor communicating with a customer premises equipment (CPE), the method comprising: receiving a user action for requesting initializing the commerce service; constructing the commerce service in response to the received user action and streaming the constructed commerce service to the CPE; receiving a user action for requesting check-out for a payment of a product item; transmitting a control command for the payment of the product item and controlling a scrambled payment user interface corresponding to the transmitted control command to be output on a screen of the CPE; receiving payment data through the scrambled payment user interface from the CPE; unscrambling the received payment data; and performing a payment process which includes transmitting the unscrambled payment data to a payment processor.

In another aspect of the present invention, in a commerce processor of processing a commerce service, the commerce processor communicating with a customer premises equipment (CPE), the commerce processor comprising: a receiver configured to receive coordinate values corresponding to payment data through an output coordinate corresponding to a bitmap associated with inputted payment data on a screen of a first browser; and a controller configured to control to execute a first browser, output coordinate corresponding to the bitmap associated with the inputted payment data on the screen of the first browser, transmit the received coordinate values based on a communication protocol to a second browser, unscramble the transmitted coordinate values corresponding to the payment data and retrieve payment data from the unscrambled coordinate values and perform a payment process for a product item corresponding to the retrieved payment data.

The first browser may include an embedded browser included in the CPE.

The second browser may include a remote browser included in the commerce processor.

The coordinate values corresponding to the payment data may include a code which corresponds to a credit card number associated with the payment data.

The retrieved payment data may be included in a number transformed from the code via the unscrambling.

The payment data may be retrieved from a third-party element.

The third-party element may generate geometries of bit-map corresponding to the retrieved payment data.

The commerce processor may be further configured to receive a result of the performed payment process, return the received result of the performed payment process to the CPE and control the CPE to be outputted the returned result.

The communication protocol may include remote protocol.

A commerce processor of processing a commerce service, the commerce processor communicating with a customer premises equipment (CPE), the commerce processor comprising: a receiver configured to receive a user action for requesting initializing the commerce service, a user action for requesting check-out for a payment of a product item and payment data through a scrambled payment user interface from the CPE; and a controller configured to transmit a control command for the payment of the product item, output the scrambled payment user interface corresponding to the transmitted control command on the screen of the CPE, unscramble the received payment data and perform a payment process which includes transmitting the unscrambled payment data to a payment processor.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIGS. 53a to 53c show a third embodiment of a browser screen edited by the editorial module of FIG. 49.

FIG. 61 shows CPE identification information according to one embodiment of the present invention.

FIG. 62 shows user identification information according to one embodiment of the present invention.

FIG. 63 shows user identification information according to another embodiment of the present invention.

While the invention has been described in connection with certain preferred embodiments, other embodiments would be understood by one of ordinary skill in the art and are encompassed herein.

DETAILED DESCRIPTION

The present disclosure presents embodiments for a T-commerce system, a cloud-based system adapted for the presentation of multi-media e-commerce through an Internet-connected television-based customer premise equipment (CPE), such as a smart TV, Blu-Ray player, digital media streaming device, and the like. The T-commerce system provides brand web content to users through their CPE, where the brand web content is provided through a multi-channel commerce offering environment (e.g., a T-commerce channel layered over brand channels). CPEs may have varying degrees of computing capability, and therefore the T-commerce system provides a remote browser infrastructure capable of providing an interface if the CPE has a weak computing capability (e.g., weak or no native browser capability), and to provide load balancing capabilities when presented with a diversity of computing capabilities. In the instance when the CPE device has weak computing capabilities, the infrastructure provides the capability to provide streamed rendered content from the multi-channel T-commerce system, through browsers that are hosted remotely, such as through a server-based content delivery platform. In addition, other supporting or related infrastructure components may be provided, such as advertisement facilities, payment facilities, analytics facilities, network management facilities, and the like.

Figure 1:
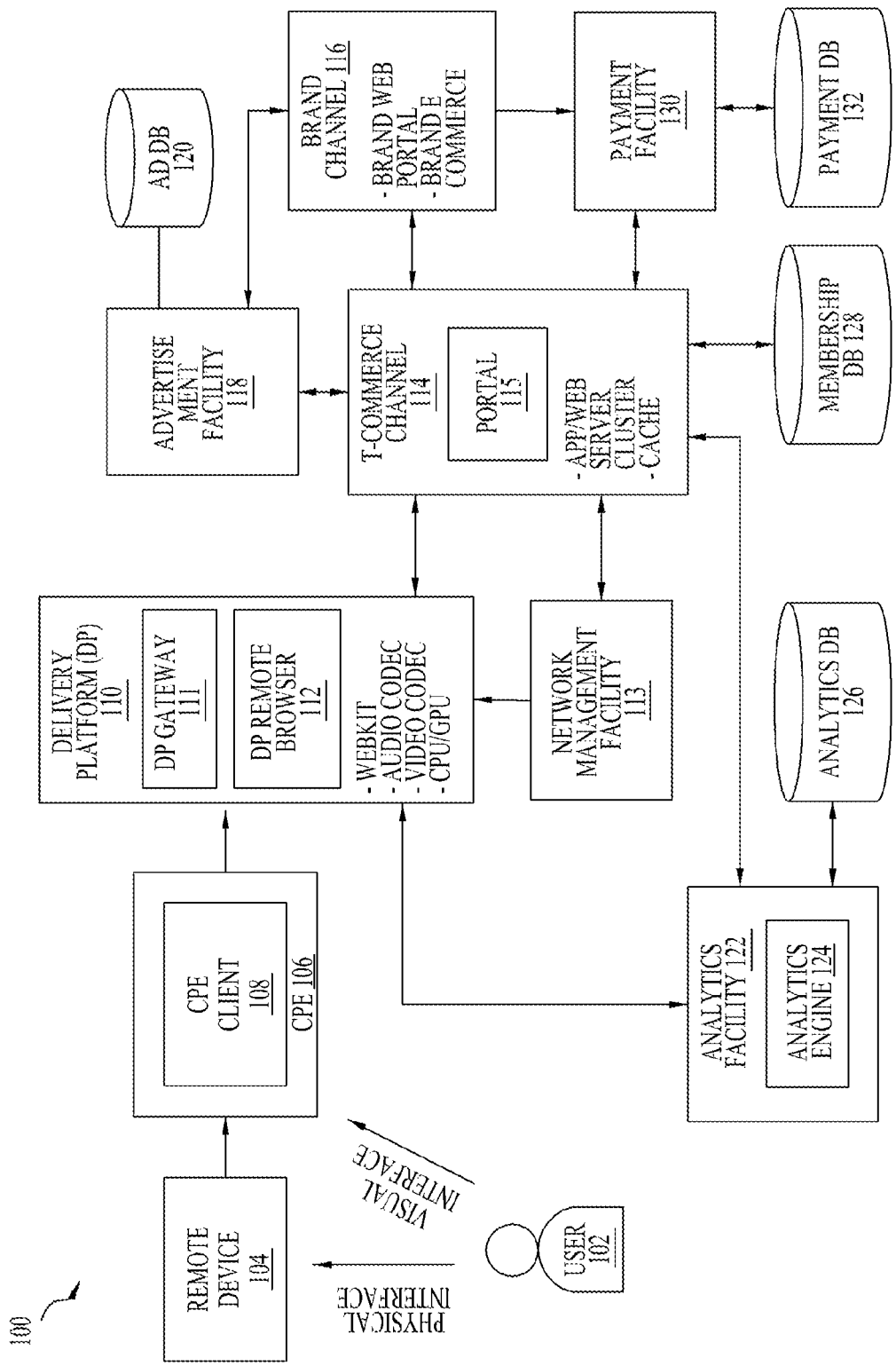
FIG. 1 depicts an embodiment functional block diagram of the T-commerce system.

In embodiments, the infrastructure behind the user experience may include not only browsers for connecting and rendering content, but with facilities for brand channels, advertisers, payment structures, and the like. Referring to FIG. 1, a top-level embodiment block diagram 100 is presented of the system, showing a user 102 interfacing visually with a CPE 106 and physically with the CPE through a remote device 104 (e.g., a sensor-based pointing-capable TV remote control). The CPE 106 includes a CPE client 108 that interfaces through the Internet with a delivery platform (DP) 110 via a DP gateway 111. Instances of DP remote browsers 112 are assigned to CPEs as needed. The delivery platform then connects the user CPE 106 to a T-commerce channel 114, such as via a T-commerce channel portal 115. The T-commerce channel 114 may store membership data in a membership database 128. A network management facility 113 may manage this interconnection. The T-commerce channel 114 then enables connection of the user CPE 106 to a brand channel 116, which may interface with a payment facility 130 associated with payment data in a payment database 132. An advertisement facility 118 may enable advertisement delivery through the T-commerce channel 114 and the brand channel 116, as well as directly to a CPE home page. An analytics facility 122 may be used to develop business intelligence data, such as for use with brands, advertisers, and the like, with analytics data stored in an analytics database 126.

In order to illustrate how the system may operate, an example presented as a narrative walkthrough will be provided. This system narrative is meant to be illustrative, and not limiting in any way, helping to illustrate an embodiment usage of the system. Although a 'smart television', also referred to simply as a 'TV', is used in the example as the CPE 106, it should be understood that the system may work with other CPE 106 devices, such as a through a Blu-Ray player, a digital media player (e.g., Roku), and the like. In addition, secondary computing devices may be used in conjunction with the CPE to enhance and extend the user experience, such as including smart phones, tablets, laptop computers, and the like.

In this non-limiting example, the user experience may include a CPE 106, such as a smart TV running a small client 108 that sits on a TV application programming interface (API). The TV client directs a remote protocol to coordinate data transfers by the TV API, where it is decoded. The TV API may comprise or work in conjunction with a plurality of APIs, such as a direct video-audio API, a rendering API, a network API, a device-input API, and the like. The client software sitting on these APIs manages the main network communications with the TV, the remote devices (e.g., TV remote control, mobile device, tablet device), and causes the TV to display video and play sound that is the user experience of the T-commerce system. The browser 112 is running the T-commerce channel content on the other side of the network, with data sent down to the TV for display, such as screen-by-screen in H.264 encoded video and audio. User interaction is sent back up to the browser 112 for interacting with the content. In embodiments, the client 108 software may include interfaces to TV operating system API's, two-way IP-based protocol across the Internet connection of the TV, buffers and instrumentation of connection speed (e.g., to send advice to the T-commerce system for purposes of adjusting network parameters, rate-adaptive compression, preventing poor user experience), DNS services, IP address services, authentication (e.g., based on MAC address), session management and synchronization with the delivery platform, encryption mode, and the like.

Through this interface, the user sees, hears, and interacts with the system, as if it was locally running. The remote protocol handles sending inputs like keyboard entry mouse clicks from the remote control device or other paired remote device (e.g., smart phone). Using the remote protocol, video and audio fed from the delivery platform 110 traverses the Internet to the smart TV. Likewise, the remote protocol handles sending inputs (e.g., keyboard and mouse inputs) from the TV. The delivery platform runtimes are running the remote browser 112. Screen and audio output is encoded on top of the remote protocol by delivery platform encoders. The T-commerce channel runs an application server, which is running the server application, which then accesses a plurality of brand channels 116.

Continuing with greater detail, and beginning back with the smart TV, when the TV is first powered, it may show a home screen. The user then uses a remote control device 104 to control the TV interface through the home screen, such as with a paired remote control device with internal sensors for cursor pointing, mouse action, keyboard control, and the like. The user may proceed to watch normal TV, or then may go to a T-commerce channel. While at the home screen, or even while watching TV, the user may select the T-commerce channel by selecting an associated launch/icon button, or by clicking through a displayed brand advertisement. Ads may appear on the home screen, while watching the TV, on the remote, and the like. Ads may also appear on secondary computer devices, such as a tablet or a smart phone that is being used in conjunction with the TV and the T-commerce system. When a user selects a T-commerce channel, they will see, hear, and be able to interact with it through a T-commerce application. To facilitate the TV-side of the T-commerce channel, a TV-client 108 is utilized, which sits on top of a TV API, taking the user inputs and sending them upstream on the Internet to the user's instance of the T-commerce channel 114. The TV API interfaces to the network using the remote protocol, such as decoding H.264 video and audio for display, and presents an interface to the remote control device. Likewise, the user experience in terms of on-screen video and application display, and audio, are taken off the network by the TV client using the TV API, and are decoded and presented as viewable video and listenable audio by the TV. The TV client uses a remote protocol for interactions with the network. The TV client sets up the connection to, and server-side invocation of, the user's instance of the T-commerce channel handling the network connectivity set-up, as well as the equivalent of the user login. The TV client is transparent to the user. Once the process is started, the user is interacting with the T-commerce application using the TV and the remote device through the network.

The remote protocol is a collection of bi-directional communications and packaging of traffic between the TV and a collection of capabilities in the delivery platform. It connects the TV with the delivery platform, first to a delivery platform gateway discovery service, to find out which delivery platform site to go to, and then to a delivery platform gateway 111 within the delivery platform site. Finally to the remote browser 112, which handles the transit of both the upstream and downstream control and audio/video payload access to the Internet, to the network facing side of the delivery platform. This may be a layer 7 protocol in the OSI networking model. More precisely, the TV client may be implementing the remote protocol, but the TV API via the network interface is placing it on the TCP/IP networking stack in the TV.

The delivery platform 110 may be implemented as a multi-computer system hosted in one or more regional data centers, and is preferably implemented using cloud computing techniques. It provides the processing that makes up the experience of the T-commerce channel, so that all the TV has to do is ingest the video and audio and play them, providing the screen and sound of the T-commerce channel, and making sure the gestures or other signals from the remote device are delivered upstream. The delivery platform may be implemented with a plurality of high performance servers, with memory and processing capabilities to implement audio and video encoding. The delivery platform may be comprised of the delivery platform gateway pool that handles edge functions and manages the traffic flows from the users, including implementing the remote protocol, the delivery platform runtimes pool that is where the remote browsers run, and the delivery platform encoders that convert the screen and sound of the T-commerce channel into the compressed video and audio stream. The delivery platform 110 may comprise a number of facilities in addition to the gateway 111 and the remote browser(s) 112, including a channel administrator interface, encoders, gateway discovery service facilities, runtimes, service lists, remote protocol facilities, and the like. In embodiments, the delivery platform 110 is a complete suite of hardware and software components that run the remote browser(s) 112 in a cloud and delivery of audio-video streams to the TV. The remote browsers in the delivery platform may obtain their web content and business login from a back-end T-commerce portal.

The delivery platform gateway discovery service may be the first step that the remote protocol encounters. The remote protocol may contain a number of fixed URLs for accessing the delivery platform gateway discovery service, such as located in different geographic regions. The delivery platform gateway discovery service, based on where the TV is located, may communicate with the remote protocol from that time on, which delivery platform site to work with.

The delivery platform gateway 111 is a software module running on the delivery platform 110 that handles edge functions and assigns traffic flows from the users to remote browsers 112. It implements one side of the remote protocol. It manages the authentication functions for the user, such as interfacing to a single sign-on system. It manages the network proxy and load balancing functions. In a cloud computing implementation of the delivery platform, there may be a dynamic pool of delivery platform gateway modules, meaning that the size of the pool may be pro-actively increased and decreased based on user demand. Delivery platform gateway models are running and ready to serve incoming users, they are created pro-actively ahead of the user demand and are recycled so that they do not need to re-start to deal with changes to the pools of delivery platform gateways or delivery platform runtimes. Ultimately the job of the delivery platform gateway 111 is to connect the user to an instance of the remote browser that is running on one of the delivery platform runtimes, and act as a form of load-balancer that receives initial TV client 108 requests to connect to a remote browser 112 instance.

In embodiments, the delivery platform runtimes are compute platforms whose function is to run part or all of a remote browser. There is a pool of them to serve the user community. Each live user will have a corresponding remote browser and therefore will have delivery platform runtime resources as well. In a cloud computing implementation of the delivery platform 110, there would be a dynamic pool of delivery platform runtimes and remote browsers, meaning that the size of the pool is pro-actively increased and decreased based on user demand. Depending on the capability of the underlying servers, and also utilizing further application internal process structure and operating system mechanisms such as cloud computing, virtualization, multi-threading, and the like, there may be several delivery platform runtimes contributing computing or memory resources to each instance of remote browser. The architecture of the pool of physical servers, the delivery platform runtimes, and the remote browser with respect to optimized process and thread management, is an area of delivery platform implementation technique optimization. The delivery platform runtimes may contain special processors to assist the remote browser with special operations, such as special graphics operations, with specialized graphics processors called graphics processing units (GPU), to assist in the processing, such as for processing of very specific 2D and 3D operations.

The remote browser 112 is running on the delivery platform runtimes. There is one running remote browser for each active TV. The remote browser may have a plurality of plug-ins installed into it, enabling it to consume, process, and display the widest variety of content. The remote browser is pointed to, loads, and executes the T-commerce application, where in embodiments under the browser is an active video technology that transcodes, such as to H.264 frames, and sends it to the CPE. As it is executing, the remote browser itself, and in choreographing its plug-ins, builds a pixel map of the screen for the end user CPE. It places this in the remote browser application memory space. In embodiments it also builds a stream of digitized audio, if there are sounds to play along with the visual presentation. This is also placed in remote browser application memory space. The remote browser is also listening to input events, such as a mouse click, or an event from a remote control, which may cause certain functionality in the T-commerce application, such as browsing navigation. The input events come to the remote browser through the remote protocol from the user on the TV. As far as the remote browser knows, it is executing a classic web application interacting with a user. In embodiments, the browser(s) 112 may be hosted through cloud-based virtual machines and storage.

In embodiments, the CPE 106 may be computationally strong enough that it has its own native browser, such that it does not require the services of the remote browser 112. In this instance, the CPE 106 may be able to bypass the front end of the T-commerce system, and go straight to the T-commerce channel 114 or the brand channel 116, without ever going to the remote browser streaming system through the delivery platform 110.

In embodiments, the T-commerce methods and systems as disclosed herein may support a diverse range of CPE devices, from CPEs without native browsers to CPEs with full browser capabilities, where the T-commerce system provides load balancing facilities and determines browser capabilities of CPE devices to determine what type and extent of processing should occur on a remote browser 112. For instance, the T-commerce system may determine what device is being used and whether the system needs to stream through H.264 (e.g., Roku (no browser), Blu-Ray (no browser), and TVs with weak browsers) or go straight to the T-commerce channel (e.g., where the CPE is a high-capability smart TV with a full browser, or another device such as a tablet, mobile phone, or laptop computer with strong browser capabilities). The load balancer also may send a browser-enabled computing device (e.g., tablet) directly to where it needs in order to access a channel (e.g., T-commerce channel, brand channel) or to the rendered streaming side (using the remote browser 112 in the delivery platform).

The T-commerce application may be HTML and JavaScript code, along with content, authored specifically to create the front-end part of the T-commerce channel experience. This is sometimes called a rich client. As the T-commerce application executes, it connects to the T-commerce server application, and that generates further instruction for the remote browser. The user interacts with the T-commerce application running in the remote browser to experience the T-commerce channel, but only after the pixel map of the screen and the stream of digitized audio are encoded and are sent across the network to the TV client using the remote protocol. The delivery platform encoders perform the encoding.

The delivery platform encoders access the remote browser application memory space to capture each instant of the pixel map of the screen and stream of digitized audio. They efficiently use a video encoding algorithm to produce a playable audio-visual stream, such as in the H.264 format, H.265 format, and the like. The delivery platform encoders may utilize a GPU, where in this instance the GPU may implement a video encoding feature.

The T-commerce channel 114 is essentially a doorway to the T-commerce system across the brand channel(s) 116 delivered via the TV medium. Just like a brick-and-mortar shopping plaza, the T-commerce channel enables a rich, interactive and consistent television-based shopping experience for products and services sold by affiliated brand channels. Architecturally, the T-commerce channel may be viewed as a back-end service provided through the T-commerce portal 115 supporting the remote browsers 112. The T-commerce portal delivers the T-commerce application web files (i.e., HTML5, JavaScript, CSS, and media content) to the remote browser(s) and implements its business logic in its servlets hosted by an application server. It also caches and manages the brand assets needed to render the brand's storefronts by the T-commerce channel application. The browser may repoint to a particular place in the T-commerce channel platform for each brand channel. Each brand channel may be a separate application, such as an HTML5 application. In embodiments, the browser application 112 may keep track of the browsing activity within and across brand channels, so the user can, using simple navigation commands, such as a "back" button, navigate back to a previous location, such as from a brand channel to the T-commerce platform or to another brand channel from which the user has navigated.

The T-commerce channel 114 may include a number of facilities, such as a brand back-end services facility, brand data store, brand server application, channel application repository, channel asset cache, channel package, application cloud, T-commerce channel data store, T-commerce channel REST API, T-commerce channel application gateway, T-commerce channel application server facility, T-commerce channel metadata service, T-commerce channel portal, T-commerce channel server application, T-commerce channel service registry, single sign-on facility, and the like. The T-commerce channel 114 may also provide an application-wide search capability to easily locate information available inside the T-commerce channel, and a navigation history facility for easy navigation within the application.

While executing, the T-commerce application may interact with the web server to get content, business logic, interface to databases, and other functions common to a web architecture application. The T-commerce application may interact with the T-commerce gateway, which is a front-end that serves as an application firewall and load balancer to the T-commerce server application.

The T-commerce server application is the web server that the T-commerce application interacts with to get content, business logic, interface to databases, and other functions. This back-end may be integral to the T-commerce channel experience, implementing functions and connection to the brand channels for content and the brand portals for e-commerce. The code for the T-commerce server application may be authored specifically to create the back-end part of the T-commerce channel experience. The T-commerce server application may run in the context of the T-commerce application server. The T-commerce application server may contain web-server and server side app server and middleware functions, such as in a full-featured back-end web-architecture applications infrastructure.

Although much of the 'shell' of the overall T-commerce channel 114 experience may be created by the code of the T-commerce application and the T-commerce server application running, the actual brands may make their goods and services available through the brand channel 116. The T-commerce application and the T-commerce server application access the brand channel as the user shops (or is entertained by) whatever experience the brand wants them to have (e.g., it is the viewing and shopping experience owned and publicized by a specific brand). With this layered approach, the brand-specific e-commerce enabled TV channel may be viewed as being 'within' the T-commerce channel experience. For instance, the brand portal may implement many of the assets of the brand channel and e-commerce mechanisms themselves.

A brand channel may be developed through a brand channel template facility, where each brand populates its own channel per a reference design. The reference design may specify standard capabilities for a standard way of making purchases through the T-commerce system, such as by presenting SKUs for particular products. The brand channel may be made to be similar to the brand's website offering, combined with the website offering to make one, multi-domain brand T/e-brand channel site, and the like. This channel may be made to be scalable, such as per the capabilities of the device and pathway through which the user enters the system. In embodiments, a channel may be created from the brand's website, where content, image, video, and the like, are pulled from the website in the creation of the brand channel.

In embodiments, the brand channel offering from the brand may be able to utilize the benefits of offering a product through a browser to a high definition smart television, such as combining product images and supporting video streams. For example, consumers may want to have the combined experience of viewing a product (e.g., a dress) and hearing from the designer (e.g., Tory Burch). The designer could, for example, be in the upper right hand corner telling the user about products in the spring lineup, such as by placing a link to the video next to the SKU of the product, or showing a video of the spring lineup with SKU linking to the product currently being shown.

The brand portal may be the e-commerce part of the brand channel, containing the specific goods and services shopping and buying experience. For instance, a user may utilize the brand portal with a brand specific shopping cart to checkout in completion of an e-commerce transaction. In an alternate embodiment, the shopping cart may be configured within the T-commerce channel, where the T-commerce channel exchanges purchasing information with the brand channel. A payment facility may be provided, where the T-commerce channel provides support for a seamless shopping experience across brands by providing the relevant payment information required by brand channels' respective payment systems. In some cases, for example, the brand channel may not have a shopping cart, but rather the T-commerce system has the cart, where the T-commerce system has a feature that bridges channels or platforms so a user action in one place is tracked and causes something to happen in another place, such as the user going back to the T-commerce system to buy something, check out, or the like. When a user is checking out, the user may have a 'guest checkout', 'use my TV' account, that, once set up, enables the user to have a password that works for all channels (single sign-on). Purchases may be charged to the user's credit card, such as though an order web app. The order web app may have the address, billing address, what the user wants to buy, a credit card number, and the like. The order web app may need to get that information to a location for the brand (e.g., Nike), that has a web page and an order form. On the brand site, the information from when the user was asked various questions exists; that is, the system provides stored information based on answers to questions within a brand channel or the T-commerce system, which can be passed to another relevant system, such as a brand's e-commerce website.

In embodiments, the user profile on the T-commerce system may store purchase information (e.g., payment information), brand-specific information (e.g., shoe size), preferences (e.g., style, price constraints), and the like. The T-commerce system may utilize a payment proxy that enables the system to go through the formatting to write to the brand site as if the user filled it out directly. The brand site may be the merchant of record, but the T-commerce system could be what it sees buying a pair of shoes. Payment confirmation may go to the order web app, which writes to the T-commerce channel (e.g., which now puts the item in the 'purchased' bucket). The T-commerce system may utilize a content proxy, such as for when a brand has content on its website, and the T-commerce system is going to use a content proxy to either scrape content off the page or access an API at the brand for a product feed, which goes to the content proxy and the HTML 5 application of the brand channel, which knows what to do with it.

The structure of the brand channel sites that are exposed through the T-commerce channel may be different from their web or mobile equivalents. While brands may use much of the content that came from the development of the web or mobile sites, their design may be adjusted to take advantage of the TV genre and the T-commerce channel style, such as emphasizing the interactive capabilities of the T-commerce system. The system may provide for a site style and interfacing guide to help brands design their T-commerce specific brand channel sites. Interfacing with the brand channel content may be meta-data requirements-driven such that it 'registers' and 'integrates' with the T-commerce system framework. For example there may be a single sign-on (SSO) system such that the consumer can sign in once to the T-commerce channel and then (if configured) be signed in to the brand sites. Another example is there may be a consistent left-navigation set of controls that are placed and managed by the T-commerce channel application, but the contents and destination of the navigation controls may be populated by the brand site (e.g., there may be meta-data expected from the Brand to fill that in). Other framework requirements may include meta-data to participate in the T-commerce channel favorites mechanism, or perhaps unified order history. While the ultimate goal is for new brands to do minimal work to provide a brand channel accessible to the T-commerce channel, the main goal is to provide a high-quality visual presentation capability that will fulfill the highest expectation for high performance and capability so that the brands realize that this medium is far more than 'better TV advertising' and 'better Web site' combined. That it is a next-generation interactive, commerce-enabled brand shopping and commerce destination.

The advertisement facility 118 may be provided, which accesses an inventory of advertising assets, and serves them up to advertising opportunities within the T-commerce channel, the TV home screen, and with the brand channels. The T-commerce system may leverage the user of the advertisement facility to offer users targeted advertisements based on the current viewing and their shopping history contexts. While ads registered in the ad server may come from the brand channels, the user contexts may be provided from the T-commerce channel, which may keep track of each TV and its registered users' brand channels, favorites, shopping carts, and the like. This information may be periodically pushed to the advertisement facility 118 and to the analytics facility 122 in order to allow ad personalization and individualization.

The payment facility 130 may provide an integral part of the electronic T-commerce system. The payment facility may facilitate financial exchange that takes place online between buyers and sellers. The content of this exchange is usually some form of financial instrument, such as an encrypted credit care number. A consumer's web browser may deliver payment instructions to a merchant (e.g., to a brand, or to the system through the T-commerce channel), who forwards those instructions to a network bank. The bank, in turn, authenticates and verifies the individual and disburses funds to the merchant. The merchant delivers the purchase product upon customer verification. The system may not support its own payment processing capability, but instead rely on brand-specific payment processing. However, the system may support a seamless shopping experience across brands by providing the relevant payment information required by brand channel payment systems. For example, the system may provide a user with a payment page when they place an order within the T-commerce system, which allows users to update their payment profile, such as billing address, shipping address, credit card information, and the like, so that the system can provide this information to the brand channel payment system in execution of the purchase from the brand.

The network management facility 113 may be supported by an operational support system through which administrators and customer support teams can monitor and manage all aspects of the daily operations. This includes the resource management and scalability of the remote browser server farm, the T-commerce channel portal and its back-end systems, the content of the user databases and brand assets, and the like.

The analytics facility 122 may allow the T-commerce channel to make intelligent and timely decisions within the T-commerce system. Business intelligence enabled analysis of information captured within the T-commerce channel application may provide access to use data that provides competitive advantage. The T-commerce channel is a doorway to T-commerce system across affiliated brand channels delivered via television medium. The T-commerce channel enables a very rich, interactive and consistent television-based shopping experience for products and services sold by affiliated brand channels. Business intelligence enabled analysis of information captured within T-commerce application is potentially a compelling opportunity. This enables the system to proactively work smarter and have a competitive advantage rather than react to crises and opportunities. This essentially, in turn, ushers in an environment whereby opportunities are capitalized before the competition; problems are identified and resolved before they escalate into crises; business processes, products, and services are reengineered in order to enhance customer satisfaction and loyalty a proactive and efficient manner.

In embodiments, the analytics facility 122 may provide for hybrid data stream analytics. For example, considering a user on the system, the system may know (from past brand channel interactions) that the user's wife likes Tory Burch and Kate Spade, where the user lives, how often they go shopping, and the like. The system can then go to a brand channel, such as Bloomingdales, and request (subject to privacy): "what are the Bloomingdale's households in the USA?" From the smart TV processor and memory, the system also knows what the user watches, and when, as well as, for example, what other brands the user and his wife shop for. For instance, the system may know that the user watches 'The Voice'. From this information the system may determine which households are watching what show, and how this watching correlates to purchases made. The system can go to actual people, not just sampling and projection; that is, the system may actually go 'down' to statistically significant sections or individuals, rather than projecting up. Analytics can be applied to data for actual people, not just based on a panel. In embodiments, the system can reach millions of people (dramatically more than Nielsen or Comscore, for example, which track a small subset of TV watchers).

It may be noted that the TV is unlike any other device because the TV is not typically an individual's TV—it is often a group device, such as for a family or a couple. For instance, the user's daughter goes to American Girl and puts products on a wish list, but the user's wife may buy them. The user's wife then places products on a wish list, and the user may buy them. The system may derive family interplay from purchase behavior. For instance, suppose one user wants to hide what they bought, so they set up a separate payment account with a separate payment account. Another family user only makes purchases one credit card. Through these interchanges, the system may be able to determine relation models. For instance, it the relationship model showing a 'transparent relationship' versus the 'opaque one'. The system may be able to derive intra-family usage from the usage data.

In embodiments the system may provide for user ID management, where the user is able to create a portable User ID that ties usage together across user platforms. Within the television domain, every TV has a unique ID. The first time the TV is turned on, the system begins building a data model. The system may also be able to tell, such as from usage data, if the TV is in the living room vs. the bedroom. One user sets up a profile and login to the bedroom TV. Now their login is their path (ID), so they can go to the neighbor's house and login. The user may go to their tablet and have a unified account structure between their tablet and TV. This capability may allow for personalization, where the system is able to personalize to users through the brand channels. For example, a woman says, "I'm a size 6 and I wear a size 7 Tory Burch flat". The system may be able to take the concept of personalization and push it through to the brand channel itself. If she only shops for flats, then the system may only show flats as a starting point for shopping for shoes. The system may only show products for which the user's size or preferences are in stock. The system may be able to take personalization and drive it all the way through, enabling the system to provide a shopping experience that is designed for the user. In embodiments, a user profile may be provided a sizing avatar, such as works across all channels.

Figure 2:
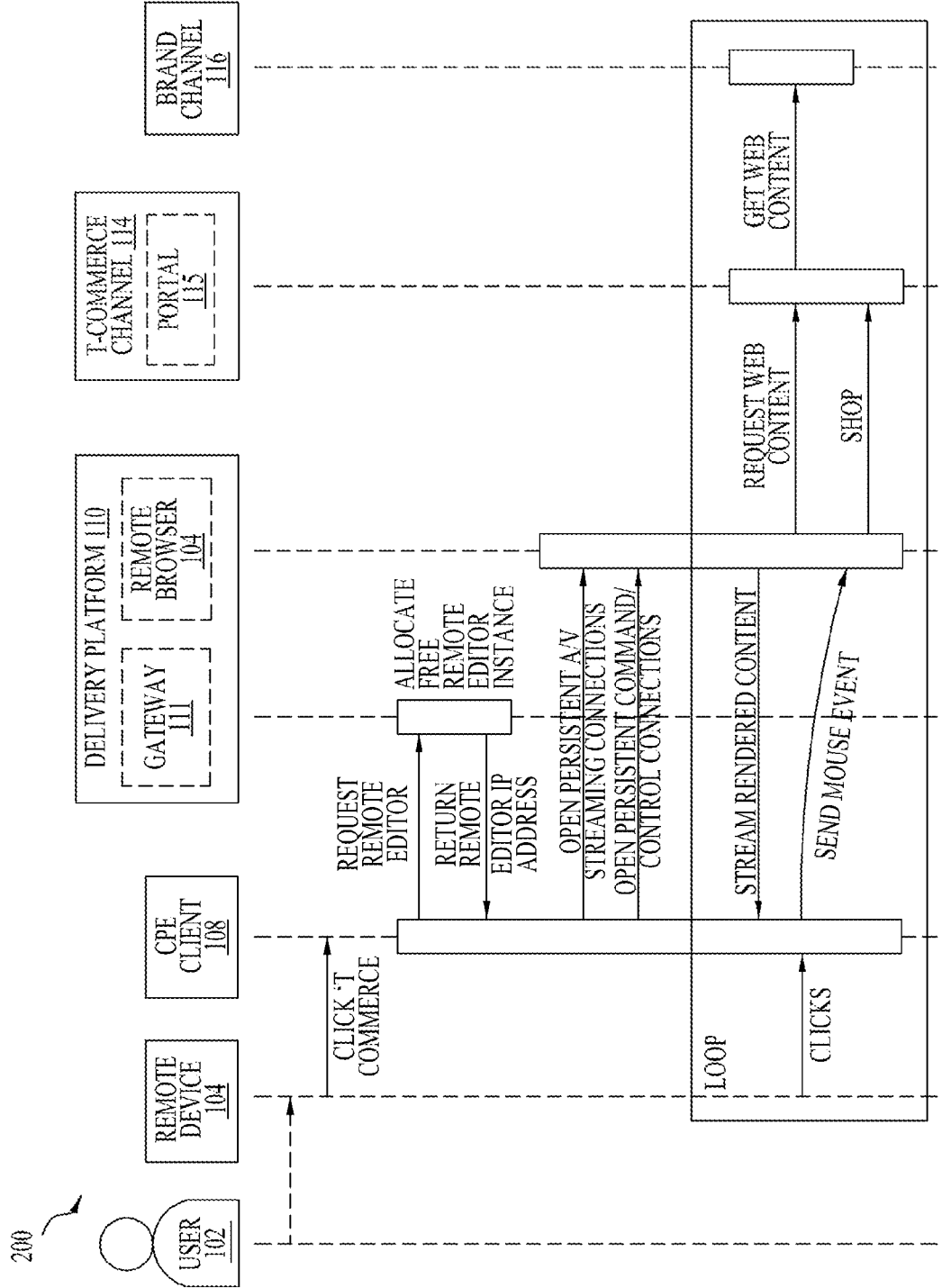
FIG. 2 depicts an embodiment flow diagram for the system during a user interaction with brand channel content.

The user experience through the system may include various user interaction modes, such as entering the T-commerce channel and shopping for consumer products ('window shopping'), managing favorites, managing their shopping cart, entering the brand channel and shopping for a specific brand product, managing settings, and the like. Referring to FIG. 2, an embodiment user experience system process flow diagram 200 is shown, such as resulting from a typical shopping experience from a user. Note that the diagram does not show the initial site discovery, described in more detail herein. The process flow begins with the user 102 turning on the CPE (e.g., smart TV) with a remote device 104 (e.g., a remote control for the TV that has sensor-based pointing capabilities). The user then selects to enter the T-commerce system, such as through selecting a displayed T-commerce icon on the TV homepage through the remote device. The selection (e.g., 'click' of the remote on the icon) is then received by the CPE client 108. The CPE client requests, through the Internet to the delivery platform 110, a remote editor from the delivery platform gateway 111. The delivery platform gateway allocates a free remote editor instance, and returns the remote editor IP address to the CPE client. The CPE client then opens a persistent A/V streaming connection from the remote browser 112. Streamed rendered content then begins to flow from the remote browser to the CPE client, such as corresponding to additional user selections through the remote device. For instance, the user, having selected to enter the T-commerce system, may be directed to the T-commerce channel, and so streamed rendered content may flow from the T-commerce channel 114. In this instance, the remote browser would request web content from the T-commerce channel through the T-commerce channel portal 115, and that content would be streamed back through the remote browser to the CPE client. The user may then select to enter a brand channel 116, which would result in brand channel web content being delivered back to the CPE client. This process repeats as the user navigates through the T-commerce system user interface, such as displayed on the user's TV. In embodiments, the system may enable single-click functions, such as through a single-click to reach the T-commerce channel, to reach a brand channel, to select a specific product, to purchase a specific product, and the like.

In embodiments, the user may also utilize a second computing device in concert with actions taken with the CPE, such as with a smart phone, a tablet, a laptop computer, and the like. That is, the user may access the T-commerce system through the CPE and through the second computing device. For instance, the user may be accessing a brand site through the CPE, where the brand site is streaming audio-video content, while the user is simultaneously viewing products through the same brand site on their tablet. The brand site may take advantage of this capability by offering complementary content presentations through the TV and through the second computing device. For example, the TV may be streaming content related to makeup products while the user is able to interactively 'try on' makeup through their tablet, such as through a virtual reality viewer facility where the system recognizes the physical product in the real world and connects back to the brand channel. This ability to coordinate usage of the T-commerce system through the multiple computing platforms may create a synergy that improves the user shopping experience beyond the use of the two computing platforms combined in separate, uncoordinated use.

In embodiments, the user may access the T-commerce system through the second computing device without ever utilizing the CPE, where the second computing device jumps over the front-end of the T-commerce system, and goes straight to the T-commerce channel 114 or the brand channel 116, without ever going to the remote browser streaming system through the delivery platform 110. The second computing device, such as a tablet, may also utilize an app that can be put it in as a plug-in to the browser (like a TV for the streaming experience), or a client app can be deployed for H.264 streaming right on the tablet. In this way, brands may be able to develop content for display to a TV that can also be used for a computer device, such as a tablet. Brands would now have multiple ways of connecting through a user device to the T-commerce system, where the brand may be able to re-utilize the brand's website in an HTML environment. Users are then enabled to shop through multiple viewing-access platforms, where either platform may act as the entry point for the other, such as with a single sign-on. In addition, entry points may be created by brands on their company website, enabling users to enter the T-commerce system from brand sites, into a brand's channel, and back again.

In embodiments, the T-commerce system service may be inserted within a third-party device, such as a digital streaming device (e.g., a Roku box), where the digital streaming device may not have a browser.

In embodiments, PCI compliance in a smart TV embodiment may go through an order web app (e.g., a side chain). In the digital streaming device without a browser, the system may have to be PCI compliant through the entire chain (e.g., go through the cloud to the T-commerce channel and brand channels to the brand, and the like).

In embodiments, the user may access the T-commerce system through a standard television station channel or through a cable network cable system, such as by linking a product advertisement on the station through an HTTP live streaming (HLS) player with an active video client. In an example, the brand may take out an ad on the station, where the user is able to connect to the T-commerce system through the ad linkage. For instance, suppose Nike decides to buy a 15 second spot in a channel. In that commercial, it says if you want to learn more about the shoe, you click and go to the SKU page of the Nike Brand Channel and you can buy it with guest checkout. Nike will have created a destination for the TV click-through for that product. The T-commerce system may provide infrastructure that will point at the station, and other times it will point to T-commerce channel. The system may instruct the browser to point to the appropriate location. In this instance, the T-commerce system may jump over the T-commerce channel and take the user down to the SKU (and the system goes to that URL). A 'back' button would now take the user back to the station (not back to see the other brands). In this way, the T-commerce system keeps track of where the user entered the system, so that the user can be returned to their point of entry when they go 'back'. In a cable TV scenario, the cable provider may need to embed the active video client in their application, with the ability to transfer over to the brand channel, with hand off and hand back to the cable provider. The cable provider could also provide connectivity to the T-commerce system via the browser, such as to transfer out to the local browser that points to a brand, skipping the active video facility. In this way, the user would get a browser-like experience rather than a streaming experience. The T-commerce system may determine the method of delivery based on the capability of the CPE.

In embodiments, the T-commerce system may utilize automatic content recognition (located either locally on the CPE or within the T-commerce system) as a method of linking content being viewed on the television to a brand product offering through the T-commerce system. For instance, the user may be watching television through cable, where the television has embedded technology for automatic content recognition. The automatic content recognition system may monitor the video, find a product fingerprint, and match the product fingerprint to products within the T-commerce system. Once the product is identified, the system may link the product to the user's CPE screen and ask the user to, for instance, 'click here if you want to see the LeBron shoe'. If the user clicks, they are taken through the T-commerce system to the product.

In embodiments, the T-commerce system may provide for remote browser rendering of T-commerce content to user equipment in a brand offering product environment, including the determination of the native capabilities of a CPE, and rendering content through a remote browser to the CPE so that the user may utilize the brand content services of the T-commerce system even when the CPE does not have native capabilities, such as a native full web browser, for direct viewing of web formatted content. In the instance when the CPE has native capabilities, the T-commerce system may provide the CPE with an interface to the brand content services of the T-commerce system without the use of a remote browser.

In embodiments, the T-commerce system may comprise a server-based multi-media content delivery platform (DP) comprising a plurality of browsers, adapted to serve a plurality of a television-based customer premises equipment (CPE) units through a remote protocol across the Internet, and where the browser renders web-based multi-media content to the CPE on a display based on whether the CPE is adapted to render web-based content with CPE native facilities; a television-based e-commerce (T-commerce) facility in communicative connection with the DP, and through at least one of the browsers to the CPE, the T-commerce facility providing access to a plurality of e-commerce content offerings through a CPE graphical user interface; and at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise. The determination of whether the CPE is adapted to render web-based content with CPE native facilities may be determined when the CPE connects with the DP, where if CPE native facilities do not meet a minimum set of predetermined criteria, a browser is assigned to the CPE for rendering content. The display may be comprised within the CPE. The display may be connected to the CPE, such as when the CPE is a television and the display is the display of the television (e.g., the CPE is a Blu-Ray player connected to a television.

In embodiments, the CPE may be a smart television, a Blu-ray device, a digital media-streaming device, and the like. The CPE may comprise a television client through which the CPE is capable of connecting to networked computer devices on the Internet. A user of the CPE may interface with the CPE through the CPE graphical user interface with a remote device, the remote device adapted to provide point-and-click functionality through sensor-based control, where the sensor-based control is through a motion-sensing sensor. For example, the sensor may be an inertial measurement unit, accelerometer, and the like. Brands may be enabled to serve relevant libraries of brand-related video and image content to the CPE. Users of the CPE may be enabled to browse and shop through libraries of brand content using the CPE. User navigation may be tracked as a user of the CPE navigates amongst the e-commerce content offerings where brand content may reside. The DP may deliver content to the CPE dependent on the type of device the user is operating as a CPE.

In embodiments, the T-commerce system may provide an interface to user CPEs that have capabilities for local browser rendering of T-commerce content in a brand offering product environment. For instance, a smart TV client may be capable of supporting service requirements of the system (i.e., removing the need for remote browsers), which includes the combination of a smart TV client with embedded browser to enable shopping a brand channel through the T-commerce system.

In embodiments, the T-commerce system may comprise a server-based multi-media content delivery platform (DP) comprising a plurality of browsers, adapted to serve a plurality of a television-based customer premises equipment (CPE) units through a remote protocol across the Internet, and wherein the at least one renders web-based multi-media content to the CPE based on the DP determining that the CPE is not adapted to render web-based content and provides direct web-based multi-media content to the CPE based on the DP determining that the CPE has native facilities capable of direct rendering of web-based content; a television-based e-commerce (T-commerce) facility in communicative connection with the DP, and through at least one of the browsers to the CPE, the T-commerce facility providing access to a plurality of e-commerce content offerings through a CPE graphical user interface; and at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise. In embodiments, the native facilities may be browser capable of direct rendering of web-based content.

In embodiments, the T-commerce system may provide for a single-click product purchase function (e.g., a single-click button on the home page, included in the T-commerce channel, included in a brand channel, and the like) from a user of a CPE within the T-commerce system, where a single-click user experience is provided for accessing and purchasing a brand product through the CPE and brand channel. In embodiments, the T-commerce system may comprise a server-based multi-media content delivery platform (DP) comprising a plurality of browsers, adapted to serve a plurality of a television-based customer premises equipment (CPE) units through a remote protocol across the Internet; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise; and a payment facility, wherein a user of the CPE executes a purchase of a product presented by the brand channel through a single-action purchase button displayed through the CPE graphical interface utilizing user purchase information previously provided by the user to the payment facility. In embodiments, the single-action purchase button may be depressed utilizing the remote device.

In embodiments, the T-commerce system may provide brand product advertisement delivery to a CPE through the T-commerce system, such as delivery of product advertisements through the home page or channel layers (e.g., T-commerce channel, brand channel) to the CPE. In embodiments, the T-commerce system may comprise a server-based multi-media content delivery platform (DP) comprising a plurality of browsers, adapted to serve a plurality of a television-based customer premises equipment (CPE) units through a remote protocol across the Internet; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise; and an advertisement facility, wherein the advertisement facility delivers an advertisement through the CPE graphical user interface. In embodiments, the advertisement may be related to a brand product being displayed to a user through the CPE graphical user interface.

In embodiments, the T-commerce system may provide for tracking of user browsing navigation through a multi-layered T-commerce system, such as tracking the click-navigation path of users through the system in order to provide the proper return path (e.g., dependent upon how the user entered a particular site or layer within the distributed web system). For instance, the T-commerce system may keep track of the browsing activity so the user can hop back from one brand channel to a region of the T-commerce system, such as a shopping plaza with multiple brands available, then over to another brand channel. In embodiments, the T-commerce system may comprise a server-based multi-media content delivery platform (DP) comprising a plurality of browsers, adapted to serve a plurality of a television-based customer premises equipment (CPE) units through a remote protocol across the Internet; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise; and a browsing navigation facility, the browsing navigation facility enabling a user of the CPE to navigate amongst the plurality of e-commerce content offerings of different brands through the CPE graphical user interface, wherein the navigation is enabled at least in part through the tracking of the user's browsing through the CPE user interface with respect to content of at least one brand. In embodiments, the tracking of the user's browsing may enable returning to a previous browsing location that is outside the content of brand content currently being browsed by a user.

In embodiments, the T-commerce system may provide for consumer product analytics, such as provided within the system with regard to the T-commerce brand layered system. In embodiments, the T-commerce system may comprise a server-based multi-media content delivery platform (DP) comprising a plurality of browsers, adapted to serve a plurality of a television-based customer premises equipment (CPE) units through a remote protocol across the Internet; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise; a payment facility for the purchase of a product as presented through a brand channel; and an analytics facility, wherein at least one of the browsing behavior and the purchase behavior of a user of the CPE is utilized at least in part to predict future purchase behavior. Further, the T-commerce system may comprise an advertisement facility, where the prediction of future purchase behavior is utilized in the improved targeting of advertisement delivery through the advertisement facility.

In embodiments, the T-commerce system may provide for a parallel website-pointing facility for multi-platform user experience in a remote browser based T-commerce environment, such as through the user's ability to simultaneously access a brand site through the CPE and through another device, such as a tablet. In embodiments, the T-commerce system may comprise a server-based multi-media content delivery platform (DP) comprising a plurality of browsers, adapted to serve a plurality of a television-based customer premises equipment (CPE) units through a remote protocol across the Internet; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise; and a web-based computing device capable of accessing the plurality of e-commerce content offerings through the DP, wherein the user utilizes the web-based computing device to simultaneously access the web-based product being accessed through the CPE. In embodiments, the web-based computing device may be a mobile computing device. The CPE may access product content through at least one of the browsers of the DP, and the web-based computing device may utilize its own native browser for access to the product content.

In embodiments, the T-commerce system may provide payment card industry (PCI) compliance in a remote browser based T-commerce environment, such as tracking and maintaining PCI compliance throughout the system, especially as applied to a remote browser system with multiple layers of commerce channels, such as the T-commerce channel overlaying the brand channels. In embodiments, the T-commerce system may comprise a server-based multi-media content delivery platform (DP) comprising a plurality of browsers, adapted to serve a plurality of a television-based customer premises equipment (CPE) units through a remote protocol across the Internet; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise, and a payment facility for managing the payments of products selected for purchase by a user of the CPE, wherein the payment facility manages payment card industry (PCI) compliance for the purchases from the plurality of e-commerce content offerings.

In embodiments, the T-commerce system may provide for automatic load balancing between client-based browser usage and remote browser usage in a T-commerce environment, such as including the capability to determine browser capability of a CPE to support a variety of system requirements (e.g., Blu-ray player with no browser vs. older TV with weak browser vs. newer TV with strong browser). In embodiments, the T-commerce system may comprise a server-based multi-media content delivery platform (DP) comprising a plurality of browsers, adapted to serve a plurality of a television-based customer premises equipment (CPE) units through a remote protocol across the Internet, wherein each of the plurality of CPEs is evaluated by the DP for native browser capability, and where the DP connects the plurality of CPEs to at least one of the plurality of browsers if determined to be below a predetermined threshold for native browser capability; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise.

In embodiments, the T-commerce system may provide a layered purchase checkout system in a television-based brand-offering environment, such as when the user's purchase 'cart' is in the T-commerce channel, not with the brand channel. For instance, the user may be viewing a product within a brand channel, and click to add the product to their cart, but the system maintains the cart at the T-commerce channel level and exchanges purchase data with the brand at the point of sale. In embodiments, the T-commerce system may comprise a server-based multi-media content delivery platform (DP) comprising a plurality of browsers, adapted to serve a plurality of a television-based customer premises equipment (CPE) units through a remote protocol across the Internet; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise; and a payment facility for managing payment for purchases made by a user of the CPE amongst the plurality of e-commerce content offerings, wherein the payment facility executes a purchase of a brand channel product, and then reconciles the purchase with the brand enterprise.

In embodiments, the T-commerce system may provide for concurrent product image viewing and product video streaming to a CPE in a brand-channel offering environment. For instance, the system may provide for the capability to show the user product images and data concurrently with a related video stream to the CPE, such as concurrently showing an image of the product and a trusted personality discussing the product. In embodiments, the T-commerce system may comprise a server-based multi-media content delivery platform (DP) comprising a plurality of browsers, adapted to serve a plurality of a television-based customer premises equipment (CPE) units through a remote protocol across the Internet; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise, wherein a the brand-specific e-commerce product content is at least one image of the product and at least one item of video-based content related to the product. In embodiments, the video-based content may be a multi-media presentation of the product, a recommendation for the product, an advertisement for the product, and the like.

In embodiments, the T-commerce system may provide for social network derived product recommendations in a brand offering product environment, such as social network recommendations linked with brand-channel product offerings. For instance, a user may be viewing a product and being presented recommendations from their friends based on the user's profile (e.g., T-commerce profile, social network profile). In embodiments, the T-commerce system may comprise a server-based multi-media content delivery platform (DP) comprising a plurality of browsers, adapted to serve a plurality of a television-based customer premises equipment (CPE) units through a remote protocol across the Internet; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise, wherein a social media based recommendation is presented through the CPE graphical user interface along with the product content. In embodiments, a first user may use the CPE, and the social media based recommendation is provided from a second user who is listed as a friend of the first user on a social media facility. A first user may use the CPE, and the social media based recommendation is provided from a second user who is celebrity that the first user has made association with.

In embodiments, the T-commerce system may provide the managing 'back' navigation paths through brand channels with content deployed across various systems and devices. For instance, a 'back button' may be managed so that a user is returned to the appropriate environment (e.g., the brand channel), after having been sent to another environment (e.g., an environment for purchasing, an environment for viewing content, and the like), such as when navigating between different devices. In embodiments, the T-commerce system may comprise a server-based multi-media content delivery platform (DP) comprising a plurality of browsers, adapted to serve a plurality of a television-based customer premises equipment (CPE) units through a remote protocol across the Internet by a user; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise; and a web-based computing device capable of accessing the plurality of e-commerce content offerings through the DP, wherein the computing device is used by the same user as with the CPE, where the DP tracks the relative navigation of the user's accesses by the CPE and the computing device, with the DP managing handover between devices as the user navigates between the CPE and the computing device. In embodiments, the computing device may be a mobile computing device. The user may be logged on to both the CPE and the computing device.

In embodiments, the T-commerce system may provide a brand channel environment for hosting both 'TV channels' and web-based applications (e.g., for smart phones, tablets) for disparate brands, such as because web-based application content is visual, these apps and TV channels may work well together in the same brand channel environment. In embodiments, the T-commerce system may comprise a server-based multi-media content delivery platform (DP) comprising a plurality of browsers, adapted to serve a plurality of a television-based customer premises equipment (CPE) units through a remote protocol across the Internet and a mobile computer device adapted to run web-based applications; a television-based e-commerce (T-commerce) facility in communicative connection with the DP, to the mobile computing device, and through at least one of the browsers to the CPE, the T-commerce facility providing access to a plurality of e-commerce content offerings to the CPE through a CPE graphical user interface and to the mobile computing device through the delivery of web-based application data; and at least one brand-specific e-commerce product content communication channel (brand channel) as at least one of the plurality of e-commerce content offerings to the CPE and at least one web-based application to the mobile computing device, the brand channel presenting brand-specific e-commerce product content, as presented though the CPE graphical user interface, the brand channel being managed by a brand enterprise. In embodiments, the mobile computing device may be a mobile phone, a tablet, and the like. The web-based application adapted to run on the mobile computing device and the e-commerce content offering adapted for use with the CPE may be both managed by the brand enterprise.

In embodiments, the T-commerce system may enable the use of a second, camera-enabled device, with the television-based CPE used in brand channel interaction. For instance, a camera-enabled device (e.g. smart phone, tablet) allows for user interactions, such as allowing a user to try on make-up, try on clothing, or customize a product to the user's image, with the image of the user captured on the camera-enabled device and the resulting, processed images (e.g., the user wearing the selected make-up or item of clothing) being rendered on the large screen of the CPE. In embodiments, the T-commerce system may comprise a server-based multi-media content delivery platform (DP) comprising a plurality of browsers, adapted to serve a plurality of a television-based customer premises equipment (CPE) units through a remote protocol across the Internet, and a mobile computer device adapted to run web-based applications and comprising a camera for viewing a user of the mobile computer device; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise, wherein the mobile computing device is running a web-based application managed by the DP in support of and in conjunction with the presentation of the brand-specific e-commerce product content served to the CPE. In embodiments, the web-based application may utilize the camera to create images of the user in conjunction with the brand-specific e-commerce product content, such as the user being able to simulate their use of the brand-specific e-commerce product content, the user being able to simulate what they would look like when using the brand-specific e-commerce product content, the user being able to apply the brand-specific e-commerce product content to them in a simulation of the use of the brand-specific e-commerce product content, and the like. The web-based application may provide for a camera-based user interface for manipulating a simulation associated with the use of the brand-specific e-commerce product content, such as the camera being used to image the user and to incorporate the user into the simulation, and creating an image of the user simulated with the brand-specific e-commerce product content.

In embodiments, the T-commerce system may provide for a CPE device identifier as a central identifier for customer demographic, psychographic, transactional, and the like, data modeling that stores data about user interactions across multiple brand channels. The unique CPE device ID may be used as the key, a seed, and the like, of a data model for storing and tracking actions for the owner/users of the CPE across the brand channels. In embodiments, the T-commerce system may comprise a server-based multi-media content delivery platform (DP) comprising a plurality of browsers, adapted to serve a plurality of a television-based customer premises equipment (CPE) units through a remote protocol across the Internet, wherein the CPE utilizes a unique device identifier to identify it when interacting with Internet facilities; a television-based e-commerce (T-commerce) facility in communicative connection with the DP, and through at least one of the browsers to the CPE, the T-commerce facility providing access to a plurality of e-commerce content offerings through a CPE graphical user interface; at least one brand-specific e-commerce product content communication channel (brand channel) as at least one of the plurality of e-commerce content offerings, the brand channel presenting brand-specific e-commerce product content, as presented though the CPE graphical user interface, the brand channel being managed by a brand enterprise; and an analytics facility that tracks the CPE unique device identifier when a user of the CPE accesses content through e-commerce content offerings, and utilizes that tracking information to derive at least one of user browsing behavior and user purchase behavior information to help predict future behavior by the user. In embodiments, the T-commerce system may further comprise an advertisement facility, where the prediction of future behavior may be utilized in the improved targeting of advertisement delivery through the advertisement facility.

CPE Clients

Figure 3:
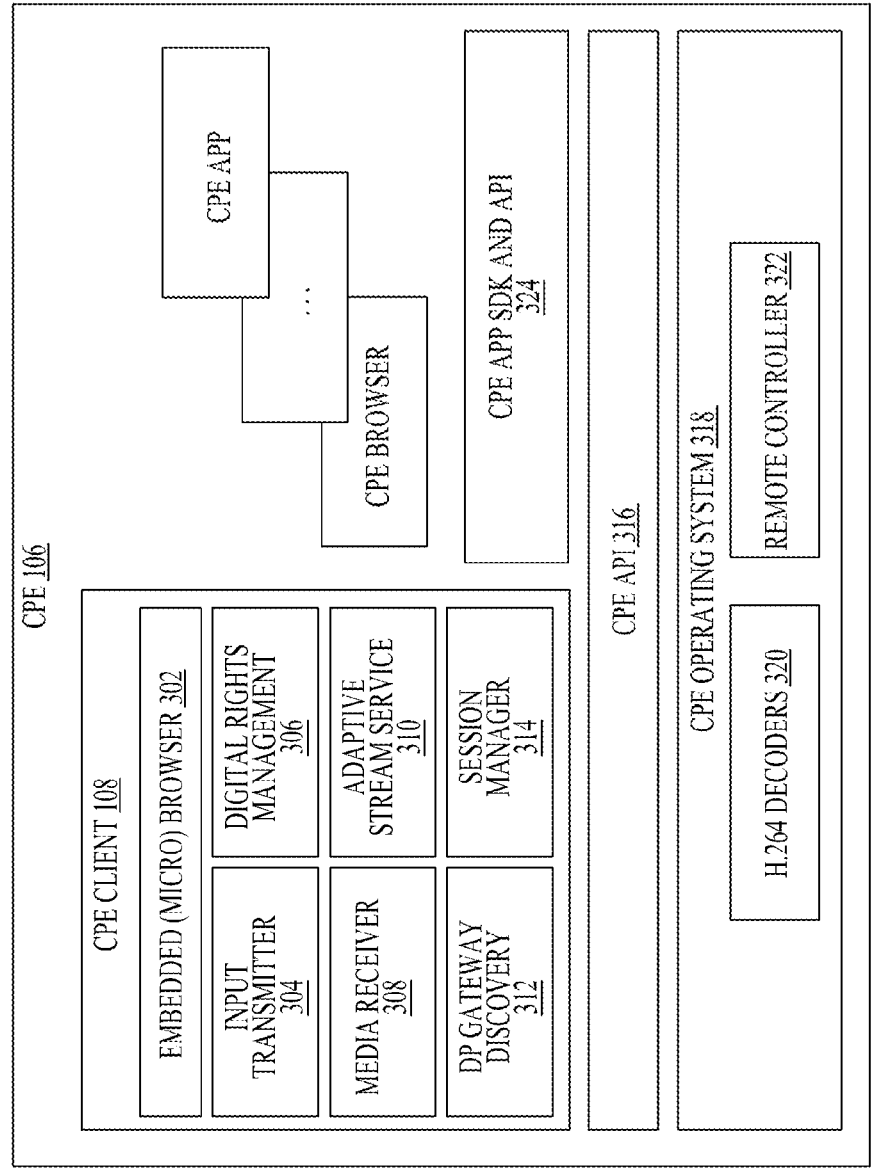
FIG. 3 depicts an embodiment functional block diagram for a consumer premises equipment (CPE) unit.

Referring to FIG. 3, a top-level embodiment block diagram 300 is presented of a CPE 106, showing a CPE client 108, a CPE Operating system 318, a CPE API 316, a CPE app software development kit (SDK) and API 314. In embodiments, a CPE 106 may comprise a CPE operating system 318 which may comprise a number of APIs such as an API for direct video/audio decoding such as an H.264 decoder 320, rendering APIs for 2D or 3D images or both, a low level socket network API, a remote controller API 322, and the like. In embodiments, the CPE client 108 may be a native application running on the CPE 106. The CPE client 108 may comprise an embedded (micro) browser 302, an input transmitter 304, a media receiver 308, DP gateway discovery 312, digital rights management 306, adaptive stream service 310, session manager 314, and the like.

In embodiments, the CPE client 108 may: (1) communicate with the delivery platform 110; (2) interface to the APIs in the CPE operating system 318; (3) manage the bi-directional IP-based protocol across the Internet connection of the CPE 106; (4) manage buffers and instrumentation of connection speed and may be enabled to communicate relevant information to the delivery platform 110 for purposes of adjusting network parameters, rate-adaptive compression, or otherwise preventing poor user experience; (5) manage the identification of an appropriate DNS or IP address for connection to the delivery platform 110; (6) handle authentication with the delivery platform 110 which may be based on a MAC address; (7) handle session management with the delivery platform 110 for both online and offline user interactions; (8) handle the switching of the connection mode into an encrypted mode, such as HTTPS and the like, for the transmission of sensitive information such as user payment information, credit card numbers, and the like; (9) and the like.

In embodiments, the DP gateway discovery 312 functionality may comprise a discovery services list (DSL), a pre-installed ordered list of globally managed hostnames or IP addresses at which delivery platform gateway discovery services 502, described later herein, may be located, and the like. The list may be comprised of XML formatted data representing an ordered list of the delivery platform gateway discovery services 502, and the like.

Figure 4:
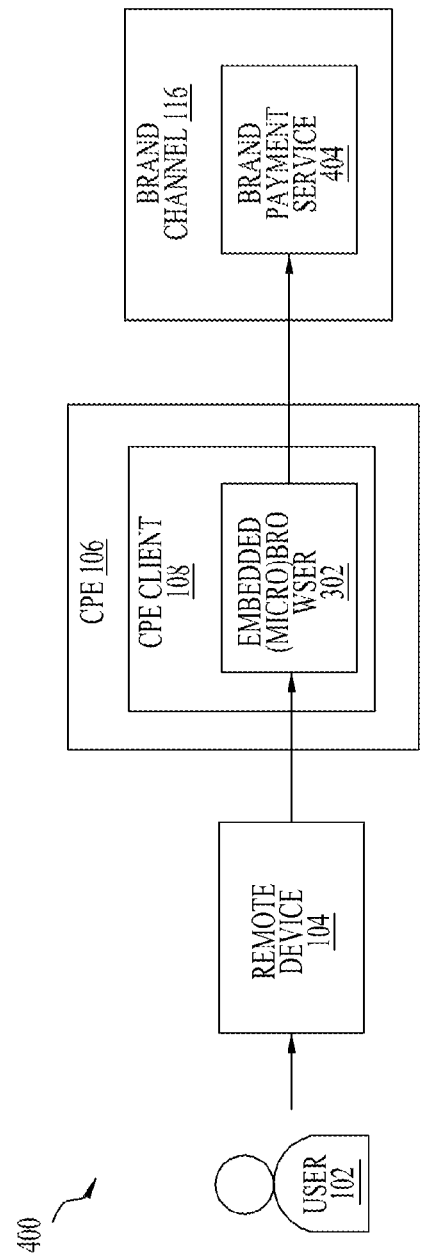
FIG. 4 depicts an embodiment functional block diagram for an interaction between a user and a brand payment service.

Referring to FIG. 4, a top-level embodiment block diagram 400 is shown of a possible connection scheme to support a user's 102 purchases. In embodiments, the user 102 may interact with a CPE 106 using a remote device 104. The CPE client 108 may comprise an embedded (micro) browser 302, which may open a secure HTTP connection directly with a brand channel's 116 brand payment service 404. The user 102 may then provide their payment information such as credit card, billing/shipping address, and the like, directly to the brand payment service 404. Thus, in this embodiment, the user's 102 confidential information need not be transferred through the delivery platform 110.

Delivery Platform

Figure 5:
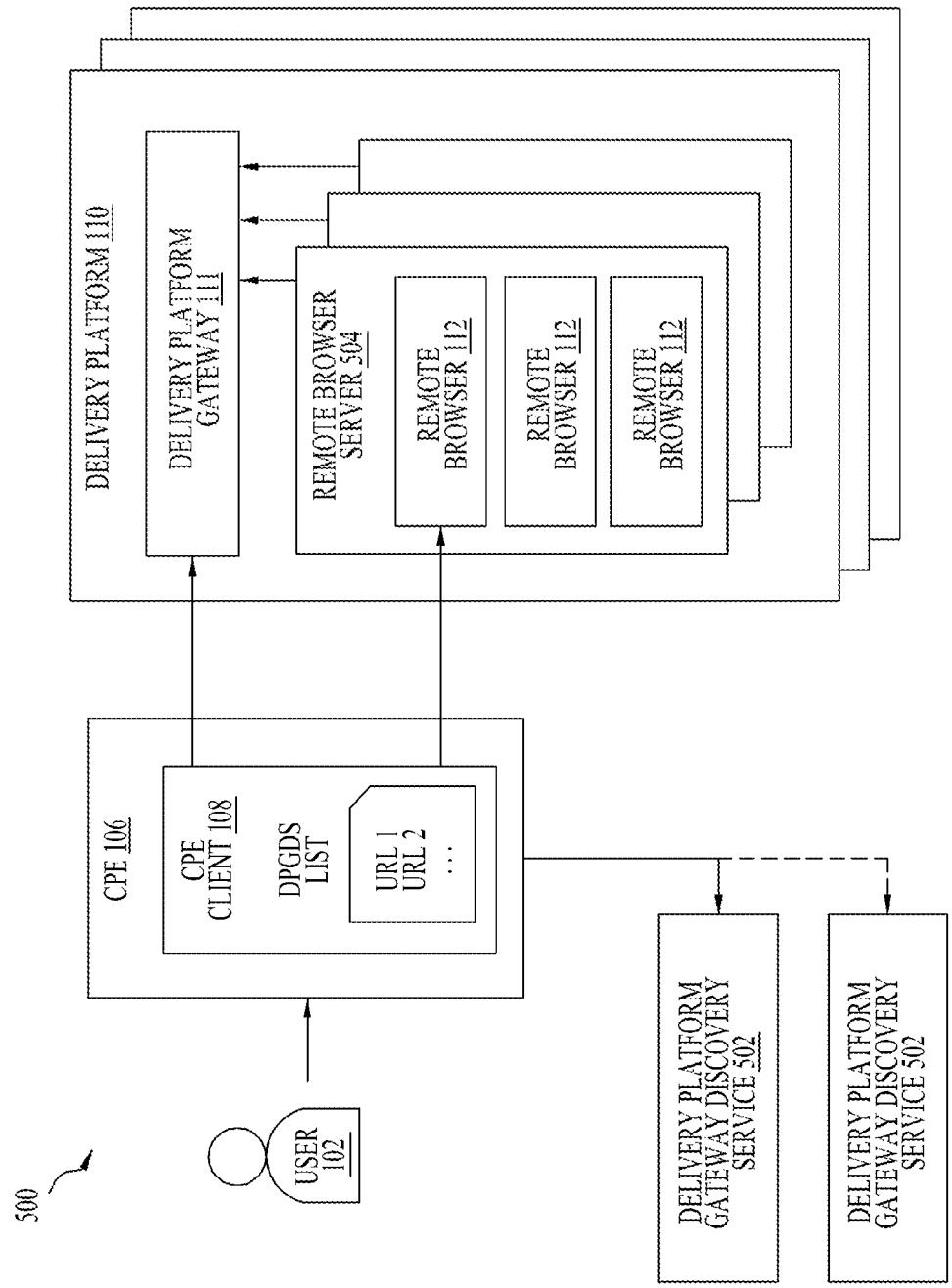
FIG. 5 depicts an embodiment functional block diagram for the delivery platform gateway discovery service.
Figure 6:
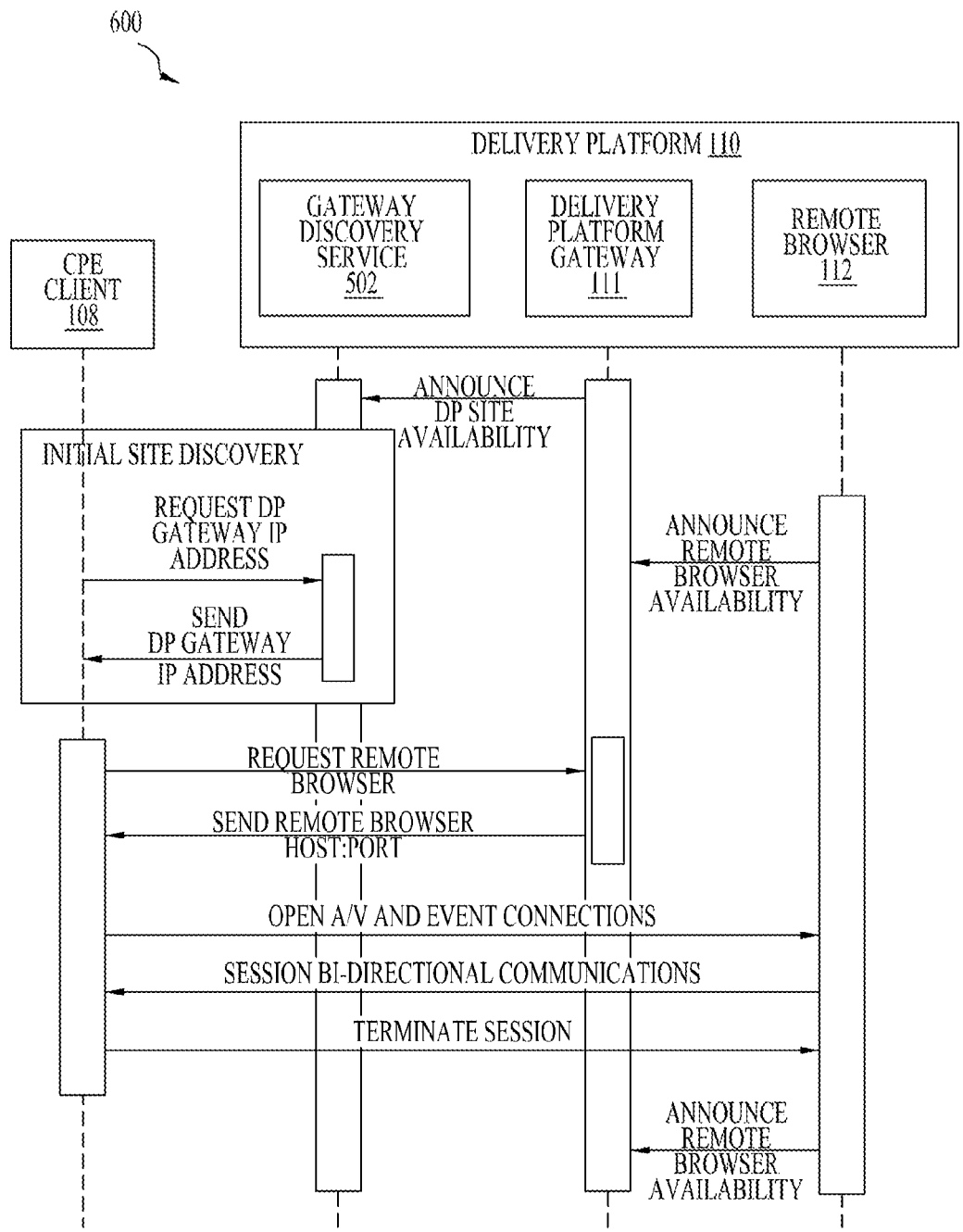
FIG. 6 depicts an embodiment flow diagram for assigning a remote browser through the gateway discovery service.

Referring to FIG. 5, a top-level embodiment block diagram 500 is presented illustrating possible interactions between a user 102, a CPE client 108, a plurality of delivery platform gateway discovery services 502, and a plurality of delivery platforms 110. Each delivery platform 110 may comprise a delivery platform gateway 111, a plurality of remote browser servers 404, wherein each remote browser server 404 may comprise a plurality of remote browsers 112. In embodiments, the delivery platform gateway 111 may manage the pool of available DP remote browsers 112 and act as a load balancer across the plurality of remote browser servers 404. A user 102 may interact with a CPE 106 using a remote device 104 or other means to start a session. In embodiments, a CPE client 108 may interact with one or more of a plurality of platform gateway discovery services 502 to identify a delivery platform 110 with which to interact Referring to FIG. 6, a top-level embodiment block diagram 600 is presented illustrating a sequence of interactions between a CPE client 108 and a delivery platform 110. In embodiments, the CPE client 108 may undergo initial site discovery wherein the CPE client 108 requests the IP address of a delivery platform gateway 111 from one or more of a plurality of delivery platform gateway discovery services 502. A delivery platform gateway discovery service 502 may respond to the request from the CPE client 108 with the IP address of a delivery platform gateway 111 where the IP address may be chosen for geography proximity to the CPE client 108. The CPE client 108 may then send a request for a remote browser to the delivery platform gateway 111. The delivery platform gateway 111 may dedicate an available DP remote browser 112 to that CPE client 108 and respond with a host port for the newly dedicated remote browser 112. The CPE client 108 may then open persistent event and audio/visual connections with the remote browser 112. A session may comprise bi-directional communications over these established connections. The DP remote browser 112 may deliver, to its associated CPE client 108, audio/video streams comprising web content, text, images, data, video, and the like, received from the T-commerce channel 114, brand channels 116, and the like. The DP remote browser 112 may receive events such as cursor movements, click, and the like from the CPE client 108. Upon completion of a session, the CPE client 108 may terminate the session with the remote browser 112. Upon termination of the session, the remote browser 112 may announce its new availability to the delivery platform gateway 111.

In embodiments, the DP remote browser 112 may be implemented using industry standards such as a Web Kit layout engine layered on top of audio and video encoders such as an H.264 video encoder, and the like. In embodiments, the DP remote browser 112 may support HTTP/1.1, HTML5, CSS 2.1, JavaScript 1.8.5 compliance, JQuery 1.9, JQuery UI 1.9, and the like. In embodiments, DP remote browsers 112 may use graphic processing units, CPUs, with appropriate drivers to facilitate run-time performance such as video encoding, and the like. In embodiments, the DP remote browser 112 may be capable of receiving a plurality of input types from remote devices 104 and the CPE client 108 such as click events, cursor movement, coordinates, button presses, and the like. The DP remote browser 112 may then reflect the received input as input to the DP remote browser 112. The DP remote browser 112 may also format the received input into a proper format for use by an analytics facility 122, discussed later herein. In embodiments, when a user 102 locates the cursor on a text field, the DP remote browser 112 may provide a pop-up keyboard for user 102 input rather than utilize a locally available keyboard on the CPE 106.

In embodiments, each of the plurality of delivery platforms 110 may comprise a unified high-performance elastic cloud in the form of a plurality of virtual machines and storage to host and run the remote browser servers 404, remote browsers 112, and the like. In embodiments, the virtual machines of the delivery platform 110 may be hosted on local hardware, in a cloud environment or in a hybrid environment comprising both local hardware and one or more cloud environments. There may be multiple, geographically distributed deployments of the virtual machines on which delivery platforms 110 may be hosted. The delivery platforms 110 may have basic redundancy, fail-over capabilities, and the like supported in cloud environments, local hardware environments, and hybrid environments.

In embodiments, the run-time environment for the DP remote browsers 112 on the deployment platform 110 may store all web-logs, such as URL and input device's 106 event logs, and the like, occurring via the DP remote browser 112. The run-time environment may be able to abstract the DP remote browser 112 from the streaming protocol support. The run-time environment on delivery platform 110 may be able to control DP remote browsers 112, such as start, stop, restart, and the like. The run-time environment on the delivery platform 110 may be able to reuse instances of the DP remote browser 112 to reduce initial response time to requests for a DP remote browser 112. The DP gateway 111 may support caching for some of the brand content and adaptive streaming based on network conditions.

Payment Facility

Electronic payment is an integral part of electronic commerce systems. Electronic payment systems typically facilitate financial exchanges that take place between buyers and sellers. The content of these exchanges is usually some form of financial instrument, such as encrypted credit card number. A consumer's Web browser delivers payment instructions to a merchant, who forwards those instructions to a network bank. The bank, in turn, authenticates and verifies the individual and disburses funds to the merchant. The merchant delivers the purchased product upon customer verification.

Figure 7:
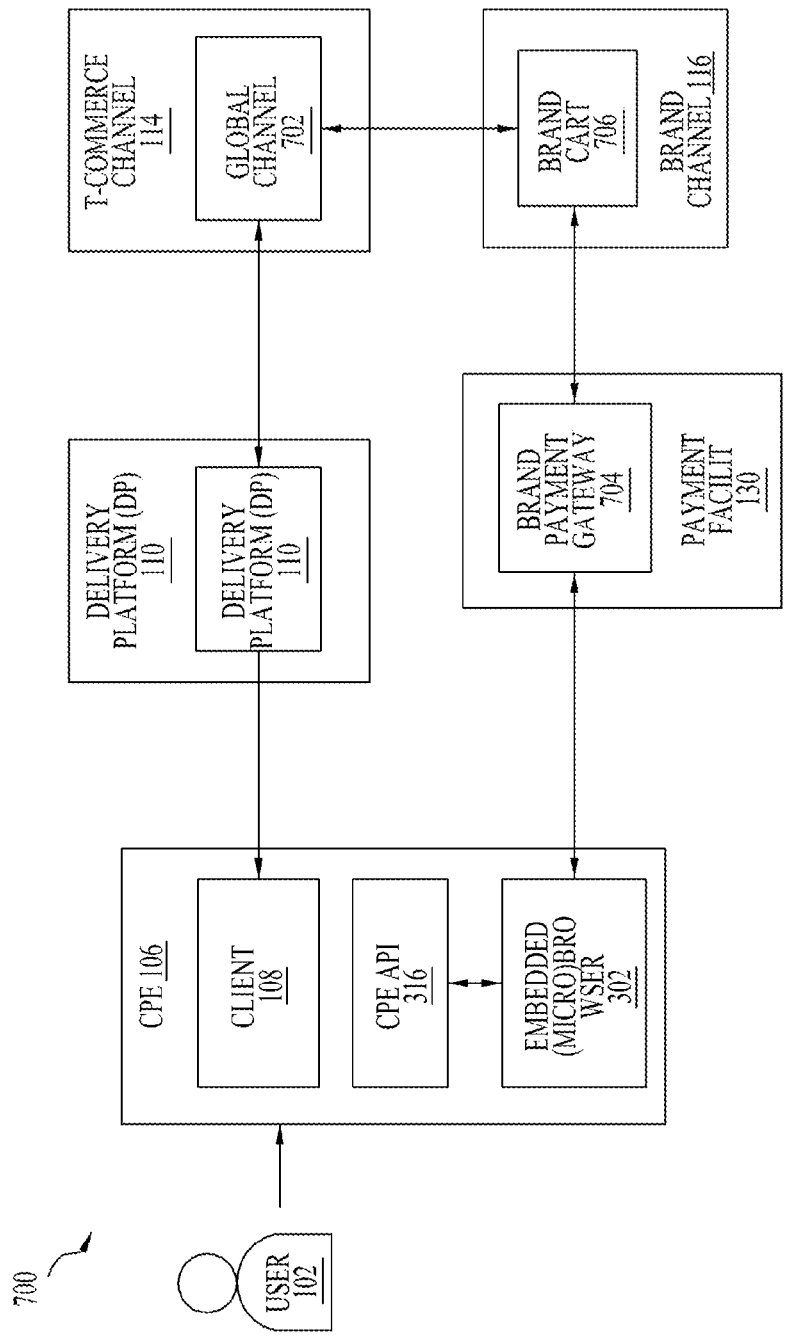
FIG. 7 depicts an embodiment functional block diagram of a user's interaction with a global and brand cart within the system.

Referring to FIG. 7, a top-level embodiment block diagram 700 is presented illustrating interactions between the user 102, the CPE client 108, the delivery platform 110, the T-Commerce channel 114, a brand channel 116, and means of payment processing. In embodiments, the T-Commerce channel 114 may not support its own payment processing capability but rather rely on the brand channels' 116 payment facilities 130. In embodiments, the T-Commerce channel 114 may comprise a global cart 702 whose contents are reflective of the contents of a plurality of brand carts 706 associated with individual brand channels 116. The payment facility 130 may comprise a plurality of individual brand payment gateways 704 wherein each brand payment gateway 704 may be associated with a brand cart 706. In embodiments, a CPE client 108 may interact with an API 316 to launch an embedded (micro) browser 302 through which the user 102 may interact with the brand payment gateway 704.

In embodiments, a user 102 of the T-commerce channel 114 environment may be presented with a payment page to enable the user 102 to enter or update payment profile information such as billing address, shipping address, credit card number, and the like. In embodiments, the payment profile information may be provided, as appropriate, to a plurality of brand payment gateways 704 to facilitate a seamless shopping experience for the user 102 across a plurality of brand channels 116.

In embodiments, the CPE client 108 may facilitate the establishment of an identifier such as a user name, avatar, and the like which may uniquely identify an individual user 102 of a CPE 106 where the CPE 106 which may have a plurality of users 102. This identifier, in conjunction with information that uniquely identifies the CPE 106 (e.g. MAC address) may uniquely identify a user 102 within the T-Commerce channel 114 establishing a unique user ID. Establishment of a unique user ID may facilitate personalization such as tracking information related to each user's 102 actions such as "Add to Favorites", "Add to Wish list", additions to the global cart 702, and the like in terms of the unique user ID. However, if the only identifying information is the unique user ID, there may be limits to the personalization provided by the T-Commerce channel 114. In a non-limiting example, this may result in random brands being displayed to the user 102 relative to sales, trending information, brand promotion banners, and the like.

In embodiments, each unique user 102 may be given an option to define detailed membership information for use by the T-Commerce system. In embodiments, the membership information may comprise mandatory profile information such as name, email, member login, password, and the like. In embodiments, the membership information may comprise optional preference information such as hobbies, interests, gender, age, and the like. In embodiments, the membership information may comprise payment information such as billing address, shipping address, credit card numbers, and the like. In embodiments, the member login and associated membership information may be separate from the information associated with the unique user ID where identification may be partially based on identification of originating CPE 106.

In embodiments, membership information associated with a unique member login such as hobbies, interests, gender, age, "Favorites", "wish list", and the like, may be used to facilitate personalization of T-Commerce channel 114 experiences such as personalized brand tiles displayed on the landing page, personalized display of sales, trending, brand promotion banners, and the like on other pages visited by the user 102. In embodiments, the member login may be shared with and used by the plurality of brand channels 116 for personalization of brand channels 116, and the like. A brand specific recommendation engine may be used to facilitate the personalization.

In another example, the user may already be a member of a selected brand channel 116. In embodiments, the system may have a mapping between T-Commerce channel membership login and membership information for a particular brand channel 116, and the like. If so, the user may seamless log on to the brand channel 116 site using a Single-Sign-On (SSO) mechanism using one or more of a federated authentication process, a delegated authentication process, and the like.

In embodiments, the system may utilize a payment facility 130 associated with a brand channel 116. In embodiments, the user interface of the brand payment gateway 704 may be rendered by the embedded (micro) browser 302 on the CPE 106 and not by the remote browser 112 on the delivery platform 110. The embedded browser 302 may use encrypted tunneling such as HTTP/S and the like to communicate payment information such as credit card number, name, billing/shipping address, and the like to a payment facility 130. In this embodiment, the remote browser 112 and delivery platform 110 do not see the user's 102 credit card number and thus, do not have to be PCI compliant in this embodiment.

In embodiments, a payment application on the user's 102 mobile computing device 1104, described later herein in detail, may collect payment information such as credit card number and the like from the user 102. In embodiments, the payment application on the user's mobile computing device 1104 may be linked with the user's member login on the T-Commerce channel 114. This payment application may connect with a payment service used by the T-Commerce channel 114. The mobile computing device 1104 may or may not be linked with the CPE 106. In embodiments, if the user's 102 mobile computing device 1104 is linked with the CPE 106, a user 102 logging into the T-Commerce channel 114 from the CPE 106 with their member login may cause the payment application on the mobile computing device 1104 to be launched (if not already) and opened. When the payment application is launched it may register a callback over the Internet with the payment service used by the T-Commerce channel 114. When a user 102 on the T-Commerce channel 114 goes to check-out, the T-Commerce channel 114 may communicate with its associated payment service which will call back the payment application on the user's 102 mobile computing device 1104 at the previously registered call-back. Upon call-back, the payment application will pop to the front on the mobile computing device 1104 where the user 102 may enter payment information such as credit card number, and the like. The payment application on the user's 102 mobile computing device 1104 may then communicate the payment information to the payment service used by the T-Commerce channel 114. The payment service may then communicate the payment information to the brand channel's 116 payment facility 130.

In embodiments, the user 102 may be presented with one of a plurality of graphics representing matrices of numbers. The user 102 may click on numbers in the graphic to enter payment information such as credit card number, and the like. The geometry of the user's 102 clicks is captured and shared with the payment service used by the T-Commerce channel 114. In embodiments, the payment service may have access to the plurality of graphics representing matrices of numbers and may use the shared click geometry in combination with the graphics to decode the payment information from the shared click geometry.

In an illustrative and non-limiting example, a user 102 may have previously established a unique user identifier on CPE Client 108. The user 102 may go to the T-Commerce channel 114 without logging in. Once at the T-Commerce channel 114, the user 102 may select one of a plurality of brand channel 116 tiles or options, and select "Add to Favorites" from a plurality of options associated with the brand channel 116 tile. Upon this action, a link to the selected brand channel 116 may be added to the "Favorites" section of the navigator bar. Use of this link will allow the user to navigate directly to a shopping page for that brand channel 116. When a user 102 is on the shopping page for a brand channel 116 the user 102 may select a particular product and select "Add to Wish list" from a plurality of options associated with the selection for that product. The product is then added to a "wish list" associated with the unique user ID. The user 102 may easily find and purchase items on their wish list in the future. The user 102 may also choose to add one or more products from a plurality of brand channels 116 to a global cart 702. The user 102 may select items for a particular brand channel 116 in the global cart and click "Checkout." In embodiments, if the user 102 has not created a member login, the user is given an option to provide detailed membership information including payment information. If the user 102 does have a member login, the user 102 is provided with the opportunity to enter their identifying information such as member login, password, and the like. Upon authentication, an existing user 102 may be presented with their currently stored payment information, if any, and given the option to override existing payment information.

In another illustrative and non-limiting example, the user 102 may add a product to a brand cart 706. The T-Commerce channel's 114 global cart 702 is created and updated accordingly. The user 102 may decide to checkout for a particular brand within the global cart 702. The user 102 may be presented with a notice indicating that they are to be transferred to another secure website to process the online payment. The notice may also comprise a link to a brand payment gateway 704. The CPE client 108 may pass control to the embedded (micro) browser 302 together with information such as brand cart 706, member login, authorization code and the like. The embedded (micro) browser 302 launches the brand payment gateway 704 pre-populated with user 102 information such as billing/shipping address and the like and transaction information such as brand cart 706 ID, authorization code, and the like. The user 102 may then enter their payment information such as credit card number, debit card number, gift card number and the like into the brand payment gateway 704. Upon successful payment through the brand channel 116 payment facility 130 the brand channel 116 is notified and the brand cart 706 is updated using the passed brand cart 706 ID. The brand channel 116 notifies the T-Commerce channel 114 that then updates the global cart 702. Control is then redirected back to the embedded (micro) browser 302 which displays a message regarding successful payment, switches control back to the remote browser 112 displaying the T-Commerce channel 114 application.

In embodiments, each user 102, as identified by their member login, may be required to define payment information such as billing/shipping address, credit card number, and the like, prior to performing a "Check Out" operation within the T-Commerce channel 114. However, the user 102 may not be required to have a member login prior to being asked to define the payment information above.

Remote Devices

In embodiments, user 102 interactions with the CPE 106, CPE Client 108, DP remote browser 112, the T-Commerce channel 114, brand channels 116, and the like, may be facilitated through system support for a plurality of remote controls 104 such as: a pointing-capable remote control, which may be enabled through inertial sensors, a joystick, and the like; a keyboard; a smart phone or smart tablet; and the like. In embodiments, the user 102 may have the ability to use the touch screen on a remote device 104 to control the cursor on a CPE 106, CPE Client 108, remote browser 112, and the like. In embodiments, remote controls 104 may connect to the CPE 106 using such means and protocols as WiFi, UDAP, IR, and the like. In embodiments, remote controls 104 may connect with the T-Commerce channel 114 through WiFi, cellular and the like.

In embodiments, the T-Commerce system may be enabled with various user communication capabilities. Such user communication capabilities may include one or more of the following: (1) direct controls, such as buttons, knobs, switches, and the like, which may be located on a CPE, on attached devices, on networked devices, and the like; (2) remote controls, such as handheld remote controls, wireless keyboards, pointing devices, and the like; (3) mobile devices, such as mobile phones, tablet computers, handheld music and video players, and the like; (4) wearable computers, such as eyeglass computers (e.g. Google Glass), smart watches (e.g. Samsung Galaxy Gear watch), and the like; (5) implantable computers; (6) human interfaces, such as user motions (e.g. gestures, nodding, shaking one's head, blinking, etc.), voice commands, and the like; and (7) other interfaces that communicate by means of light, sound, touch, electromagnetic fields, and the like. In these embodiments, CPEs may be equipped with sensors or may be networked or otherwise in communication with devices that are equipped with sensors to detect various forms of user communication. A CPE may be equipped with or be networked with or otherwise have access to one or more cameras that may detect and capture user motions and may be equipped with or be networked with or otherwise have access to software that is enabled to interpret such motions. Similarly, a CPE may be equipped with or be networked with or otherwise have access to a microphone through which a user may input oral commands and may also have access to software that may interpret such oral commands. A CPE may be equipped with other sensors, as well, possibly including infra-red sensors, which may detect the number of people viewing the CPE, motion detectors, and the like. In an example of these embodiments, a user who is watching television may issue an oral instruction to the CPE for it to display a brand channel. The user may then use oral commands to navigate around the brand channel, to make purchases, to edit favorites, to use viewing features (e.g. picture-in-picture, program recording, slow motion playback, etc.), to change settings, and the like. In response to user commands, the CPE may respond by displaying screen prompts, with audio, possibly including conversational responses (e.g. "Are you ready to place the order?"), and with other methods of feedback. Such feedback methods may be subject to user control through preference settings. In another example of these embodiments, a user may make a swiping gesture with a hand to change a channel, may point with a finger to select a button on a screen, may ask a question about an item on the screen (e.g. "Is that available in size 10 in green?"), and the like. Such means of user input and CPE feedback may be combined, such that a user may point with a finger at an item on the screen and ask a question about that item and the CPE may respond by answering the question using audible words, words displayed on a screen, or both. Alternatively, the CPE may respond using other communication methods, possibly including sending a message to a mobile device (e.g. an email with a price sheet attached, a text message, a picture, a video file, an audio file, etc.), by displaying lights, by making sounds, and the like. In embodiments, a user may control a CPE through conversation with an animated figure that may be a digital representation of a person, an animal, a cartoon character, or the like. Such an animated figure may appear in a box that is displayed on a screen. Interactions with such an animated figure may emulate conversations between people. For example, a user may instruct the animated figure, "Show me Nike products" and the animated figure may respond, "Would you like to go to the Nike home page or to the running shoe page?" Software required for voice recognition, software recognition, speech synthesis, and the like may run on the CPE or elsewhere, possibly on a server, set-top-box, other connected device, other remote device, or the like. User interfaces that are available for the T-Commerce system may also be enabled to control other CPE functions, such as changing channels, recording programs, picture-in-picture controls, and the like.

Figure 8:
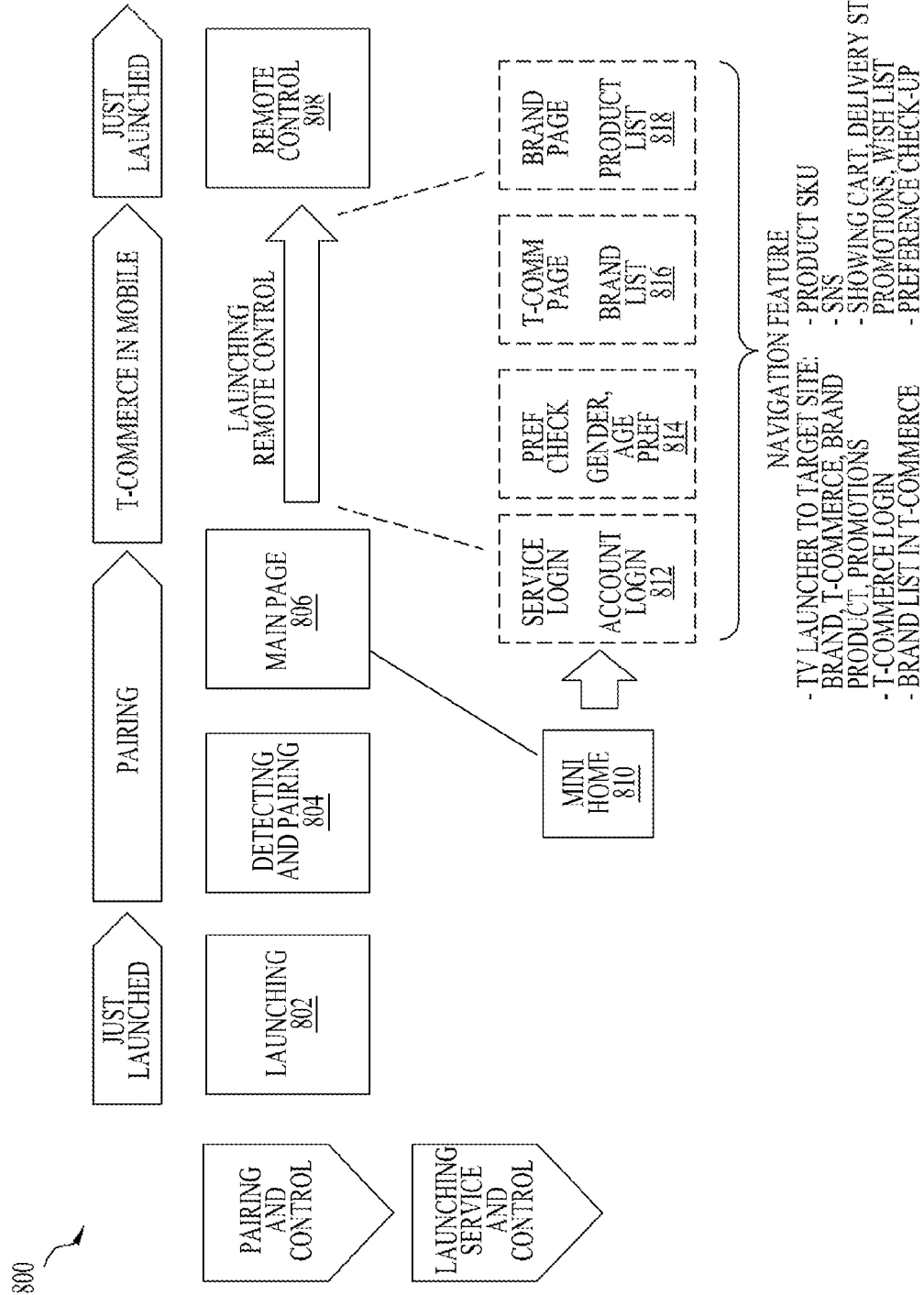
FIG. 8 depicts an embodiment flow diagram for a user launching the system through a remote device.

Referring to FIG. 8, a top-level embodiment block diagram 800 is presented illustrating the functionality of a T-Commerce mobile application functionality running on a mobile computing device 1104 and the interactions of the application with the CPE 106. Mobile application functionality may comprise launching 802, detecting and pairing 804, main page 806, mini home 810, remote control 808 for the CPE 106, and the like. In embodiments, the user 102 may be able to use the touch screen of a mobile computing device 1104 to control the cursor and generate click actions when using the mobile computing device 1104 as a remote control 808 for the CPE 106. Mini home may further comprise features such as account login 812, preference checking 814, brand list 816, brand pages/product lists 818, and the like.

In embodiments, a mobile computing device may go through an initial sequence comprising: launching 802 a T-Commerce mobile application on a CPE 106; detecting and pairing 804 the mobile computing device with a detectable CPE 106; displaying a main page 806 on the mobile computing device; and the like. The main page 806 may comprise an option to launch a mini home 810 which may facilitate access to a plurality of options for the T-Commerce channel 114 such as account login 812, preference checking 814, brand list 816 of brands available through the T-Commerce channel 114, brand pages/product lists 818 for a plurality of brand channels 116, and the like.

Figure 9:
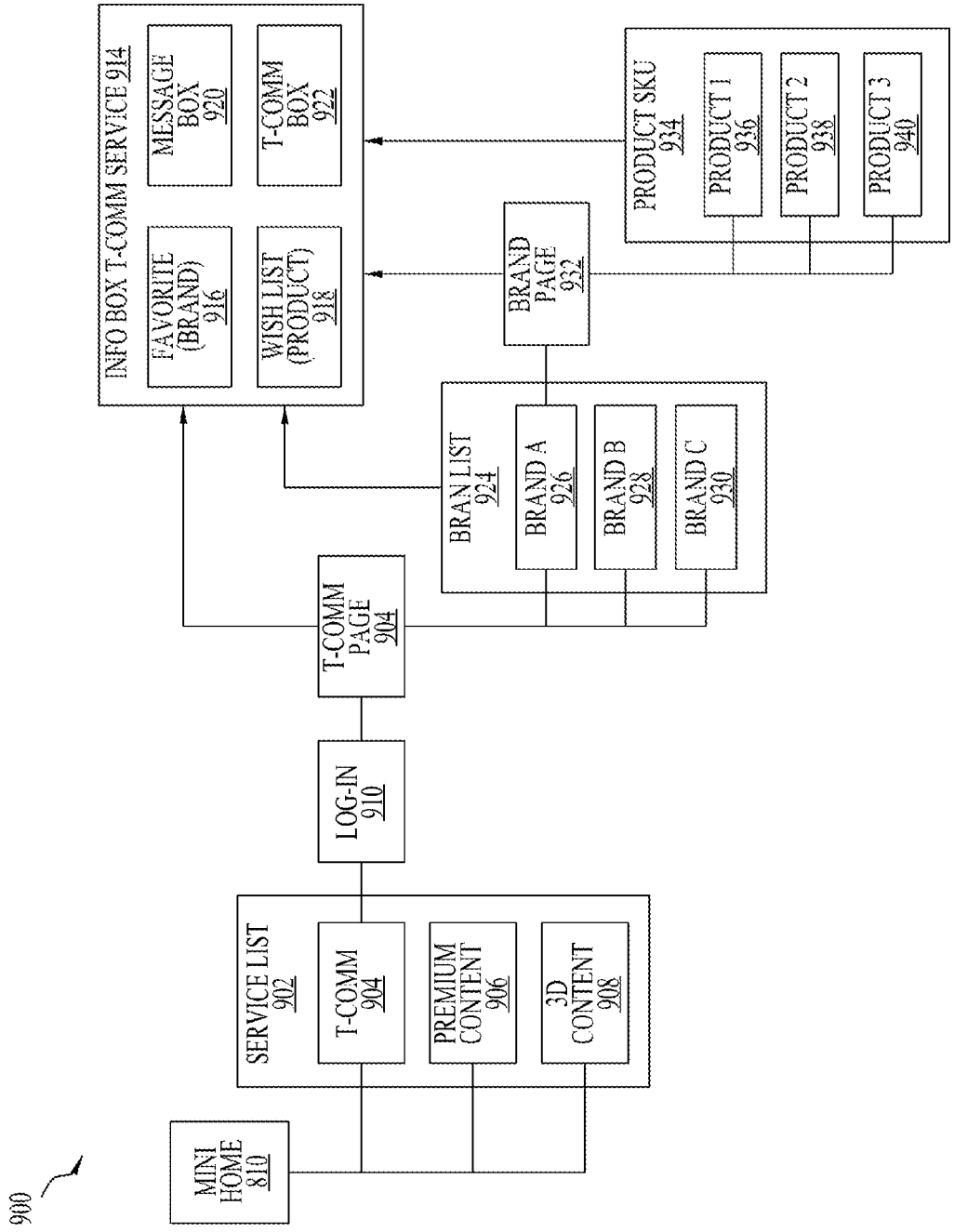
FIG. 9 depicts an embodiment block diagram of the mini home.

Referring to FIG. 9, a top-level embodiment block diagram 900 is presented illustrating some of the features available from mini home 810 such as a service list 902 of options, T-Commerce page 912, brand list 924, brand pages 932, product SKUs 934, information box of T-Commerce services 914, and the like. The service list 902 may comprise options, icons or the like facilitating access to features such as T-Commerce 904, premium content 906, 3D-content 908, and the like. In embodiments, the T-Commerce page 912 may facilitate access to a brand list 924, an information box of T-Commerce services 914, and the like. The information box for T-Commerce services 914 may comprise "favorites" 916, "wish list" 918, message box 920, T-Commerce box 922, and the like.

In embodiments, a user 102 in mini home 810 on a mobile computing device 1104 may select the T-Commerce 904 option from a service list 902. In embodiments, once the user 102 has selected the T-Commerce 904 option, the user 102 may be given an opportunity to log-in 910 to the T-Commerce channel 110 or proceed directly to the T-Commerce page 912. Once on the T-Commerce page 912, the user 102 may view a brand list 924. The brand list 924 may facilitate browsing of brands by displaying a plurality of brand indicators such as images, icons, text, and the like representative of supported brands 926 928 930. In embodiments, selection of one of the plurality of brand indicators may result in the display of the associated brand page 932. The brand page 932 may display information about a plurality of products 936 938 940 such as images, videos, text, and the like. In embodiments, once on the T-Commerce page 912, the user 102 may access one of a plurality of services shown in the info box T-Commerce Service 914 such as: reviewing a user's 102 favorites 916; checking a user's 102 message box 920 which may comprise promotions, shared items from other T-Commerce channel users 102, and the like; review of the user's 102 "wish list" 918; a T-Commerce Box which may comprise miscellaneous status information from the T-Commerce channel 114 such delivery status of purchases, receipts, coupons, and the like; and the like.

Figure 10:
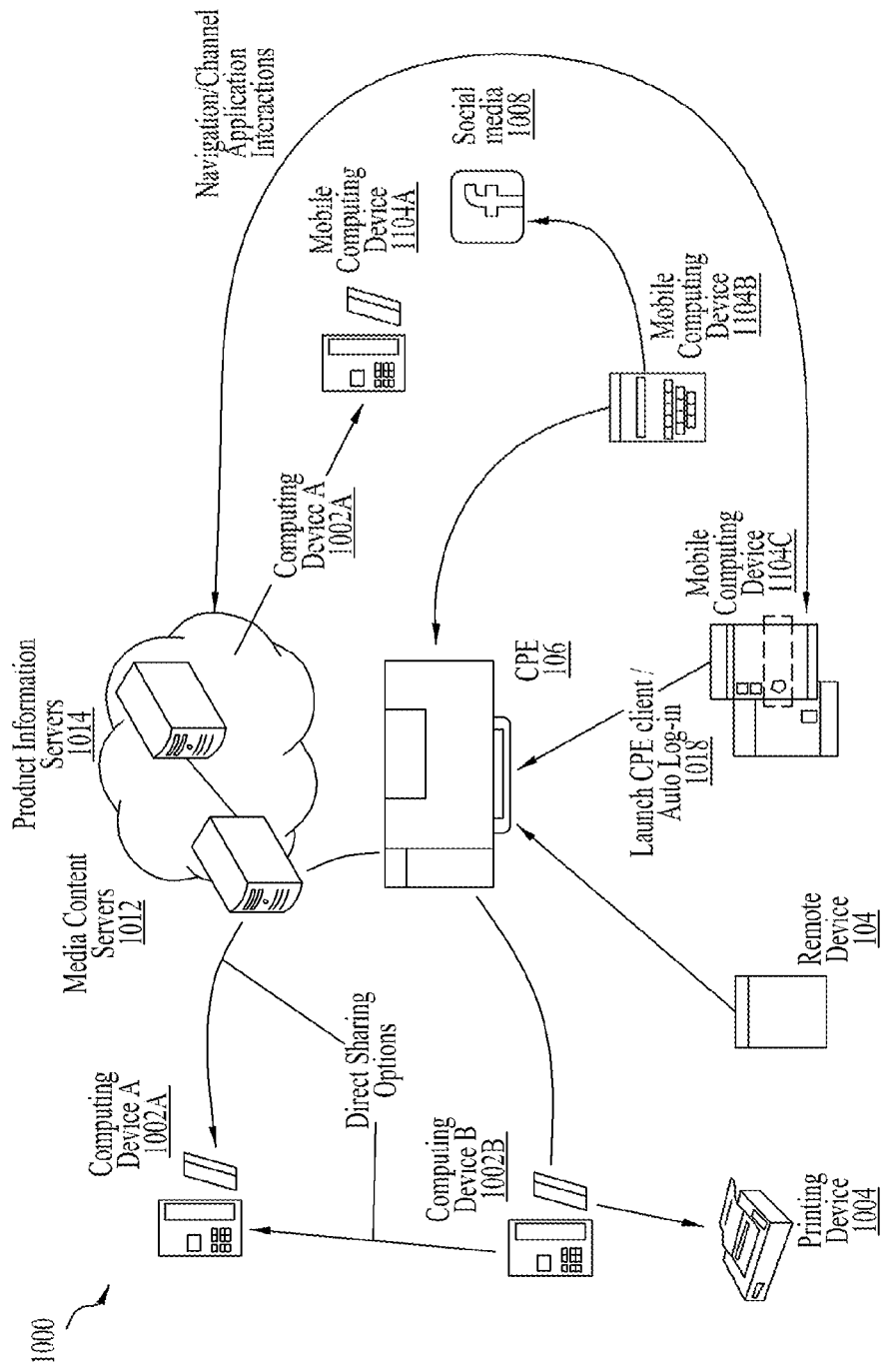
FIG. 10 depicts an embodiment functional flow diagram of the CPE interacting with the system.

Referring to FIG. 10, a top-level embodiment block diagram 1000 is presented illustrating a CPE 106 environment and the plurality of devices and systems with which the CPE 106 may interact such as remote devices 104, a plurality of computing devices 1002, a plurality of mobile computing devices 1104, a plurality of content servers 1012 1014, and the like.

In embodiments, a user may interact with the CPE 106 using a plurality of devices such as remote devices 104, computing devices 1002 such as desktops, laptops, and the like, mobile computing devices 1104 such as smart phones, smart tablets, and the like. In embodiments, a mobile computing device 1104C paired to a CPE 106 may launch the CPE client/auto login 1018. In embodiments, if the user 102 of the mobile computing device 1104C has logged into the T-Commerce channel 114, their identification information is passed to the CPE 106 together with commands to launch the CPE Client 108 and log-in to the T-Commerce channel 114 using the passed identification information. In embodiments, a mobile computing device 1104B may be used for keyboard texting, as well as sharing product and brand content with social media 1008 such as Facebook, Twitter, and the like. In embodiments, direct sharing of content between individuals may be facilitated between computing devices 1002, mobile computing devices 1104 and the like, where direct sharing options may comprise: direct device to device sharing, such as shown between computers 1002A and 1002B by such means such as email, IM, and the like; sharing facilitated by the CPE 106 or T-Commerce channel 114 messages; and the like. In embodiments, a computing device 1002B may support the output of content from the T-Commerce system to a printing device 1004. In embodiments, an "add additional screen" 1010 command may be sent to a mobile computing device 1104A linked to a CPE 106. The screen on the mobile computing device 1104 may act as a second screen to facilitate interactions between the CPE Client 106 and the T-Commerce system or as a primary interface to the T-Commerce system when the CPE 106 may be running an alternate application. The T-commerce system may share information and content from a plurality of servers such as product information servers 1014, media content servers 1012, and the like.

In embodiments, a plurality of mobile computing devices 1104 may support the CPE client 108 by facilitating effective interactions with the T-Commerce channel 114, the brand channels 116, the CPE 106, and the like. The mobile computing devices 1104 may facilitate users' 102 on-the-go experience of a T-Commerce channel 114 and may enhance users' 102 convenience by leveraging, if available, the mobile computing device's 1104 smart features such as short-cut app launch, pointer capabilities, SNS, printing, share over email, and the like. The features of the mobile computing device 1104 may be grouped into sets of features supporting activities such as interacting with CPE 106, interacting with the T-Commerce channel 114 on-the-go, and the like.

In an illustrative and non-limiting example, the user 102 may have logged into the T-Commerce channel 114 when visiting the T-Commerce page 912 using their mobile computing device 1104. The user 102 may select among options such as configuration, settings, preferences, and the like to personalize their experience. The user 102 may be shown a plurality of options such as selecting a printer from a list of available printers on their local network, identifying their preferences for the kinds of products for which they receive promotions, the types of promotions they are interested in receiving, and the like. In embodiments, the system may have an option to send content such as delivery status, receipts, product images, product names, coupons and the like to a printing device 1004.

In embodiments, portions of the T-Commerce system such as the T-Commerce page 912, T-Commerce channel applications 107, brand channel applications 108, and the like, may provide a plurality of methods to share metadata, media content, URLs, and the like, with social media 1008 such as Facebook, Twitter, and the like. Sharing with social media 1008 may be accomplished using a plurality of devices such as a computing device 1002C, a mobile computing device 1104, and the like. In embodiments, a user 102 accessing the T-Commerce channel 114 using a CPE 106 may be able to share or send product information such as metadata, media content, and the like, to others. Product information may be sent by mobile computing devices 1104 using email, IM, MMS, and the like.

In embodiments, the system may send information related to brand content to a mobile computing device 1104 paired to a CPE 106, such that the user 102 may access the T-Commerce channel 114 while utilizing the CPE 106 for applications other than the CPE client 108. In an illustrative and non-limiting example, the user 102 may "add additional screen" 1010 under a variety of circumstances such as: when in the CPE Client and accessing the T-Commerce system; when switching between applications on the CPE 106; when in an alternate application on the CPE 106 and prompted by the CPE client 108 running in the background; and the like.

Figure 11:
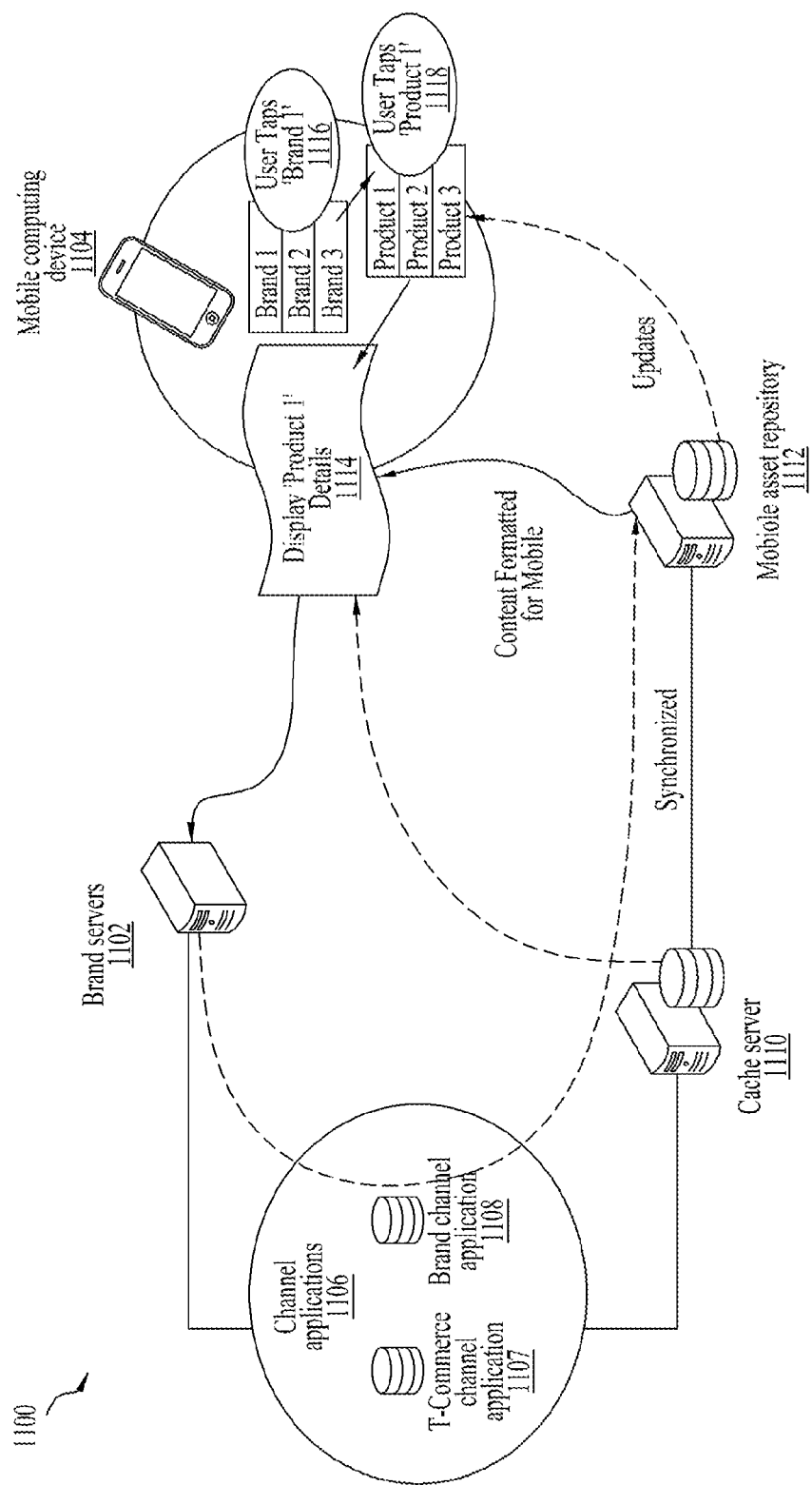
FIG. 11 depicts an embodiment functional flow diagram including navigation through the system.

Referring to FIG. 11, a top-level block diagram 1100 is presented illustrating the flow of information between a mobile computing device 1104 and components of the T-Commerce system such as brand servers 1114, channel applications 1106, T-Commerce channel applications 1107, brand channel applications 1108, cache servers 1110, mobile asset repositories 1112, and the like. In a non-limiting example, a user 102 on a mobile computing device 1104 taps 'Brand 1' 1116 followed by user taps 'Product 1' 1118. This may initiate a chain of interactions resulting in display detail of 'Product 1' 1114 being shown on the screen of the mobile computing device 1104.

In embodiments, there may be a cache server 1110 that provides media content for channel applications 1106 which may be displayed on a CPE 106. There may be a mobile asset repository 1112 which may provide content from the cache server 1110 trans-coded for mobile computing devices 1104. The mobile asset repository 1112 may synchronize its content with the cache server 1110 and maintain synchronization using a form of version control or the like. In embodiments, the mobile asset repository 1112 may be included within the cache server 1110. The brand servers 1102 may provide content to the cache server 1110 and mange provided content through such actions as add, delete, update, and the like. In embodiments, the mobile asset repository 1112 may update product information and pages on a mobile computing device 1104 as page versions are updated.

Figure 12:
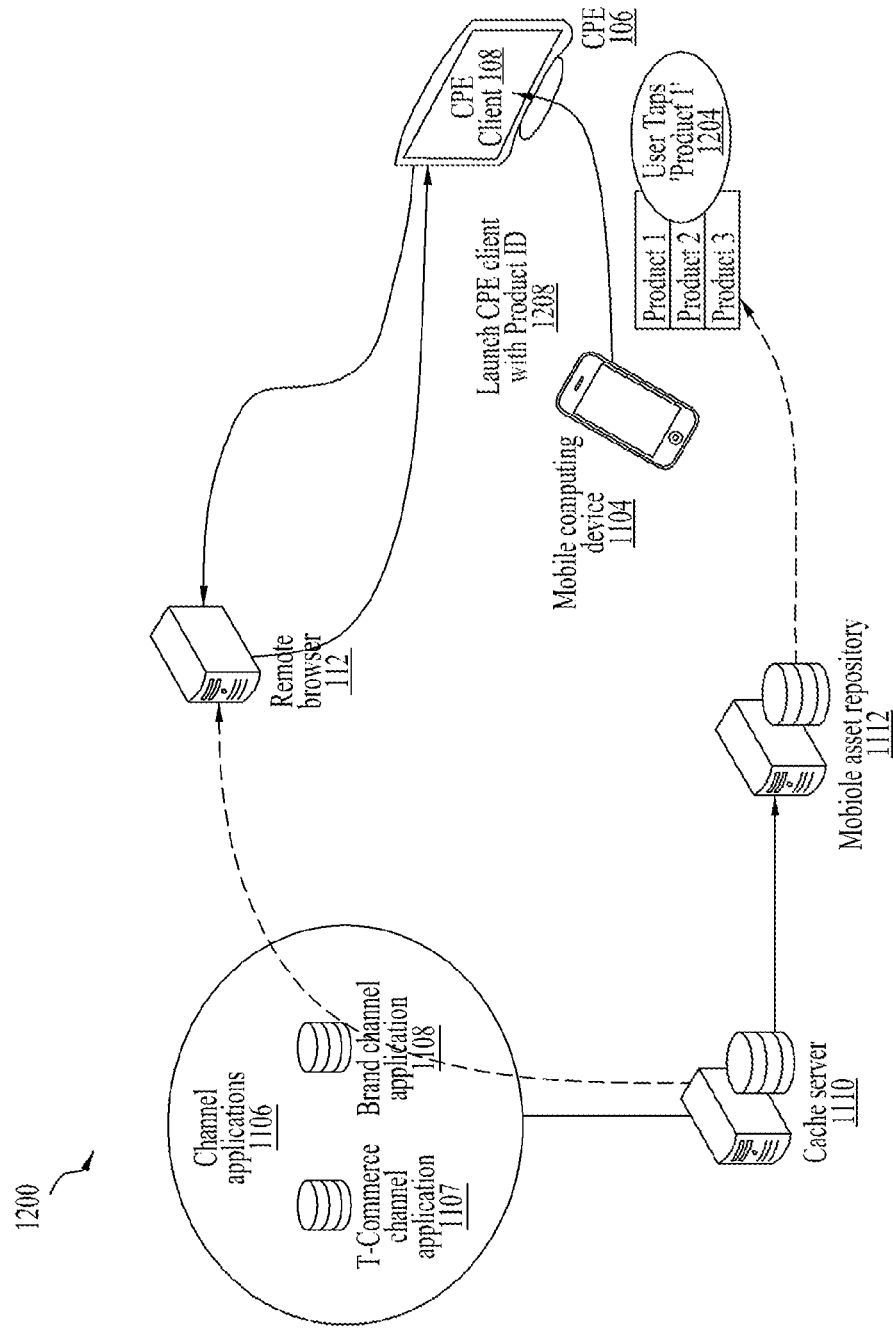
FIG. 12 depicts an embodiment functional flow diagram including launching applications within the system.

Referring to FIG. 12, a top-level block diagram 1200 is presented illustrating interactions between a mobile computing device 1104, a CPE 106 and CPE client 108 and the flow of data between the CPE client 108, the remote browser 112, channel applications 1106 such as brand channel applications 1108 and T-Commerce channel application 1107, cache server 1110 and a mobile asset repository 1112.

In an illustrative and non-limiting example, a user 102 may select a product, user taps 'Product 1' 1204, while on a mobile computing device 1104. The mobile computing device 1104 may "launch CPE client with 'Product 1' ID" 1208 which launches the CPE Client 108, if not already running on the CPE 106, and causes a request for 'Product 1' information to be sent to the remote browser 112. The remote browser 112 may retrieve the 'Product 1' information from the appropriate channel application 1106 and the Cache Server 1110. The remote browser 112 may then stream the associated content back to the CPE client 108 on the CPE 106.

Figure 13:
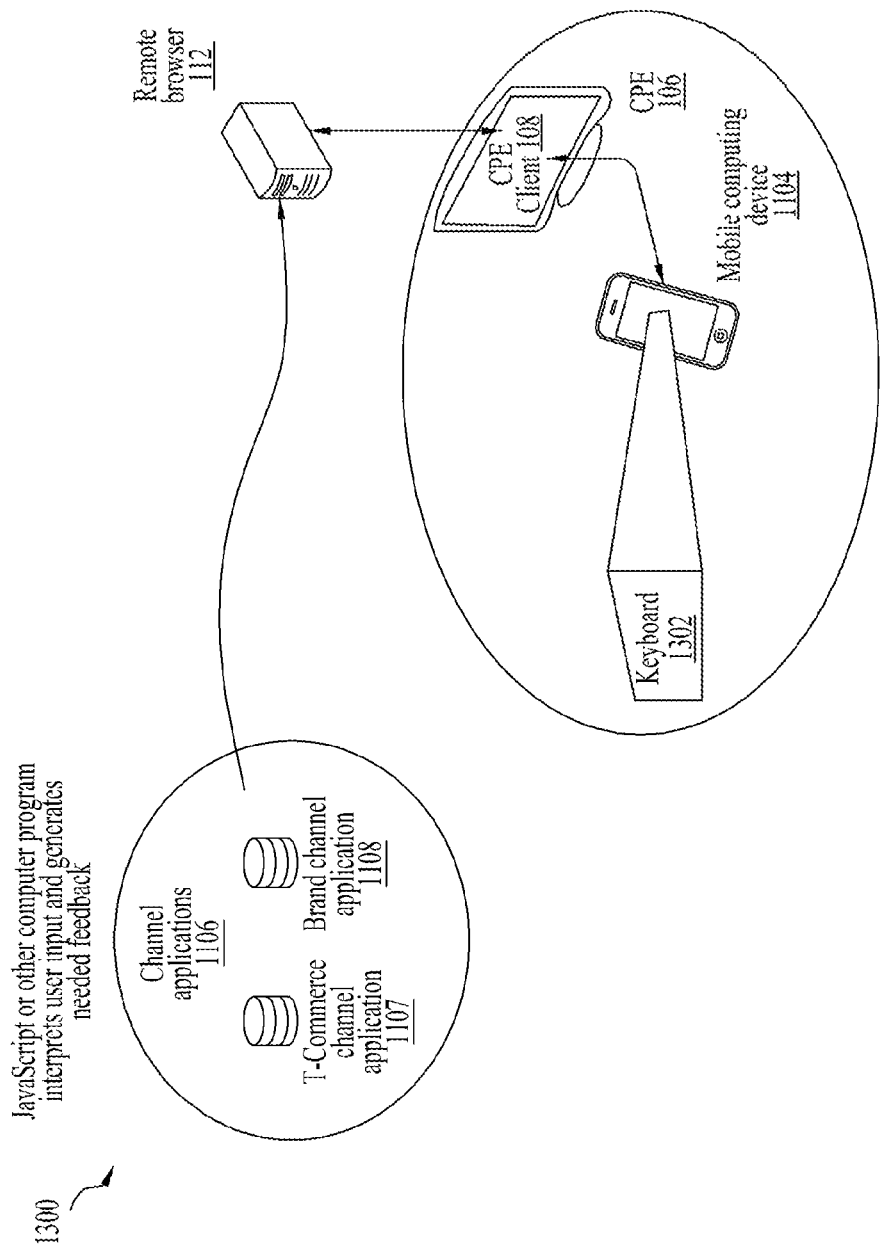
FIG. 13 depicts an embodiment functional flow diagram including texting within the system.

Referring to FIG. 13, a top-level block diagram 1300 is presented illustrating the use of a mobile computing device's 1104 keyboard 1302 in support of channel applications 1106 running on a remote browser 112 and being displayed by a CPE client 108 on a CPE device 106.

In embodiments, the remote browser 112 may receive user-initiated events such as cursor movements, clicks, and the like, from the CPE client 108. The remote browser 112 may send these inputs to one or more of a plurality of channel applications 1106, such as the T-Commerce channel application 1107, brand channel applications 1108, and the like. JavaScript or other computer program on a channel application 1106 interprets user 102 input and generates needed feedback based on the response from the channel application 1106. In this way a user 102 may be able to initiate an event within one of the plurality of channel applications 1106 such that keyboard input may be desired. Upon identification of the need for keyboard input, JavaScript or other computer code running on the channel application 1106 may send a command through the remote browser 112 and the CPE client 108 to a paired mobile computing device 1104 to open a keyboard 1302 or phone book. In embodiments, the mobile computing device 1104 may display its keyboard 1302, regardless of the status of the mobile screen and functions. The user 102 may enter the text on the keyboard 1302 of the mobile computing device 1104 and click enter or done. The mobile computing device may then send this information to the paired CPE device 106 and CPE client 108 which may transmit the data to the remote browser 112 which: renders the text in the appropriate place on the screen; sends the entered text to one or more channel applications 1106; sends an updated screen image to the CPE Client 108; and the like.

Figure 14:
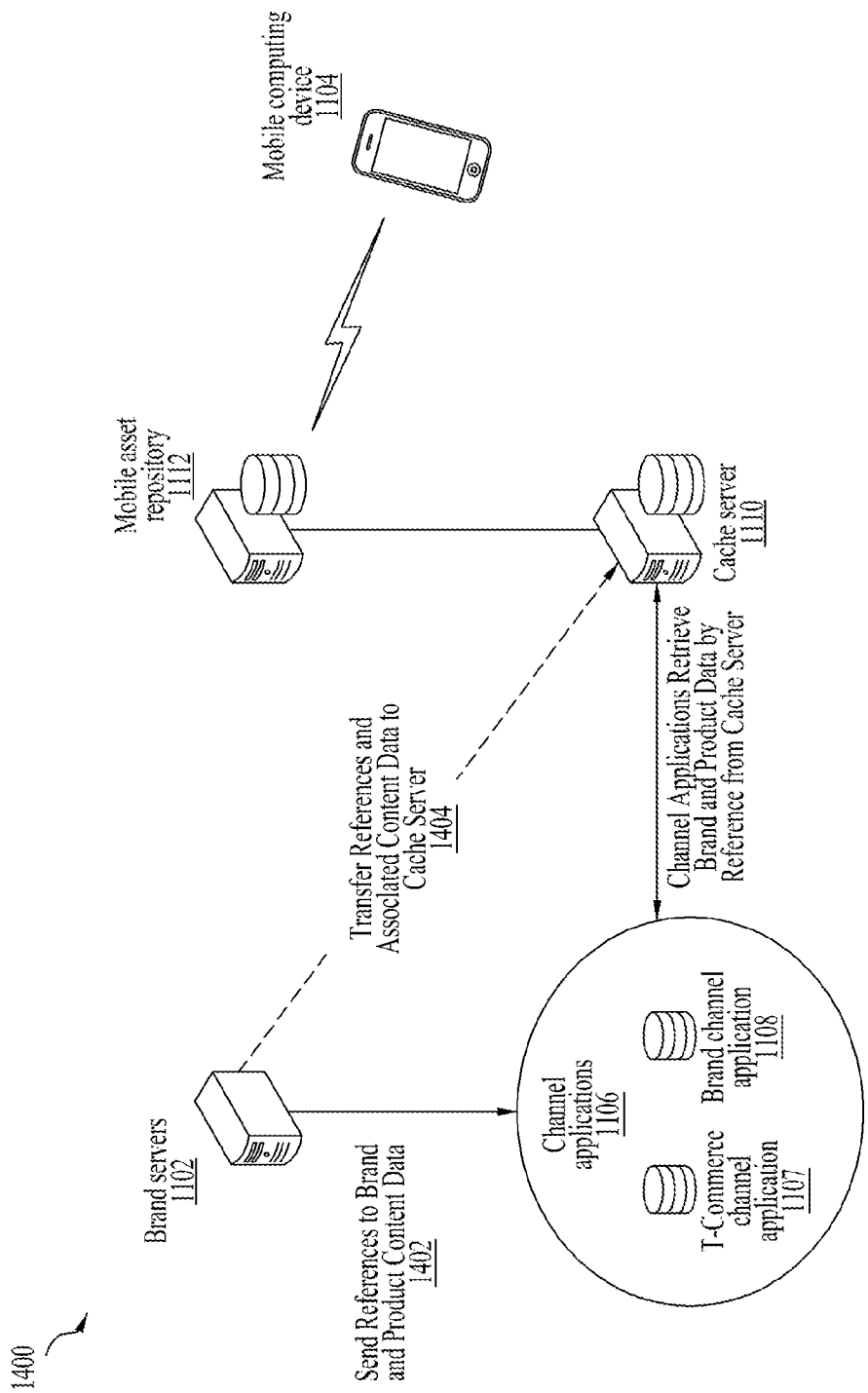
FIG. 14 depicts an embodiment functional flow diagram including data flow within the system.

Referring to FIG. 14, a top-level block diagram 1400 is presented illustrating the flow of data and content between brand servers 1102, channel applications 1106, the cache server 1110, the mobile asset repository 1112, and a mobile computing device 1104.

In embodiment, the brand servers 1102 may assign identification information, such as IDs, URLs, and the like to content such as images, text, video, and the like. This identification information, referred to hereafter as a reference, may be used for identifying the content in the future. The brand servers 1102 may send references to brand and product content 1402 to a plurality of channel applications 1106. The brand servers 1102 may "transfer references and associated content data to the cache server" 1404. The cache server 1110 may store such content for a plurality of channel applications 1106. In embodiments, when a channel application 1106 page is displayed on a CPE 106, the channel application 1106 retrieves brand and product data by reference from the cache server 1110. If a channel application 1106 is being displayed on a mobile computing device 1104, the request for referenced content may be sent to the mobile asset repository 1112.

In embodiments, the mobile computing devices 1104 may delay displaying images and providing video clips until the user 102 clicks to display the image, play the video, and the like. In embodiments, the content used by channel applications 1106 shown on a CPE 106 may or may not be usable in the same format for display on mobile computing devices 1104. Transcoding of original images and video for use on mobile computing devices 1104 may be required. In embodiments, a mobile asset repository 1112 may manage the version of the content transcoded for mobile display and provide said content to the mobile computing devices 1104. In embodiments, the mobile asset repository 1112 may fetch content from the cache server 1110 and transcode the content for N-screen. In embodiments, the N-screen content may be supplied by the brand server 1102 directly to the cache server 1110, from which it may be fetched by the mobile asset repository 1112. The mobile asset repository 1112 may use a version number to manage synchronization with the cache server 1110 resulting from version changes by the brand servers 1102.

In an illustrative and non-limiting example, the mobile asset repository 1112 checks the cache server 1110 for a change in version number. If a difference in the version number is detected between the cache server 1110 and the mobile asset repository 1112, the mobile asset repository 1112 synchronizes the changed content data with that in the cache server 1110. The content in the cache server 1110 may or may not be transcoded. If the content in the cache server 1110 is not transcoded the mobile asset repository 1112 may transcode the content into a mobile content format and fetch the URL of pages associated with each piece of content. The mobile asset repository 1112 may then update the mobile version number. When a mobile computing device 1104 initiates the display of certain content and information, a request may be sent to the mobile asset repository 1112. In embodiments, the mobile asset repository 1112 may direct the mobile computing device 1104 to cache server 1110 for the content. In embodiments, the mobile asset repository 1112 may send the content and data to the mobile computing device 1104 directly from the memory of the mobile asset repository 1112. The provided content may be accompanied by a token to facilitate actions such as tracking views, validating a user's visit, recording details of a visit occurrence for later analysis, facilitating sharing, facilitating advertising, and the like.

Figure 15:
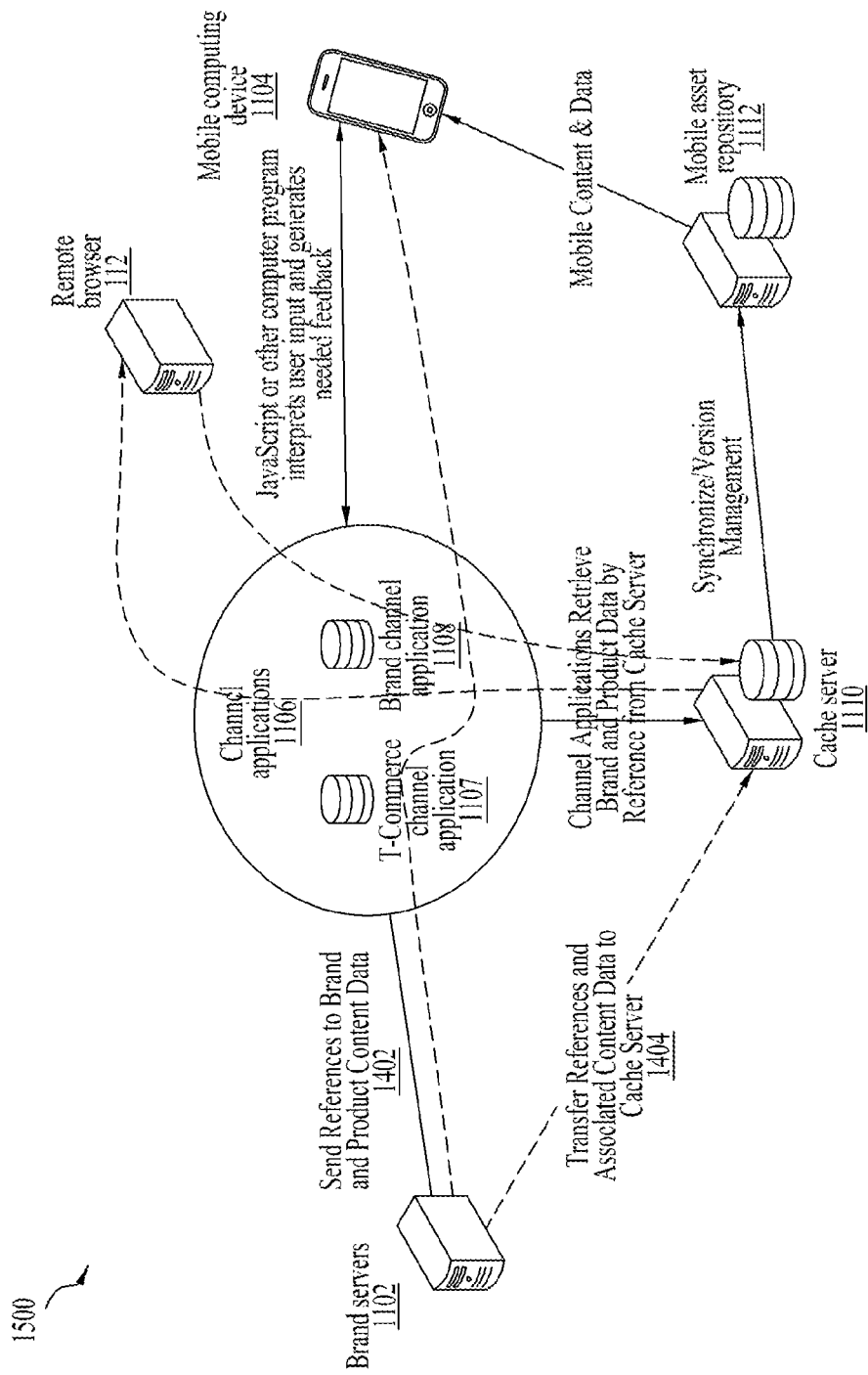
FIG. 15 depicts an embodiment functional flow diagram including a mobile assist repository.

Referring to FIG. 15, a top-level block diagram 1500 is presented illustrating the flow of data between a mobile computing device 1104 and components of the T-Commerce system such as brand servers 1102, mobile asset repository 1112, cache server 1110, channel applications 1106, remote browser 112, and the like.

Figure 16:
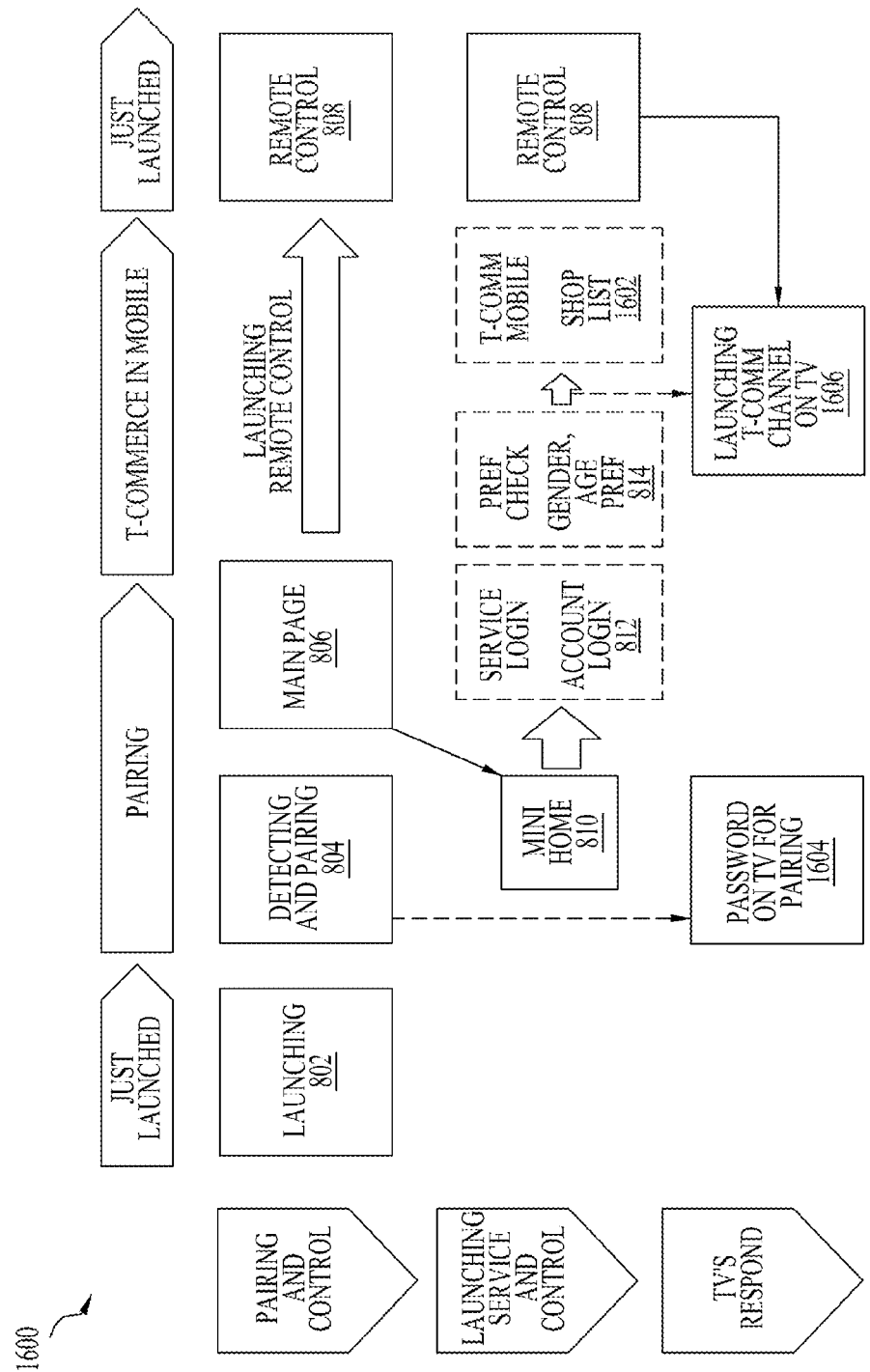
FIG. 16 depicts an embodiment flow diagram including interaction amongst components during launching of the system.

Referring to FIG. 16, a top-level embodiment block diagram 1600 is presented illustrating T-Commerce mobile application functionality and its interaction with the CPE 106. Mobile application functionality may comprise launching 802, detecting and pairing 804, main page 806, mini home 810 and remote control 808. Mini home may further comprise features such as account login 812, preference-checking 814, brand list 816, brand pages/product lists 818, and the like. CPE 106 functionality may comprise providing a password on the screen for pairing 1604, launching the T-Commerce channel 110 on the screen 1606, and the like.

In embodiments, a mobile computing device 1104 may go through an initial sequence comprising launching 802 a T-Commerce mobile application, detecting and pairing 804 the mobile computing device with a detectable CPE 106. In embodiments, as part of the pairing process the CPE 106 may display a password on the screen 1604 which may be entered into the mobile computing device 1104. In embodiments, the mobile computing device may display a main page 806 having an option to open a mini home 810. The mini home 810 may facilitate access to a plurality of options for the T-Commerce channel 114 such as account login 812, preference checking 814, brand list 816 of brands available through the T-Commerce channel 114, brand pages/product lists 818 for a plurality of brand channels 116, and the like.

In embodiments, the mobile computing device 1104 may act as a remote control 808 for the CPE 106. In embodiments, the remote control 808 functionality may be an option selected from the main page 806. In embodiments, the user 102 may launch a plurality of applications on the CPE 106 such as the CPE client 108, local CPE 106 applications, channel applications 1106 such as the T-Commerce application 1107, brand channel applications 1108, and the and the like, directly using the mobile computing device 1104 as a remote control 808. In embodiments, an action on the T-Commerce channel 110 on the mobile computing device 1104 may result in the launching of the T-Commerce channel on the CPE 1606. If the mobile computing device 1104 launches the T-Commerce channel on the CPE 106 it may also act as a remote control 808. Both mini home 808 and remote control 808 may have the option of launching 1606 the T-Commerce channel 114 on CPE 106.

Figure 17:
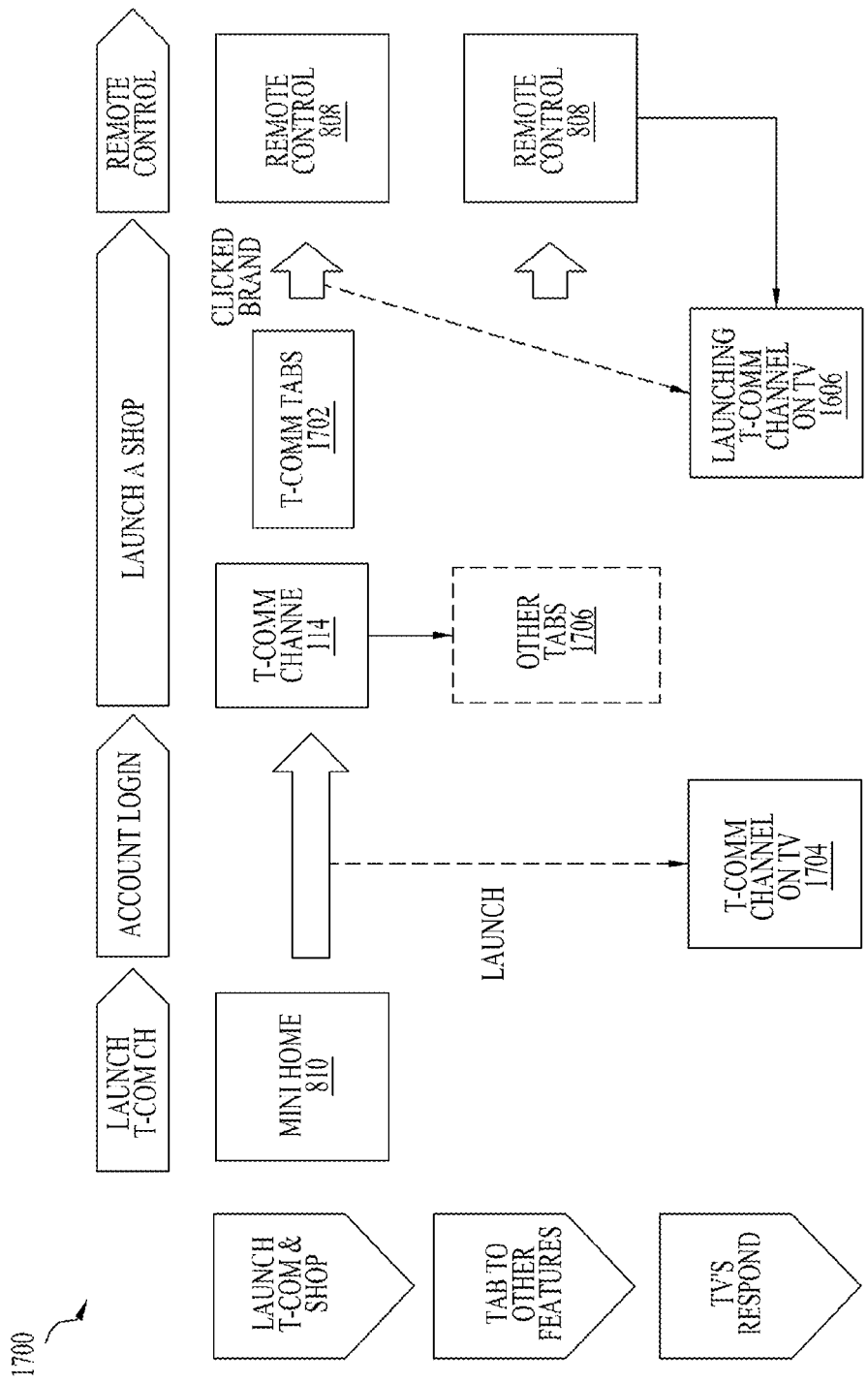
FIG. 17 depicts an embodiment flow diagram including interaction amongst components during launching of the system.

Referring to FIG. 17, a top-level embodiment block diagram 1700 is presented illustrating a flow of options on the mobile computing device such as mini home 810, T-Commerce channel 114, other tabs 1706, T-Commerce tabs 1702, remote control functionality 808, and the like. The illustration 1700 also shows the corresponding state on the CPE, in this illustration a TV, such as T-Commerce channel on TV 1704, shop on TV 1708, and the like.

In embodiments, selection of the option to launch the T-Commerce channel on the CPE 106 may result in the launch of the CPE client 108 and display of the T-Commerce channel on the CPE 1704. Selection of the T-Commerce channel 810 from a plurality of other tabs 1706 may result in the display of the T-Commerce page 912 on which may display a plurality of T-Commerce tabs 1702. Selection of a brand may result in a shop on TV 1708 page being displayed on the CPE 106. The remote control functionality 808 on the mobile computing device 1104 may facilitate interaction with the "shop on TV" 1708 page displayed on the CPE 106.

In an illustrative and non-limiting example, a user 102 may open a T-Commerce mobile application. Following launch 802, the mobile application may progress to detecting and pairing 804. The mobile computing device 1104 may detect nearby devices such as CPEs 106, printing devices 1004, and the like. If an unknown CPE 106 is detected an attempt may be made to pair or link with the CPE 106. A dialog box may open on the mobile computing device 1104 and on the CPE 106 where a password 1604 may be displayed. The user 102 may enter the password displayed on the CPE 106 into the dialog box displayed on the mobile computing device 1104 to pair the mobile computing device 1104 and the CPE 106. After detecting and pairing 806 the T-Commerce mobile application may display the main page 808. The main page may have a plurality of options such as mini home 810, remote control 808, and the like.

Figure 18:
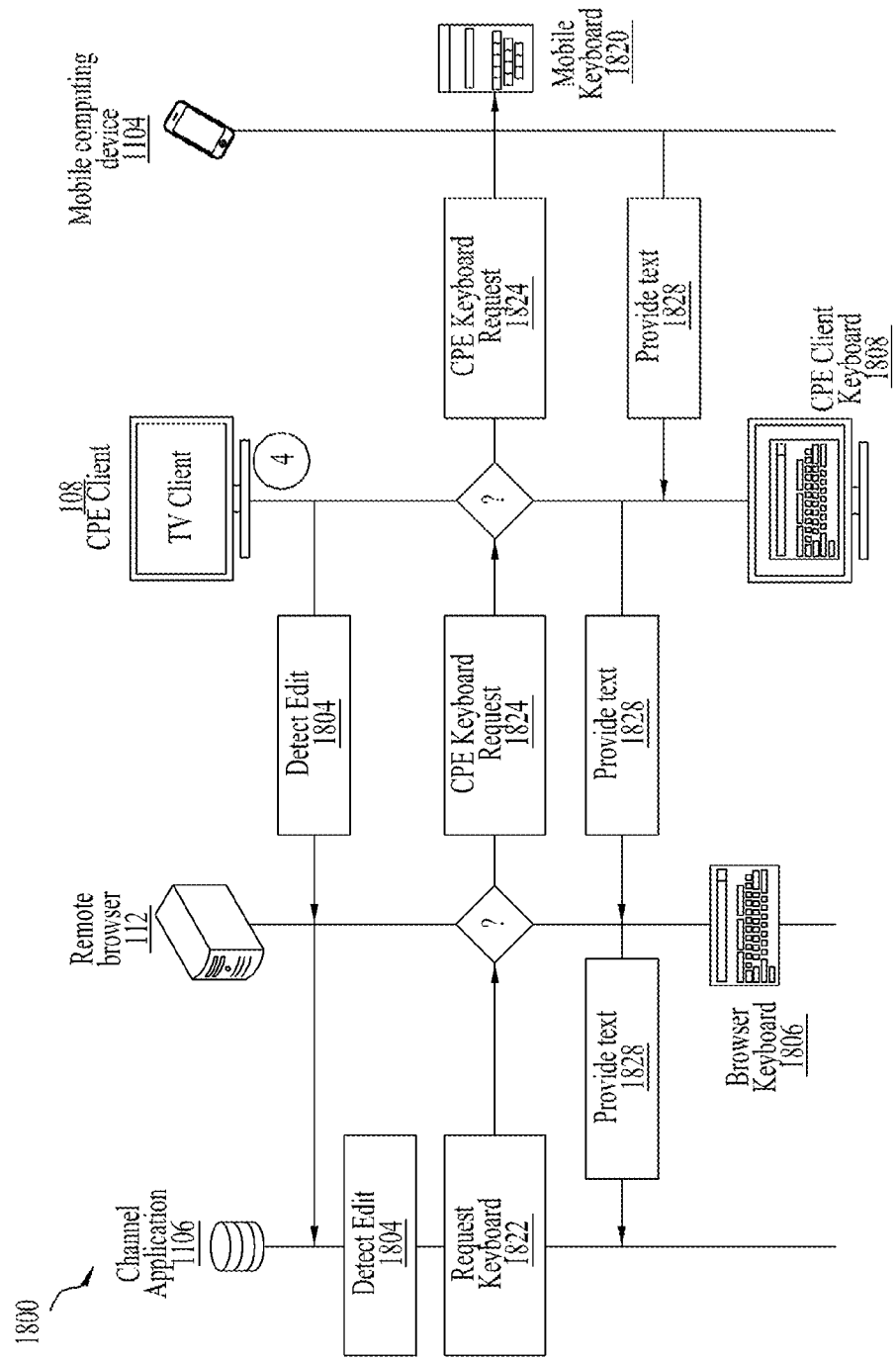
FIG. 18 depicts an embodiment flow diagram including browser interaction with a mobile application.

Referring to FIG. 18, a top-level embodiment block diagram 1800 is presented illustrating a flow of interactions between a user 102, a CPE client 108, a remote browser 112, channel applications 1106, a plurality of possible keyboards such as a browser keyboard 1806, a TV-client keyboard 1808, a mobile keyboard 1820, and the like. Interactions may include: user action 1824; detect edit 1804; request keyboard 1822; CPE Keyboard Request 1824; mobile keyboard request 1830; provide text 1828; and the like. These interactions may occur over wireless, cellular or other means using public or private protocols such as WiFi, UDAP, and the like.

In embodiments, the T-Commerce channel 114, brand channels 116, and a plurality of channel applications 1106 may be accessed by a remote browser 112 and the corresponding audio/visual content streamed to a CPE client 108 and displayed on a CPE 106. The CPE client 108 may send a user action 1824 such as cursor movements and click events to the remote browser 112 which may send that input to one or more of a plurality of channel applications 1106. JavaScript or another computer program on a channel application 1106 may interpret the user action 1824. In this way a user 102 may be able to initiate an event within one of the plurality of channel applications 1106 that may be detected by the JavaScript.

In an illustrative and non-limiting example, the JavaScript may interpret the user action 1824 and detect edit 1804. As a result of the detect edit 1804 event, the JavaScript or other computer program may send a request keyboard 1808 event back to the remote browser 112. In embodiments, the remote browser 112 may display a browser keyboard 1806 with which the user 102 may interact. The remote browser may then provide text 1828 to the channel application 1106. In embodiments, the remote browser 112 may send a CPE keyboard request 1824 to the CPE client 108. In embodiments, the CPE client 108 may display a CPE client keyboard 1808 with which the user 102 may interact. The CPE client 108 may then provide text 1828 to the remote browser 112 who may then provide text 1828 to the channel application 1106. In embodiments, the CPE client 108 may send a mobile keyboard request 1830 to a mobile computing device 1104. The mobile computing device 1104 may display a keyboard 1820 with which the user 102 may interact. The mobile computing device 1104 may then provide text 1828 to the CPE client 108 which may provide text 1828 to the remote browser 1828 who may then provide text 1828 to a channel application 1106.

In an illustrative and non-limiting example, the user 102 may launch a CPE client 108 and connect to channel applications 1106 such as the T-Commerce application 1107, brand channel applications 1108, and the like, directly from the mobile computing device 1104. When the user 102 enters the mobile application on the mobile computing device 1104 and selects to connect to the T-Commerce channel 114, the user 102 may be shown a login page 910 and provided with the opportunity to enter their identifying information such as member login, password, and the like, related to user's 102 membership on the T-Commerce channel 114. The user 102 may have an option to save member login information and allow the mobile application on the mobile computing device to reuse the saved data. This may enhance user 102 convenience and ease of repeated logins. If the user 102 has logged onto the T-Commerce channel 114 and then uses the mobile computing device 1104 to launch the CPE client 108, that CPE client 108 may auto log-in to the T-Commerce channel 114 using the same membership information used to log-in to the T-Commerce channel 110 on mobile computing device 1104. If the user 102 has not logged onto the T-Commerce channel 114 prior to launching the CPE client 108, the user 102 may not be auto logged onto the T-Commerce channel 114. In this instance, the user 102 may asked to provide identifying information such as member login, password, and the like, related to user's 102 membership on the T-Commerce channel 114 prior to completing a purchase through the CPE 106.

In embodiments, the user 102 may be asked to log-in when they click the T-Commerce icon 904 within the mini home 810 on a mobile computing device 1104. The user 102 may choose to not login. If the user 102 chooses to not log-in they may have limited access to the functions and information on the T-commerce mobile application. The user 102 may be able to launch the CPE Client 108 without having logged onto the T-Commerce channel 114 on the mobile computing device 1104. If the user 102 who has not logged in, attempts to access information which is associated with a member login, the user 102 may asked to login.

In embodiments, the user 102 may be asked to login when they click the T-Commerce icon 904 within the mini home 810 on a mobile computing device 1104. If the user 102 does login to the T-Commerce channel 114 and then launches the CPE Client 108 from the mobile computing device 1104, the CPE client 108 may be automatically logged onto the T-Commerce channel 114. The CPE client 108 log-in status may be saved and the user 102 may remain logged onto the T-Commerce channel 114 through the CPE client 108 even if the user 102 leaves the T-Commerce page 912 or closes the T-Commerce mobile application.

In embodiments, the user 102 may navigate to the T-Commerce channel 114 and brand channels 116 using the mobile application on the mobile computing device 1104 without interacting with the CPE 106. Using the mobile application, the user 102 may have access to a plurality of functionality on the T-Commerce channel 114 and brand channels 116 such as: viewing the user's 102 "wish list"; viewing global cart 702 and brand carts 706; checking delivery status; viewing a brand list 924 and brand pages 932; viewing product SKUs 924; receiving shared data; searching brands and SKUs; and the like.

In an illustrative and non-limiting example, the user 102 taps 'Brand 1' 1116 on their mobile computing device 1104. The mobile asset repository 1112 updates lists of products and images for versions of brand pages that have changed. The user 102 taps 'Product 1' 1118 resulting in mobile content and data being sent from the mobile asset repository 1112 to the mobile computing device 1104 displaying detail of 'Product 1' 1114. The user 102 may select 'Product 1' 1118 for addition to the user's 102 "wish list", thus changing personal information associated with the user's 102 member login, in this case the contents of the user's 102 "wish list." This change to the personal information associated with the user's 102 member login may be shared with the components of the T-Commerce system such as the T-Commerce data service database 2012, brand server 1102, channel applications 1106 such as the T-Commerce channel application 1107, brand channel applications 1108, and the like, the cache server 1110, the mobile asset repository 1112, and the like.

In embodiments, there may be a remote devices server which may track a plurality of user 102 data such as the user's 102 on-the-move activity, response to share/promotional messages, preference for product and ad types, click-time variation, demographics, and the like. The remote devices server may track information related to the operation of mobile computing devices 1104 such as mobile content ID of displayed image or content, attributes related to displayed image or content such as classification of displayed content such as favorite, wish list, cart, and the like, image format, image size and the like. The remote devices service may track information related to the operation of the mobile computing device 1104 such as the URL of banner content, URL of target page, event log such as event type, click on what content for what actions, navigation route, time log, and the like. The remote devices server may track information to be used by the analytics system such as product information regarding the advertising content such as category and information about the CPE 106 such as MAC address, zip code, demographics associated with the unique user identification, and the like. In embodiments, when a user 102 views a brand page 932 on their mobile computing device 1104 the visit may be counted and a scenario of the user's 102 visit to a brand channel 116 accompanied by a token and saved to the remote devices server where it may be used to track brand exposures, click-through, and the like.

In embodiments, the T-Commerce page 912 may provide a list of brand shops which users' 102 may click to enter brand pages 932. The list of brand shops may be updated when a business entity or the like associated with the T-Commerce channel 114 makes changes in business partners and their associated brands. The list may be updated when the mobile application on the mobile computing device 1104 detects an update when accessing the brand list 924 from within the T-Commerce Page 912

In embodiments, a user's 102 interactions and selections with the T-Commerce channel 114, brand channels 116, and the like while on the mobile computing device 1104 may be updated in a plurality of locations such as the T-Commerce server, cache server 1110, brand servers 1102, channel applications 1106, and the like. These updates may facilitate consistency of experience for the user between the CPE 106 and mobile computing devices 1104. The updates may facilitate the appearance of events that occurred on the mobile computing device 1104 appearing when the user 102 visits the T-Commerce channel 114, brand channels 116, and the like using the CPE 106 device.

In embodiments, a user 102 may be able to personalize their experience with the T-Commerce channel 114, brand channels 116, and the like. In embodiments, a user 102 may set preferences about the product categories and brands about which they wish to see information, the types of information they receive such as advertisements, new product launches, and the like. In embodiments, the user 102 may set system configuration details for a printing device 1004, additional computing devices 1002, and the like.

In an illustrative and non-limiting example, the user 102 may click on the T-Commerce icon 904 in the mini home 810. As the mobile application begins to display the T-Commerce page 912 it may access content from the mobile asset repository 1112 or the cache server 1110. When the mobile application accesses the content it may check the version number to see whether or not the content has changed. If the version has changed, the mobile application may retrieve the updated content while a progress icon may be displayed on the layout of each piece of content being updated. If there is no change in the version or the updates have completed, the mobile application may show the content on the screen of the mobile computing device 1104. When the user 102 selects or clicks on a brand, the display of the mobile computing device 1104 may updated to show the basic layout of a brand page 932 which may be provided by the brand, be a generic layout, and the like. When updating the display, the mobile application checks the version number of the brand page 932 relative to that in the cache server 1110 or mobile asset repository 1112 to see of the brand page 932 has been updated. If the version has changed, the mobile application may retrieve the new content with a progress icon displaying on the layout of each piece of content being updated. If there is not a version change or if the updates have completed, the mobile application may display the brand page 932 on the screen of the mobile computing device 1104. When the user 102 touches or clicks on one of the images representing product, promotional content, and the like, the mobile application may alter the display of the mobile computing device 1104 to show more product content and metadata relating to the selected image. Again, the mobile asset repository 1112 may check to verify the version of the content which may be streaming video, documents, images with hyperlinks to other sites, and the like. If the user 102 selects a hyperlink to go to a linked site, the T-Commerce channel 114 may receive credit, payment, or the like from the brand based on the agreement between the T-Commerce channel 114 and the brands.

In an illustrative and non-limiting example, the user 102 may be viewing a brand page 932 on their mobile computing device 1104. The user 102 may mark one or more products as "favorites", "wish list", and the like, for later review. The user 102 may turn on a CPE 106 device with access to the T-Commerce channel 114. The user may view the T-Commerce channel 114 on the CPE 106 device and may see that those lists updated on the mobile computing device 1104 such as "favorites", "wish list", and the like, may be marked as having been updated on the CPE 106 view of the T-Commerce channel 114. The user 102 may enter "favorites", "wish list", and the like, from the CPE 106 device and find that those products identified on the mobile computing device 1104 are present.

In an illustrative and non-limiting example, the user 102 may open a page of information on the mobile computing device 1104. At the end of the page there may be a selectable option to allow the user 102 to review that page of information on a CPE 106 device. If the user 102 selects the option to visit that page on a CPE 106 device, the CPE client 108 may be launched and the page that user 102 indicated accessed using the DP remote browser 112. If the user 102 is already accessing the T-Commerce channel 114 on a CPE 106 device when they select the option to visit a page on their mobile computing device 1104, the target page selected may replace the page currently being displayed by the CPE client 108. Thus, in this instance, the use of the mobile computing device 1104 may be used as a shortcut to directly jump to the page the user 102 wishes to display on the CPE 106 device.

In an illustrative and non-limiting example, the user 102 may click the T-Commerce 904 icon in the mini home 810 on the mobile computing device 1104. When the login page 910 is displayed the user 102 may choose not to login. Once on the T-Commerce page 912 the user may navigate to a menu where the user may access receipts and purchase history. However, before the user 102 may gain access to this information the mobile application may display a pop-up dialog box for the user to enter in their member login information. The user 102 may enter the member login information and when the user has been verified, the mobile application may allow the user 102 to access information related to a member login such as receipts, purchase history, and the like.

In an illustrative and non-limiting example, the user 102 may have logged into the T-Commerce channel 114 when visiting the T-Commerce page 912 using their mobile computing device 1104. While visiting a page on the T-Commerce mobile site such as the T-Commerce page 912, "favorites" 916, brand page 932, and the like, the user 102 may have the option of displaying that page on a linked CPE 106 device. The mobile computing device 1104 may then launch the CPE client 108 on the CPE 106 device. The CPE client 108 running a channel application 1106 such as the T-Commerce application 1107, brand channel application 1108, and the like may read the saved login status and reflect the saved login information into the current screen. If this information is not available, the mobile application may send the member login information saved in the mobile computing device 1104 to the CPE Client 108. The CPE Client 108 may then use that information to log in. The CPE Client 108 may display a dialog box asking whether the user 102 wishes to inherit member login information from the mobile application on the mobile computing device 1104. The user 102 may now be logged into the T-Commerce channel 114 and able to access all information on the site including that information linked to member login.

In embodiments, the user 102 may select 'share' relative to a product, promotion, brand, and the like, which the user 102 sees displayed on the CPE 106 device. The user 102 may now be considered a "sender" as the user 102 is initiating the sharing. The user 102/sender may download to their paired mobile computing device 1104 content related to the product, promotion, brand, and the like which they wished to share. The user 102/sender may use the mobile computing device 1104 to send the downloaded content to the desired recipients by leveraging the sharing features of their particular mobile computing device 1104 such as email, SMS, MMS, Messenger, and the like. The recipient may view the message received and see an image, token, URL related to a site where they might download the T-Commerce mobile application, and the like. The recipient may download the T-Commerce mobile application if it is not already loaded on their mobile computing device 1104. The recipient may use the T-Commerce mobile application to access the content assigned to the token in their received message. The content may be accompanied by a token to enable features such as tracking and validating the recipients visits, providing credit to referring user 102, providing credit to the T-Commerce channel 114, and the like.

In an illustrative and non-limiting application, the user 102 may select share relative to a product, promotion, brand, and the like, which the user 102 sees displayed on the CPE 106 device. The user 102 may now be considered a "sender" as the user 102 is initiating the sharing. A dialog box may be seen on the CPE 106 display and the user 102 may select a method by which to share the material. The user 102/sender may click on their preferred medium such as email, MMS, message with the T-Commerce application 1107, and the like. The CPE 106 device may show a dialog box to get input from the user 102/sender. The user 102/sender may use the mobile application on their mobile computing device 1104 to enter texts or to push contact information such as address, phone number, email, and the like, to the dialog box. The CPE client 108 may send the share message to the recipient. The recipient may receive the message and open it with a tool capable of opening the message type.

In an illustrative and non-limiting example, the user 102 may have logged into the T-Commerce channel 114 when visiting the T-Commerce page 912 using their mobile computing device 1104. While visiting a page on the T-Commerce mobile site the user 102 may select an option to put their favorite content on the user's 102 preferred social network site such as Facebook, Twitter, and the like. The mobile application on the mobile computing device 1104 may pop up a dialog to request login information for the user's 102 selected social network site. The user 102 may then enter the login information, share the selected content, make comments within the social network site, and the like.

In an illustrative and non-limiting example, the user 102 may wish to access the T-Commerce channel 114 while using applications other the CPE client 108 on the CPE 106 device. A plurality of channel applications 1106 such as the T-Commerce application 1107, brand channel application 1108, and the like, may send messages to the CPE 106 device such as advertisements, URLs of interest, metadata and the like. In embodiments, the CPE client 108 may run in background and receive these messages while the user is engaged with other applications on the CPE 106. The CPE client 108 may use Auto Content Recognition (ACR) on the incoming messages and may cause a pop-up box to appear on the CPE 106 display comprising a second screen option for selected messages. The user 102 may have set preferences for the types of incoming messages for which the user 102 wished to receive such notification. The user 102 may wish to continue displaying an application other than the CPE client 108 on the CPE 106 device and may, therefore, select the 'add additional screen' which may send content information such as URL, metadata, and the like to a mobile computing device 1104 paired with the CPE 106. The user 102 may then view provided content from a plurality of channel applications 1106 using the T-Commerce mobile application or the local browser on the mobile computing device 1104.

Figure 19:
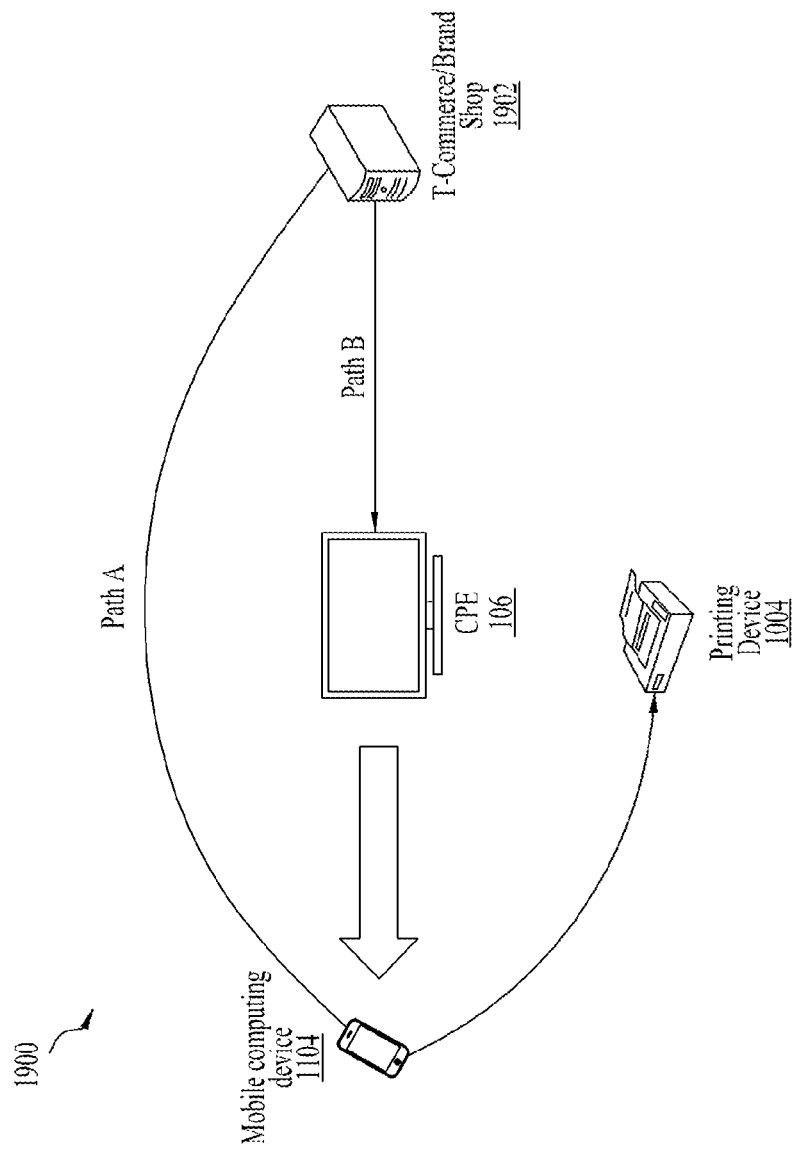
FIG. 19 depicts an embodiment flow diagram amongst a mobile device, the CPE, and a system channel.

Referring to FIG. 19, a top-level embodiment block diagram 1900 is presented illustrating two paths for transferring data between a T-Commerce/brand shop 1902 and a mobile computing device 1104 connected to a printing device 1104.

In embodiments, the mobile computing device 1104 may communicate with a T-Commerce/brand shop 1902 in a plurality of ways such as: directly using one of a plurality of standard wireless protocol; through an intermediary device such as a CPE 106; and the like. The mobile computing device 1104 may communicate with a printing device 1104 using one of a plurality of standard wireless printing protocols. The user 102 may select material to print such as images, coupons, receipts, delivery information, and the like from a T-commerce/brand shop 1902. In embodiments, the selected material may be transferred directly to the wireless computing device 1104, Path A, using one of plurality of means such as WiFi, cellular, and the like. In embodiments, the selected material may be transferred to the wireless computing device 1104 with the CPE 106 as an intermediary, Path B. The requested data may be sent through the remote browser 112 to the CPE 106. The CPE 106 may then send the material to be printed to the mobile computing device 1104 using either standard wireless protocols or proprietary wireless communication protocols. The mobile computing device 1104 may then send the material to be printed to the printing device 1004.

In an illustrative and non-limiting example, the user 102 may have logged into the T-Commerce channel 114 when visiting the T-Commerce page 912 using their mobile computing device 1104. While visiting a page on the T-Commerce mobile site the user 102 may click on a page or menu displaying information they want to print such as receipts, purchase info, product information, delivery information, coupons, and the like. The user 102 may be shown a plurality of options one of which may be printing. The user 102 may then select the print option. The T-Commerce mobile application may retrieve the content to be printed from the T-Commerce server. If the mobile computing device 1104 has a configured printer the content to be printed may be automatically sent to the printing device 1004. If the mobile computing device 1104 has no associated printing device 1004 a pop-up dialog box may appear to facilitate the user 102 in configuring a printing device 1004.

T-Commerce Channel

In embodiments, the T-Commerce channel 114 may facilitate ease of shopping and improved decision making capabilities for the user 102 by means such as consistent terminology and navigation hierarchies, application wide search capability, personalized content, navigational tools, and the like. In embodiments, brand owners may display their merchandising information such as products, prices lists, promotional information, cross-sells, up-sells, and the like on their brand channel 116 while benefiting from the integration with the T-Commerce channel 114.

Figure 20:
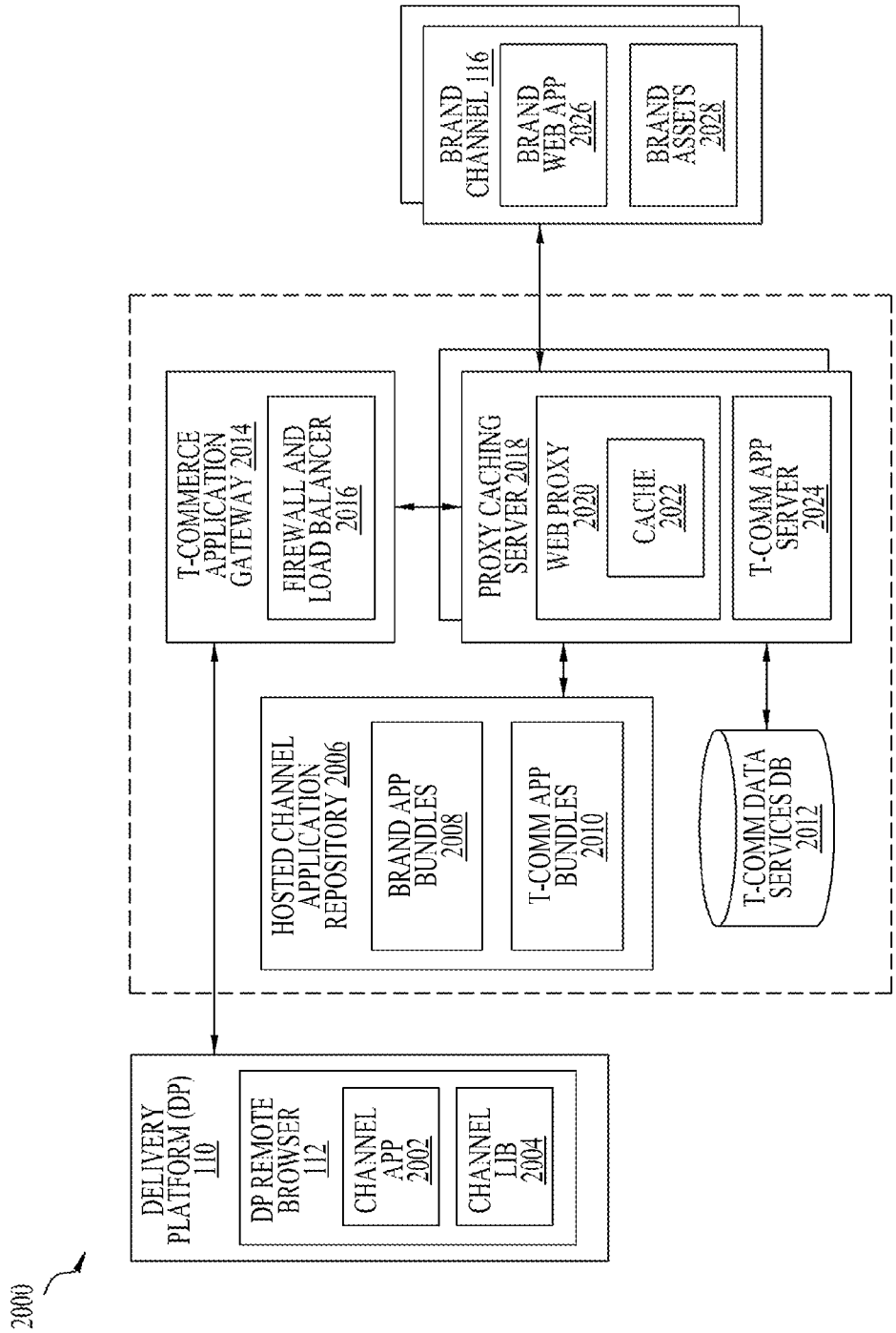
FIG. 20 depicts an embodiment functional block diagram for the T-commerce channel.

Referring to FIG. 20, a top-level embodiment block diagram 2000 is presented illustrating the interrelationship between the delivery platform 110, the T-Commerce application gateway 2014, the hosted channel application repository 2006, the proxy-caching server 2018, a plurality of brand channels 116 and the T-Commerce data services database 2012.

In embodiments, the T-Commerce application gateway 2014 may act as a front door to a plurality of T-Commerce application servers 2024. The T-Commerce application gateway 2014 may comprise a firewall and load balancer 2016. The firewall may limit access to the plurality of T-Commerce application servers 2024, proxy caching servers 2018, and caches 2020 to only those approved protocols and ports. The load balancer may monitor the utilization of a plurality of proxy-caching servers 2018 and T-Commerce application servers 2024 and may redirect new sessions as appropriate. There may be a cluster of proxy caching servers 2018 wherein each may comprise a web proxy 2020 and a cache 2022. The cache 2022 may store the latest brand assets 2028 supplied by the brand channel 116. The web proxy 2020 may redirect, as appropriate, requests such as content requests, Rest API requests, application requests, data services requests, and the like, to one or more of: a hosted channel application repository 2006 comprising brand application bundles 2008 and T-Commerce application bundles 2010; a T-Commerce data services DB 2012; a plurality of brand web applications 2026; and the like.

In embodiments, a T-Commerce application gateway 2014 may act as the interface between the T-Commerce backend system and the delivery platform 110 where the delivery platform may comprise a plurality of remote browsers 112 running channel applications 2002 supported by channel libraries 2004 and the like. In embodiments, the plurality of T-Commerce application servers 2024 may each run a T-Commerce application bundle 2010 which may implement business logic, interact with T-Commerce data services data base 2012, and the like. Data stored in the T-Commerce data services database 2012 may be secured using encryption, password protection, and the like. The T-Commerce system may support user identification and access management such as user provisioning, authentication, authorization, Federated Single-Sign-On, SSO, and the like.

There may be a cache 2022 which may host and distribute T-Commerce channel 114 assets to the T-Commerce application 1107, brand assets 2028 to brand web applications 2026, and the like. Brand data stores 2216, described later herein, may support such abilities as: registration and uploading of new brand assets; updating of media and metadata assets; tracking of media and metadata asset versions; removal of previous versions of media and metadata assets.

In embodiments, the brands may provide content for the T-Commerce channel 114 to display in a plurality of locations such as "window shop", "favorites", and the like. In embodiments, all brand content and asset data maintained and displayed on the T-Commerce channel 114 may public information. In embodiments, the T-Commerce channel 114 may support a plurality of highly dynamic content layouts such as a main "window shop" landing page, a "favorites" landing page, and the like. The main "window shop" landing page may comprise a plurality of sections such as a navigation menu, brand tiles content area, and the like. The brand tiles content area may be dynamically composed of a plurality of brand tiles wherein each brand tile may vary in display attributes such as width, height, screen location, and the like. These brand tile display attributes may vary based on age of brand channel 116, timeliness of content, user personalization preferences, business rules, and the like. The brand tiles may display brand specific content such as static images, animated images, slow-motion videos, text, and the like The "favorites" landing page may comprise a plurality of sections such as a navigation menu section, a "favorites" content area, and the like. The "favorites" content area may comprise a plurality of content areas such as a "favorites" brand store channel 116 carousel; personalized product modules areas such as "wish list", trending, sales, and the like; brand store promotional banners; and the like. A personalized product modules area may be dynamically composed of a plurality of product tiles wherein each product tile may vary in display attributes such as width, height, screen location, and the like. Personalized product module areas such as "wish list", trending, sales, and the like, may display a numerical indicator of how many product tiles are in that particular module area. The user 102 may have ability to scroll through the list of displayed product tiles. There may be an option available to the user 102 to expand the screen space used by an individual product module area to facilitate the display of additional product titles. There may be an option available to the user 102 to expand the screen space used by an individual product tile to display additional details about the individual product.

Figure 21:
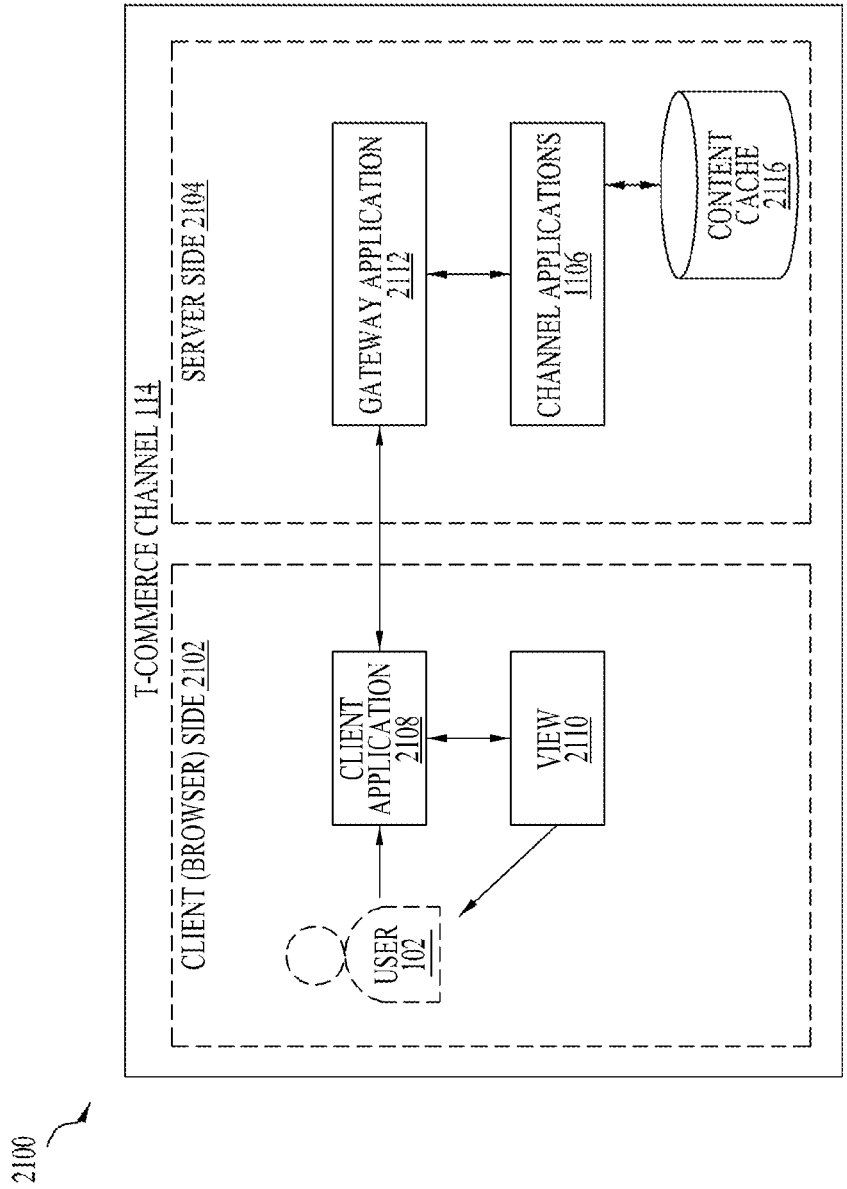
FIG. 21 depicts an embodiment client-server configuration of the T-commerce channel.

Referring to FIG. 21, a top-level embodiment block diagram 2100 is presented illustrating the T-commerce channel 114 which may have a client (browser) side 2102 and a server side 2104. The client (browser) side 2102 may comprise a client application 2108 such as a CPE client 108, a T-Commerce mobile application, and the like. The client application 2108 may render a view 2110 on the screen of the device with which the user 102 is interacting, such as a CPE 106, mobile computing device 1104, and the like. The client application 2108 may interact with a gateway application 2112 on the server side where the gateway application 2112 facilitates access to the channel applications 1106 such as the T-Commerce application 1107, brand channel applications 1108, and the like. In turn, the channel applications may retrieve content from a content cache 2116 such as the cache server 1010, the mobile asset repository 1112, and the like.

Figure 22:
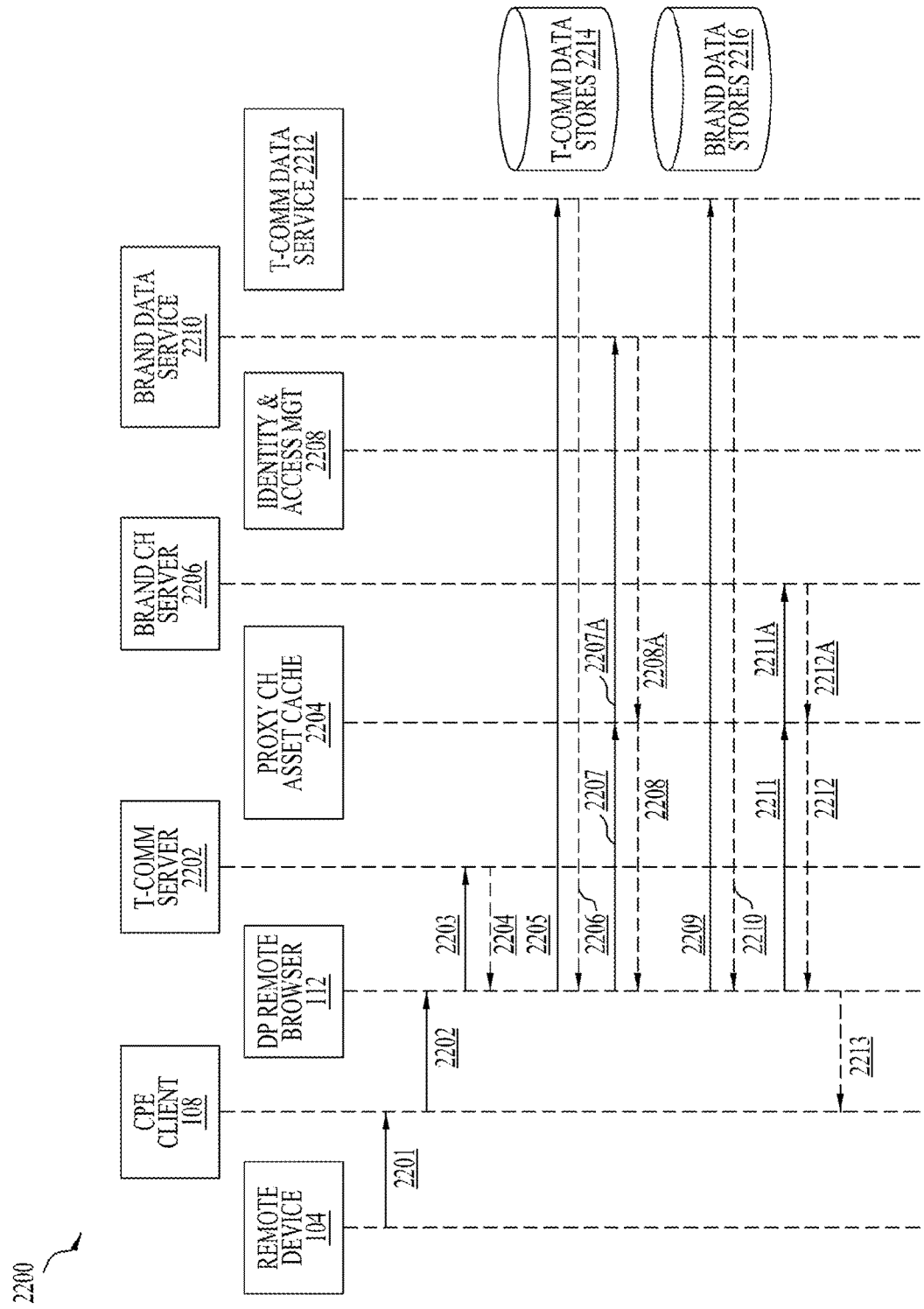
FIG. 22 depicts an embodiment sequence diagram showing interactions across the system to channel stores.

Referring to FIG. 22, a top-level flow diagram 2200 is presented illustrating the communication flow between various T-Commerce system components in response to a user-initiated event. In embodiments, the user 102 may click on the T-Commerce icon 2201 displayed by the CPE Client 108 using the remote device 104. The CPE client 108 may pass control to the DP remote browser 112 using a token such as the user identifier, and the like. The DP remote browser 112 may invoke 2203 the T-Commerce server 2202 which may respond 2204 by sending HTML and JavaScript for the T-Commerce channel 114 home page to the DP remote browse 112. The DP remote browser 112 may then send a request for navigation bar assets to the T-Commerce data service 2212 which may respond with the requested navigation bar information 2206. The DP remote browser 112 may send a request for brand information 2207 to the proxy channel asset cache 2204 which may send the request for brand information 2207A to the brand data service 2210. The brand data service 2210 may return the brand information 2208A to the proxy channel asset cache 2204 which may forward the requested brand information 2208 to the DP remote browser 112. The DP remote browser 112 may send user 102 identification information such as member login, password, username, and the like, together with a request for "favorites" 2209 to the T-Commerce data stores 2214. The T-Commerce data stores 2214 may then return the "favorites" information 2210 to the DP remote browser 112. The DP remote browser 112 may then send a request for web assets 2211 to the proxy channel asset cache 2204. If the requested web assets 2211 are available, on the proxy channel asset cache 2204 it may return the web assets 2212 to the DP remote browser 112. If the requested web assets 2211 are not available on the proxy channel asset cache 2204 it may send a request for the web assets 2211A to the brand channel server 2206. The brand channel server 2206 may return the requested web assets 2212A to the proxy channel asset cache 2204 which may send the request web assets 2212 to the DP remote browser 112. The DP remote browser 112 may then stream 2213 the T-Commerce channel 114 home page to the CPE Client 108.

In embodiments, the T-Commerce data base 2214 may comprise information on individual users such as "favorites", "wish list", global cart, aggregated order history, navigation topics taxonomy, and the like. In embodiments, the brand data stores 2216 may comprise content, media assets, and the like, relating to such areas as product specification, brand configuration, trending products, on sale products, brand order history, brand shopping cart, and the like.

In embodiments, the hosted channel application repository 2006 may comprise APIs which may support the ability for new brand application bundles 2008 to be registered and uploaded, the ability for a brand application bundle 2008 to be updated, the ability for a brand application bundle 2008 to be deleted or disabled so it does not appear in the list of available brands, and the like.

In embodiments, there may be an API that provides key services within the T-Commerce application 1107 environment with respect to "favorites", "wish list", aggregated order history, global cart, navigation topics taxonomy, and the like. The API may provide such services as retrieving information, creating new items, updating/modifying items, deleting existing items, and the like.

In embodiments, there may be an API that provides key backend business services related to product specification, brand configuration, trending products, on sale products, brand order history, brand shopping cart, and the like. The API may provide such services as retrieving information on an individual item, retrieving information on all items, creating new items, updating/modifying items, delete existing items, and the like.

In embodiments, there may be brand application bundles 2008 which may facilitate product specification, brand configuration, specifying and managing trending products, specifying and managing on sale products, managing brand order history, specifying and managing brand shopping cart, and the like.

Advertisement Facility

In embodiments, the T-Commerce system may include advertising services. Such advertising services may leverage the use of an advertising server to offer targeted advertisements to users across multiple brand channels. Such an advertising server may include advertisements from brand channels and from other sources. The advertising server may select advertising content to serve personalized, customized advertisements to a given user based on data about that user, which may include information on past purchases, programs viewed, demographic information, brand channels joined, favorites, wish lists, shopping carts, and the like. The advertising server may also serve advertisements that are not personalized or customized to users in one brand channel or across multiple brand channels. The advertising server may acquire such user data from the T-Commerce channel, as defined herein, and may share user data across multiple brands.

In embodiments, the T-Commerce system's advertising services may include banner advertising. In these embodiments, such banner advertising may include sound, images, video, and the like, which may be accompanied by metadata, computer code, and the like. As used herein, the term "banner advertisement" may refer to any advertisement that does not fill a screen in its entirety, regardless of the shape or size of the advertisement, such that vertical tower advertisements may also be referred to as banner advertisements, as may hot spot advertisements that correspond to objects displayed on the screen, round advertisements, screen-edge advertisements, and the like. Banner advertisements may change in shape or they may be static. Banner advertisements may be enabled, such that when they are clicked or otherwise selected they take one or more actions. These actions may include one or more of the following: (1) linking to a URL, which may or may not result in changing the content displayed on a portion of the screen or on the whole screen; (2) initiating, cancelling, or otherwise changing functionality; (3) running a script or other computer code; (4) adding an item or items to a shopping cart; (5) adding an item or items to a wish list; and (5) other actions that may be appropriate based on the selection of the banner advertisement in question. For example, clicking a banner advertisement could add a product to a shopping cart, initiate a picture-in-picture feature, display a brand channel in the main screen area, display a purchase confirmation screen in a smaller screen area, and launch computer code that stores metadata relating to the circumstances in which the banner was clicked such as the demographics of the user, the product added to the shopping cart, and the like. In another example of these embodiments, a banner advertisement may be configured such that when it is clicked it transfers the user to a brand channel, displaying that brand channel on the user's screen.

In embodiments, there may be a designated screen area for the display of banner advertisements. In these embodiments, clicking or otherwise selecting a banner advertisement may redirect a user to one or more of the following: (1) a portal channel from which multiple brand channels may be browsed; (2) a brand channel's main page; (3) a brand channel's retail shop page; (4) a product-specific page; (5) a shopping channel that includes products from multiple brand channels; and (6) another channel or page that may be appropriate based on the banner advertisement selected. In these embodiments, the duration that a banner advertisement may be displayed and which banner advertisement replaces it may be determined by the advertising server and may depend on such factors as the number of banner advertisements determined to be appropriate for display in that location, information about the user, information about programs watched, wish list data, purchase history, user behavior, channel content, and other relevant factors. In some cases, it may be appropriate to rotate a fixed number of advertisements. In other cases, it may be appropriate to select advertisements sequentially. In cases where there are multiple users within a household, it may be useful to attempt to determine which user or users are viewing the CPE 106 at that time, since different banner advertisements might be appropriate to different users.

In commerce generally and in electronic commerce in particular, information about a customer may be valuable in serving the needs of that customer and completing transactions with that customer. However, since a single television may be used by multiple people, it may be difficult to identify who is watching a given television at a given time. This problem is of particular significance when delivering advertising content to television viewers, since an advertisement that may be appropriate for one viewer may be inappropriate for another viewer. Definite identifications may be made when a viewer self-identifies (e.g. logs in with a personal user name, selects his name from a menu, etc.), through the use of biometric inputs (e.g. fingerprint readers, retinal scanners, and the like), but users may chose not to self-identify and may prefer not to make use of biometric identification technologies. Therefore, a need exists for a viewer identification tool.

In embodiments, the T-Commerce application may provide a viewer identification tool. Such a viewer identification tool may collect and analyze data from a number of sources to make probabilistic determinations about who is watching a given television at a given time. In cases where no one factor is determinative as to who is using a CPE (such as self-identification, biometric identification, and the like), the CPE may invoke software that may weigh and analyze a number of factors to make probabilistic determinations regarding the identity of viewers. Such factors may include one or more of the following: (1) user profiles of household members; (2) purchase histories of household members; wish lists of household members; viewing history of household members; (3) recent activity, such as recently viewed programming, recently visited channels and pages, recent purchases, recent wish list changes, frequency of channel changes (i.e. different users may have different channel-changing patterns of behavior, which may be used to identify those users, possibly through the use of pattern-recognition software); and the like; (4) MAC hardware addresses of recently used devices; (5) current time of day, day of week, day of month, month of year, and the like; (6) self-identification by users, such as logging on to make a transaction, confirming a user id (possibly by clicking on or otherwise selecting a name on the screen), and the like; (7) biometric user data; (8) voice recognition of voice commands or other ambient speech; (9) face recognition of viewers; (10) the location within a home in which the screen being viewed is located; (11) the size of the screen being viewed; (12) the number of people watching the CPE, which may be determined using cameras, microphones, motion detectors, infrared sensors, and the like, possibly in combination with software that may interpret information acquired through such sensors; and (13) other indicators that tend to make it more likely that a given user is watching the television in question at that time. In making such viewer probability calculations, certain of these factors may be given greater weight in combination than individually. For example, time of day by itself may offer little indication of who is watching a given screen, but when combined with data indicating that at that time of day children's programming is frequently viewed on that screen, the probability that a child is watching the screen may increase considerably.

In embodiments, the viewer identification tool may be enabled to make probabilistic determinations regarding the location of a given CPE. In cases where a CPE's location is not provided by a user, the viewer identification tool may collect and analyze available data to make such a determination. Such data may include any data related to the use of the CPE, including installation, setup, operation, and the like. Operation data may include information relating to the one or more of the following: (1) the times the CPE is used (including time of day, day of week, day of month, month of year, frequency of use, duration of use, and the like); (2) For example, a small screen on which children's programming is frequently viewed in the morning and news programming is frequently viewed in the evening may have a high probability of being located in a kitchen.

In cases where a remote device 104 being used to control the CPE 106 may be associated with a single user such as a mobile computing device 1104, it may be possible to make such determinations with a high level of confidence. Similarly, it may be possible to identify a user who has recently logged in based on the user's log-in information and it may be possible determine a user's user ID on a given CPE based on that user's activity, possibly including setting preferences, clicking or otherwise selecting the user's name from a menu, and the like. In other cases, it may not be possible to identify a user with a high level of confidence. Even in cases where one user may be identified with a high level of confidence as watching a CPE, there may be one or more other users watching the same CPE at the same time. In any of these circumstances, it may be appropriate to select banner advertisements that are likely to appeal to as many as possible of the unique users of the particular CPE 106. Factors that may be used to determine which user or users are viewing the CPE 106 at a given time may include one or more of the following: (1) user profiles of household members; (2) purchase histories of household members; wish lists of household members; viewing history of household members; (3) recently activity, such as recently viewed programming, recently visited channels and pages, recent purchases, recent wish list changes, frequency of channel changes (i.e. different users may have different channel-changing patterns of behavior, which may be used to identify those users, possibly through the use of pattern-recognition software); and the like; (4) MAC hardware addresses of recently used devices; (5) current time of day, day of week, day of month, month of year, and the like; (6) self-identification by users, which may include recent self-identifications as well as patterns of self-identifications on that CPE over time; and (7) other indicators that tend to make it more likely that a given user may be watching the CPE 106 in question at that time. In these embodiments, the advertising server may calculate likely viewers based on data passed to it by the CPE 106 and other sources. Alternatively, the calculation as to probable users may be made elsewhere and be passed to the advertising server. Data on probable users may be stored in data sets containing user identification numbers and the corresponding percentage probability that a given user may be currently watching that television and possibly also a percentage confidence that the percentage probability may be correct.

In embodiments, there may be a publisher advertising server, which may include a database of banner advertisements, and there may be one or more third-party advertising servers, which may include content for banner advertisements. In these embodiments, the clicking or other selection of a banner advertisement (e.g. pointing with a remote control, gesturing, issuing an oral command, issuing a command through a mobile device, and the like) may send a signal to the publishing advertising server, which may redirect the request to a third-party advertising server. The third-party advertising server may serve advertising content or may further redirect the request to a content delivery network ("CDN"), which may serve advertising content. Other server arrangements may also be used to optimize the delivery of content, such as external cache servers, compressed asset decompression and delivery systems, and the like. In these embodiments, the publishing server may store an event log and may be enabled to generate an audit log. Such an audit log may include information on the number of times an advertisement has been viewed, the duration of such views, the number of times the advertisement has been clicked or selected, and the like. Such audit log data may be shared with other service delivery platforms, possibly including components that calculate advertising performance, components that calculate charges for pay-per-click advertisements, components that calculate charges for pay-per-view advertisements, and the like.

In embodiments, banner advertising may involve a number of categories of data. These data categories may include one or more of the following: (1) data required to deliver advertising content to a user, such as a banner advertisement's identification number, the URL where the content of the banner advertisement may be located, the URL where the banner advertisement is to be displayed, and the like; (2) data required by the analytics system, such as identifying information on the product or products being advertised, the categories of such products being advertised, user demographics, user activity, other information about the user, household information; the MAC hardware address of the television on which the banner advertisement may be displayed; the MAC hardware addresses of mobile devices, controllers, and the like used to select or click on a banner advertisement, and the like; (3) events logs, which may include details of banner advertisements displayed such as time, size, position, and the like; details of banner advertisements clicked or otherwise selected such as time, size position, identity of clicking or selecting device, and the like, details of content clicked-on, details of actions taken, navigation paths (e.g., within and between brand channels and areas of the T-commerce system), time logs, and the like; and (4) other events related to banner advertising.

In embodiments, banner advertising may be initiated by a plurality of precipitating events such as user 102 actions, system conditions, time-based, and the like. In an example of these embodiments, banner advertising may be initiated when a user 102 visits the T-Commerce channel 114, at which time three advertisements may be displayed. Continuing the example, the user 102 may click on the first of the three advertisements and be directed to a shopping channel that includes products from multiple brand channels 116. The user 102 may then select the home button on the navigation bar, which may redirect the user 102 back to the main T-Commerce channel 114 page. When the user 102 arrives back at the main T-Commerce channel 114 page, three new banner advertisements may be displayed there. Alternatively, the banner advertisement that has already been clicked by the user might be replaced by a new banner advertisement and the other two advertisements might remain. In a third alternative variation, all three of the original banner advertisements may be displayed again. In some cases, banner advertisements may vary in type. For example, there may be a banner advertisement that describes a specific product, a second banner advertisement that describes a category of products, and a third banner advertisement that identifies a brand channel, such that each advertisement could lead to a corresponding landing page. If a user 102 clicks on or otherwise selects the first of these advertisements, the user 102 may be redirected to a product detail page offering information and purchase links regarding the product in question. Alternatively, the first advertisement may include the words "buy now" or equivalent language and clicking on or otherwise selecting that advertisement may place the product advertised into the user's 102 global cart 702 and may take the user 102 to a purchase confirmation screen.

In embodiments, the T-Commerce system's advertising services may include full-screen advertising. Such full-screen advertising may include all of the types of content that may be included in banner advertising (e.g. images, videos, sound, and the like) and may share other characteristics with banner advertising, as described above. Full-screen advertisements may be delivered using the same servers and other components as banner advertisements or they may be delivered from dedicated servers, or they may be delivered from other sources. Full-screen advertisements may be initiated by user actions within a banner advertisement, within a brand channel, while viewing programming, and the like. For example, a user viewing a banner advertisement about a product may click that banner advertisement launching a full-screen video about the product (e.g. a commercial, a movie trailer, a video describing the features of the product, or the like). In another example, a brand channel may feature a link, which may be labeled "more information," "learn more," "see it in action," or the like and may launch a full-screen advertisement when clicked or otherwise selected. In another example, a full-screen advertisement may be launched without user input, such as when a brand channel is left on the same screen for a period of time.

In embodiments, the T-Commerce system's advertising services may include automatic content recognition ("ACR") advertising. ACR advertising may be enabled to identify products in streaming video and to generate pop-up dialog boxes relating to those products that may be clicked or selected by users 102. These pop-up dialog boxes may link to more information about the products in question, to related brand channels, to related product category pages, or to other channels and pages that are appropriate based on the products identified, user information, and other relevant factors. These pop-up dialog boxes may have any or all of the characteristics of banner advertisements, as described above. These pop-up dialog boxes may also have additional characteristics that are particular to the ACR advertising context. ACR advertising services may be provided internally by the T-commerce system or externally by an ACR vendor or other third-party provider. In some cases, advertising brands may be required to provide content to an ACR vendor. Such content may be used to extract identifying information. Such identifying information may be used to facilitate the process of recognizing applicable products in streaming video.

Figure 23:
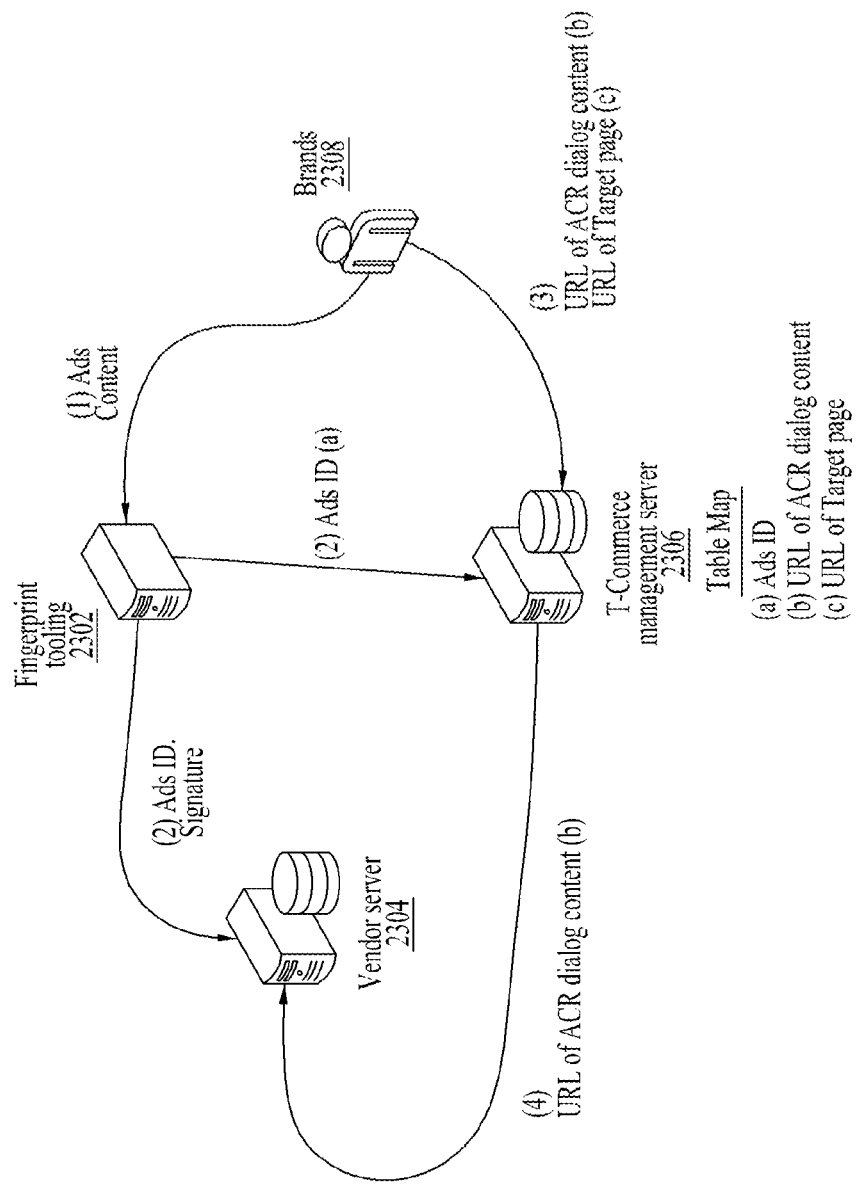
FIG. 23 depicts an embodiment functional flow diagram for a T-channel ads service setup.
Figure 24:
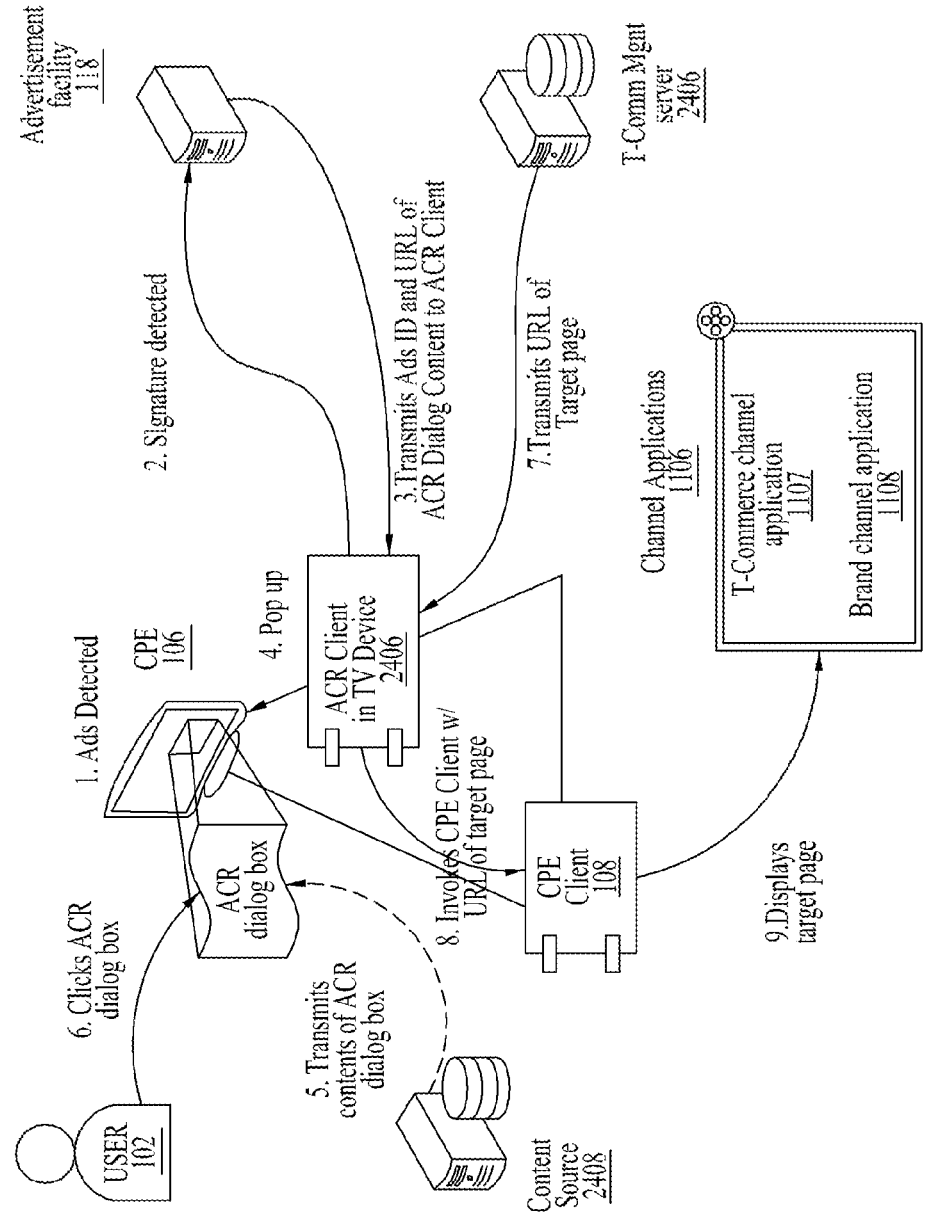
FIG. 24 depicts an embodiment functional flow diagram for a T-commerce ads scenario.

In embodiments, ACR advertising may be limited to products of brands that register with the T-Commerce advertising server. Such registration may include providing one or more of the following: (1) the URL of a target page to which the pop-up dialog box should be linked; (2) the URL of advertising content to be included in the pop-up dialog box; (3) other information, as appropriate. Restrictions may be placed on where the target page information may be stored. For example, it may be possible that the system may be set up to prevent ACR vendors from storing the target pages of their ACR advertisements on their ACR advertising servers. Such restrictions may be useful for preventing fraud, abuse, self-dealing, inflated click-through numbers, and the like. FIG. 23 illustrates an example of these embodiments involving a vendor server. As illustrated in FIG. 23, brands 2308 may provide advertising content to a fingerprint tooling 2302 system. Such a fingerprint tooling 2302 system may generate advertisement signature identification information, which may be provided to a vender server 2304 as well as to a T-Commerce management server 2306. Brands may provide the URL of a target page to which the pop-up dialog box should be linked and the URL of advertising content to be included in the pop-up dialog box to the T-Commerce management server 2306. The T-Commerce management server may then send the URL of this advertising content to the vendor server. Instead of or in addition to using a vendor server, the system may use another form of advertising facility. Once the advertising facility, which may be a vendor server, has advertisement identification signature information and the URL of ACR dialog content, the system may begin the process of delivering ACR advertising to users. The process of delivering such content is illustrated in FIG. 24. Referring to FIG. 24, an ACR client 2406 embedded in a CPE 106 may run in the background on the CPE 106 and may analyze content being displayed on the screen of the CPE 106, together with audio being played by the CPE 106, to search for signatures that match the product fingerprints that correspond to ACR advertisements. Once a product signature has been detected, the ACR client 2406 may send the signature of the detected product to an advertisement facility 118, which may match that signature to the URL of corresponding ACR dialog content and return that information to the ACR client 2406. The ACR client 2406 may then use the URL provided to it by the advertisement facility 118 to retrieve the ACR dialog content from a content source 2408. Such content may include images, video, audio, and the like. Once this content has been retrieved, it may be displayed in the ACR dialog box on the CPE 106. The content may be accompanied by one or more buttons. Such buttons may be labeled with actions that may include one or more of the following: "Visit Now," "Favorite," "Visit Later," "Exit," and the like. If a user 102 responds to the dialog box by clicking or otherwise selecting a "Visit Now" or equivalent button, the ACR client 2406 may then retrieve the URL of the target page from the T-Commerce management server 2306 and may invoke the CPE client with the URL of the target page; the CPE client may then signal one of the channel applications 1106 to display the target page on the screen of the CPE 106, possibly using a picture-in-picture feature to preview the target page. The channel application displaying the page may be the T-Commerce channel application 1107, a brand channel application 1108, or the like. If a user 102 clicks or otherwise selects the "Favorite" button, the ACR client 2406 may pass this information along to the CPE client 108, which may, in turn pass the information along to appropriate servers, as necessary to add that product to the user 102's favorites list, such servers possibly including the T-Commerce management server 2306. Similarly, if the user 102 clicks or otherwise selects the "Visit Later" option, the ACR client 2406 may pass this information along to the CPE client 108, which may, in turn pass the information along to appropriate servers, as necessary to prompt the user with a "Visit Now?" inquiry for that product at a future time, such servers possibly including the T-Commerce management server 2306. This prompt may be offered in a pop-up box, as a banner, as an auditory prompt, or as another form of audio or visual inquiry. If the user 102 clicks or otherwise selects the "Exit" button or an equivalent option, the dialog box may be removed from the screen immediately. If the user 102 does not respond to a dialog box, it may be removed from the screen after a fixed period of time or it may remain until the user takes another action. This fixed period of time may have a default value, which may possibly be five seconds. This fixed period of time may also vary depending upon product or other factors. The period of time that a dialog box may be displayed may be determined by agreement with a brand owner or other company displaying the advertisement in question or may be determined using other factors.

In embodiments, a target page linked to by ACR advertisements may be brand channel product page, a main brand channel landing page, a product category page, or another page or channel. Target pages may be displayed full screen or picture-in-picture. ACR advertising-related activity may be recorded in an audit log. The T-Commerce system may provide options for changing the duration of ACR advertising display, the frequency of ACR advertising display, the depth of ACR advertising overlay display, the transparency of ACR advertising overlay display, and the like. There may also be options for blocking the display of certain ACR advertisements, certain classes of ACR advertising, and the like.

In embodiments, ACR advertisements may be displayed alongside live television programming, recorded television programming, still images, and the like.

In embodiments, users may browse lists of ACR advertisements. Such ACR advertisement browsing may take a number of forms. In one such form, a user may navigate to a channel on which various advertisements are listed, possibly including thumbnail images of advertisement content. Such a channel may display one or more of the following and multiple such channels are possible: (1) ACR advertisements from a particular brand channel; (2) ACR advertisements from a particular product category; (3) a complete list of ACR advertisements that have been displayed on a given television within a set period of time; (4) a complete list of ACR advertisements that have been displayed to a given household within a set period of time; (5) a listing of ACR advertisements based on user preferences; (6) a list of ACR advertisements for which the "Visit Later" option was selected; (7) a list of ACR advertisements for which the "Favorite" option was selected; (8) a combined list of ACR advertisements for which either the "Visit Later" or the "Favorite" option was selected; (9) a list of ACR advertisements that have previously been viewed, by selecting the "Visit Now" option or by navigating to them through another path; and (10) a listing of ACR advertisements based on other selection criteria. In these embodiments, ACR advertisements that were responded to may be highlighted to show the nature of the response. For example, an ACR advertisement whose "Visit Now" button has been clicked may be highlighted in green, an ACR advertisement whose "Visit Later" button has been clicked may be highlighted in red, and the like. In these embodiments, such lists of ACR advertisements may be enabled with active links, such that users may click on them with the same effect as by clicking the "Visit Now" button associated with that advertisement's dialog box.

In embodiments, the T-Commerce system's advertising services may include overlay advertising that uses object recognition to make video streams (e.g. programs) clickable. In these embodiments, the ACR client running on a CPE may analyze image streams not only for ACR advertising signatures, but also for images, possibly through the use of image recognition software. When an image is recognized, it may be made clickable or selectable using an invisible overlay and may possibly be highlighted with a semi-transparent overlay. Whether recognized objects are highlighted may depend on user preference settings. When a highlighted object is clicked or otherwise selected by a user, it may prompt a search of T-Commerce channels for the closest matching product or product category and may display the results of that search, possibly using picture-in-picture technology. It is possible that advertisers may be permitted to purchase rights to overlay advertising based on product type, product category, or other criteria. For example, an advertiser may purchase overlay advertising for cars and have its products or brand channel displayed when a user clicks an overlay image of a car.

Figure 25:
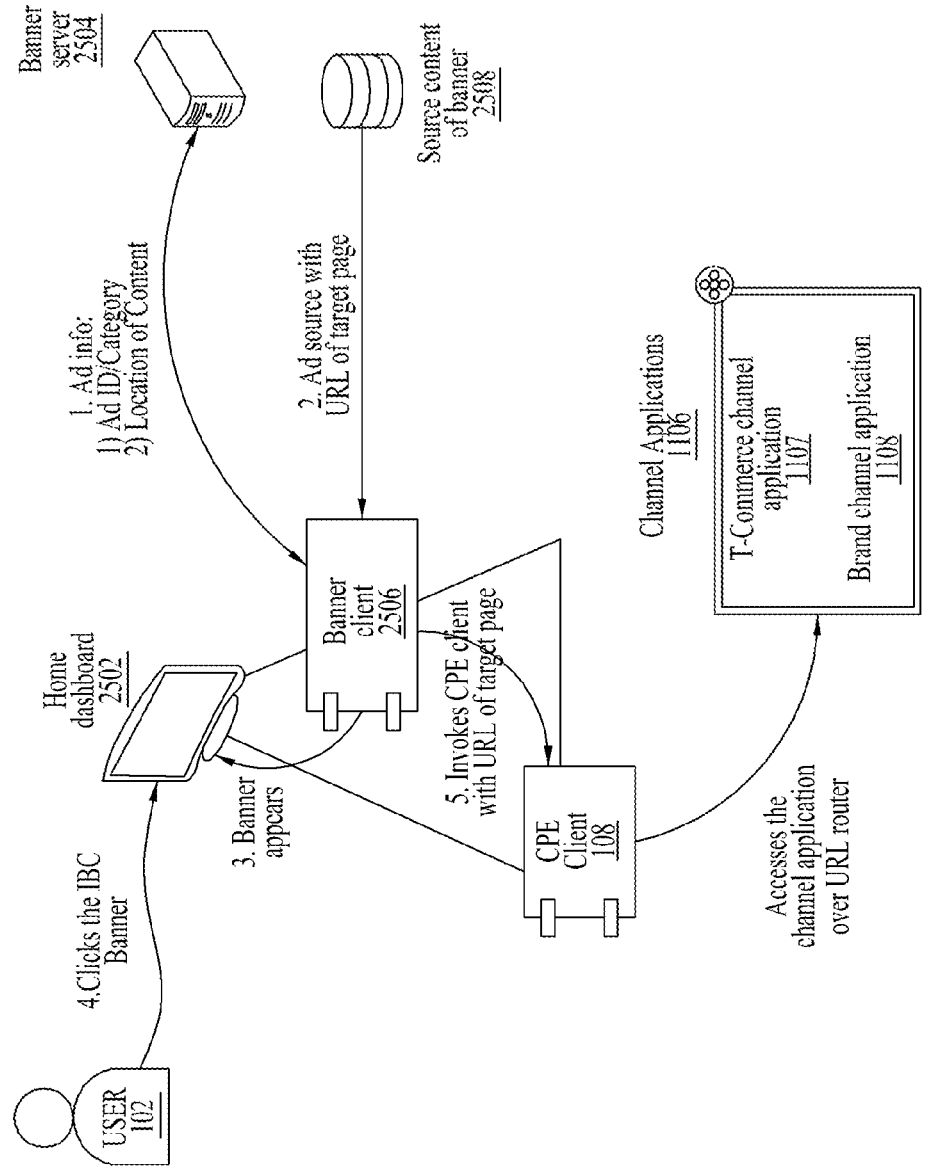
FIG. 25 depicts an embodiment functional flow diagram including a banner setup scenario.

In embodiments, the T-Commerce system's advertising services may include an interactive brand channel ("IBC") banner. An IBC banner may be an image of any dimensions, possibly associated with video and sound, which appears on the home dashboard of a CPE. An IBC banner may use one or more of a wide range of file formats and technologies, such as jpeg, simple Small Web Format, Flash, mpeg, mp3, and the like. As illustrated in FIG. 25, there may be a banner server 2504 on which information relating to an IBC banner may be located. Such information may include one or more of the following: (1) identifying information, such as identification number, category, and the like; (2) the location of the IBC banner's content; (3) the URL to which the IBC banner is to link; and (4) other appropriate information relating to the IBC banner. There may be a banner client 2506 that may be launched on the CPE 106 when the CPE 106 is started or at other appropriate times, such as when a link to the home dashboard is clicked or otherwise selected by a user; when a CPE is restarted or rebooted; and the like. Upon startup, the banner client 2506 may query the banner server 2504 and may retrieve information concerning the IBC banner. The banner client 2506 may then use the information retrieved from the banner server 2504 to locate and retrieve the source content of banner 2508. The banner client 2506 may then display the IBC banner on the home dashboard 2502 of the CPE. A user 102 may then have the option to click on or otherwise select the IBC banner. If a user 102 selects or otherwise clicks on the IBC banner, the banner client 2506 may invoke the CPE client 108 with the URL of the IBC banner's target page, which may cause the CPE client 108 to launch one of the channel applications 1106. Such channel applications may include the T-Commerce channel application 1107, the brand channel application 1108, and the like. The applicable channel application may display the requested page on the CPE 106. This page may be a brand channel application 1108 home page, a T-Commerce channel application 1107 home page, or another page.

Figure 26:
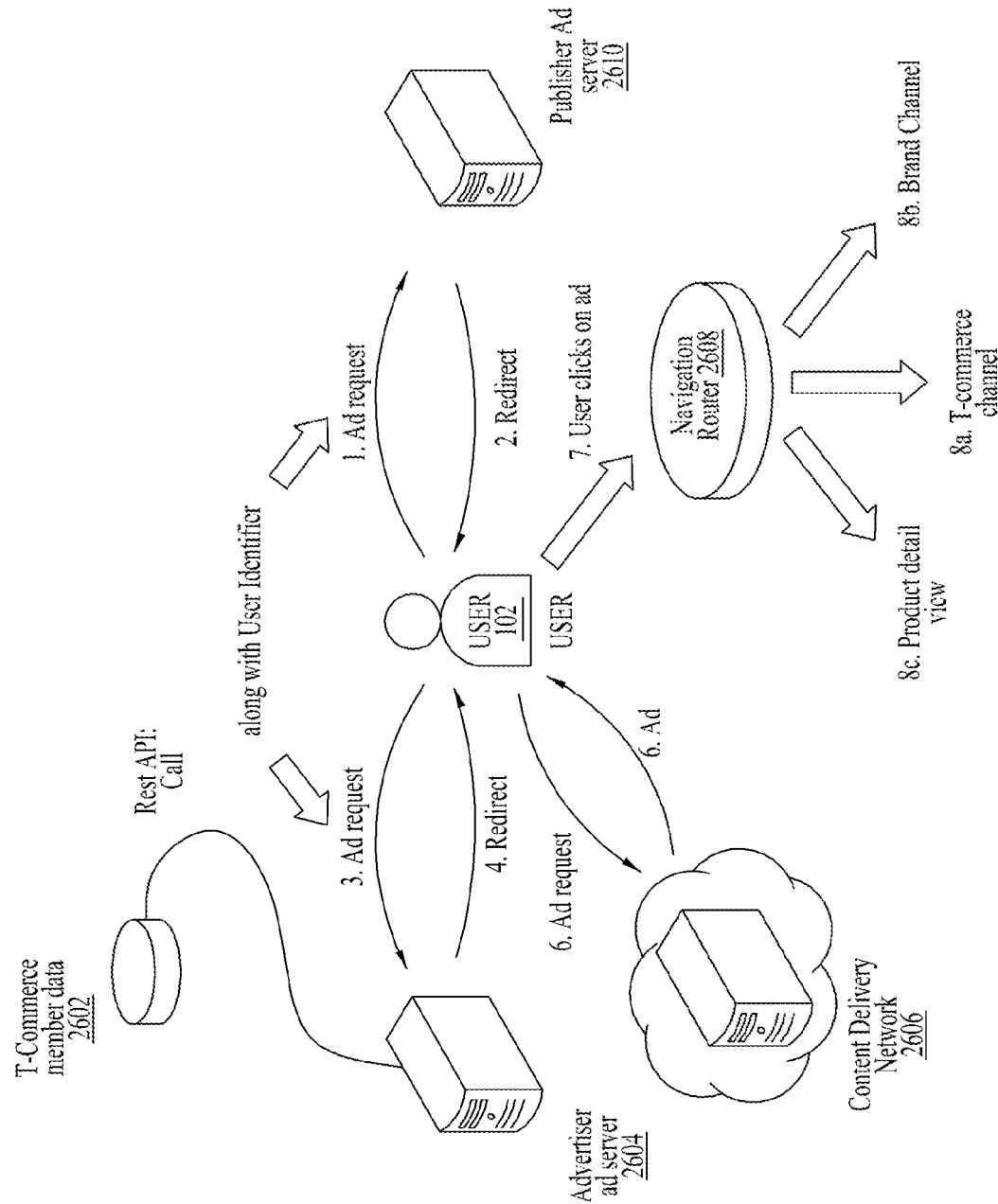
FIG. 26 depicts an embodiment functional flow diagram including ad serving.

In embodiments, the T-Commerce system's advertising services' technical architecture may include a number of system components. As illustrated in FIG. 26, these system components may include T-Commerce member data 2602, an advertiser ad server 2604, a content delivery network 2606, a navigation router 2608, and a publisher ad server 2610, and the like. In these embodiments, the actions of a user 102 may prompt an advertisement request, which may be transmitted to a publisher ad server 2610, which may respond by redirecting the user to the correct advertiser ad server 2604. In turn, the advertiser ad server 2604 may redirect the user to a content delivery network, which may serve the advertisement to the user 102. Once the advertisement has been served, the user 102, may click on or otherwise select the advertisement or buttons associated with the advertisement. Such actions by a user may trigger a navigation router 2608 to take the user to an appropriate page or channel, such as a product detail view, a T-Commerce shop, a brand channel retail store, or the like. The navigation router 2608 may be enabled to facilitate transitions to content pages within the T-Commerce application. For example, the navigation router 2608 may make use of frameworks such as backbone routers to route applications URLs consisting of hash tags, so as to access specific views within single-page application environments wherein individual pages do not have their own URLs. For example, the navigation router 2608 may facilitate transitions to such landing pages as multi-product shop landing pages, brand landing pages, specific product landing pages, and the like.

Brand Channel

In embodiments, the T-Commerce system may include brand channels. Such brand channels may be television optimized, company-specific storefronts and may incorporate content from companies seeking to sell products or services into high definition web page templates specially designed to be displayed on television sets. Brand channels may be accessed through a T-Commerce channel. Brand channels share characteristics with web pages, but also differ in significant respects. Just as a page that is optimized for viewing on a mobile device may differ significantly from the version of that same page optimized for viewing through a computer's web browser, a brand channel may differ significantly from a web page from the same company displaying the same products or services. Like traditional web pages, brand channels may exclusively feature the products and services of a given company and the content of brand channels may be managed by that company. However, brand channels may also have one or more of the following characteristics that distinguish them from traditional web pages: (1) brand channels may be optimized for display on high-resolution screens, possibly of 50-inches or more (measured diagonally); (2) brand channels may be designed to take advantage of the television environment through the addition of interactive video content and similar material and the adjustment of navigation elements to make them more compatible with the types of input devices likely to be used by users, including users who are using a pointing device or paired mobile device to navigate, rather than a mouse, track pad, or the like; (3) brand channels may have a uniform navigation bar that may be placed and managed by a T-Commerce channel application and may be located in a consistent part of the screen, which may be the left side of the screen; (4) brand channels may be designed to minimize the need for keyboard or other text input through the use of contextual menus or other input strategies; (5) brand channels may make more extensive use of audio than do traditional web pages, possibly including surround sound and other forms of enhanced audio designed to take advantage of modern sound systems; (6) brand channels may be integrated with one another and with the T-Commerce channel, such that a user who logs onto one brand channel or to the T-Commerce channel is automatically logged on to all brand channels and to the T-Commerce channel; (7) brand channels may share data with the T-Commerce channel and other components of the disclosure, such data possibly including user preferences, demographic information, transaction history, and the like; (8) brand channels may make use of standardized structural elements or templates that are designed to facilitate the process of creating content-rich features that make them appear more like interactive television channels than web sites while minimizing the amount of additional work required to create the brand channel; (9) brand channels may make use of style sheets, which may facilitate the standardization of their look and feel, such style sheets possibly being provided by the T-Commerce channel application; (10) brand channels may offer functionality that is not included in traditional web pages, such as interactive guided tours and product demonstrations; (11) brand channels may make use of shared APIs; and (12) brand channels may be required to conform with a channel client design specification.

In embodiments, a brand channel may be implemented on a television through use of a brand channel application. Companies developing brand channel applications may make use of one or more of the following: (1) recommended style sheets; (2) channel skins; (3) APIs; standardized data schemas, formats, and structures; (4) other tools, technologies, standards, and the like that are determined to be appropriate for implementation in the T-Commerce channel and the brand channels.

Figure 27:
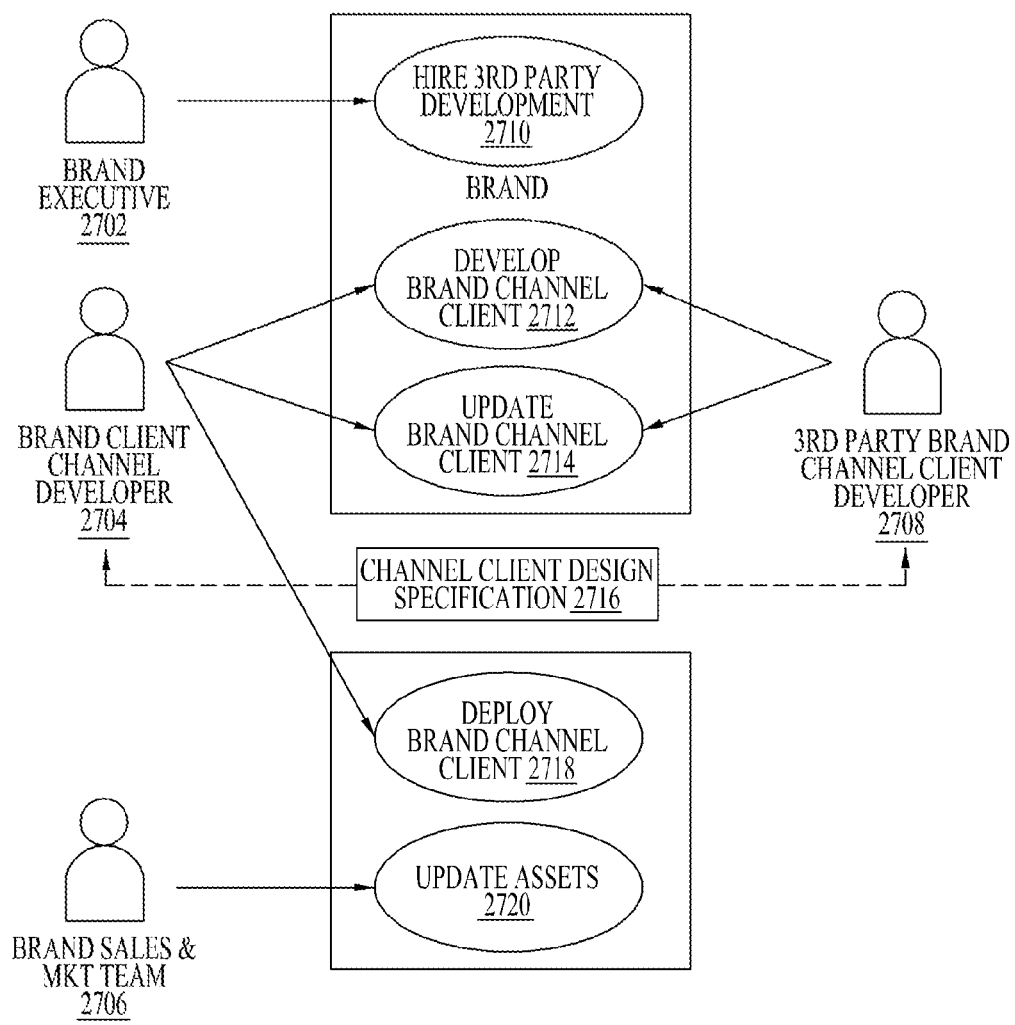
FIG. 27 depicts embodiment brand channel use cases.

Referring to FIG. 27, the brand channel design process may involve a brand executive 2702, a brand client channel developer 2704, a brand sales and marketing team 2706, a third party brand channel client developer 2708, a channel client design specification 2716, the hiring of a third party development 2710 specialist, the development of a brand channel client 2712, the updating of a brand channel client 2714, the deployment of a brand channel client 2718, and the updating of assets 2720. The brand channel executive 2702 may contract with or otherwise work with a third party development 2710 specialist. The brand client channel developer 2704 and the third party brand channel client developer 2708 may work to develop the brand channel client 2712 and to update the brand channel client 2714. The brand channel executive may also deploy the brand channel client 2718 to the T-Commerce environment. The channel client design specification 2716 may serve as a guide for the brand channel developer 2704 and the third party brand channel client developer 2708. The brand sales and marketing team 2706 may update assets in the deployed brand channel client 2718.

In embodiments, companies developing brand channels may be required to register their media content with designated servers. Such designated servers may be located on the brand's servers, on T-Commerce servers, or elsewhere.

In embodiments, brand channels may be required to comply with guidelines, such guidelines may specify various site interactions, possibly including interactions over APIs, interactions with television features, interaction with T-Commerce functionality (e.g. picture-in-picture, wish lists, etc.), and the like.

In embodiments, there may be an API that may offer applications a range of services. Such services may enable and support a number of features. These features may include user-interface features. The API may be a JavaScript API. The operation of the API may involve the exchange of metadata. The API may facilitate the displaying of product lists and categories at the navigation menu. When a user clicks, highlights, or otherwise selects a menu item, the API may pass that information to the T-commerce application or to another element of the disclosure. This information may then be used to serve appropriate content to the user. The API may also conduct user behavior tracking Such tracking may involve the collection of data on user activities and the transmission of those data to T-Commerce servers or other aspects of the disclosure. For example, the API may track user actions involving the configuration of a filter for size and color. Similarly, the API may track user searches, such that the API may record and transmit a data set that includes the search terms used, the results clicked, and the like. The API may also track event times and durations and may include those data along with other data when storing and transmitting such data. The API may also track devices. For example, when a user selects an "edit" command, the API may send a signal to an appropriate device. Such a device may be a mobile phone, a tablet computer, a wireless keyboard, or another device through which commands may be entered. The API may also control device functionality. For example, when a user selects a picture-in-picture option, the API may place the old view into a window in the new view or make other changes to the television's audio and video output. Similarly, when a user selects a "Share to Friends" option for a product, the API may retrieve appropriate metadata for that product and transmit it to the T-Commerce channel. The API may also manage commerce-related activity. For example, when a user views sale information, the API may transmit data about the event and any associated information to the T-Commerce channel. Similarly, when a user purchases an item, saves and item to a wish list, or engages in other purchase-related behavior, the API may transmit information on the user's actions and associated information to the T-Commerce channel.

In embodiments, there may be a brand channel client design specification. A brand channel client design specification may provide guidance, requirements, and the like regarding a wide range of aspects of a brand channel. These aspects may include components that affect the user interface and components that affect the user experience. A brand channel design specification may include one or more of the following: (1) a list of definitions of functions, which may be JavaScript functions, that may be enabled to manipulate layouts, audio and visual content, and the like and to gather data on user behavior, user experiences, user demographics, and the like; (2) style sheet information; (3) transaction-related functionality within the brand channel; and (4) other parameters helpful for maintaining the look and feel and functionality of the brand channel individually and of the brand channel in the context of other brand channels and the T-Commerce channel.

In embodiments, companies seeking to create brand channels may be required to enter into agreements governing the exchange of and access to data. Such agreements may require such companies to permit access to metadata, possibly including data relating to the contents of their brand channels and possibly also including logs of behavior and commerce activities created by the users of such brand channels. Such agreements may also provide such companies with access to reports or other data sets, which may have been derived from metadata provided by the brand channel.

In embodiments, there may be a brand channel requirement. A brand channel requirement may encompass one or more of the following: (1) the style of the user interface and user experience, possibly including specifications for graphical design elements; (2) commerce-related functionality within the brand channel; (3) other functionality within the brand channel; and (4) data-related parameters, such as assumptions, structures, data flow characteristics, and the like. Such data flow characteristics may relate to analytics, interaction with CPE client and remote devices, matters relating to categorization of APIs regarding commerce features in a brand channel, and the like. A brand channel requirement may be used in the process of developing a channel application design specification. A channel application design specification may include contents from a brand channel requirement, as well as methods and tools related to the creation of brand channels, deployment-related information, and other content that may be applicable to the creation and operation of a brand channel. Such deployment-related information may include suggestions and requirements regarding software to be used in deployment. For example, a channel application design specification could specify the use of software such as Brand-Create, LG-Template for Brand, Brand-Hosting, LG-Hosting, and the like.

In embodiments, brand channels may feature a navigation bar. Such a navigation bar may have one or more of the following characteristics: (1) it may be displayed on the left side of the screen; (2) it may include buttons, menu bars, and the like related to transactions and other commerce-related activity; (3) it may include buttons, menu bars, and the like related to non-commerce actions and activities, such non-commerce actions and activities possibly including features like Back-to-TV, picture-in-picture controls, wish lists, and the like; (4) it may accommodate the inclusion of additional functions selected by the brand owner; and (5) it may accommodate the inclusion of additional functions across multiple brand channels.

In embodiments, brand channels may incorporate a wide range of user interface and user experience-related assets. Such assets may include fixed user-interface assets and other assets that relate to the user experience. Such fixed user-interface assets may be defined in a user interface guide or other documentation and may include such as: (1) icons, which may include a progress-indicator icon, such icons possibly being animated and possibly including accompanying audio components; (2) colors; (3) text styles, which may include font types, sizes, formats, and the like; (4) boxes, borders, lines, and the like, (5) other stylistic elements; (6) design pattern elements, which may be displayed in a wide range of locations, such locations possibly including banners, dashboards, carts, wish lists, favorites, payment screens, social network service posting screens, log-in screens, configuration menus, and the like; and (7) other screens where such user-interface assets may appropriately be displayed. Such other assets that relate to the user experience may include one or more of the following: (1) automatic text correction and completion; (2) search style, operation, functionality, options, and the like; (3) checkbox style, operation, functionality, options, and the like; (4) menu expansion style, operation, functionality, options, and the like; (5) dialog wheel and dialog box style, operation, functionality, options and the like; (6) sorting style, operation, functionality, options, and the like; and (7) other assets that may affect the user experience.

In embodiments, brand channels may include commerce functionality. Such commerce functionality may enable users to make purchases through a brand channel. This functionality may, on some levels, be similar to ability to make purchases through traditional e-commerce enabled web sites using a web browser. However, brand channels 116 may have some commerce functionality that differs in some respects from traditional e-commerce functionality. Brand channel commerce functionality may also be subject to customization, such that certain functions may be available in certain brand channels but not in other brand channels. There may also be certain universal channel commerce functionality that is available across all brand channels. Brand channel commerce functionality may include one or more of the following: (1) the ability for a user to place orders and for the system to capture orders; (2) payment processing; (3) shopping cart manipulation, which may include adding up the items in a cart, removing items from a cart, updating item quantities, updating item specifications (e.g. colors, sizes, and the like), checking item availability, storing cart preferences, and the like; (4) wish list management, which may include adding items to wish lists, creating new wish lists, removing items from wish lists, deleting wish lists, sharing wish lists, transferring wish lists, viewing shared wish lists, and the like; (5) managing product lists, which may include refreshing lists of available products, updating product pricing, updating shipping times, updating product characteristics, and the like; (6) presenting product information, which may include displaying information about products, playing audio and video information about products, providing interactive product information, providing links to additional product information, answering questions about products, and the like; (7) presenting lists of available products, such lists possibly including directories of a brand's products, where such lists may be searchable and sortable by a wide range of criteria (e.g. price, size, color, style, SKU, product name, product type, product category, products liked by friends, product popularity, product reviews, and the like); (8) displaying price information, such price information possibly including the price of products selected for purchase, applicable tax information, applicable shipping and handling charges, totals for all applicable charges, credit amounts, net amounts after credits, coupon and discount amounts, net amounts after coupons and discounts, and the like; (9) offering users who are not members the opportunity to sign up as members and enabling them to do so; (10) allowing members to store transaction-related information, which may include credit card numbers, address information, phone numbers, notification preferences, security codes, other identifying information, expedited check-out preferences, and the like; (11) retrieving and making use of stored transaction-related information, as needed; (12) processing refunds, customer-service inquiries, and the like; and (13) enabling and accepting user inputs related to transactions, such inputs possibly including holding up a credit card to a camera, such that credit card information may be captured without the need to enter that information manually, nodding or gesturing with a device to approve a transaction, shaking one's head or waving a device to cancel a transaction, speaking to provide information relating to a transaction or to approve or cancel a transaction, and the like; and (14) other functions related to the completion and execution of transactions.

Figure 28:
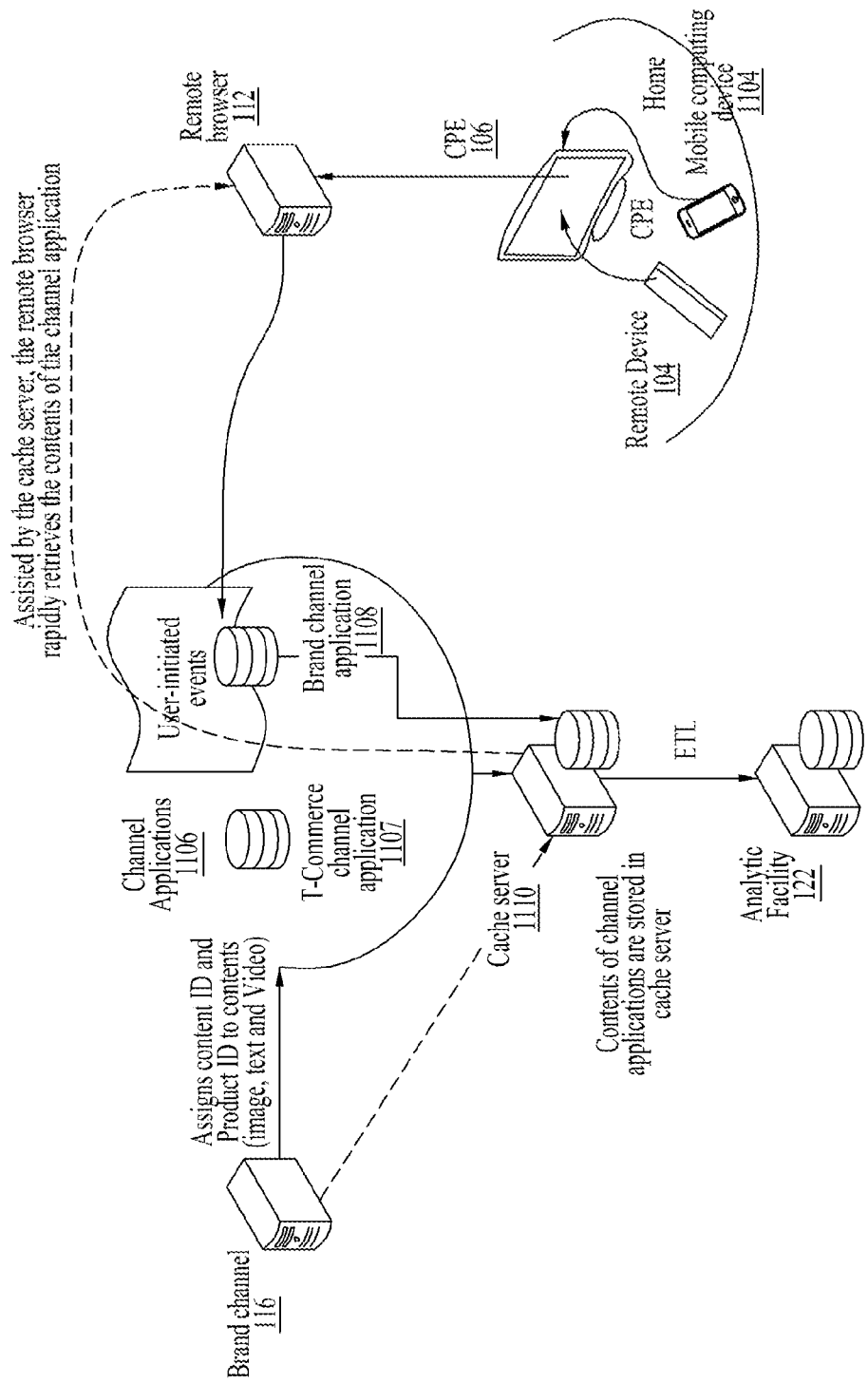
FIG. 28 depicts an embodiment functional flow diagram including user interaction with a brand channel.
Figure 34:
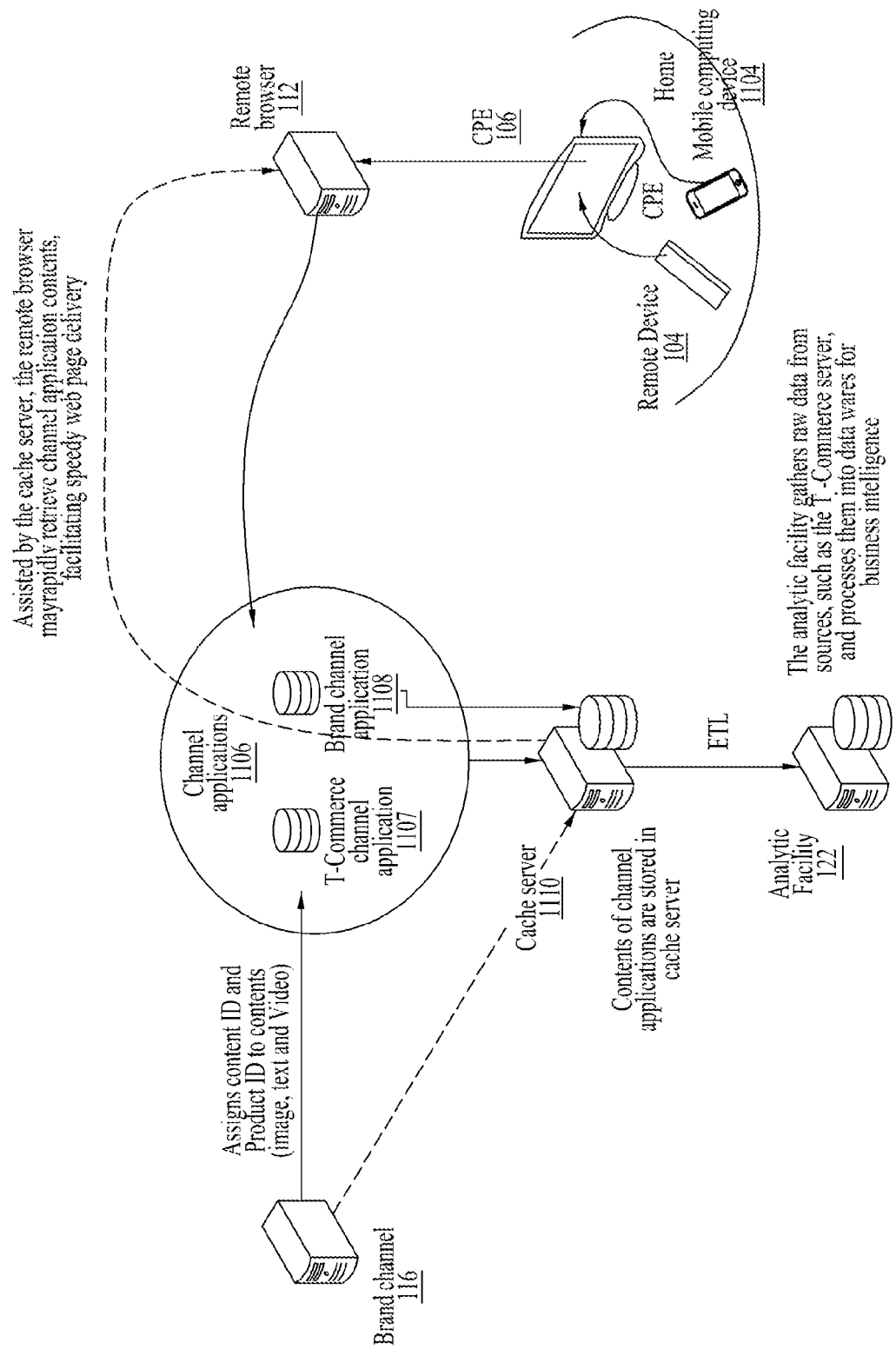
FIG. 34 depicts an embodiment functional flow diagram for a user interaction for metadata in an analytics facility.

In embodiments, brand channels may include non-commerce functionality. Such functionality may include events, features, and the like. For example, brand channels may enable users to manipulate picture-in-picture controls, Back-to-TV features, wish lists, and the like. Such functionality may involve a number of system components. As illustrated in FIG. 28, these system components may include one or more of the following: (1) a brand channel 116 server; (2) channel applications 1106, which may include (a) a T-commerce channel application 1107 and (b) a brand channel application 1108; (3) a cache server 1110; (4) any number of CPEs 106; (5) a remote device controller unit 104; (6) a remote browser 112; and (7) any number of mobile computing devices 1104. Contents of channel applications 1106 may be stored on the cache server 1110. Such content may include media files, event logs, product attributes, and the like. Such transfers may include processing users' events through channel applications 1106, matching user events with content and product identification codes. Data may be transferred from the cache server 1110 to the analytics facility 122. This transfer of data may be effectuated using JavaScript or code from another programming language or by other means. As illustrated in FIG. 34, the remote browser 112 may transmit data to channel applications 1106 and the cache server 1110 may send data directly to the remote browser 112. The channel applications 1106 may be enabled to respond to signals that CPE 106 transmits to them via the remote browser 112. Channel applications 1106 may notify CPE 106 of events, such events possibly including texting, and may transmit data to the cache server 1110. These communications may be managed by within the channel applications. This code may be JavaScript or code from another programming language. The brand channel 116 server may assign content and product identification information to content, such as images, text, audio files, and video files, and may transmit data to the channel applications 1106 and to the cache server 1110. Such transmissions may be accomplished through use of code running on the brand channel 116 server. Such code may be JavaScript or it may be code written in a different programming language. The analytics facility 122 may gather data from the cache server 1110 and other system components and may process and package those data, making them valuable for business intelligence. Information gathered by CPE 106 may be combined with other system data, including user data and information derived from user interactions. Users may interact with CPE 106 using paired remote devices 104, mobile computing devices 1104, wireless keyboards, and the like. Such user interactions may involve controlling events in channel applications 1106, receiving events affecting paired remote devices 1104 and CPE 106 from channel applications 1106, and the like.

In embodiments, brand channels may have picture-in-picture functionality. Such picture-in-picture functionality may be enabled by code within the brand channel application. This code may be JavaScript or it may be code from another programming language. This functionality may include reorganizing or alternating layout of the display to clear a space the proper size to show a picture-in-picture video stream and may include establishing and maintaining such a video stream. Such a space may be cleared upon receipt of a signal from the CPE client that the user has initiated a request to initiate picture-in-picture functionality. Such a video stream may include sound or may be muted depending upon user preferences and inputs. This code may also be enabled to respond to user inputs initiating other events. Such events may include altering the size of the picture-in-picture video stream, changing the volume of the picture-in-picture video stream, swapping to a different video stream, changing the size of the area in which the picture-in-picture video stream is being displayed, and the like.

In embodiments, brand channels may include data collection functionality. This data collection functionality may make use of a global cache, a cache server, or another storage component. Data collection code, which may be written in JavaScript or another programming language, may check the data behind content (e.g. a menu) and perform one or more of the following functions: (1) it may manipulate the content, such as by compressing or encrypting it; (2) it may transmit the content, such as by storing in on a server, which may be a cache server; (3) it may manipulate other data repositories, such as wish lists, shopping carts, delivery status files, and the like; and (4) it may perform other actions appropriate to the data collected.

Figure 29:
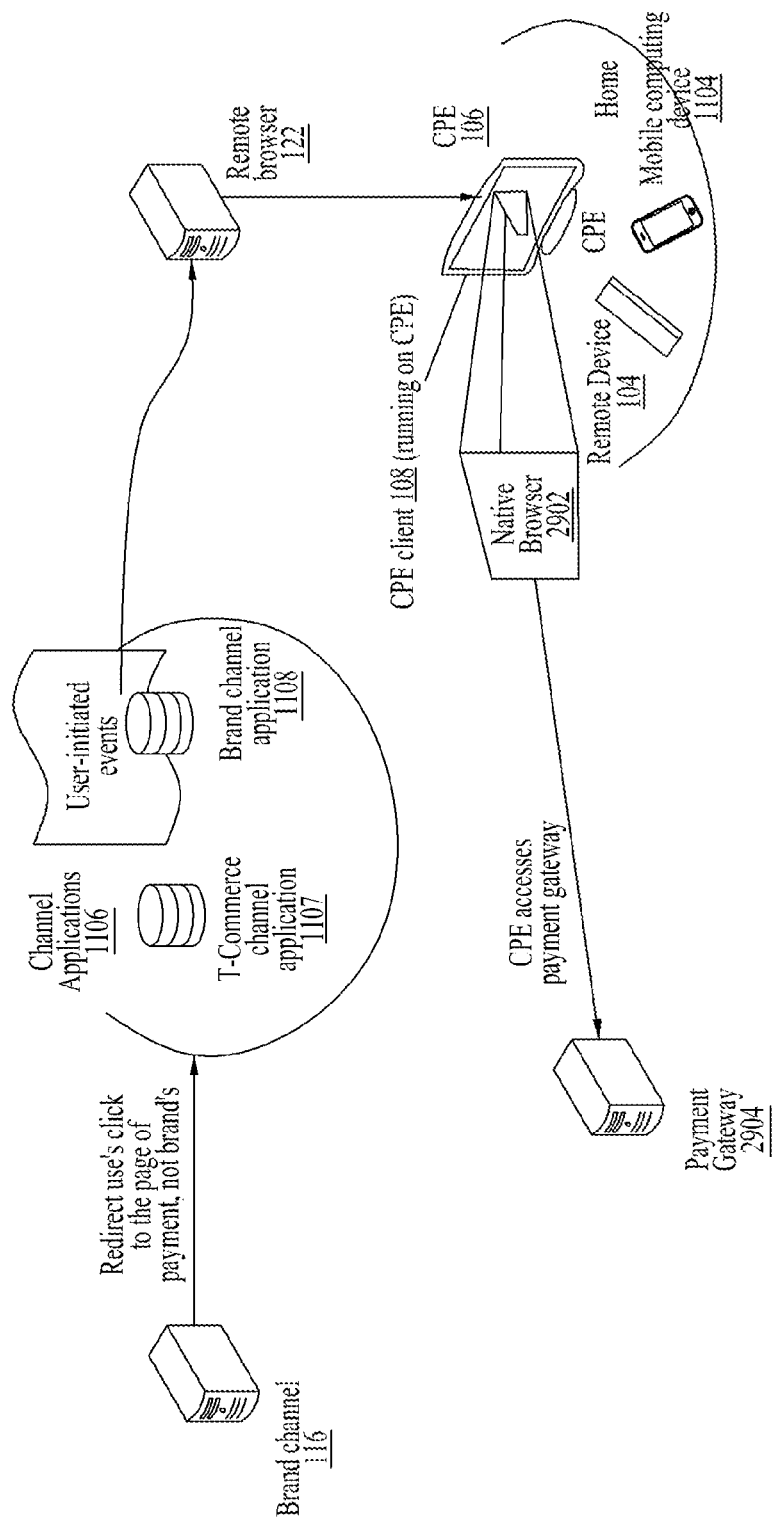
FIG. 29 depicts an embodiment functional flow diagram including brand channel interaction with a payment facility.

In embodiments, T-commerce applications and brand channel applications may interact with CPEs and CPE clients. As illustrated in FIG. 29, a channel application 1106 may send requests to CPE clients 108 via a remote browser 112. Such a request may include a shipping address and may cause a CPE client 108 to open a native browser 2902 on the CPE 106. The native browser may access a payment gateway 2904. A brand channel 116 server may redirect user's payment-related input (such as a click to send payment) to a T-commerce channel application 1107 (rather than a brand channel application 1108). Users may input payment information to the CPE 106 and CPE client 108 through various means, such as the use of a remote device 104 or a mobile computing device 1104. Communications between components may be managed by computer code. Such code may be a JavaScript or code written in another computer language.

Figure 30:
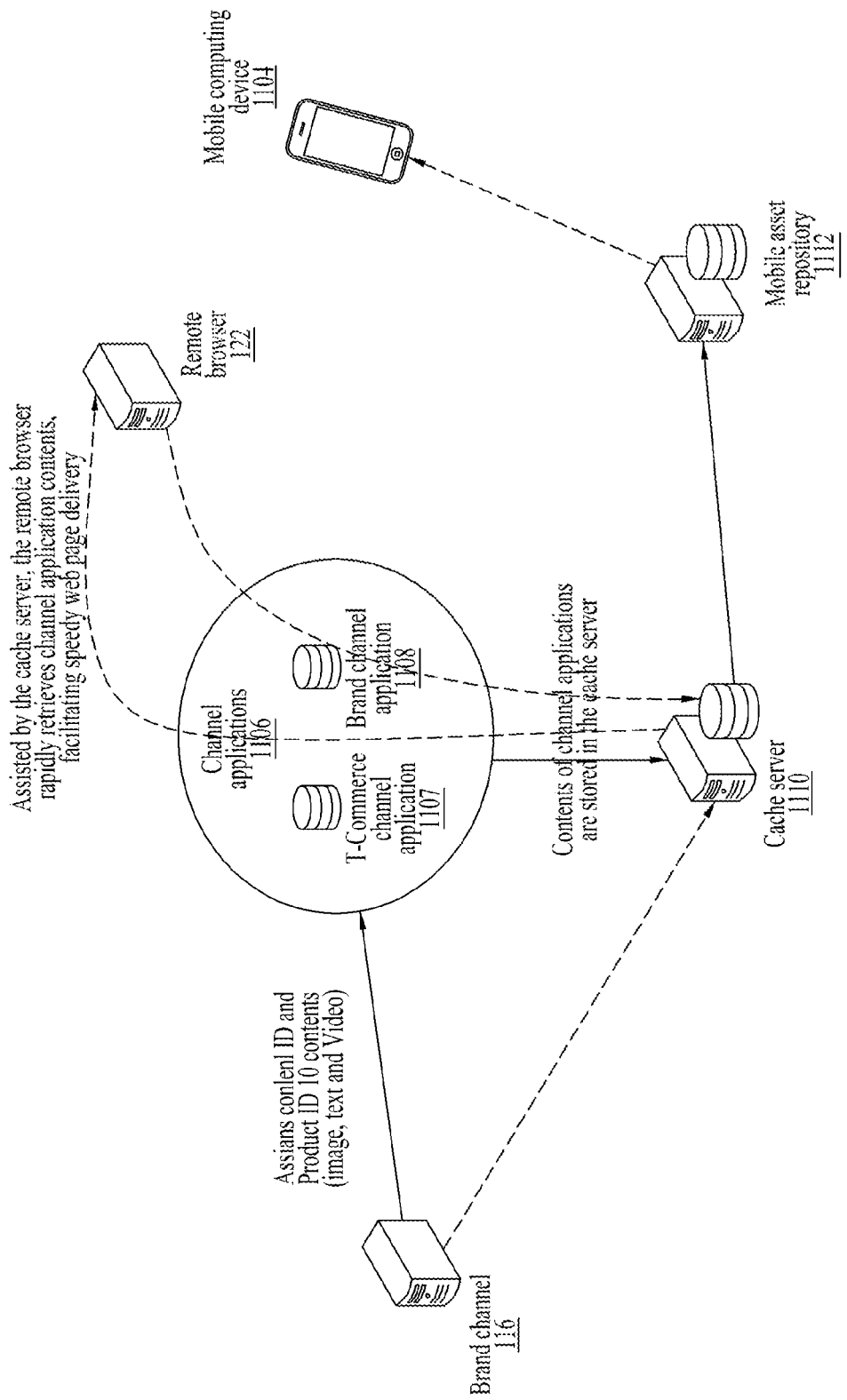
FIG. 30 depicts an embodiment functional flow diagram including a data flow in association with a brand channel.

In embodiments, transaction data may flow between system components in a number of ways. An example of one possible data flow scenario is illustrated in FIG. 30. In this scenario, a brand channel 116 server may assign content and product identification information to content, such as images, text, audio files, and video files, and may transmit that information to channel applications 1106, which may include the T-Commerce channel application 1107, one or more brand channel applications 1108, and the like. The channel applications may store attributes of products and associated content indicated by the product identification information on the cache server 1110. These transfers may be accomplished through the use of computer code, which may be JavaScript or code written in another programming language. A remote browser 112 may retrieve such product attribute data and content from the cache server 1110. A mobile asset repository 1112 may synchronize content with the cache server and with one or more mobile computing devices 1104, as appropriate based on content and product identification information. Such synchronization may take place using version management.

In embodiments, there may be a brand channel application that performs operations in the delivery of brand channel functionality. These operations may include (1) analytics; (2) running operational algorithms, such as algorithms that decide the order in which to list or display brand related elements, possibly including content information, product information, and the like; and (3) other operations that may be useful. Such operations may make use of data. Such data may include one or more of the following: (1) content identification, such as space attributes (e.g. favorite, wish list, shopping cart), content attributes (e.g. image format identification), and content location (e.g. URL of the content); (2) product identification, such as product attributes like the product's name, color, material, style, category, and size; and (3) metadata, such as user identifiers, the MAC address of the sending device, and demographic tags. As transfers take place, information on such transfers may be stored in an event log. Such an event log may include (a) where the input took place, including any object that was clicked or menu item that was selected; (b) the content that was selected or clicked, if applicable; (c) what actions prompted the input; (d) the route followed by the input on its path from the input device to the analytics facility; and (e) a log of the time of each event.

In embodiments, resources may be made available to companies seeking to develop brand channels. Such resources may include one or more of the following: (1) a channel application design specification, which may include a channel application JavaScript API, a channel application style sheet, and a development kit with a fully-functional sample application, possibly including HTML, CSS, JavaScript, media files, JavaScript Object Notation ("JSON") files, XML data files, and the like; (2) a T-Commerce brand application deployment and hosting service, which may include an update mechanism for determining how the brand channel application under development is to be registered and rendered by the T-Commerce application; (3) an asset cache to which brands may periodically upload new assets, including media files, associated metadata, and the like; and (4) other resources, as needed.

Figure 31:
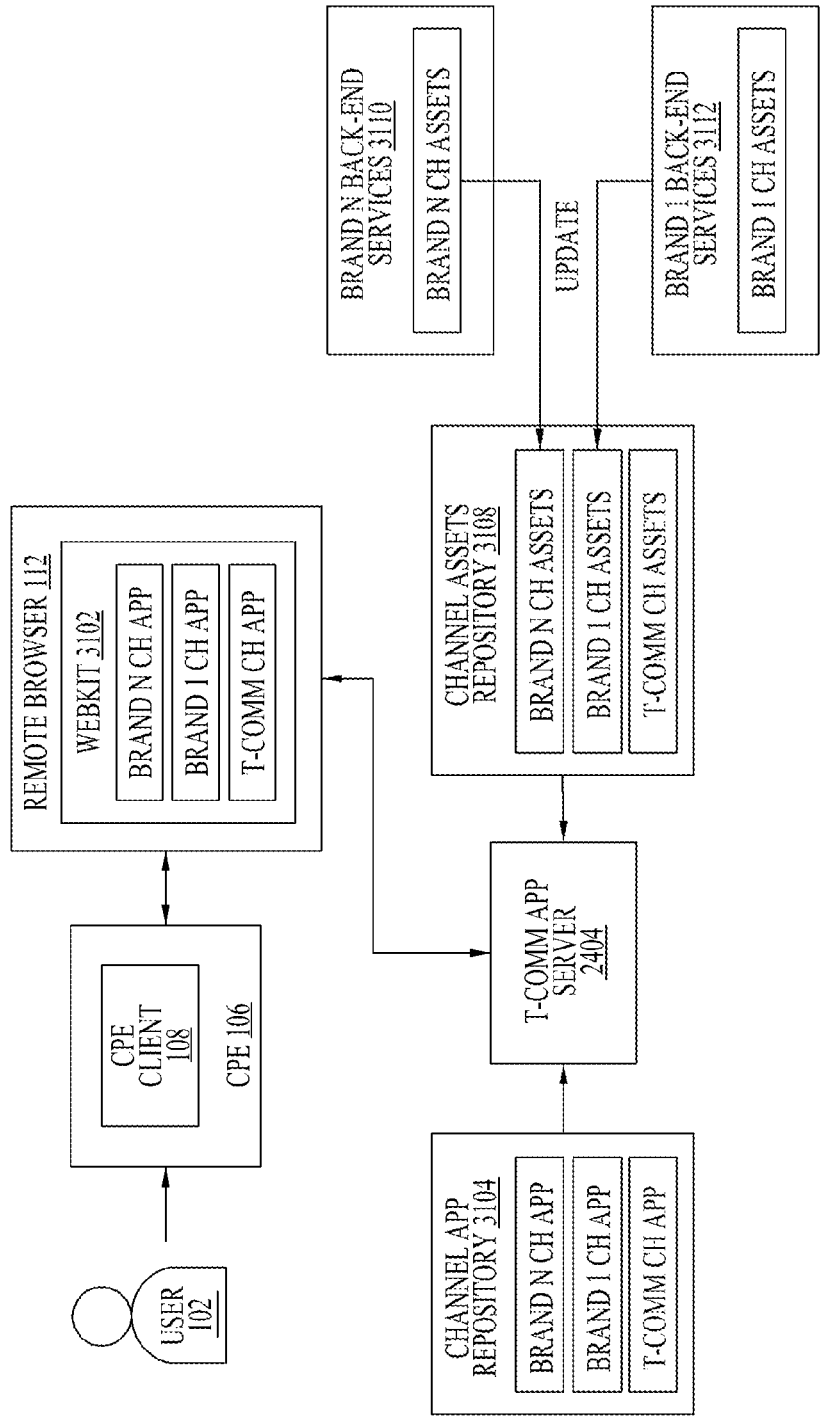
FIG. 31 depicts an embodiment functional block diagram for channel applications deployment.

In embodiments, implementation of brand channel functionality may require use of a number of technical components. As illustrated in FIG. 31, in an example involving two brand channels, Brand N channel and Brand 1 channel, these components may include one or more of the following: a CPE client 108, a CPE 106, a remote browser 112, a web kit 3102, a channel application repository 3104, a T-Commerce server 2404, a channel assets repository 3108, Brand N back-end services 3110, and Brand 1 back-end services 3112. In these embodiments, a user 102 may interact with the CPE 106 running the CPE client 108. The CPE 106 and CPE client 108 may communicate with the remote browser 112, which may be running the web kit 3012. The web kit 3102 may include a Brand N channel application, a Brand 1 channel application, and a T-Commerce channel application. The remote browser 112 may communicate with the T-Commerce application server 2404, which may also communicate with the channel application repository 3104 and the channel assets repository 3108. The channel application repository 3104 may contain the Brand N channel application, the Brand 1 channel application, and the T-Commerce channel application. The channel assets repository 3108 may contain Brand N channel assets, Brand 1 channel assets, and T-Commerce channel assets. The Brand N back-end services 3110 may include a copy of the Brand N channel assets, which it may use to update the Brand N channel assets contained in the channel assets repository 3108. Similarly, the Brand 1 back-end services 3112 may include a copy of the Brand 1 channel assets, which it may use to update the Brand 1 channel assets contained in the channel assets repository 3108. In these embodiments, a user 102 may browse various brands by interacting with the CPE, thereby accessing the copy of the T-Commerce Channel application contained in the web kit 3102 running on the remote browser 112. When the user 102 clicks on or otherwise selects a brand channel, the remote browser 112 launches the copy of the channel application for that brand channel contained in the web kit 3102. Once launched, the brand channel application loads its media assets from the channel assets repository 3108, which it accesses through the T-Commerce server 2404. The brand assets in the channel asset repository may be updated periodically by the Brands. Brands may update their brand assets by uploading new brand assets to the appropriate brand back-end services component (in this case, either Brand N back-end services 3110 or Brand 1 back-end services 3112). In these embodiments, channel applications may be web applications comprising of HTML5 and JavaScript or they may consist of code from one or more other programming languages. External communication may be handled through a functional interface to a library that includes appropriate communication software. Such external communications may include one or more of the following: (1) loading channel assets from the channel asset repository; (2) create, read, update, and delete ("CRUD") operations pertaining to certain T-Commerce features, possibly including wish list functions, shopping cart management, picture-in-picture controls, and the like; (3) access to brand back-end services, which may enable performance of brand-specific CRUD operations; (4) session and history persistence; and (5) other communications, as needed.

Figure 32:
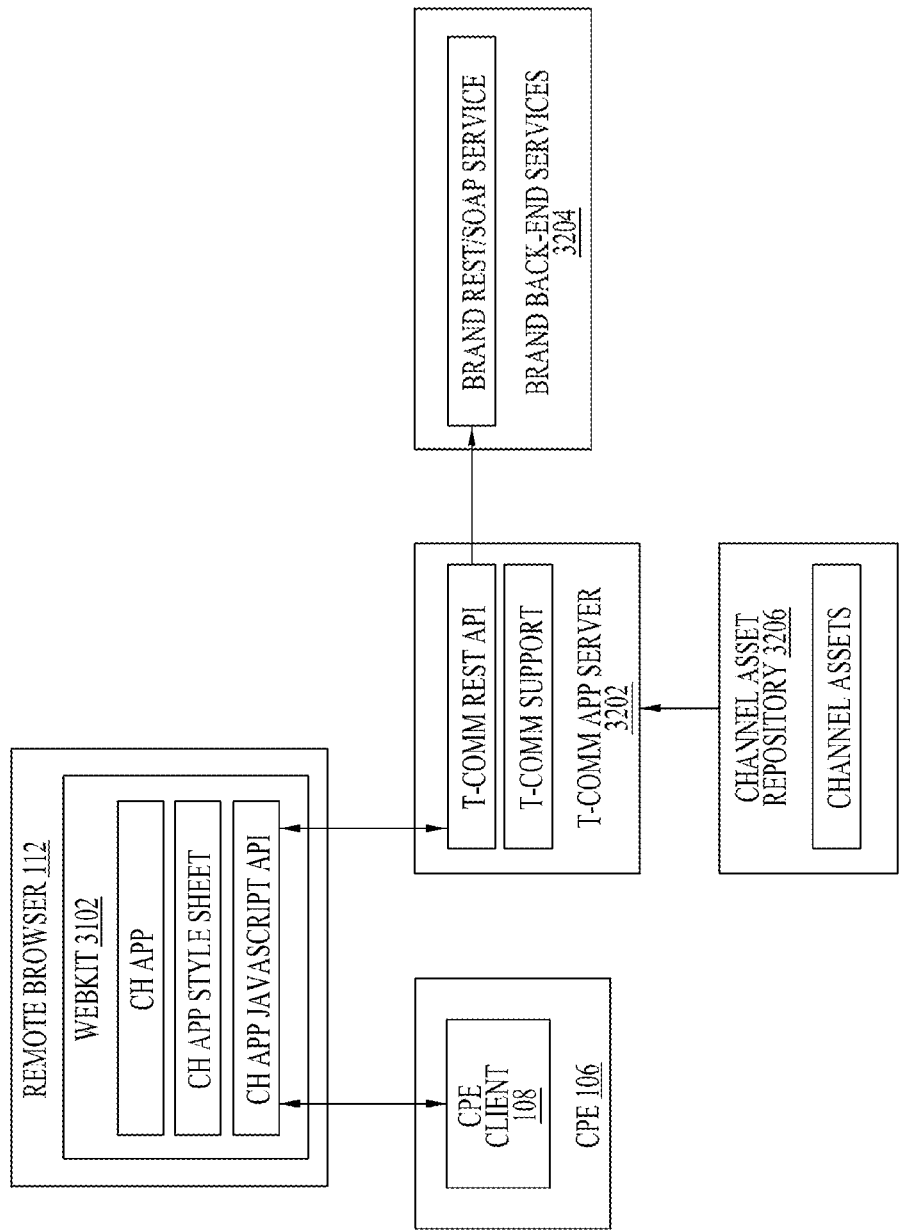
FIG. 32 depicts an embodiment functional block diagram for channel application components.

In embodiments, the brand channels may be implemented using any number of programming languages and technologies. For example, a channel application could make use of (1) an HTML5/JavaScript foundation; (2) a single-page application, possibly using client-side DHTML via JQuery orchestration; (3) use of JQuery hash tags for state and history support; (4) client-side model-view-controller ("MVC") user interface software; and (5) external data connectivity through a JavaScript API contained within the channel application. This example is illustrated in FIG. 32. In FIG. 32, a CPE 106 is running a CPE client 108 that communicates using a channel application JavaScript API that is part of a web kit 3102 running on a remote browser 112. The channel application JavaScript API also manages communication with a T-Commerce REST (representational state transfer) API running on a T-Commerce application server 3202, which also includes T-Commerce support. The T-Commerce application server 3202 receives channel assets from a channel asset repository 3206. The T-Commerce REST API communicates with a brand REST/SOAP (simple object access protocol) service running on brand back-end services 3204.

Network Management

In embodiments, the T-Commerce system may include a network management feature. Such a network management feature may facilitate monitoring and management of other elements of the disclosure by administrators, user support teams, and the like. These elements may include the resource management and scalability of one or more remote browser server farms, a T-Commerce portal 115, back-end systems, the content of user databases, brand assets, and the like.

In embodiments, the network management feature may facilitate deployment and usage flexibility. For example, this feature may make use of modular logical or virtual systems that may be included within a single physical system. The feature may also facilitate the organization and tracking of such systems, which might otherwise prove difficult, particularly when physical servers are scaled to accommodate multiple virtual servers, which may operate invisibly.

In embodiments, the network management feature may make use of cloud management platforms, which may provide for the management of public, private and hybrid cloud environments, and the like. Such cloud management platforms may incorporate one or more of the following elements: (1) self-service interfaces, (2) provision system images, (3) metering and billing functionality, (4) algorithms that facilitate workload optimization, (5) integration with external enterprise management systems, (6) inclusion of service catalogs, (7) support for the configuration of storage and network resources, and (8) resource management tools designed to facilitate system performance and availability, through such means as the use of service governors, advanced monitoring techniques, and the like.

In embodiments, the network management feature may have the characteristic of rapid elasticity, which may facilitate the systems rapid scalability to accommodate demand. Such rapid elasticity may include the ability to monitor, control, report, meter and the like use of such resources as CPU, RAM, storage, network bandwidth, and the like.

In embodiments, the network management feature may have the characteristic of broad network access, which may facilitate access to the system over a network through a plurality of thin and thick client platforms such as mobile devices, laptop computer, desktop computers, and the like.

In embodiments, the network management feature may include on-demand resource provisioning functionality, which may facilitate quick access to computing resources such as number of CPU cores, RAM size, and the like.

In embodiments, the network management feature may include resource-pooling functionality, which may facilitate the delivery of location services. This functionality may be particularly helpful in cases where a user has no knowledge about the underlying infrastructure and may include the inputting and processing of location preferences regarding where the virtual machine may run, such as country, state, data center, and the like.

In embodiments, the network management feature may be designed to function in one or more of the following environments: (1) a public cloud model in which the cloud infrastructure is provided by a cloud service provider for multiple users who may lease the infrastructure provided and pay for the resources they utilize; (2) a private cloud model in which the cloud infrastructure is provided by a single organization and may be used for that organization's various business units and in which the infrastructure may be located on or off the organization's premises and may be maintained by the organization and/or by one or more third parties; (3) a community cloud model in which the cloud infrastructure is shared by multiple users who may have similar requirements such as security policies, bandwidth usage, storage needs, and the like and in which the cloud environment may be managed by one or more third parties; (4) a hybrid cloud model in which the cloud infrastructure extends or enhances the functionality of a private cloud to combine local resources with those of the public cloud; and (5) another environment in which its functionality may be accessed and used.

In embodiments, the network management feature may facilitate communication between physical machines. Such communication may make use of such technologies as DNS and DHCP, where DNS performs name resolution and DHCP assigns IP addresses to the physical machines, and the like.

In embodiments, the network management feature may make use of additional components, such as Linux bridge-utilities or other utilities capable of creating virtual bridges within physical machines and which may designate a unique MAC address for each virtual machine, as well as other components.

In embodiments, the network management feature may make use of virtual networking, which is defined for purposes of this section to be the process of assigning IP and MAC addresses to virtual machines. Virtual networking may be useful for facilitating or enabling communication between virtual machines.

In embodiments, the technical architecture of the network management feature may make use of a wide variety of technologies and other elements such as open-source computer monitoring technology, technology designed to monitor and to provide alerts regarding servers, switches, applications, and related services (e.g. products offered by such companies as Nagios), and the like. Such technology and elements may be open source or proprietary or be subject to other forms of intellectual property restriction or may be in the public domain. Such technical architectures may be designed to be self-monitoring, such that they may alert users when problems are detected and again when those problems are addressed.

Analytics System

In embodiments, the T-Commerce system may include an analytics facility. Such an analytics facility may provide integrated data collection, processing, analysis functions, and the like, and may serve to link various systems of the disclosure. Such an analytics facility may offer a number of benefits, including facilitation of one or more of the following: (1) identifying competitive advantages; (2) capitalizing on market opportunities; (3) identification of problems, possibly including early identification of problems; (4) reengineering of business processes, products, and services to optimize performance, user satisfaction, user loyalty, and the like; (5) improving decision-making processes; (6) analyzing trends to anticipate market needs; (7) maximizing customer retention; (8) generating correlation and causation data that may be valuable to advertisers and third parties; and (9) facilitating, enabling, or otherwise improving other business processes, activities, and the like. For example, an analytics facility may be used to answer questions such as: What is the breakdown of sales by category, brand, SKU, and other identifiers and what does this breakdown means for future marketing and operations?; How are various products performing?; Which pages are most frequently visited and which links are most frequently clicked?; What are the conversion rates for various brands, products, product categories, etc.?; How do customer demographics correlate to purchasing behavior?; What are the trends in product, category, and brand performance?; Which products should be displayed on a given page to optimize sales and return in investment?; and the like.

In embodiments, the analytics facility may be focused on identifying opportunities to improve business results and may perform one or more of the following functions: (1) gathering data from other systems of the disclosure, including such data as device sales, T-Commerce sales, revenue by source, costs, profits, user TV viewing habits, click behavior, membership activity, payment methods, account personalization, transaction characteristics, application images, and the like; (2) linking new data and infrastructure elements with existing structures, such as to use existing resources to the extent feasible when creating new data fields and structures; (3) incorporating data from brand channels into analytic processes; (4) offering real-time performance and functionality; (5) integrating with metadata services to support analytics facility functionality; (6) integrating with a membership service facility, possibly through use of an analytic dashboard, such that relevant data, such as user ID, password information, and the like, may be communicated as needed; (7) identifying patterns of behavior among users such as identifying similar clicking and purchasing propensities among clusters of users, and the like; (8) parsing large amounts of data collected through one or more online storefronts such as the T-Commerce channel 110, the plurality of brand channels 116, and the like to identify and utilize meaningful data; (9) interacting with other elements of the disclosure as necessary to optimize its performance, including such elements as data files, servers, and the like; and (10) facilitating other processes.

In embodiments, the analytics facility may generate reports on customer behavior and needs. Such reports may be useful for customer retention, cross-selling, up-selling, creating targeted, personalized advertisements and promotions, and the like.

In embodiments, the analytics facility may use a plurality of strategies for the purpose of integrating information used by the business from various sources and for other related purposes, such strategies possibly including one or more of the following: (1) defining a comprehensive information access services program that may be aligned with business strategies and goals and may take advantage of holistic and agile solutions that go beyond relational query and reporting tools, such solutions being designed to provide timely information on such things as user behavior and needs, business opportunities, data trends, and the like; (2) building a unified reporting platform that may be accessed throughout an organization and that may be designed to provide relatively seamless access to information; (3) implementing a live, interactive reporting environment where users may quickly locate and analyze the information they need; (4) providing users with the ability to aggregate structured data from relational databases quickly and easily and to integrate those structured data with unstructured data from a variety of sources; and (5) providing other data-related services.

In embodiments, the analytics facility may include an analytics user interface that has one or more of the following characteristics: (1) it may enable users to access information, to build report and query criteria, to run reports and queries, to save search and query criteria for future use, and to save and to export search results, query, results, reports, and other data compiled in a wide range of formats, at least some of which formats are compatible with other database and analytics facilities; (2) it may include interactive graphical capabilities, such as the ability to generate and to manipulate charts, tables (including pivot tables) and other visual elements, such that manipulation of these elements may be used to alter query and display criteria to generate new results through live interactions; (3) it may be designed for extensive scalability, including sufficient processing power, graphics manipulation capabilities, memory, storage capacity, network ports, and other infrastructure to access and process data from large numbers of sources simultaneously and to generate complex reports and graphic displays integrating and analyzing data from large numbers of sources quickly; (4) it may include true ad hoc reporting and analysis capabilities that enable users to develop and to implement statistical models for analyzing business questions as they arise; (5) it may be accessible through an interactive analytic dashboard, possibly an online analytical processing ("OLAP") dashboard, such that users may make use of their capabilities without learning complex instruction sets, computing code, or other technical material; and (6) it may have other characteristics designed to facilitate communication with users, processing efficiency, operational speed, clarity of communication, and the like.

In embodiments, the analytics facility may provide users with a trend analysis and reporting module that has one or more of the following characteristics: (1) inclusion of an integrated suite of analytical tools designed to facilitate the development of business insight and to enable multi-channel access to a relevant, actionable intelligence, such tools possibly including Micro Strategy, Oracle Enterprise Edition, Business Objects, and Pentaho; (2) sophisticated trend-analysis software that may facilitate user efforts to gain insights into historical and emerging trends, to understand user behaviors, and to make predictions about likely future events and outcomes; (3) algorithms to determine when a given user may benefit from particular information that may be set to alert the user to such information or to suggest that the user generate a particular report or run a particular query that may be timely, such algorithms possibly running in the background and detecting changes in data that may indicate sufficiently changed circumstances to be relevant to that user; (4) artificial intelligence enabled to develop suggestions and to build multi-step processes, which may include such steps as alerting users to suggested actions, implementing processes as prompted by users, and the like, where such development of processes, suggestions, and related processing may take place in real time based on interactions with users and analysis of data or may take place in a different time frame; (5) drag-and-drop dashboard creation functionality that may allow users to build functional dashboard elements that may be built and integrated into the analytic dashboard without requiring any technical expertise, programming ability or the part of the user or assistance from information technology specialists or others; and (6) other functions, features, components, and the like that may be helpful in performing its functions.

Figure 33:
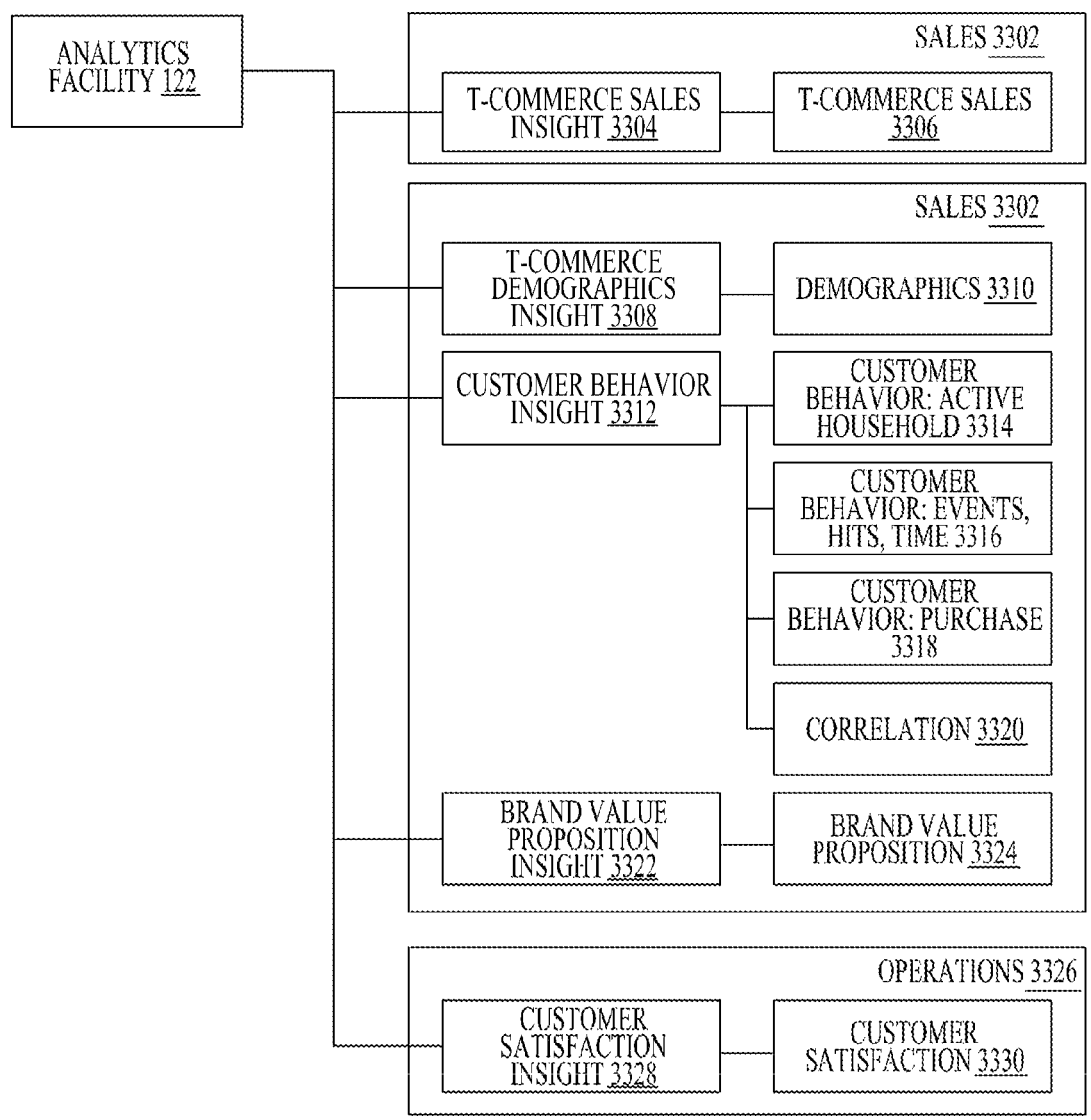
FIG. 33 depicts an embodiment functional block diagram for an analytics facility.

In embodiments illustrated in FIG. 33, there may be an analytics facility 122, which may be referred to as a business intelligence portal. The analytics facility 122 may include a data structure with a number of elements. These elements may be separated into three subject areas: sales 3302, marketing 3303, and operations 3326.

In embodiments, the sales 3302 area may include (1) a T-Commerce sales insight 3304 dashboard and (2) a T-Commerce sales 3306 element. The sales insight 3304 dashboard may have a bi-directional connection to the T-Commerce sales 3306 element, enabling it to gather sales data from the T-Commerce sales 3306 element and to send queries and processed data to the T-Commerce sales 3306 element.

In embodiments, the marketing 3303 area may include (1) a T-Commerce demographics insight 3308 dashboard; (2) a demographics 3310 element; (3) a customer behavior insight 3312 dashboard; (4) a customer behavior: active household 3314 element; (5) a customer behavior: events, hits, time 3316 element; (6) a customer behavior: purchase 3318 element; (7) a correlation 3320 element; (8) a brand value proposition insight 3322 dashboard; and (9) a brand value proposition 3324 element. The T-commerce demographics insight 3308 dashboard may have a bi-directional connection with the demographics 3310 element, enabling it to gather data from the demographics 3310 element and to send queries and processed data to the demographics 3310 element. The customer behavior insight 3312 dashboard may have bi-directional connections with each of the following elements: (a) the customer behavior: active household element 3314; (b) the customer behavior: events, hits, time 3316 element; (c) the customer behavior: purchase 3318 element; and (d) the correlation 3320 element. These bi-directional connections may enable the customer behavior insight 3312 dashboard to communicate with all of these elements simultaneously, receiving data from them and sending queries and processed data to them. The brand value proposition insight 3322 dashboard may have a bi-directional connection with the brand value proposition 3324 element, enabling the brand value proposition insight 3322 dashboard to receive data from the brand value proposition 3324 element and to send queries and processed data to the brand value proposition 3324 element. Each of these elements may include a page and corresponding back-end code for serving text, images, sound, video, and other assets, as well as code for processing and collecting data entered into the page, and the like.

In embodiments, the operations 3326 area may include a customer satisfaction insight 3328 dashboard and a customer satisfaction 3330 element. The customer satisfaction insight 3328 dashboard may have a bi-directional connection with the customer satisfaction 3330 element, enabling it to send queries and processed data to the customer satisfaction 3330 element and to receive data from the customer satisfaction 3330 element.

In embodiments, access to the analytics facility may be based on designated user communities, where a given user may be part of multiple communities, each community having access to designated analytics facility functionality. These user communities may include one or more of the following: power users, executive users, regular users, casual users, mobile users, non-analytics users, and the like. The power user community may include the head of T-Commerce, members of the T-Commerce department, internal relevant internal team members, and one or more T-Commerce administrators. The executive user community may be limited to include only the head of T-Commerce. The regular user community may include of the same members as the power user community or it may also include additional internal users. The regular user community may also include external contractors or other external users whose responsibilities require frequent access to the analytics facility. Mobile users may include the head of T-Commerce, members of the T-Commerce department, and one or more T-Commerce administrators. Non-analytics users may include users whose only need for access to the analytics facility is to gather data needed for brand marketing. Access to reports may be limited depending upon a user's user community. For example, access to dashboards, standard reporting, and plug-ins may be limited to power users, while access to ad-hoc queries and reporting and to mobile analytics may also be available to non-analytics users.

In embodiments, users may be assigned login credentials that are coded to their user communities, such that a given user's access to designated functionality may be limited based on that user's user community. Access to the analytics facility may be restricted to users who have logged in. The login process may be integrated with other systems of the disclosure, such that logging in to one system automatically logs a user into other systems.

In embodiments, the analytics facility may be accessed through mobile computing devices such as smartphones and tablet computers. Mobile access may incorporate additional technologies, such as SMS, MMS, push notifications to provide users with timely communications, and the like. Such mobile access may include the communication of excerpted information from reports generated by the analytics facility.

In embodiments, the analytics facility may be designed to comply with a set of business requirements. As illustrated in FIG. 33, these business requirements may include one or more of the following: (1) an analytics facility 122 may process data relating to a number of subject areas, which may include sales 3302, marketing 3303, and operations 3326; (2) each subject area may have its own dashboards; and (3) each subject area dashboard may have pages a number of custom pages special to its subject area. In these embodiments, there may be a sales area 3302 that is designed to provide the management of the sales department with information relating to sales, expenses, and profits. In these embodiments, there may be a marketing area 3303 designed to provide members of the marketing department with useful and relevant information. In these embodiments, there may be an operations area 3326 designed to provide customer satisfaction-related information to relevant managers. Subject area dashboards may include a T-Commerce sales insight 3304 dashboard that may provide data and analysis relating to T-Commerce sales, a T-Commerce demographics insight 3308 dashboard that may provide data and analysis relating to T-Commerce customer demographics, a customer behavior insight 3312 dashboard that may provide data and analysis relating to T-Commerce customer behavior, a brand value proposition 3322 dashboard that may provide data and analysis relating to the value of the various brands being sold through T-Commerce, and a customer satisfaction insight 3328 dashboard that may provide data and analysis relating to customers' satisfaction with their T-Commerce experiences. In these embodiments, each dashboard may have a number of pages and corresponding code, which together constitute elements that are connected to the dashboard. Such elements may include any number of elements, including: T-Commerce sales 3306; demographics 3310; customer behavior: active household 3314; customer behavior: events, hits, time 3316; customer behavior: purchase 3318; correlation 3320; brand value proposition 3324; and customer satisfaction 3330.

In embodiments, the T-Commerce channel application may be enabled to access a number of pre-made queries. Access to such pre-made queries may be limited based on a user's user community. Such pre-made queries may be OLAP queries. Such pre-made queries may include queries designed to seek one or more of the following kinds of data: (1) business performance numbers, such as sales, revenue, profit, growth rate, achievement of goals, and click behavior; (2) customer satisfaction, including status and difficulty of customer complaint; (3) improvement metrics; (4) subject area-specific data; and (5) other data. Each subject area, including those illustrated in FIG. 33, may have its own pre-made queries. For example, the T-Commerce sales insight 3304 dashboard may have pre-made queries for such data as (a) general sales, such as sales revenue, growth rate by brand, growth rate by product type, growth rate by SKU, (b) device sales, such as sales of smart TVs, Blu-Ray disc players, set-top boxes, projectors, monitors, and upgrade boxes, which may use proprietary operating system software designed to function in accordance with the disclosure; (c) rates of achievement of targets, such as sales targets, revenue targets, and marketing channel targets; (d) sales-related expense reports, such as breakdowns by SKU, by brand, by marketing channel, by performance, by revenue generated, and by category of expense; (e) return on investment information; (f) customer interaction data, such as click-through and purchase rates for various page elements (e.g. banner advertisements, linked text, and pop-up advertisements); and the like. Similarly, the T-Commerce demographics insight 3308 dashboard may have queries for (g) demographic information, such as rates of hits, purchases, return visits, and repeat purchases, such information possibly being broken down by region, by gender, by age, and by other criteria. The customer behavior insight 3312 dashboard may have queries for (h) data on active households, such as households who viewed IBC, households who viewed each brand, subscription households, potentially-connected households, returning households, households that have made multiple purchases, and number of active users in a household; (i) customer behavior, such as hits per household, hits in IBC, hits by period, hits by day, hits by week, hits by month, hits by year, average time per session, average time on IBC, average time by brand, average time per session when returning to a page, conversion rates, purchases by time period, seasonal differences in customer behavior, time of day of purchases, and payment types; and (j) correlations between shop elements and purchase behavior, such as differences among SKUs, brands and advertisements, as well as comparisons of performance between a brand generally and a given SKU and between an SKU generally and a particular advertisement for that SKU. The brand value proposition insight 3322 dashboard may have queries for (k) data useful in valuing brands, such as marketing value, data analytics value, brand commerce value, and the like. The customer satisfaction insight 3328 dashboard may have queries for (l) customer satisfaction-related data, such as SKU turnover data, promotion data, customer complaint-related data, and the like, where such queries may include variations whereby they may search by brand, by SKU, or by other criteria.

In embodiments, the analytics facility 122 may make be connected to a number of system components. As illustrated in FIG. 34, these system components may include one or more of the following: (1) a brand channel 116 server; (2) channel applications 1106, which may include (a) a T-commerce channel application 1107 and (b) a brand channel application 1108; (3) a cache server 1110; (4) any number of CPEs 106; (5) a remote device controller unit 104; (6) a remote browser 112; and (7) any number of mobile computing devices 1104. Contents of channel applications 1106 may be stored on the cache server 1110. Such contents may include media files, event logs, product attributes, and other data. Such transfers include processing users' events through channel applications 1106, matching user events with content and product identification codes. Such channel applications 1106 may include a T-Commerce channel application 1107, one or more brand channel applications 1108, and the like. Data may be transferred from the cache server 1110 to the analytics facility 122. This transfer of data may be effectuated using JavaScript or code from another programming language or by other means. As illustrated in FIG. 34, a remote browser 112 may rapidly retrieve the contents of channel applications 1106 from the cache server 1110. The brand channel 116 server may assign content and product identification information to contents, such as images, text, audio files, and video files. The analytics facility 122 may gather data from the cache server 1110 and other system components and may process and package those data, making them valuable for business intelligence. Information gathered by CPE 106 may be combined with other system data, including user data and information derived from user interactions. CPE 106 and paired remote devices 104 may facilitate enhancement of viewer experience by providing data for analytics that, in turn, may be used to customize content being served to customers.

In embodiments, data acquired by the analytics facility 122 from the other system components may include one or more of the following: (1) content identification, such as space attributes (e.g. favorite, wish list, shopping cart), content attributes (e.g. image format identification), and content location (e.g. URL of the content); (2) product identification, such as product attributes like the product's name, color, material, style, category, and size; (3) metadata, such as user identifiers, the MAC address of the sending device, and demographic tags; and (4) other relevant data As transfers take place, information on such transfers may be stored in an event log. Such an event log may include (a) where the input took place, including any object that was clicked or menu item that was selected; (b) the content that was selected or clicked, if applicable; (c) what actions prompted the input; (d) the route followed by the input on its path from the input device to the analytics facility; (e) a log of the time of each event; and (f) other information about the event.

In embodiments, the analytics facility may be enabled to generate automatic content recognition ("ACR") advertising. Such ACR advertising may involve checking viewer preferences for products, ad types, and other viewer characteristics, such as click-time variation, click accumulation, demographics, and variation of exposure per regional location. ACR advertising may involve one or more of the following components: (1) data required to serve the advertisement, such as the identification number of the advertisement, the URL of the advertisement's content (i.e. the location of the source of the content to be displayed in the dialog box), and the URL of the target page, such as an address within a channel application; (2) data required by the analytics facility, such as the product information of the product or products being advertised, including product category, and identifying metadata, such as the MAC address of the device viewing the advertisement and demographic tags; (3) associated information to be stored in the event log, as discussed above; and (4) other data.

In embodiments, the analytics facility may be enabled to generate banner advertising. Such banner advertising may involve checking viewer preferences for products, ad types, and other viewer characteristics, such as click-time variation, click accumulation, demographics, and variation of exposure per regional location. Banner advertising may also involve one or more of the following components: (1) data required to serve the advertisement, such as the identification number of the advertisement, the URL of the advertisement's content (i.e. the location of the source of the content to be displayed in the banner), and the URL of the target page, such as an address within a channel application; (2) data required by the analytics facility, such as the product information of the product or products being advertised, including product category, and identifying metadata, such as the MAC address of the device viewing the advertisement and demographic tags; (3) associated information to be stored in the event log, as discussed above; and (4) other data.

In embodiments, the analytics facility may be enabled to generate promotional messages and content for mobile devices. Such promotional messages and content may involve checking the device carrier's activity, past responses to promotional messages, preferences for products, ad types, and other viewer characteristics, such as demographics. Generating promotional messages and content for mobile devices may also involve one or more of the following components: (1) information necessary to produce the message and content to be displayed, such as the identification number of the image or content of the message, the name of the application being used to display the message, (e.g. text messaging application, web browser, email client, or other application), the URL of the mobile content (i.e. the location of the source of the content to be displayed on the mobile device) and sufficient information to identify the mobile device on which the information is to be displayed (e.g. an email address, a mobile phone number, an IP address, or the like, depending on the form in which the promotional content is to be displayed); (2) data required by the analytics facility, such as the product information of the product or products being advertised, including product category, and identifying metadata, such as the MAC address of the device viewing the advertisement and demographic tags; (3) associated information to be stored in the event log, as discussed above; and (4) other data.

In embodiments, the analytics facility may be enabled to function with legacy system components and technologies (e.g. business intelligence portal, business intelligence data, business intelligence infra, and the like) and new and emerging components and technologies (e.g. wearable computers, implantable computers, etc.) not specifically referenced herein.

Figure 35:
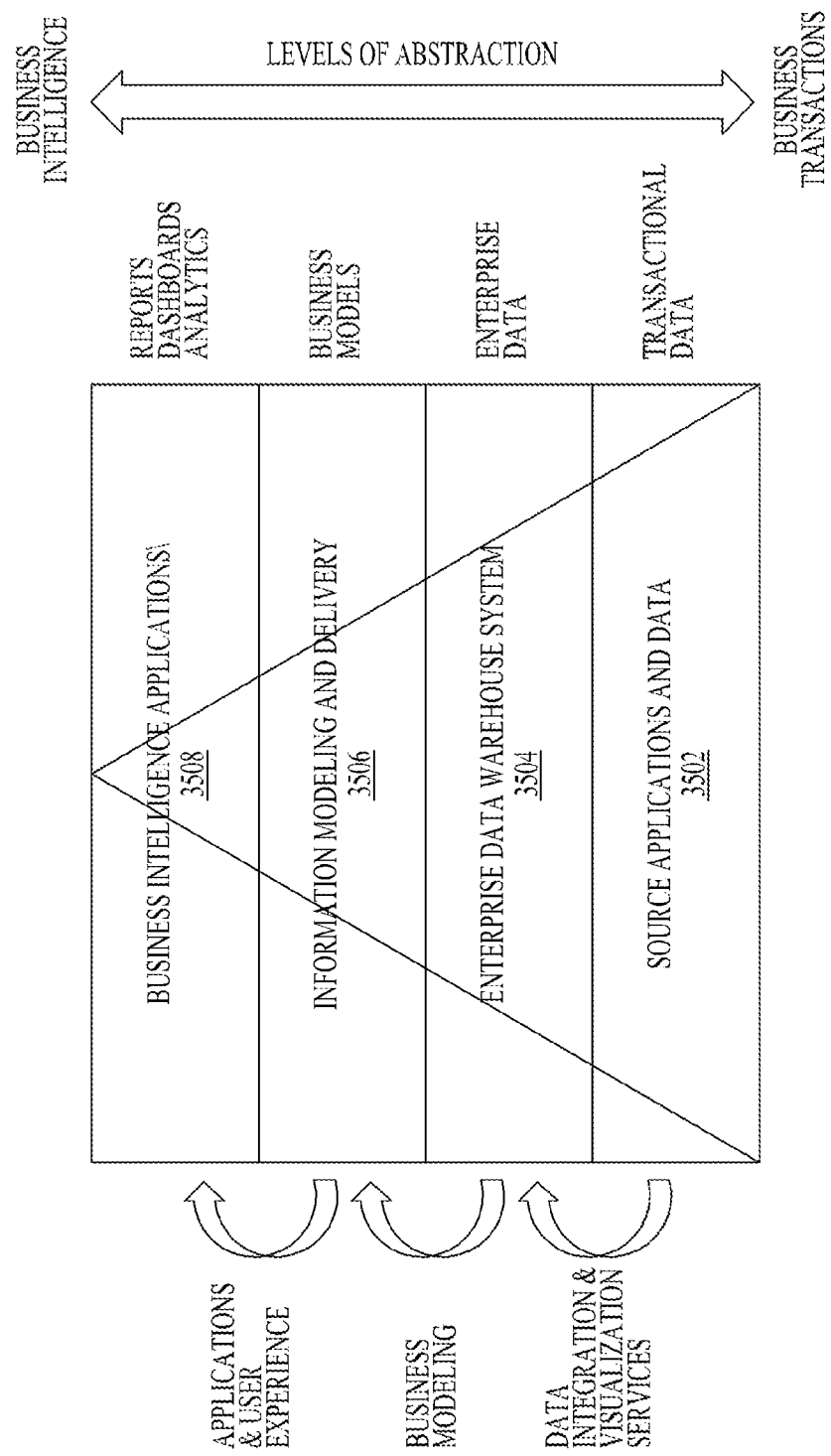
FIG. 35 depicts an embodiment data abstraction layers for an analytics facility.

In embodiments, the analytics facility may incorporate business intelligence engines. As illustrated in FIG. 35, such business intelligence engines may involve a number of layers of varying degrees of abstraction. Starting at the bottom of FIG. 35 with source applications and data 3502, the business intelligence engine may refine information each time it passes the information up a layer with the eventual result that when the information reaches the business intelligence applications 3508, it is valuable for use in making business decisions. In these embodiments, the first refinement step may take place as transactional data are processed and transmitted to the enterprise data warehouse system 3504. This first refinement step may involve integrating data from multiple sources and cleaning and cross-linking those data, which process may produce enterprise data. The second level of refinement may take place when data are processed and transmitted to the information modeling and delivery 3506 layer, during which process business modeling may be implemented. This second processing step may involve enriching data from the enterprise data warehouse system 3504 and reformatting those enriched data, so that they may readily be used in business operations and decision-making. The data warehouse system may make use of staging tables, which may be used to prepare data for subsequent manipulations and to facilitate those manipulations. This stage may involve one or more of the following operations: (1) developing and organizing data hierarchies so as to enable automatic drill-down from one level of data to the next (e.g. from processed data to the source data from which the processed data was derived); (2) calculating measures on a consistent scale based on base measures, such that data may be aggregated meaningfully at various hierarchical levels; (3) including a business-friendly presentation layer that enables users to carry out self-service reporting without worrying about the underling complexities of the data model; and (4) applying data visibility rules and user role definitions. The result of this second processing step may be to produce data useful in business models. The third refinement step may involve processing and transmitting business model data to the business intelligence applications 3508, which may produce reports and dashboard analytics. As part of this third processing step, business applications may be built on top of the enriched data foundation and may be delivered to various devices, as needed.

In embodiments, the enterprise data warehouse system may include one or more of the following components: (1) a data warehouse database; (2) extract, transform, and load processes; (3) operational systems; (4) external sources; and (5) other components. In these embodiments, the data warehouse database may be a shared, analytic data structure for storing tactical or historical information from company-wide operational systems into a centralized relational database and may be used for reporting and business intelligence. It may also be considered Single Source of Truth ("SSOT"), i.e. information contained in data warehouse database may be relied upon and reported on for business use. A number of possible structures are possible for such a database (e.g. a star structure or a snowflake structure). Such a data warehouse may support multiple subject areas and may act as the central source of decision support data across an entire enterprise. There are a number of possible ways to implement such a database, one of which is a traditional relational database management system. In these embodiments, the extract, transform, and load processes may involve extracting data from various sources, consolidating and reconciling data, and storing them in a consistent format. Data integration technology may be used to extract transactional data from internal and external source operational applications to build the database. This overall process and its associated steps may be referred to as extract, transform and load ("ETL") and may involve extracting data from source applications, transforming those data to the format needed for the data warehouse, and then loading those transformed data into the data warehouse. These processes may incrementally or fully refresh the data warehouse with data on a regular basis (daily, weekly, monthly etc.). Data may be extracted from various sources, consolidated, reconciled, and stored in a consistent format. In these embodiments, operational systems may be systems that record details of business transactions. Such systems may be a location where decision support data may be sourced. In these embodiments, external sources may include any sources from outside the analytics facility, such as census data, zip code lists, economic data, and any other data that may be useful in refining internal data to make it more useful.

In embodiments, the analytics facility may produce data and tools useful in an analytical environment. In these embodiments, an analytical environment is the domain of business users who use analytical tools to query, report, analyze, mine, visualize, and act on the data in the data warehouse. Business users analyze against data stored in data marts using user-friendly query tools. In this context, the analytics facility may be designed to provide reporting, data mining algorithms, visualization, and OLAP tools. These tools may be designed to enable users to view reports as static documents, to filter reports by relevant criteria (e.g. geography, products), to navigate within reports (e.g. search, drill down, drill across), or to change the view or level of detail, if any. Such tools may also generate exception-driven reports, such as dashboards or scorecards that compare performance to projections and plans. These tools may also enable users to perform historical, slice-and-dice analysis that answers "what?" and "when?" inquiries using information stored in a data warehouse. For example, a typical query might be, "What was the total revenue for the eastern region in the third quarter?" Users may take advantage of pre-built queries and reports or build their own.

In embodiments, the analytics facility may include data mining and predictive analysis tools. Data mining allows users to perform predictive, multidimensional analysis of hypothetical situations and may be used for many business purposes, including forecasting, customer profiling, trend analysis, and fraud detection. These tools may be used to answer "what if" and "why?" questions, such as, "What would be the effect on the eastern region of a 15 percent increase in the price of the product?" Such tools may involve a variety of statistical analysis techniques in examining current and historical data in order to make predictions, to evaluate current operations, and the like.

Figure 36:
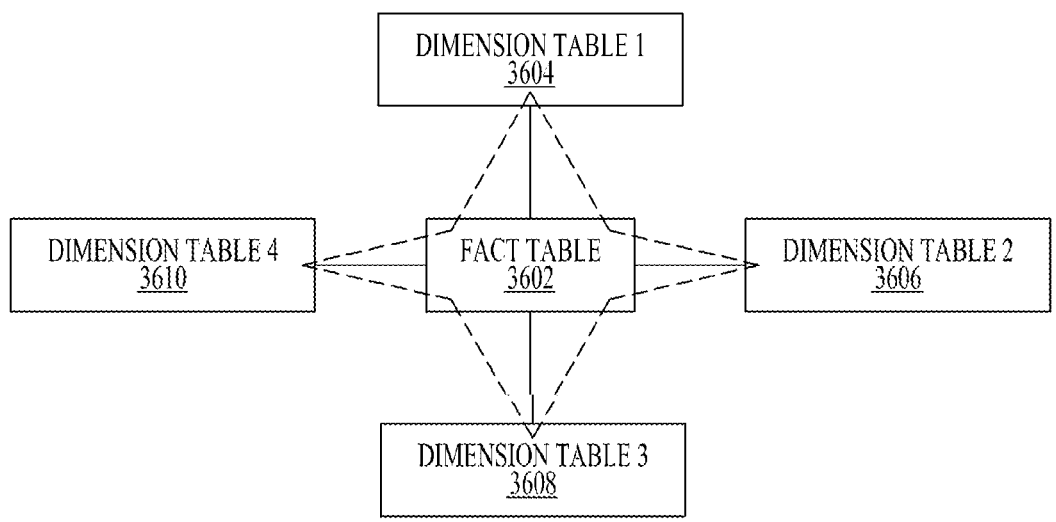
FIG. 36 depicts an embodiment star schema diagram for an analytics facility.

In embodiments, the analytics facility may include OLAP and dimension modeling capabilities. Such capabilities may be useful in creating and running ad hoc reports that run quickly and efficiently. Both capabilities involve the production and use of a data layer that is optimized for query performance. Such a performance layer may take the form of a de-normalized star schema or of a multidimensional online analytical programming (OLAP) cube. The key ingredient in either approach is to build a specialized data structure that improves performance by aggregating information and performing calculations in advance. Essentially, online analytical processing, or OLAP, is an approach to quickly answer multi-dimensional analytical queries. The term OLAP was created as a slight modification of the traditional database term OLTP (Online Transaction Processing). Databases configured for OLAP use a multidimensional data model, allowing for complex analytical and ad-hoc queries with a rapid execution time. The output of an OLAP query is typically displayed in a matrix (or pivot) format. The dimensions form the rows and columns of the matrix; the measures form the values. At the core of any OLAP system is the concept of dimension modeling ("DM"), a logical design technique used for designing data warehouses. It is different from entity-relationship modeling ("ER") typically used in the OLTP environment. DM is a design technique for databases intended to support end-user queries in a data warehouse. DM may or may not involve a relational database. The DM modeling approach, at the logical level, may be used for any physical store, such as multidimensional database or even flat files. Essentially, DM consists of quantitative facts called measures that are categorized by descriptive elements called dimensions, which may be created from a star schema of tables in a physical store, such as a relational database. Facts are typically numeric values that can be aggregated, and dimensions are groups of hierarchies and descriptors that define the facts. For example, sales amount is a fact; timestamp, product, register#, store#, etc. are elements of dimensions. Dimensional models are built by business process area, e.g. store sales, inventory, claims, etc. Because the different business process areas share some but not all dimensions, efficiency in design, operation, and consistency may be achieved using conformed dimensions, i.e. using one copy of the shared dimension across multiple subject areas. Each measure can be thought of as having a set of labels, or meta-data associated with it. A dimension is what describes these labels; it provides information about the measure. A simple example would be a cube that contains a store's sales as a measure, and date/time as a dimension. Each sale has a date/time label that describes more about that sale. The star schema is the basic building block used in dimensional modeling. As illustrated in FIG. 36, a star schema consists of one large central table called the fact table, and a number of smaller tables called dimension tables that radiate out from the central table. In FIG. 36, four dimension tables (dimension table 1 3604, dimension table 2 3606, dimension table 3 3608, and dimension table 4 3610) are arranged around a single fact table 3602.

Figure 37:
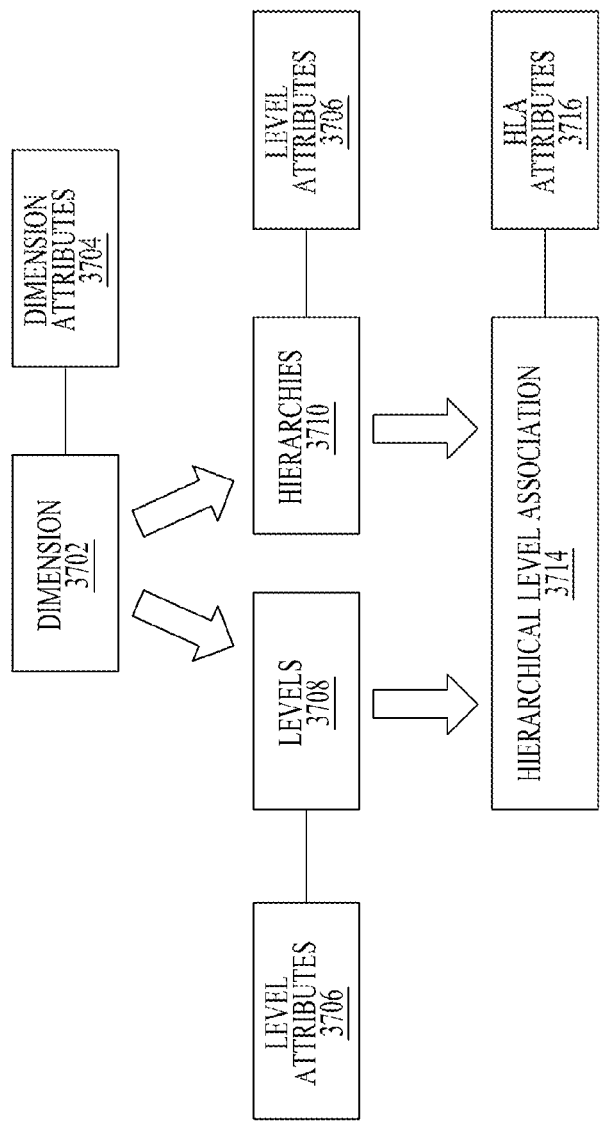
FIG. 37 depicts an embodiment hierarchical diagram for an analytics facility.

In embodiments, multidimensional OLAPs ("MOLAPS") and relational OLAPS ("ROLAPS") may be used to optimize ad hoc search query creating and implementation. A MOLAP is the classic form of OLAP and is sometimes referred to as just OLAP. A MOLAP stores data in optimized multi-dimensional array storage rather than in a relational database. It requires the pre-computation and storage of information in the cube. This pre-computation operation may be referred to as processing. ROLAPs work directly with relational databases. A ROLAP's base data and the dimension tables are stored as relational tables and new tables are created to hold the aggregated information. In these embodiments, DM consists of numeric facts called measures that are categorized by dimensions typically created from a star schema of tables in a physical store such as a relational database. A star schema is the basic building block used in DM. A star schema consists of one large central table called the fact table, and a number of smaller tables called dimension tables which radiate out from the central table, as illustrated in FIG. 36. Optimizing ad-hoc data query performance may involve the use of multidimensional meta-modeling, which may include the following characteristics: (1) dimensions, (2) levels, (3) hierarchies, (4) attributes, (5) cubes, (6) measures, and (7) other characteristics. As illustrated in FIG. 37, a dimension 3702 may contain multiple and diverse member hierarchies 3710. A dimension may also contain multiple levels 3708. Each component has its own set of attributes (e.g. a dimension 3702 has dimension attributes 3704, levels 3708 have level attributes 3706, hierarchies 3710 have hierarchy attributes 3712, and a hierarchical level association 3714 has HLA attributes 3716.) A hierarchical level association 3714 may be derived from levels and hierarchies. Cubes, on the other hand, are used to store measures and they are related to the dimensions through the cube dimension association ("CDA") relationship. The data cube may also be known in OLAP systems as the multidimensional table and may be designed to provide an intuitive way for data analysts to navigate through various levels of summary information. In a data cube, attributes are categorized into dimension attributes and measure (or fact) attributes. Measure attributes of those records with the same values are combined (mainly summed up) into an aggregate value. Each OLAP type has certain benefits that may be useful in optimizing ad-hoc query performance, although each OLAP type also has disadvantages. Therefore, ad-hoc query optimization may require the use of multiple OLAP types. MOLAP advantages may include better performance due to specialized indexing and storage optimizations. MOLAPs also need less storage space compared to ROLAPs because the specialized storage typically includes compression techniques. MOLAPs may also have disadvantages. Some MOLAP implementations are prone to database explosion. Database explosion is a phenomenon causing vast amounts of storage space to be used by MOLAP databases when certain common conditions are met—high number of dimensions, pre-calculated results and sparse multidimensional data. The typical mitigation technique for database explosion is not to materialize all the possible aggregations, but only the optimal subset of aggregations based on the desired performance versus storage trade off. The need for such mitigation techniques may be a factor in determining which form of OLAP to use in a given case. ROLAPs are generally more scalable than MOLAPs. However, large volume pre-processing is difficult to implement efficiently so it is frequently skipped. ROLAP query performance can therefore suffer tremendously. Since ROLAPs rely more on databases to perform calculations, they are more limited in the specialized functions they can implement.

In embodiments, building business intelligence engines may involve a number of steps. These steps may include one or more of the following: (1) capacity and infrastructure planning, which may include identifying and determining sizing requirements of hardware needed to run various tools and functionality; (2) installation of operating systems and connecting network components (e.g. the data warehouse database server); (3) installation of business intelligence tools, ETL functionality, and the business intelligence server environment; (4) configuration of ETL functionality and the business intelligence server environment; (5) testing source data and target data warehouse connectivity using business intelligence and ETL components; (6) identification and configuration of security systems and components; and (7) other steps that may facilitate the development process, speed up other steps, improve efficiencies, or the like.

Browser Plugin

In embodiments, to allow a cloud-TV client to be activated as an HTML application on certain platforms, the client needs to be delivered as a web browser plugin. Some client platforms (e.g., a smart TV) allow third-party applications to be installed, such as local HTML5 applications. To allow such applications to use the cloud-TV platform for the delivery of the user interface, they have to be able to use the cloud-TV client. Rather than implementing the client as an HTML5 application, which has inherent limitations, the system may provide cloud TV client functionality as a plugin to the local browser (e.g., the browser on the client device).

Figure 38:
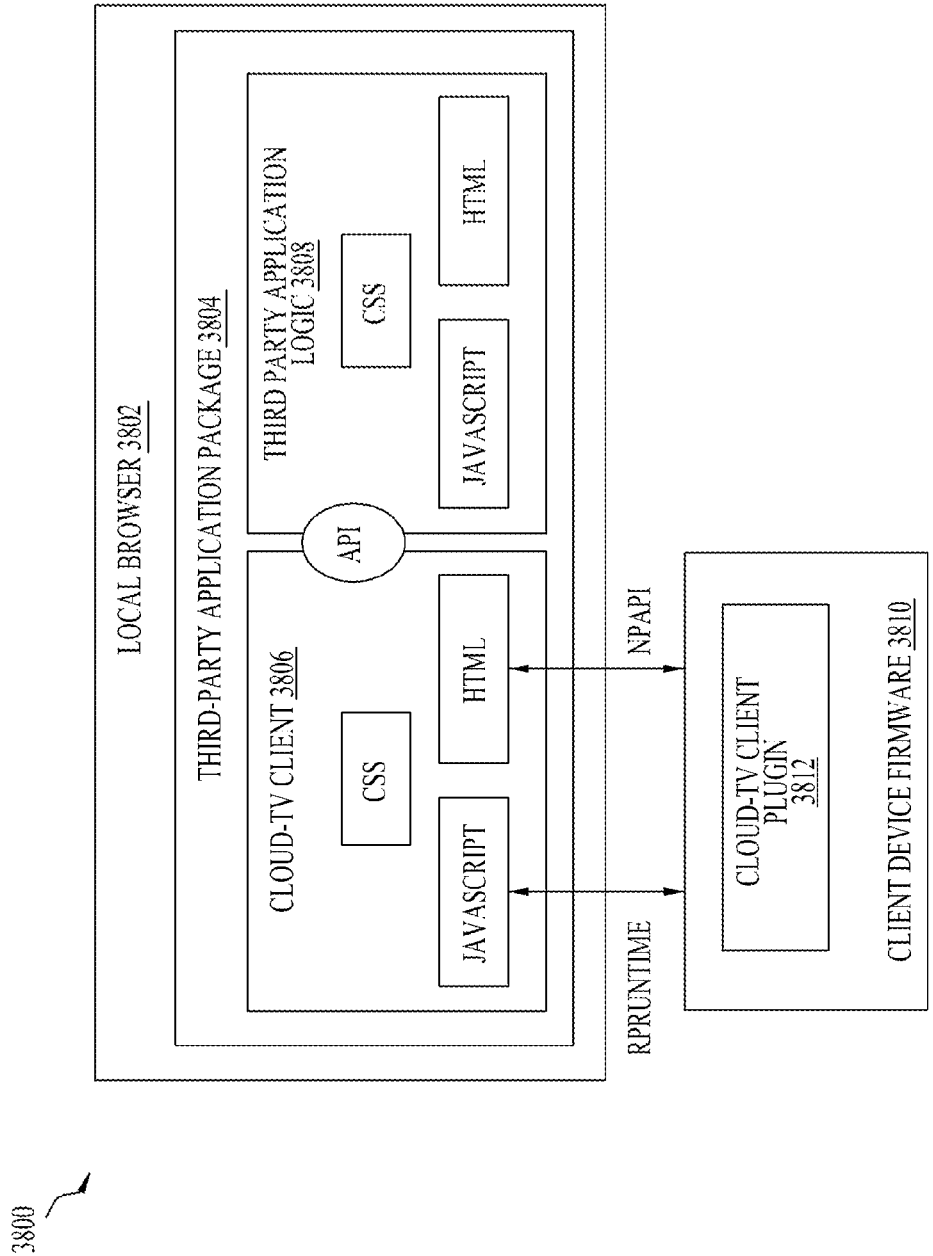
FIG. 38 depicts an embodiment functional block diagram including a browser plugin for a CPE client.

Referring to FIG. 38, an embodiment functional diagram 3800 is presented showing a local browser 3802 is shown comprising a third party application package 3804 containing two objects, the cloud-TV client 3806, consisting of HTML, JavaScript, and CSS. This Cloud-TV client code provides a simple interface to the third party application logic 3808, the third party application logic also consisting of CSS, JavaScript, and HTML and other stored assets such as images, such as required by the application. In embodiments, the architecture supports multiple interaction models, including the third party application starting the cloud-TV client, the cloud-TV client starting the third party application. The cloud-TV client 3806 then interfaces with a cloud-TV client plugin 3812 within the client device firmware 3810.

Figure 39:
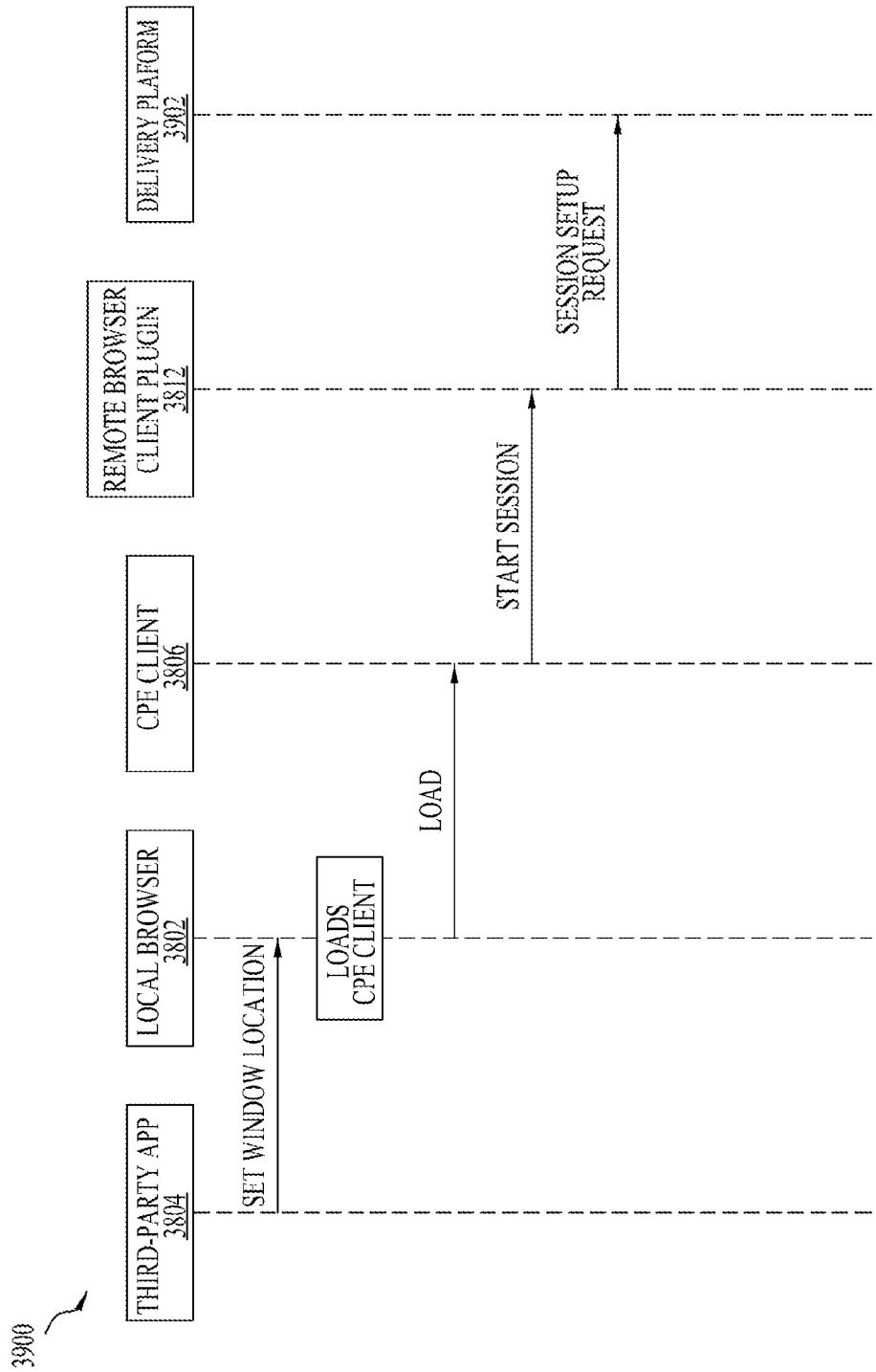
FIGS. 39-41 depict embodiment sequence diagrams for interactions associated with a browser plugin for a CPE client.

The third party application logic may invoke the cloud-TV client by setting the window source URL to the URL of the cloud-TV client (cloud-TV.html). As a result, the local browser will load the cloud-TV client HTML code, which will load the CSS and JavaScript. The cloud-TV client code will then make sure that the cloud-TV client plugin is loaded and started. Referring to FIG. 39, an embodiments sequence diagram 3900 illustrates the interaction between the various components, where in this instance the third-party application 3804 sets a window location to the local browser 3802, which loads to the cloud-TV client 3806, starting a session in the client plugin 3812, which sends a session setup request to the cloud-TV platform 3902 (e.g., a smart TV).

Figure 40:
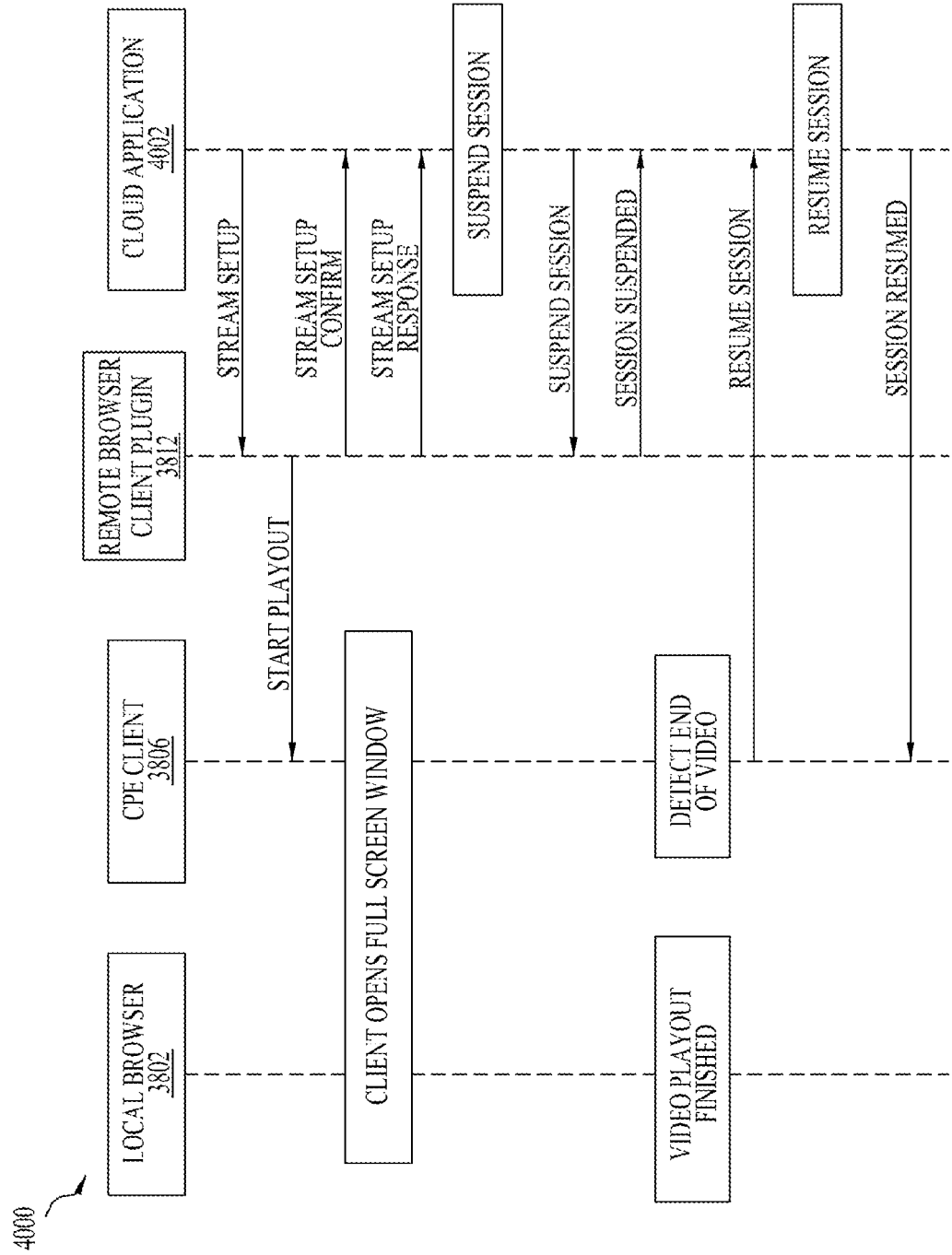

While the cloud-TV Client Plugin is executing, it will communicate with the JavaScript of the cloud-TV Client. This is used for example to perform play-out of video locally, where the cloud application will invoke perform a local function such as video play-out. The cloud-TV client plugin will examine the URI scheme, and notify the JavaScript code that video play-out is requested, passing the URL of the content to be played. The JavaScript will then add a video element, setting the element's source URL to the video source. The browser will then start playing the video. The cloud-TV client session is suspended during this time. When the user stops the video or presses 'back', for example, the JavaScript will read the current play position and pass this back to the cloud-TV Client Plugin. FIG. 40 illustrates this embodiment configuration 4000.

Figure 41:
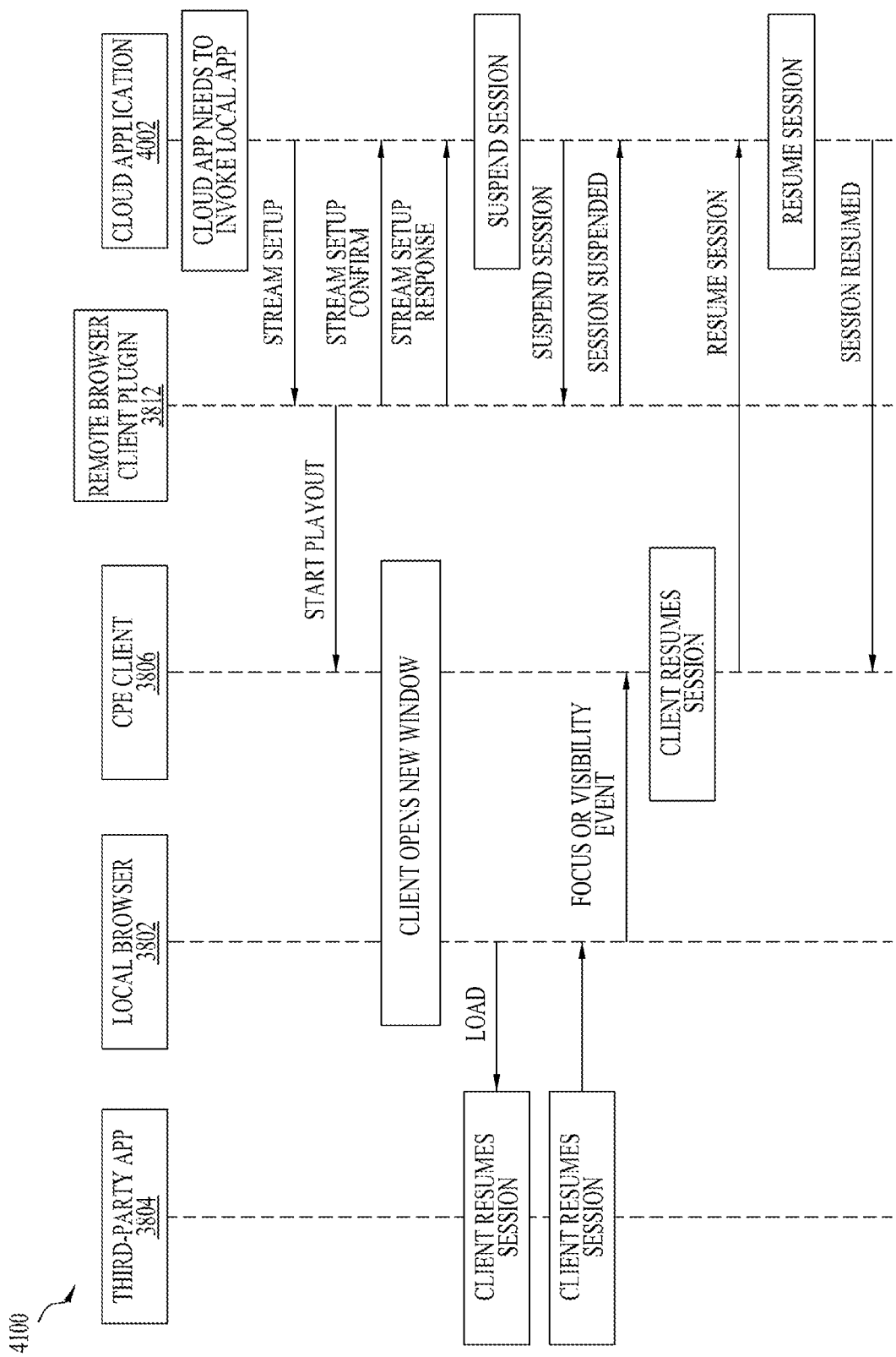

The cloud-TV may invoke the third party application. In some cases, the third-party application that includes the cloud-TV client also has to execute some functionality locally. For example, a cloud GUI would show a catalog to allow a user to select certain items to purchase. Then, to complete the purchase a local function is executed to handle the financial transaction (sometimes required as part of PCI compliance). The cloud application performs a handoff to a local function with the cloud-TV Client Plugin starting the local function by requesting the cloud-TV client JavaScript to open a new window with the source set to the HTML starting point that executes the local function. The browser will execute the local function, downloading the HTML source assets if required. This solution has the advantage of being simple, however no 'function results' may be passed back to the cloud-TV client to be reported to the cloud-TV application. Instead the results may be stored in a backend (e.g., transaction) server, from which they are fetched by the Cloud-TV application. FIG. 41 illustrates this embodiment configuration 4100. This procedure allows loading and executing any content in the local browser, including Flash content. Note, however, that the flash content cannot communicate with the cloud application if suspended. If the third party application logic wants to pass any execution result to the cloud application, then it could do so via a backend server that is reachable by the cloud application.

Cookie Authentication

Figure 42:
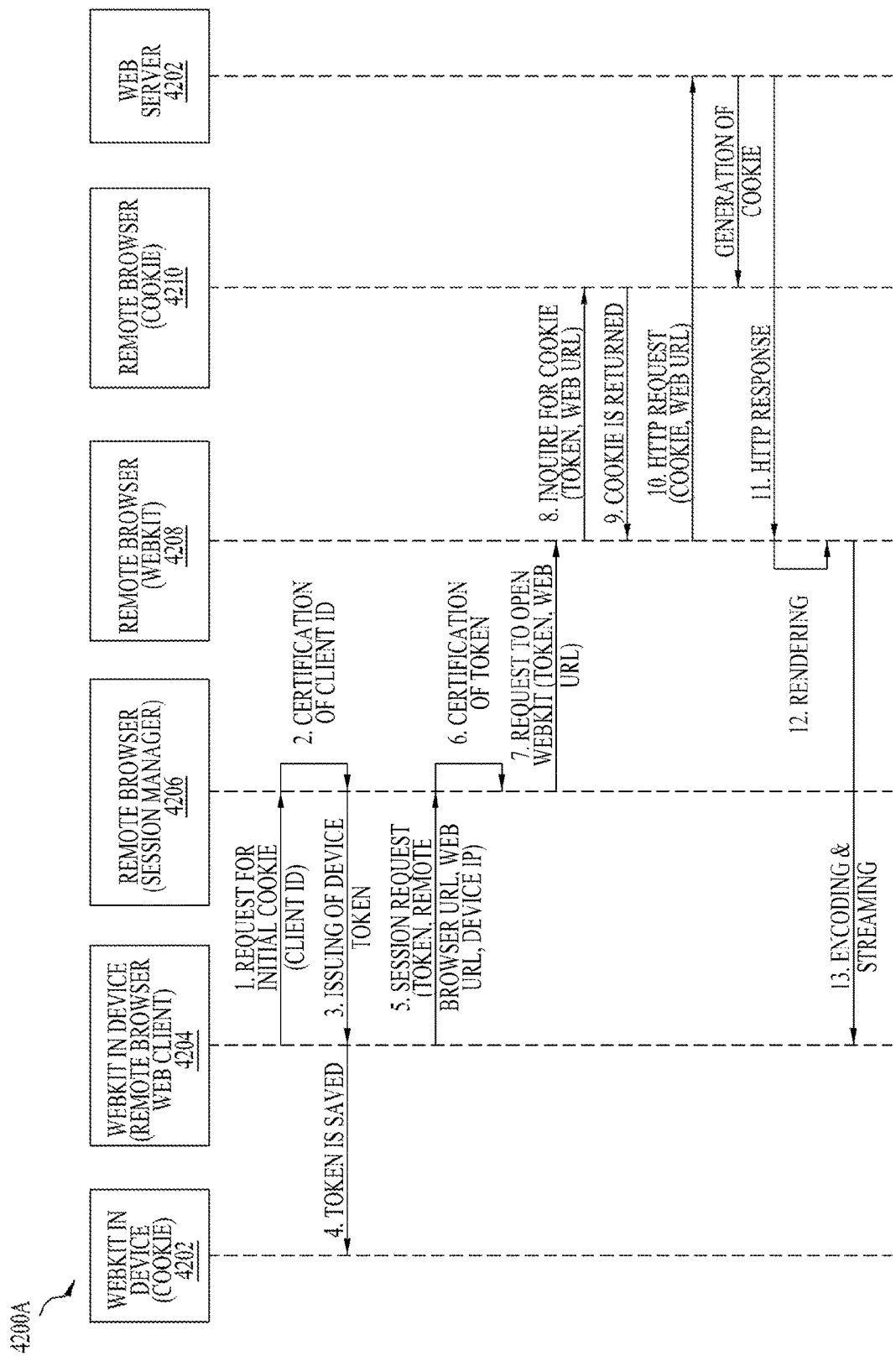
FIGS. 42-43 depict embodiment sequence diagrams for interactions associated with cookie authentication.
Figure 43:
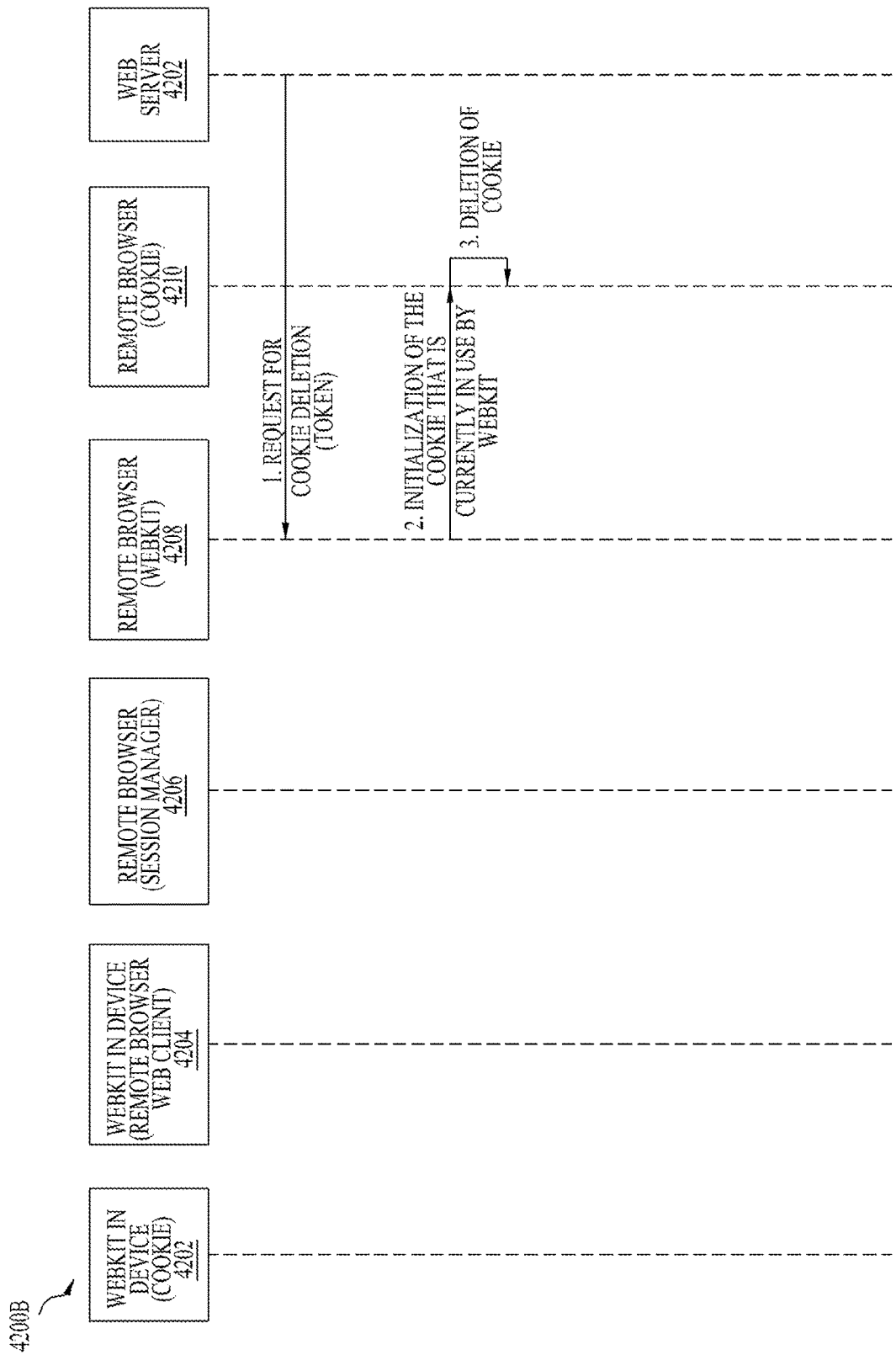

In embodiments, the T-commerce system may maintain remote browser session cookie information by using the device web kit cookie. When a remote browser is used as a webpage rendering engine in a device, the cookie information entered during the previous remote browser session (e.g. information of the product added to the shopping bag from a web page) cannot typically be reused. By generating a semi-permanent token which acknowledges a device from remote browser, then save it in a non-volatile space, this token can be mapped with each URL cookie in the remote browser. When a device is re-booted, or remote browser session is restarted, the existing cookie that was in use can be kept as it was prior to re-booting or restarting. FIGS. 42 and 43 provide an embodiment process diagram 4200A and 4200B to illustrate this process. This process sequence begins in 4200A in FIG. 42 with the web kit in the device (e.g., the remote browser web client) 4204 requesting an initial cookie (e.g., client ID) from the remote browser (e.g., session manager) 4206, which then certifies the client ID and issues a device token back to the web kit 4204. This token is then saved in the web kit in the device (e.g., cookie) 4202. The web kit 4204 then requests a session (e.g., token, remote browser URL, web URL, device IP) from the remote browser 4206, which certifies the token. The remote browser 4206 then makes a request to open a web kit (e.g. token, web URL) from the remote browser web kit 4208, which then makes an inquiry for a cookie (e.g., token, web URL) from the remote browser (e.g., cookie) 4210, and the cookie is returned to 4208. The remote browser 4208 then makes a HTTP request (e.g., cookie, web URL) to the web server 4212, which then generates the cookie, sending it back to the remote browser 4210. Note that if there is no cookie mapped with a token, then the request may proceeded without a cookie, and the web server then generates a cookie related to this, then inputs this cookie to the remote browse's cookie jar. The web server 4212 then sends an HTTP response to the remote browser 4208, which renders it, and sends encoding and streaming to the web kit 4204. Continuing with the process 4200B in FIG. 43, the web server 4212 requests a deletion of the cookie (e.g., token) from the remote browser 4208. The remote browser 4208 provides initialization of the cookie that is currently in use by the web kit to the remote browser 4210, which deletes the cookie.

Streaming Facility

In embodiments, the T-commerce system may provide for a streaming facility to enhance user engagement, such as by combining various technologies to enable scalability across multiple devices, and delivering the streaming experience with the lowest latency possible. Technologies utilized may include a web application server (e.g., to generate the user interface (UI)), stitching server (e.g., to convert the UI to a HTTP-based streaming format), HLS streaming server (capable of one-to-many applications), and the like. The streaming facility may provide enable the system to accelerate dynamic web content, such as utilizing TCP (Transmission Control Protocol) acceleration by attempting to keep connections open and utilizing the reuse of them. The streaming facility may provide for web acceleration services designed to accelerate delivery of a wide variety of web sites ranging from publishing/advertising to dynamic online commerce and business to business transaction web sites, using browser-level acceleration and bypassing the congestion of the public Internet to improve end-user experience, reduce site abandonment and increased online transactions, and the like.

A web accelerator is a proxy server that reduces web site access times, which can be self-contained hardware appliance or installable software. Unlike other web acceleration facilities, which may only work with the first page, requires hardware deployment, only offers either network or browser level optimization, and/or has a client side plug-in component, the streaming facility may optimize entire websites through a combination of browser-level acceleration and dynamic network delivery platform that works consistently for every device leading to improved business metrics. The streaming facility may combine browser-based acceleration techniques with a global network platform to decrease the time it takes for users to first engage with content on online and mobile sites. The streaming facility may boost website or application performance multi-fold (e.g. ×2, ×5), helping the system benefit from more time on site, reduced abandonment rates, increased page views, improved conversion rates, and the like.

The streaming facility may improve the performance of the one-to-one streaming delivered via the rendering server. The streaming facility may provide for web content caching services designed to deliver a wide variety of web sites ranging from publishing/advertising to online media and news web sites, bypassing the congestion of the public Internet to improve end-user experience, reducing site abandonment and increased online transactions without requiring costly IT build outs. The streaming facility may provide performance optimization and static content offload to support web based applications for fast delivery of content to users in order to increase page views, engagement, transactions and lower abandonment rates, and the like. The system may benefit from faster page load times, on demand scaling with no additional infrastructure investments, enhanced user experience, and the like. The streaming facility may provide a server-side URL authentication service. It should be noted that the streaming facility is not a replacement for DRM, and may not be associated with user authentication in any way. However, the streaming facility may assist customers in securing their content from unauthorized viewing. The streaming facility may provide a high performance authorization service that allows users to secure access to their content in an efficient, flexible and reliable fashion. The system may be token-based to maximize performance and avoid unwanted three-way handshakes that are common to other methods of authentication and can lead to sever latency in connection time.

A script or service may be added to the application server, such as for processing URLs before they are given to a user so that the URLs contain an encrypted token in the query string. This script may make its decisions based on any number of business criteria. Once the decision is calculated, the script may provide the user a URL with a token in the query string containing a hash (e.g., cryptographic string) of a shared secret, a 8-12 character secret known only to the user and the system, that is the desired object on the CDN. Query string parameters that are included in the hash may be used to determine the desired criteria the CDN should use to evaluate the request. This 'shared secret' component, may be required to contain only alphanumeric characters. It may be hashed, such as using an MD5 algorithm, and passed through the system via URI query string to be decrypted and authorized. Hashing may be done using PHP or ASP. The system may also use the hash generator to create the hashed URI query string. The end-time, start-time and length values may also be placed within the URI query string. Without these values the request for content ma be accepted or denied based on the shared secret with no discretion for time. However, with the time values included in the query string there may be additional authorization depending on the time of the request.

Membership Service

The T-commerce system may provide for a membership service facility, which may comprise responsibilities for user authentication and payment card storage. In embodiments, the membership service facility may be applied to high security items. Other services that may communicate with the membership service facility may include a user service, a shopping service, and the like. The membership facility may manage users, such as creating a user, editing a user (e.g., changing details of a user), authenticating a user (e.g., returns a time-sensitive authentication token which can be used to retrieve a payment card, such as where the token expires after a short time period, such as 15 minutes), and the like. The membership service facility may manage payment cards. In embodiments, the management of payment cards may be used by a shopping service, and all calls may need to include an authentication token. Abstracted calls may include storing of a payment card, deleting a payment card, retrieving a payment card, and the like, where one user may have multiple payment cards. Specific payment card information may need to be stored (e.g., PAN, name, expiry). The user service may store the billing address.

The membership service facility may provide for payment card encryption, where the membership service facility may be responsible for user authentication and card storage, and where there is an opportunity to store the card information with an encryption key, such as derived in part with the user's password. This may increase security greatly. For instance, if an attacker successfully accesses the database, they still need each user's password in order to retrieve the payment card information. Secure communication may be provided, where a REST interface may be accessed through a secure HTTPS (TLS) connection. Clients may need to verify the server's certificate. Similarly, users may be required to have client side certificates, where the server needs to verify them. User and shopping services may have different client certificates to identify them specifically. The membership service facility may then restrict which calls can be made by each service appropriately. PCI Compliance may be provided, where membership service and shopping services may touch payment card information, and so these may be the only services that need to be PCI compliant.

Payment Card Encryption

The T-commerce system may provide a payment card encryption facility for improving security, such as by encrypting payment cards using a key derived from the user's password. When encrypting the card number, a key may be generated from the user's password and a unique, random salt. The salt is saved but the key is discarded. To decrypt the card number, the user's password must be obtained to generate the key. This system increases security. With a standard industry approach, an attacker can retrieve card numbers in a few different ways. These attack vectors could be with access to a shopping service the attacker could request cards one at a time from a membership service. The attack vector could also be a full system breach. With access to the payment storage, the attacker could access the full database and application encryption keys. In this worst case scenario the attacker now has access to all credit card numbers. In the payment card encryption facility the keys are not stored at all. They are simply discarded after use. A piece of information, such as the user's password, which is not saved anywhere, is needed to generate individual keys. Attack vectors are therefore limited to where the attacker knows or can guess the user's password.

In embodiments, to store the user's password, a user service may generate a salt (e.g., 64-bit salt) using a crypto-module and encode it with hex. This hex is combined with password and hashed (e.g., with SHA-512). The salt and hash are then stored in the database, where the salt is called the 'password salt'. When a user is created, a second salt (e.g., 64 bit encoded with in hex) is generated and saved to the database. This salt is called the 'key salt'. When a user successfully authenticates, the user service combines the key salt with the password and hashes, such as with SHA-512. The hash is then truncated to the length for a key of an appropriate AES cypher. The resulting key is saved in an in-memory table temporarily. When a user enters a payment card, this is passed to the shopping service. The shopping service retrieves the key and encrypts the card number with the key before passing the card information to the payment storage. When a user purchases an item, the shopping service requests the card from payment storage. It retrieves the key and decrypts the card number. If the key is unavailable (e.g., it expired and was deleted from the table), the Shopping Service cannot encrypt or decrypt the card number. It must return an error and the user will be asked to enter their passcode. The user service may not have permission to communicate with payment storage, where only the shopping service has the required client certificate. In addition, payment storage may encrypt all data as it would normally in the standard industry approach.

Because the encryption key is never stored permanently and derived from the user's password several consequences arise, including the system's CNS never has the user's payment card number, automatic recurring payments (subscriptions) are not possible, and the like. Also, if the user forgets their password and requests a password reset their saved card numbers cannot be decrypted and must be reentered by the user, which may be acceptable along with appropriate messaging. If the user forgets and resets their password, the next time they choose to use a saved card they will be told something similar to: "Because your password was reset, please enter your card number to continue."

While several attack vectors still exist, these are all limited in scope as they require the user's password. In essence, the payment card encryption facility is always at least as secure as the industry standard and in several ways much more secure. There are vectors that also exist in the industry standard approach. For instance, with access to the shopping service, an attacker could passively listen as cards are used for shopping. They could only obtain the number of cards that are actively used by legitimate users. With access to the user service and shopping service, an attacker could passively listen in the user service as active users submit passwords. They could then request credit cards for those users from the shopping service. There could also be a full system breach. With full access to the payment storage database, payment storage keys, and user service database, an attacker could attempt to brute force each user's password individually to decrypt the card number.

In embodiments, the payment card encryption facility utilizes SHA-512 directly. This is because the crypto library may only offer PBKDF2 with SHA-1 and CNS requirements may call for SHA-512. Theoretical attacks exist on SHA-1, which may reduce its strength, such as from 280 operations to 260. SHA-512 may be preferable, requiring many more operators (e.g., 2256 operations). In practice however most password hashes may be cracked in significantly less operations because the average user uses weak passwords, allowing an attacker to intelligently iterate over a password list. Passwords are expected to be even weaker on the TV where users must enter a password using the TV remote. A solution is to repeatedly hash many times (>20000), such as is the foundation of Bcrypt and PBKDF2, or it could be done manually.

Users, Sessions, and Security

The T-commerce system may provide for a user session security facility, such as to deal with fact that the T-Commerce system is provided through a TV, and multiple people frequently use that TV's, sometimes at the same time. The security model facilitates collaborative use, where each TV has a list of profiles that have logged in to that TV (or were created on that TV).

In embodiments, and in an example of how the session security facility may implement the secure collaborative use of a TV, the act of logging into a new TV may require profile information, such as email address, passcode, and the like. This adds the profile to the list accessible on the TV. In embodiments, profiles may not be removed from the list on a TV, where a hardware reset may be performed, which erases all application information so that the TV is treated as a new TV again. Alternately there may be user profile management facility through which profiles may be managed. Switching profiles may not require a passcode, because basic shopping is an unlocked area. By contrast, a locked area is one that requires the user to enter their passcode. After the user has entered their passcode, they remain in an authorized mode for a period of time (e.g., 60 minutes, one day, and the like). While Authorized, the user can access any of their own locked areas (including checkout) without reentering their passcode. The authorized mode timeout may be a hard timeout maintained by the backend. The frontend may not take proactive action when it times out. After timeout, if the user attempts an action on an item in a locked area, the action will fail and the user presented with a passcode gate. An 'unlocked area' may include a shopping mode and the like. A 'locked area' may include a payment mode (e.g., credit cards, address book, and the like), checkout, saved information, and the like. An intermediate 'conditionally locked area' may be available, such as set in the profile, which may include a 'shopping bag', wish list, recently viewed list, order history, profile settings, and the like.

In embodiments, different identifiers (e.g., set in cookies) may be tracked by the browser, such as including an identifier for the TV, an identifier for a session (e.g., particular to the current profile), and the like. When the user switches profiles they may be given a new session ID. Because this may be implemented in a cookie, it would be included in HTTP calls the browser makes to the different services. A service then uses the session ID to lookup the user ID. When the user enters an authorized mode (e.g., by entering their passcode for an activity), a date stamp may be set in the system, such as in a backend sessions table. Services may check the authorized mode date stamp before taking action in a locked area. The frontend may not keep track of the timeout, and may merely passcode gate if it receives a 'forbidden' indication from a backend service.

To authenticate a user, such as for payment card access, the frontend may call a user service with the passcode. The user service checks may call a membership service, such as with email address, passcode, and the like. On success, the membership service may issue a temporary token to the user service, which may store it, such as in a sessions table. This may happen every time the user is authenticated regardless of the reason why the user authenticated. This token may need to be used by the shopping service to retrieve a saved payment card. The membership service temporary token will expire in a period of time (e.g. 60 minutes, and the like). This extra time is to prevent a 'place order request' from succeeding in every system except the membership service. Despite this extra time, the shopping service should gracefully handle a forbidden indication, such as from the membership service.

There may be guest accounts allowed on each TV. Many locked areas of a regular account (e.g., payment, wish list) won't exist on a guest account. If accessed, the user is prompted to create an account. There may also be no interaction with the membership service for a guest. If a guest checks out, they may need to enter the full payment card information. That information is then sent directly to the shopping service, which places the order with the brand.

Figure 44:
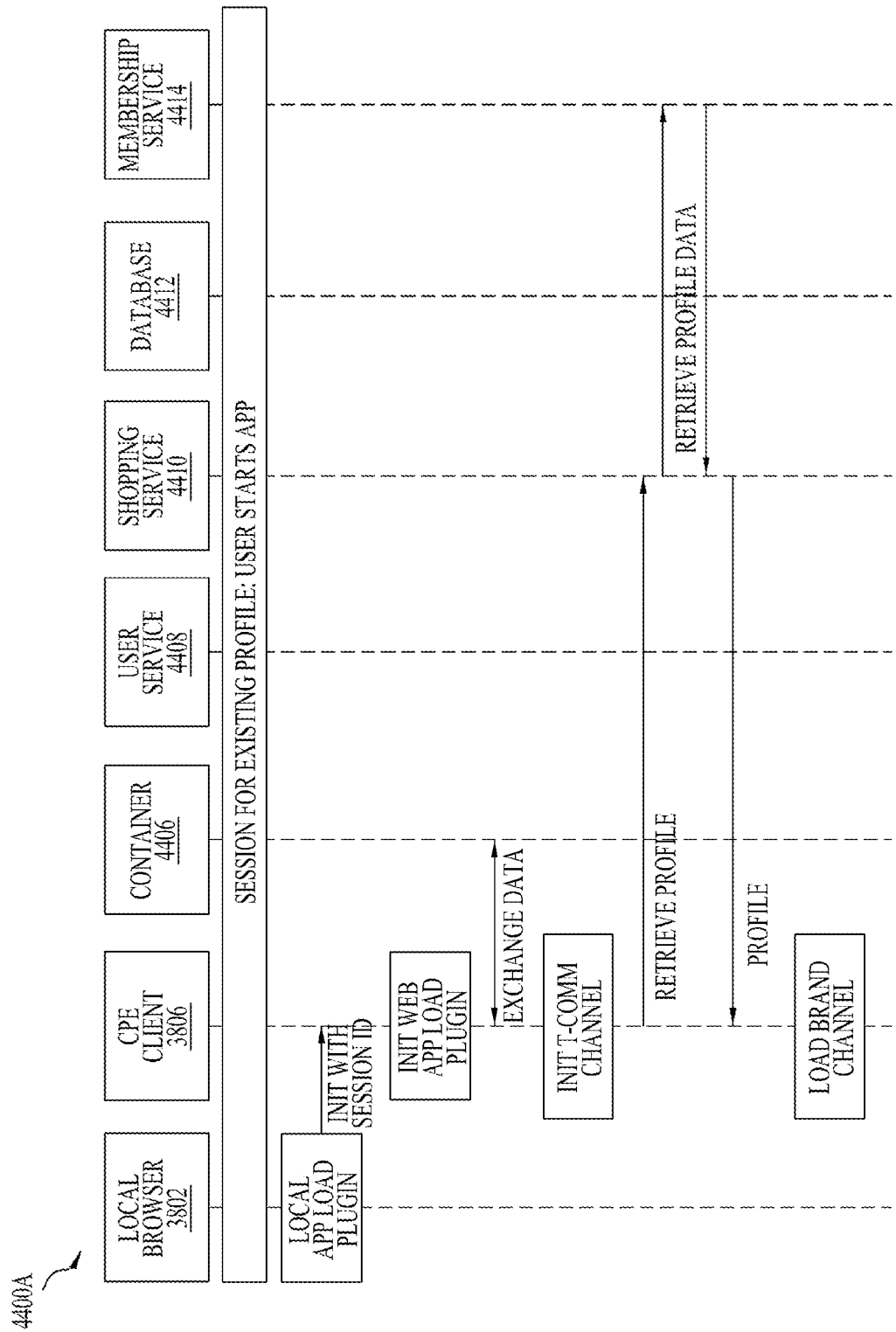
FIGS. 44-48 depict embodiment sequence diagrams for new and existing profile interactions.
Figure 45:
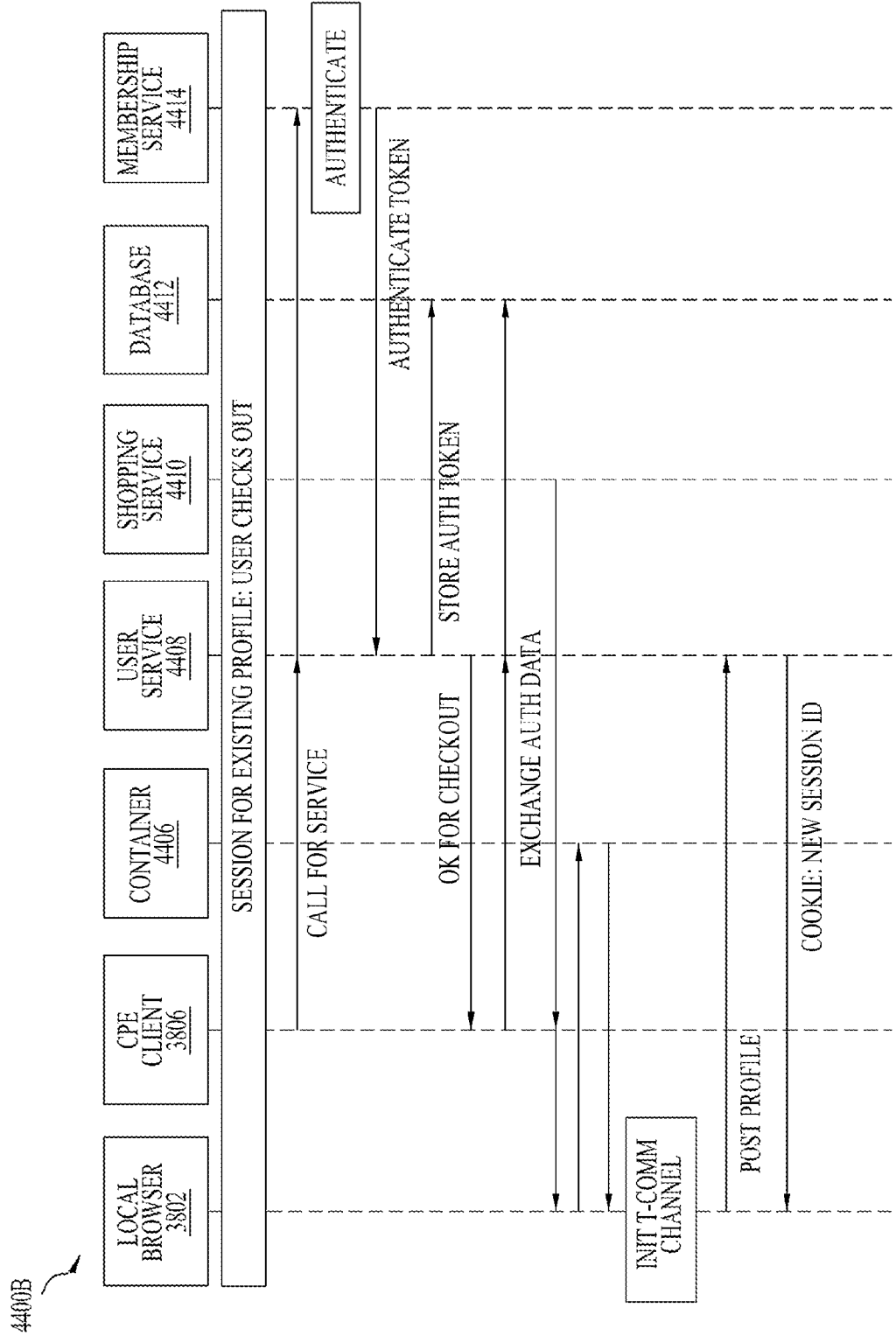
Figure 46:
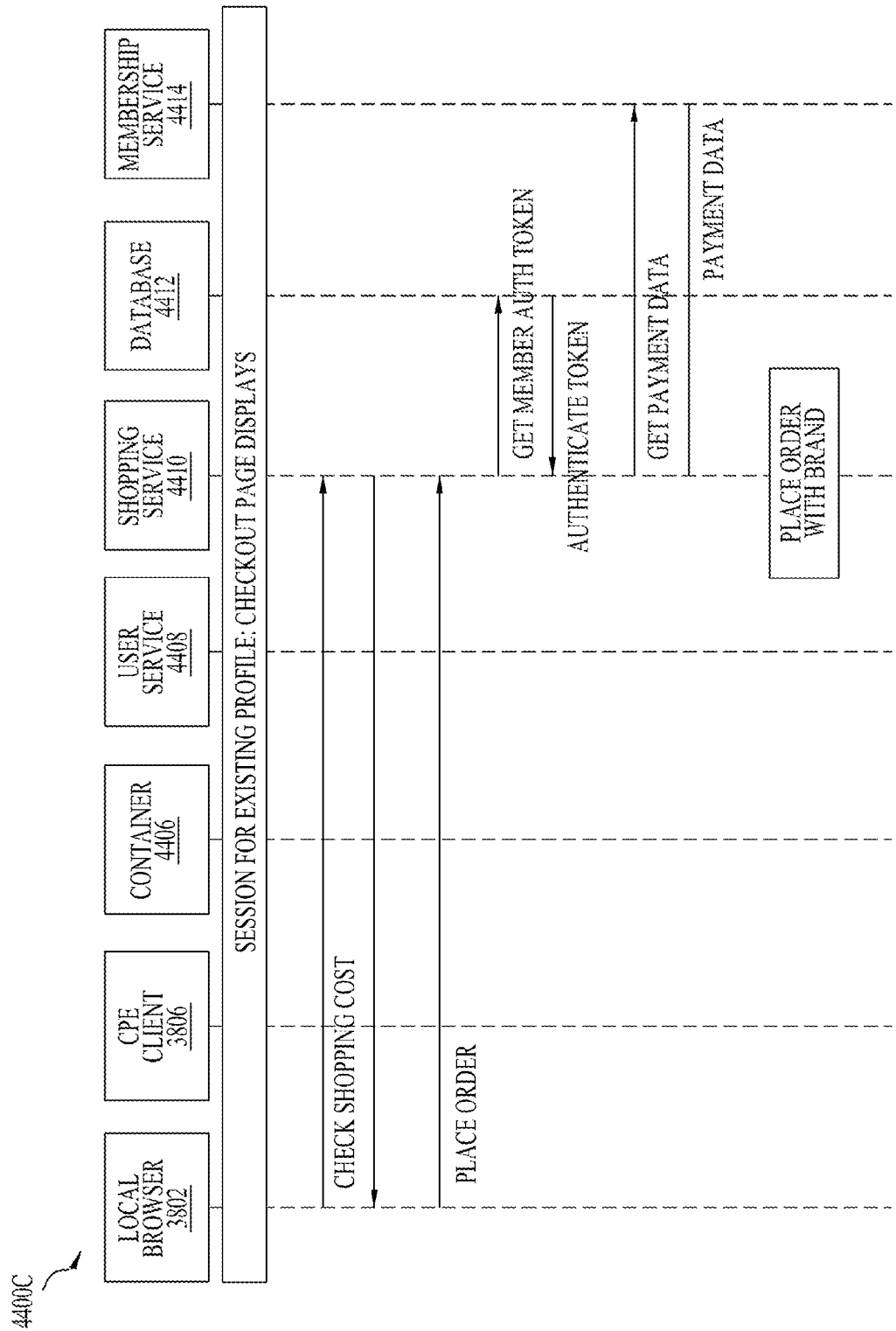
Figure 47:
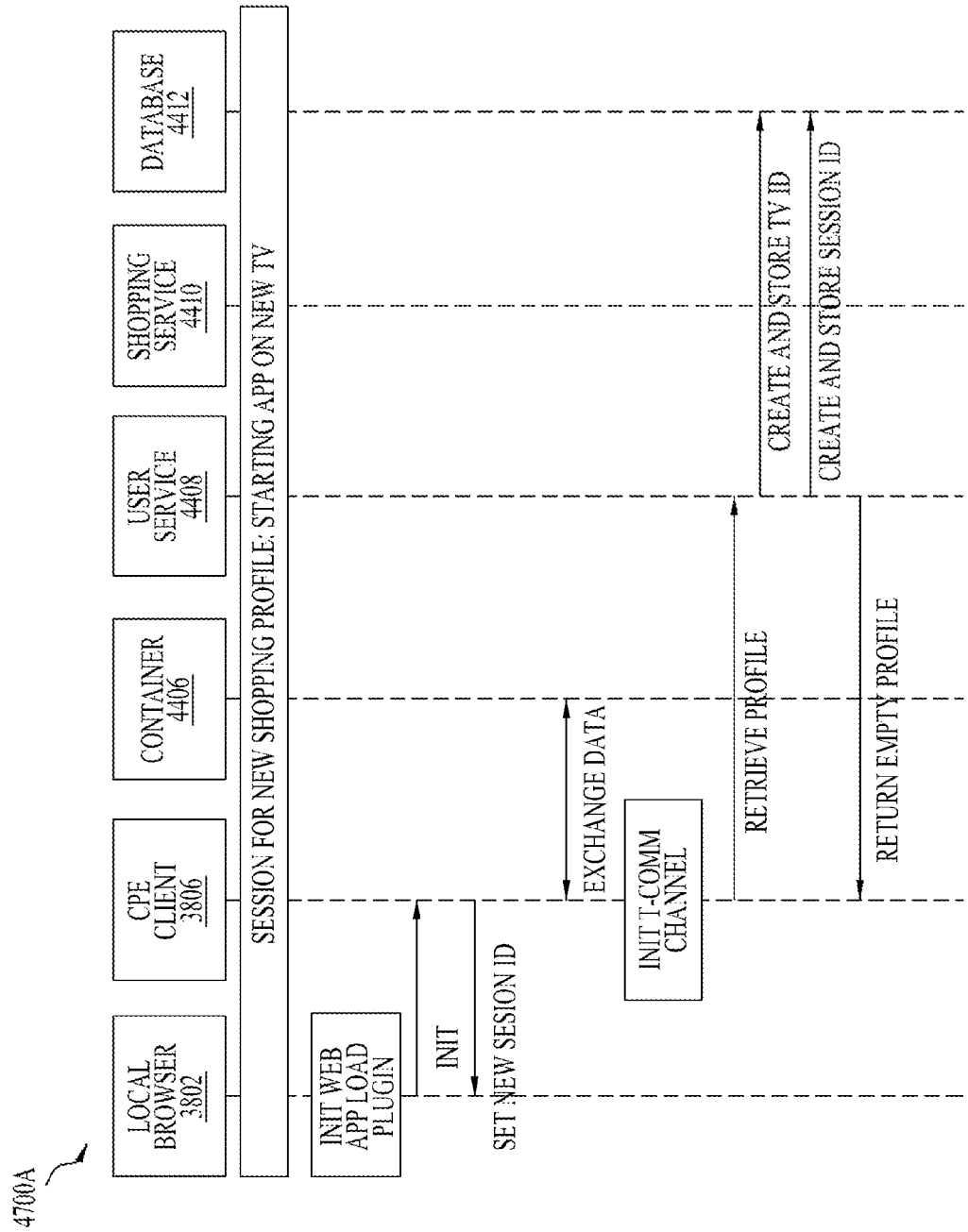
Figure 48:
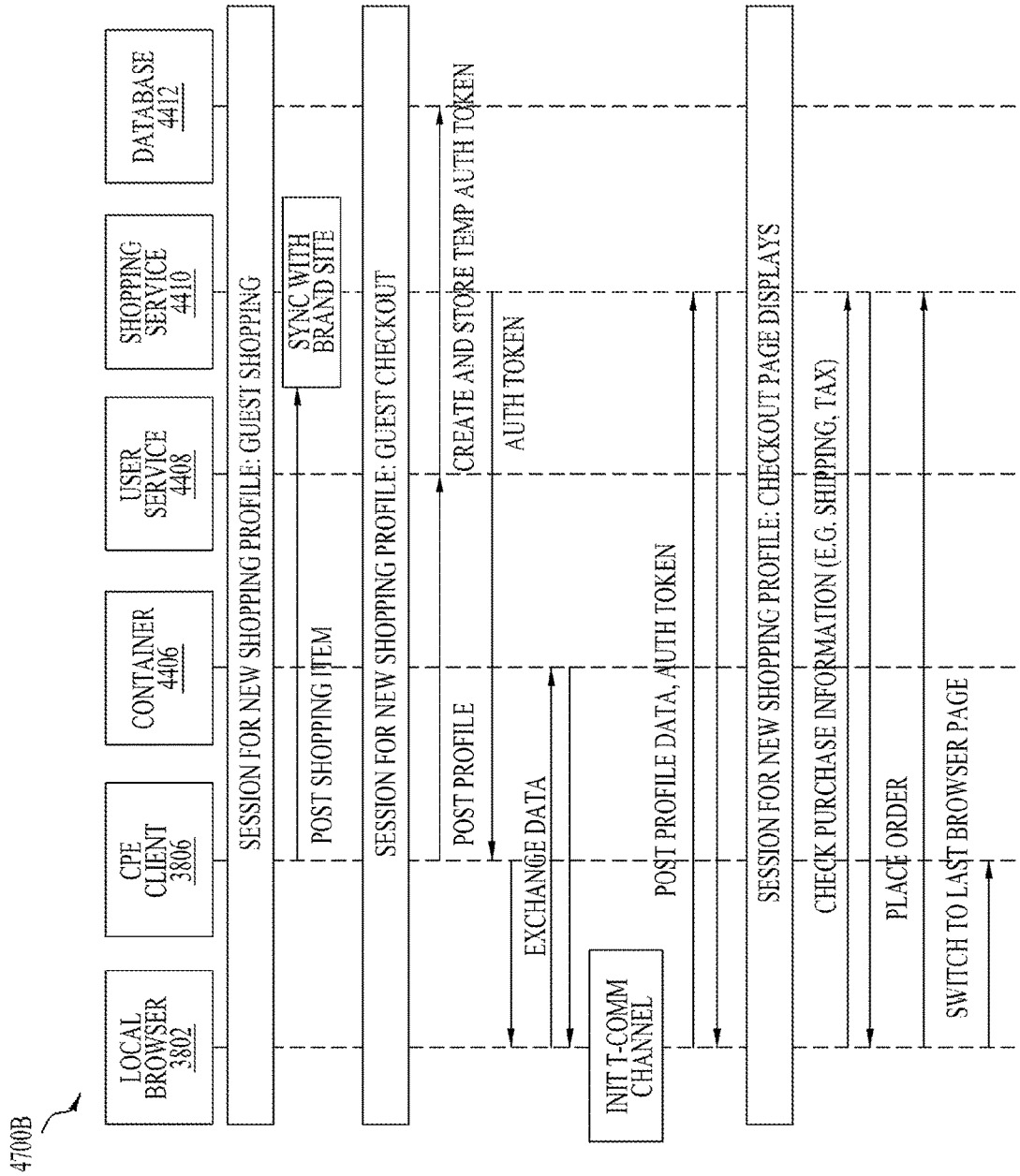

FIGS. 44-46 provide example session sequences 4400A-C for an existing profile, shopping, and checkout between the local browser 3802, cloud-TV client 3806, container 4406, user service 4408, shopping service 4410, database 4412, and membership service 4414. FIG. 44 shows a sequence for when a user starts the application, where membership service is not queried, as no sensitive data is needed. FIG. 45 shows a sequence for when a user checks out, where the checkout is a locked area, so the user must authenticate with their passcode. FIG. 46 shows a sequence for when a checkout page displays, and the user interacts with various checkout screens including selecting an existing saved payment card, and where the user enters the security code for the selected payment card. FIGS. 47-48 provide example session sequences 4700A-B for an existing profile, shopping, and checkout between the local browser 3802, cloud-TV client 3806, container 4406, user service 4408, shopping service 4410, and database 4412. FIG. 47 shows a sequence for when an application is started on a new TV. FIG. 48 shows sequences for when a guest is shopping, a guest is checking out, and for when a checkout page displays. In the sequence for checkout page displays, the user is shown interacting with various checkout screens including payment card entry, and where payment card information is held in application memory, such as until the order has placed.

Figure 49:
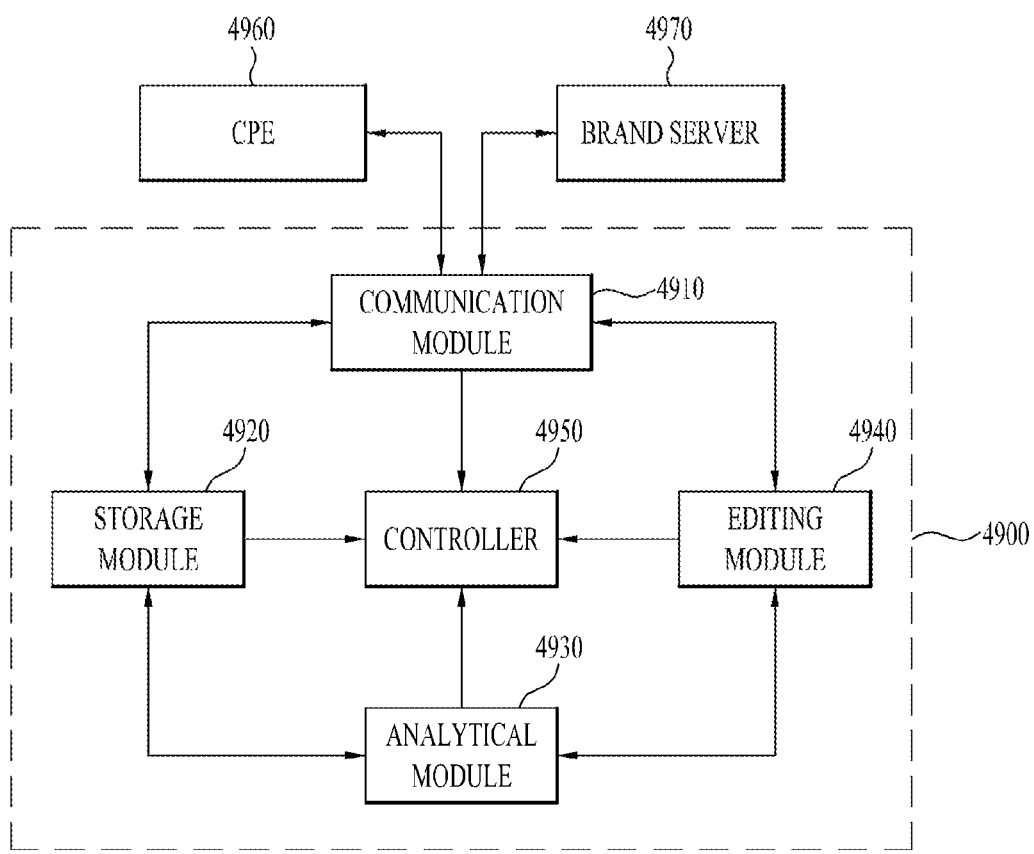
FIG. 49 is a block diagram showing a T-commerce service system 4900 according to the present invention.

FIG. 49 is a block diagram showing a T-commerce service system 4900 according to the present invention.

As shown in FIG. 49, the T-commerce service system 4900 according to the present invention may include a communication module 4910, a storage module 4920, an analytical module 4930, an editorial module 4940 and a controller 4950.

The communication module 4910 may transmit and receive data to and from a CPE 4960 and a brand server 4970.

The storage module 4920 may receive first information from the CPE 4960, receive second information from the brand server 4970, and store third information about user's product purchase received from the CPE 4960. At this time, the first information may include at least one of identification information, device information, location information and purchaser information of the CPE 4960, the second information may include at least one of sales brand information, sales company information, sales product information, sales adverting information and event information of the brand server 4970, and the third information may include at least one of item, price, brand name, category and user's commerce history information of a product purchased via the CPE 4960. At this time, the commerce history information may include at least one of identification information of a user, a per-brand search time of a user, a per-brand search path of a user, a total use time of a multimedia commerce service, purchase performance according to use time and a repurchase time.

Next, the analytical module 4930 may analyze the first, second and third information stored in the storage module 4920 and determine a purchase grade of a user. Here, the analytical module 4930 may include a product purchase information generator, a product purchase power calculator and a purchase grade determination unit.

At this time, the product purchase information generator may generate product purchase information of a user based on at least one of the collected first, second and third information. The product purchase information may include a brand grade, a brand use time of a user and loyalty. Here, in the brand grade, average prices of items provided by brands are calculated, brands are classified according to the calculated average prices and grades are assigned to the classified brands. The loyalty may include a total purchase amount, the total number of times purchased, purchase performance according to use time and a repurchase time.

Next, the product purchase power calculator may assign a weight to the generated product purchase information to calculate a product purchase power. A weight may be assigned to a brand grade if a brand purchased by a user is considered an important element when a purchase grade of a user is determined, a weight is assigned to a brand use time if a brand used for a long time is considered an important time when a user uses a commerce service, and a weight is assigned to loyalty if user purchasing power is considered an important element. Accordingly, the product purchase power calculator may calculate the product purchase power of the user according to the characteristics of the user who uses the multimedia commerce service.

The purchase grade determination unit may determine the purchase grade of the user based on the product purchase power of the user. Accordingly, since the purchase grade of the user is determined by taking into account characteristics of a user who uses a multimedia commerce service, different multimedia commerce services may be provided to users having the same purchase grade.

Subsequently, the editorial module 4940 may edit a browser screen configuration of a multimedia commerce service provided to the CPE 4960 according to the determined purchase grade of the user. Here, the editorial module 4940 may analyze a browser screen of a multimedia commerce service currently provided to the CPE 4960 of the user, whose purchase grade has been determined, checks whether brand information corresponding to the purchase grade of the user is included in the analyzed current browser screen, and edit the currently provided browser screen configuration based on the brand information corresponding to the purchase grade of the user if the brand information corresponding to the purchase grade of the user is included. For example, if the purchase grade of the user is a very important person (VIP), brand information having a grade corresponding to the VIP may be extracted and information about products related to the brand and event information may be provided on the browser screen according to a predetermined browser screen configuration. The browser screen configuration may be previously set and stored according to the purchase grade of the user or may be periodically updated according to circumstance.

The editorial module 4940 may request and acquire brand information corresponding to the purchase grade of the user from the brand server 4970 when the brand information corresponding to the purchase grade of the user is not included in the browser screen of the multimedia commerce service currently provided to the CPE 4960 of the user.

In some cases, after the currently provided browser screen configuration has been edited, the editorial module 4940 may acquire device information of the CPE 4960 of the user, whose purchase grade has been determined, and reedit the browser screen configuration according to the device information. For example, the editorial module 4940 may acquire device information of the CPE 4960, for example, information related to the specifications of a device product, such as a panel size, function or supported applications. Accordingly, the editorial module 4940 may acquire performance information of the CPE 4960 of the user so as to configure a browser screen corresponding thereto. For example, when the CPE 4960 supports three-dimensional (3D) images, the brand server 4970 can provide various 3D moving images on the browser screen so as to provide interest and convenience to the user, thereby increasing use of the multimedia commerce service.

Alternatively, after the currently provided browser screen configuration has been edited, the editorial module 4940 may acquire location information of the CPE 4960 of the user, whose purchase grade has been determined, and reedit the browser screen configuration according to the location information of the CPE 4960. For example, the editorial module 4940 may acquire the location information of the CPE 4960, for example, information about a purchaser who has purchased the CPE 4960 and the location information of an area in which the CPE 4960 is mounted. Accordingly, the editorial module 4940 may acquire the location information of the CPE 4960 of the user so as to configure the browser screen corresponding thereto. For example, when the CPE 4960 is located in Africa, since it may be estimated that the user who uses the multimedia service is located in Africa, it is possible to edit brands and the items thereof provided on the browser screen according to the regional characteristics and climatic characteristics of Africa and to provide a variety of event information corresponding thereto.

Next, the controller 4950 may control the communication module 4910, the storage module 4920, the analytical module 4930 and the editorial module 4940 to provide the edited browser screen to the corresponding CPE 4960 according to the purchase grade of the user. Here, the controller 4950 may analyze the browser screen of the multimedia commerce service currently provided to the CPE 4960 of the user, whose purchase grade has been determined, checks whether brand information corresponding to the purchase grade of the user is included in the analyzed current browser screen, and edit the currently provided browser screen configuration based on the brand information corresponding to the purchase grade of the user if the brand information corresponding to the purchase grade of the user is included. In addition, the controller 4950 may acquire the device information of the CPE 4960 of the user, whose purchase grade has been determined, and reedit the browser screen configuration according to the device information. In some cases, the controller 4950 may acquire the location information of the CPE 4960 of the user, whose purchase grade has been determined, and reedit the browser screen configuration according to the location information of the CPE 4960.

Figure 50:
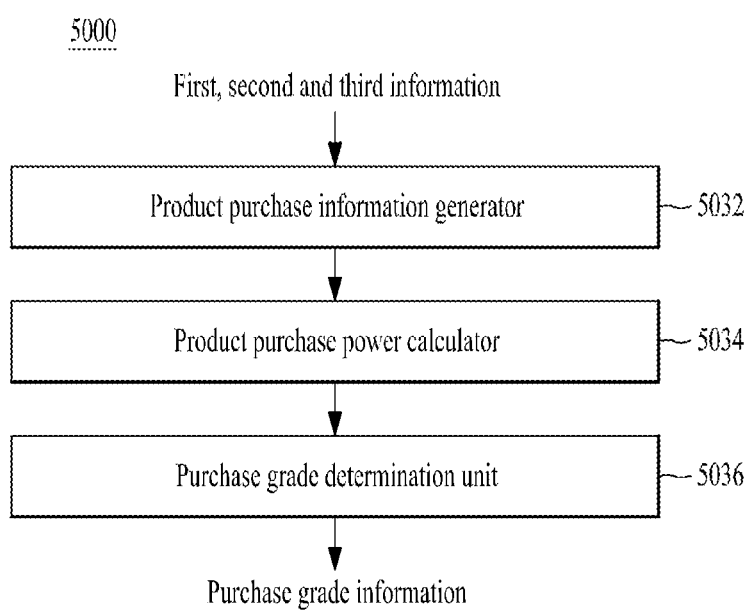
FIG. 50 is a block diagram showing the analytical module of FIG. 49 in detail.

FIG. 50 is a block diagram showing the analytical module of FIG. 49 in detail.

As shown in FIG. 50, the analytical module 4930 may analyze the first, second and third information stored in the storage module to determine the purchase grade of the user. Here, the analytical module 4930 may include a product purchase information generator 4932, a product purchase power calculator 4934 and a purchase grade determination unit 4936.

At this time, the product purchase information generator 4932 may generate product purchase information based on at least one of the collected first, second and third information. The product purchase information may include a brand grade, a brand use time of a user, and loyalty. Here, in the brand grade, average prices of items provided by brands are calculated, brands are classified according to the calculated average prices and grades are assigned to the classified brands. The loyalty may include a total purchase amount, the total number of times of purchase, purchase performance according to use time and a repurchase time.

Next, the product purchase power calculator 4934 may assign a weight to the generated product purchase information to calculate a product purchase power. A weight may be assigned to a brand grade if a brand product purchased by a user is considered an important element when a purchase grade of a user is determined, a weight is assigned to a brand use time if a brand used for a long time is considered an important time when a user uses a commerce service, and a weight is assigned to loyalty if user purchasing power is considered an important element. Accordingly, the product purchase power calculator 4934 may calculate the product purchase power of the user according to the characteristics of the user who uses the multimedia commerce service.

The purchase grade determination unit 4936 may determine the purchase grade of the user based on the product purchase power of the user. Accordingly, since the purchase grade of the user is determined by taking into account characteristics of a user who uses a multimedia commerce service, different multimedia commerce services may be provided to users having the same purchase grade.

Figure 51A:
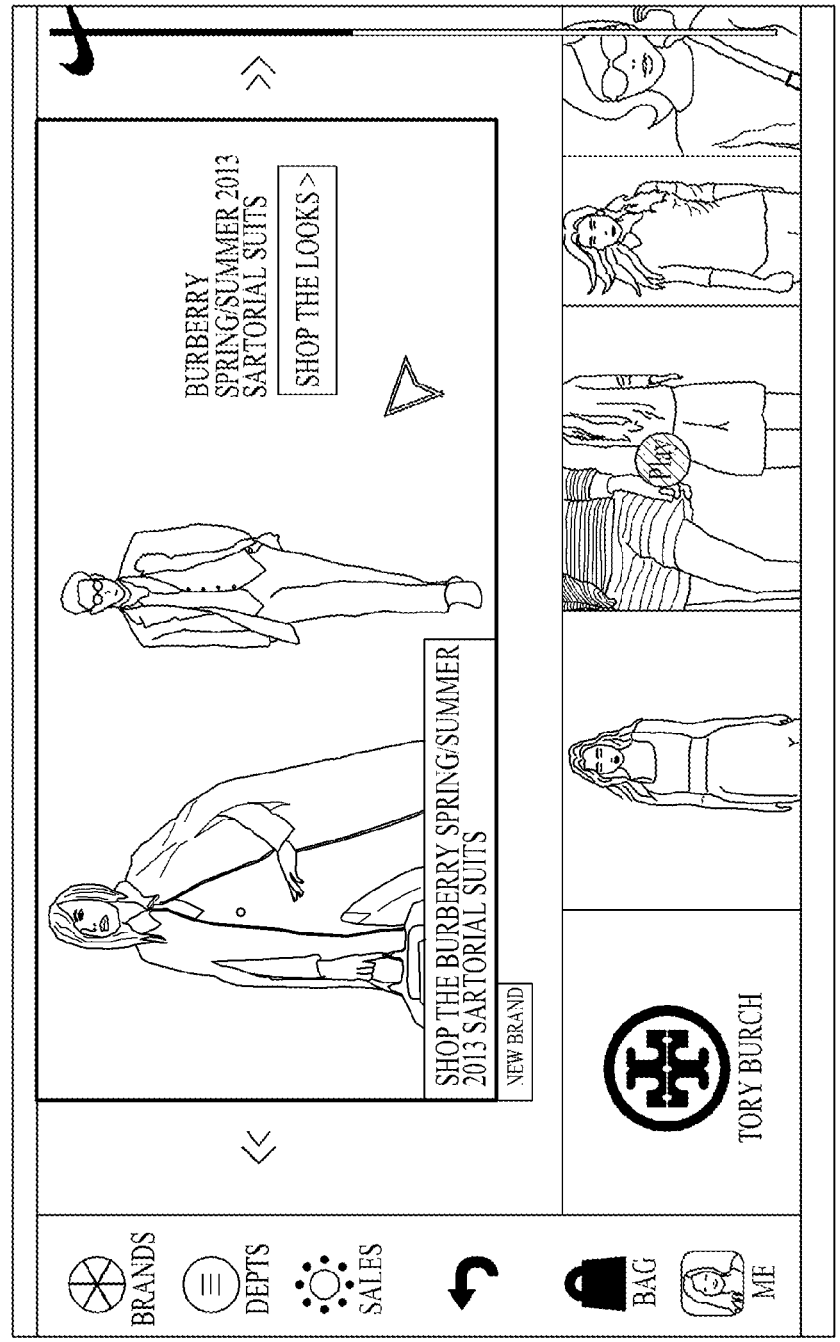
FIGS. 51a to 51c show a first embodiment of a browser screen edited by the editorial module of FIG. 49.
Figure 51B:
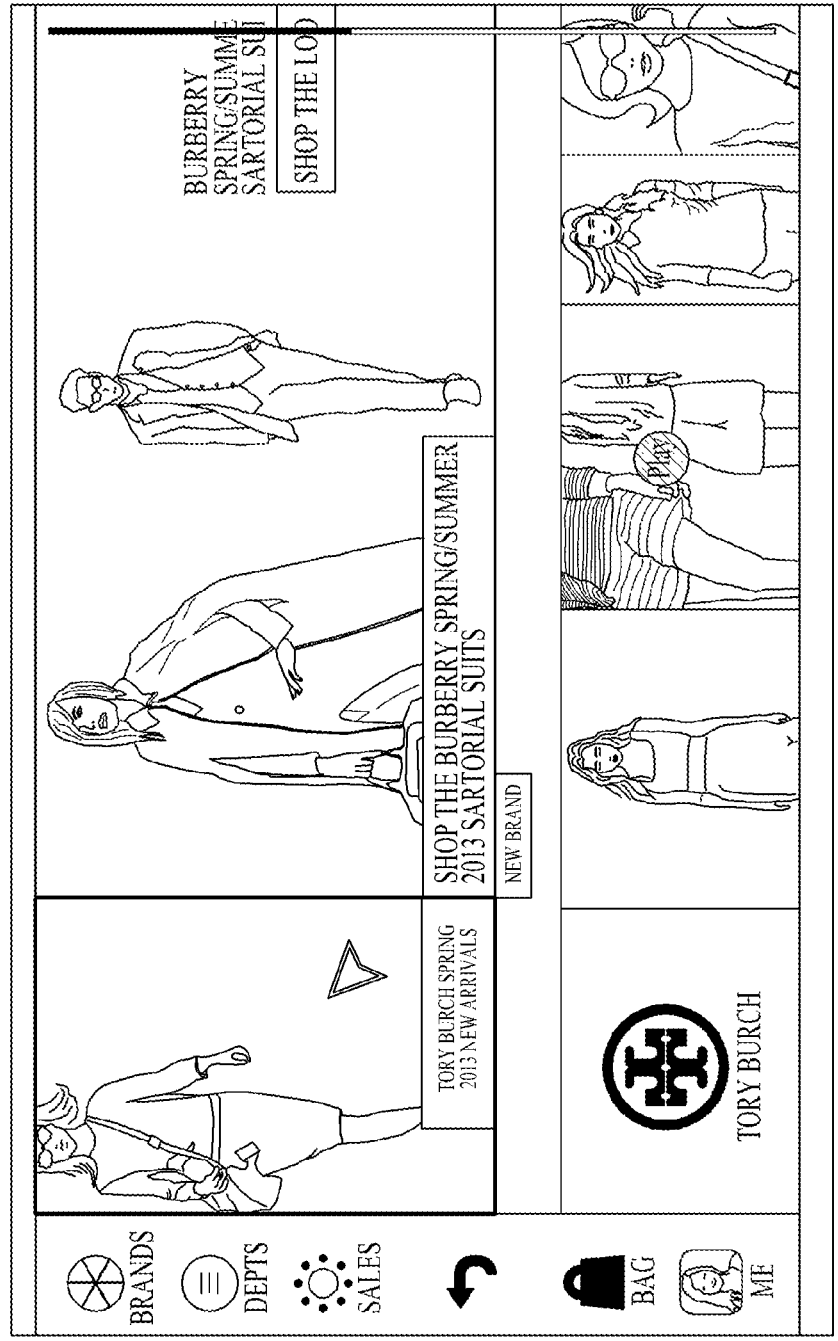
Figure 51C:
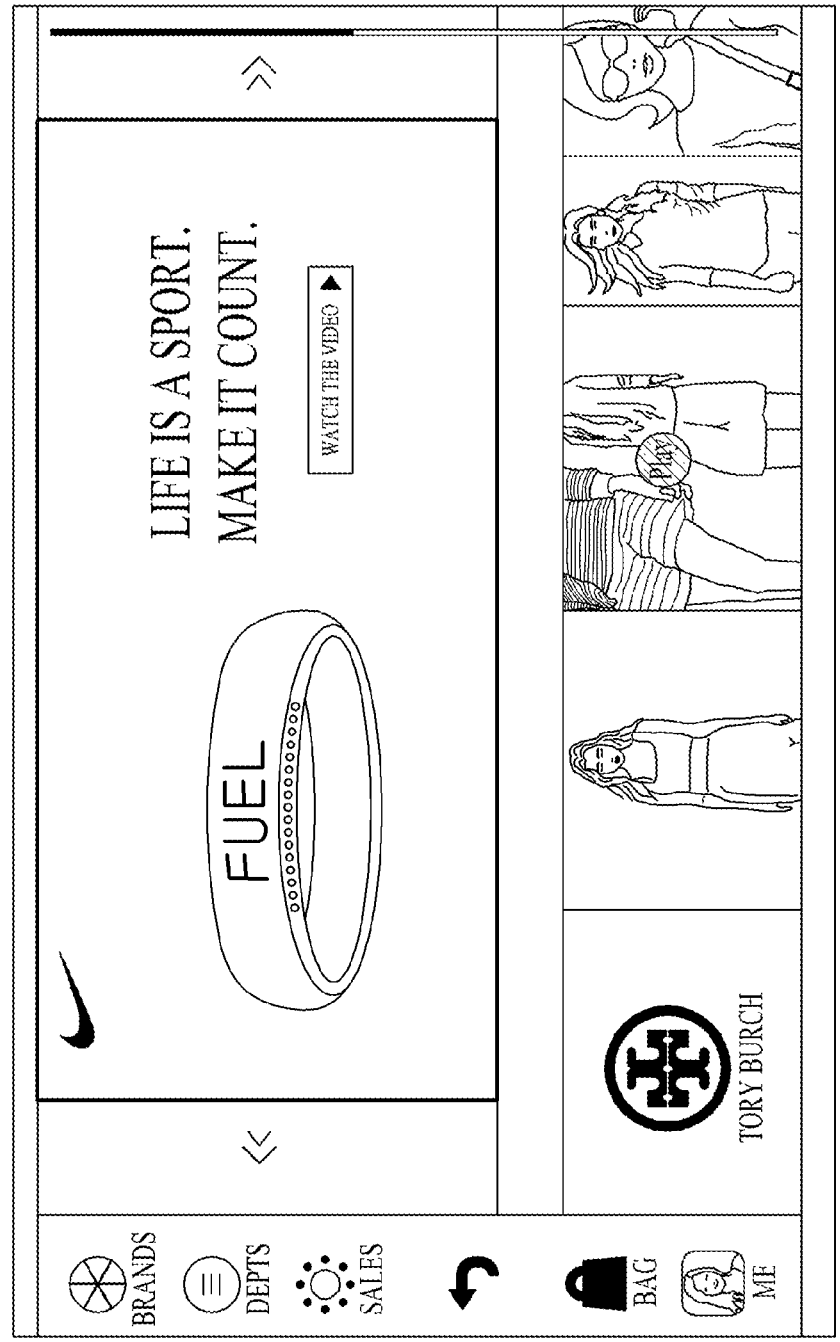

FIGS. 51*a* to 51*c* show a first embodiment of a browser screen edited by the editorial module of FIG. 49, FIGS. 52*a* to 52*c* show a second embodiment of a browser screen edited by the editorial module of FIG. 49 and FIGS. 53*a* to 53*c* show a third embodiment of a browser screen edited by the editorial module of FIG. 49.

The editorial module may edit a browser screen configuration of a multimedia commerce service provided to the CPE according to the determined purchase grade of the user. Here, the editorial module may analyze a browser screen of a multimedia commerce service currently provided to the CPE of the user, whose purchase grade has been determined, checks whether brand information corresponding to the purchase grade of the user is included in the analyzed current browser screen, and edit the currently provided browser screen configuration based on the brand information corresponding to the purchase grade of the user if the brand information corresponding to the purchase grade of the user is included.

As shown in FIGS. 51*a* to 51*c*, if the purchase grade of the user is a VIP, the editorial module may extract a browser screen configuration frame from the storage module according to the purchase grade of the user, acquire recent product information, sales product information and event information from brands Burberry, Tory Burch, Nike, etc. which have the grade corresponding to the VIP, and provide product information and event information related to the brands on the browser screen. The browser screen configuration frame may be previously set and stored according to the purchase grade of the user or may be periodically updated according to circumstance.

The editorial module may request and acquire brand information corresponding to the purchase grade of the user from the brand server when the brand information corresponding to the purchase grade of the user is not included in the browser screen of the multimedia commerce service currently provided to the CPE of the user.

Figure 52A:
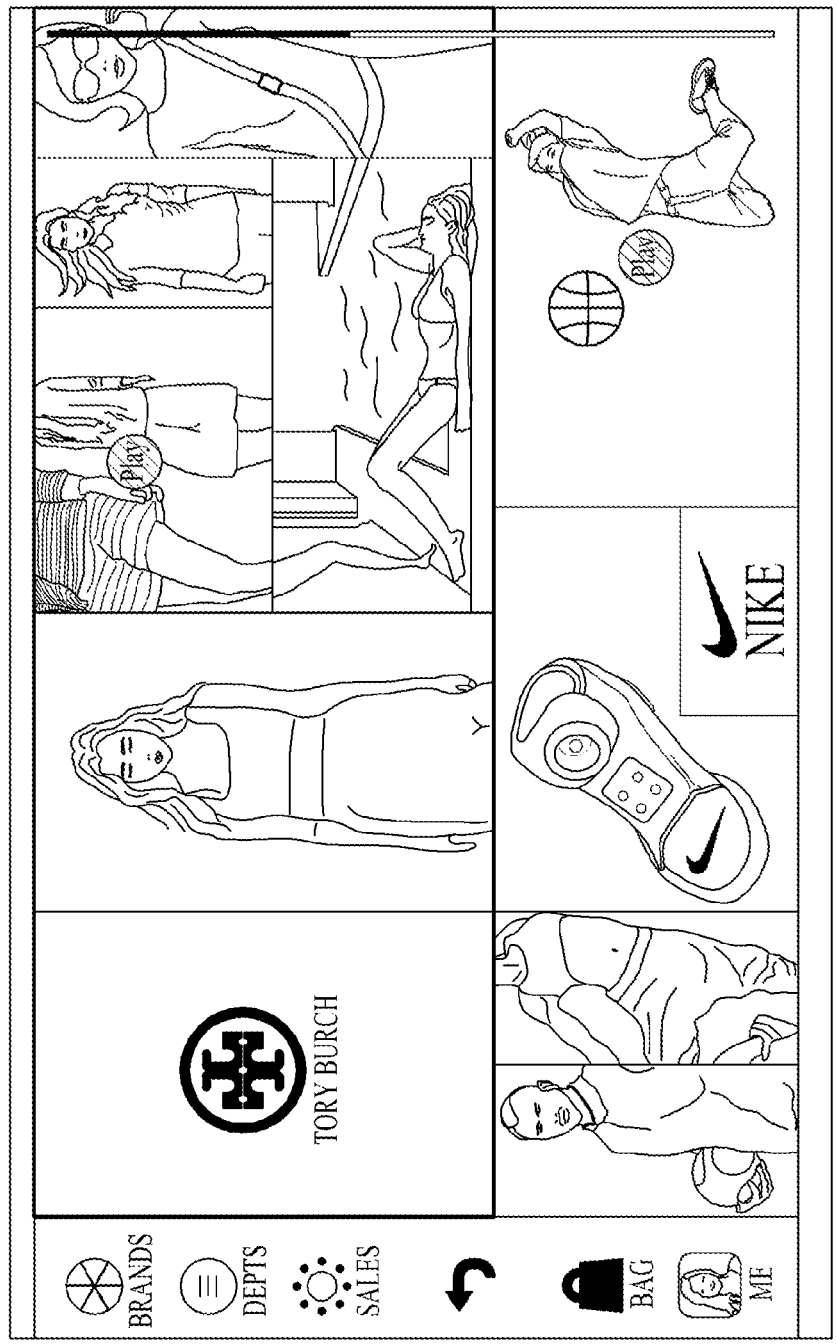
FIGS. 52a to 52c show a second embodiment of a browser screen edited by the editorial module of FIG. 49.
Figure 52B:
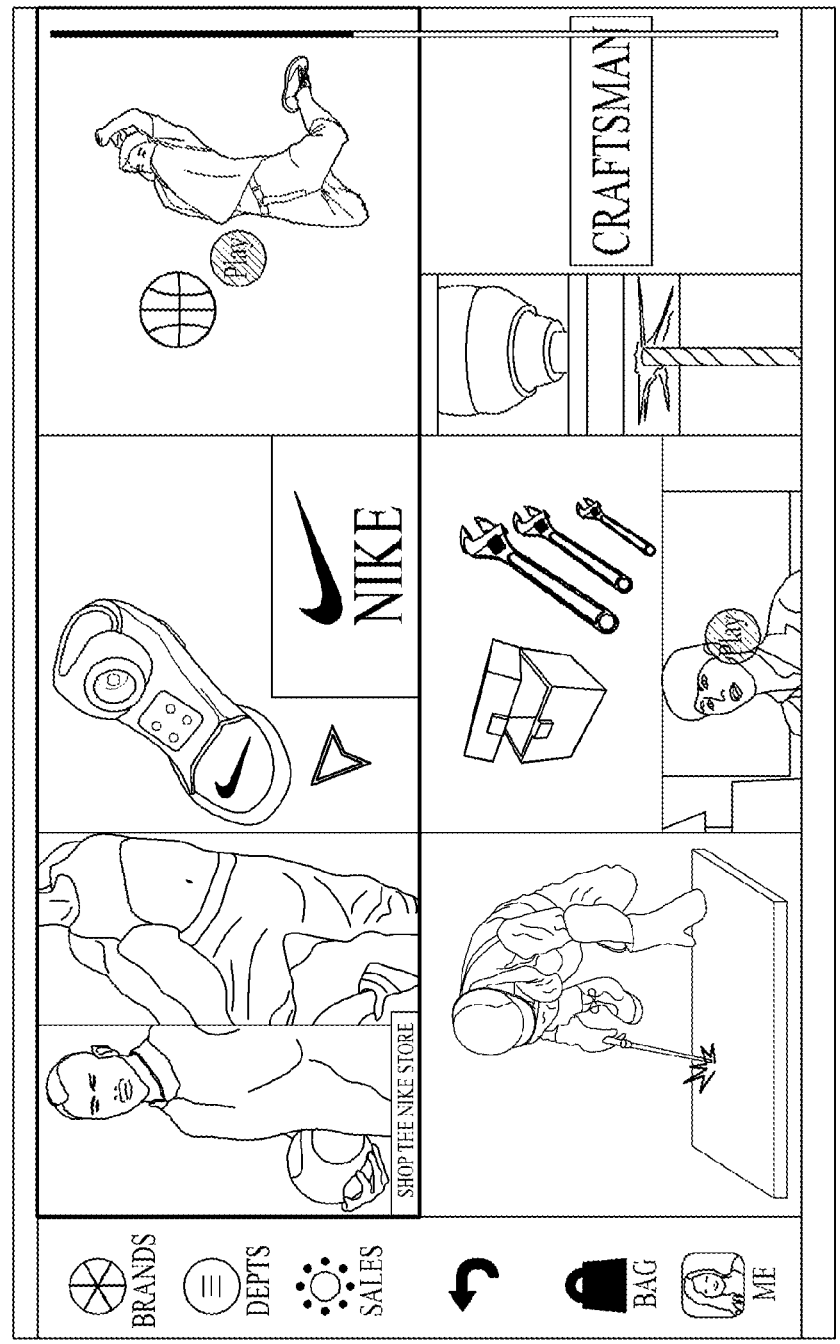
Figure 52C:
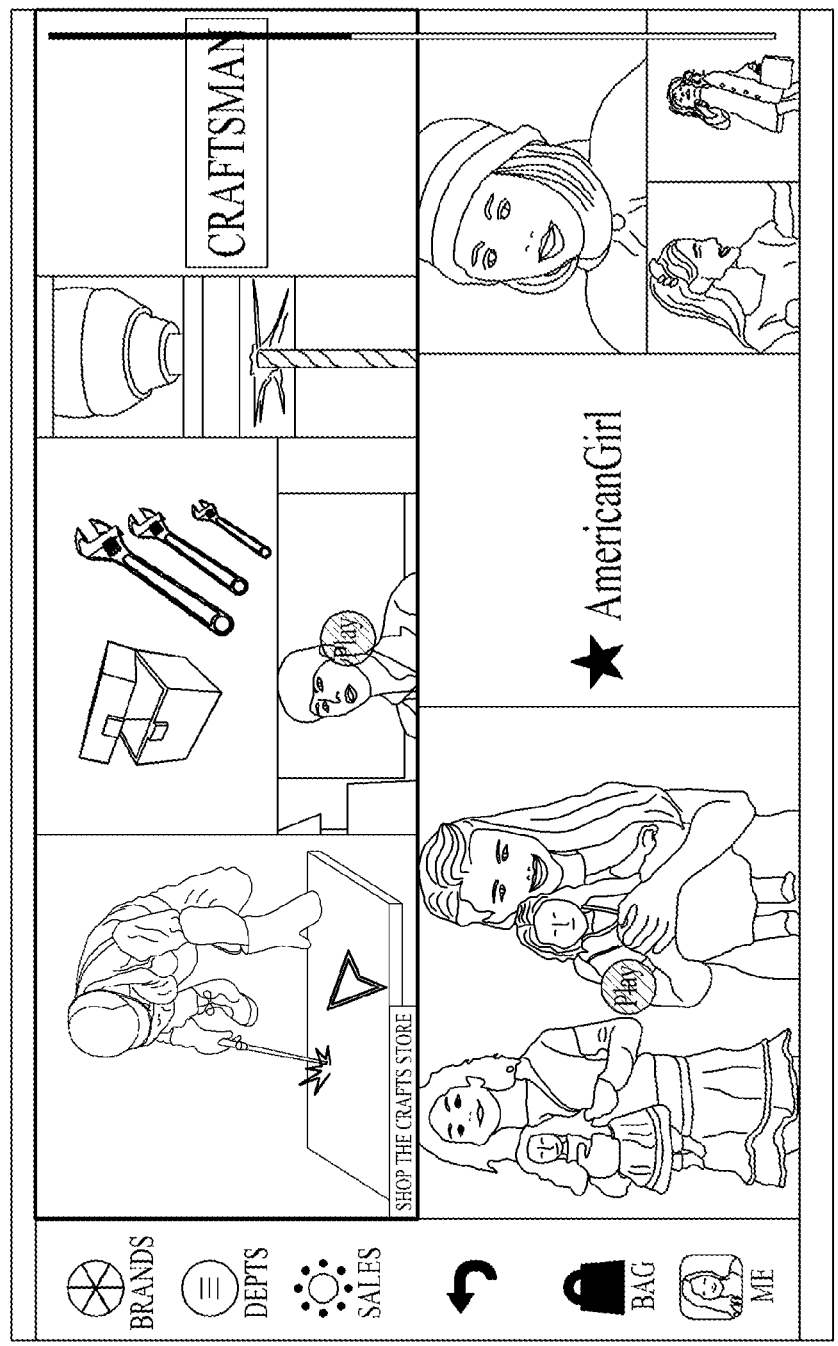
Figure 53A:
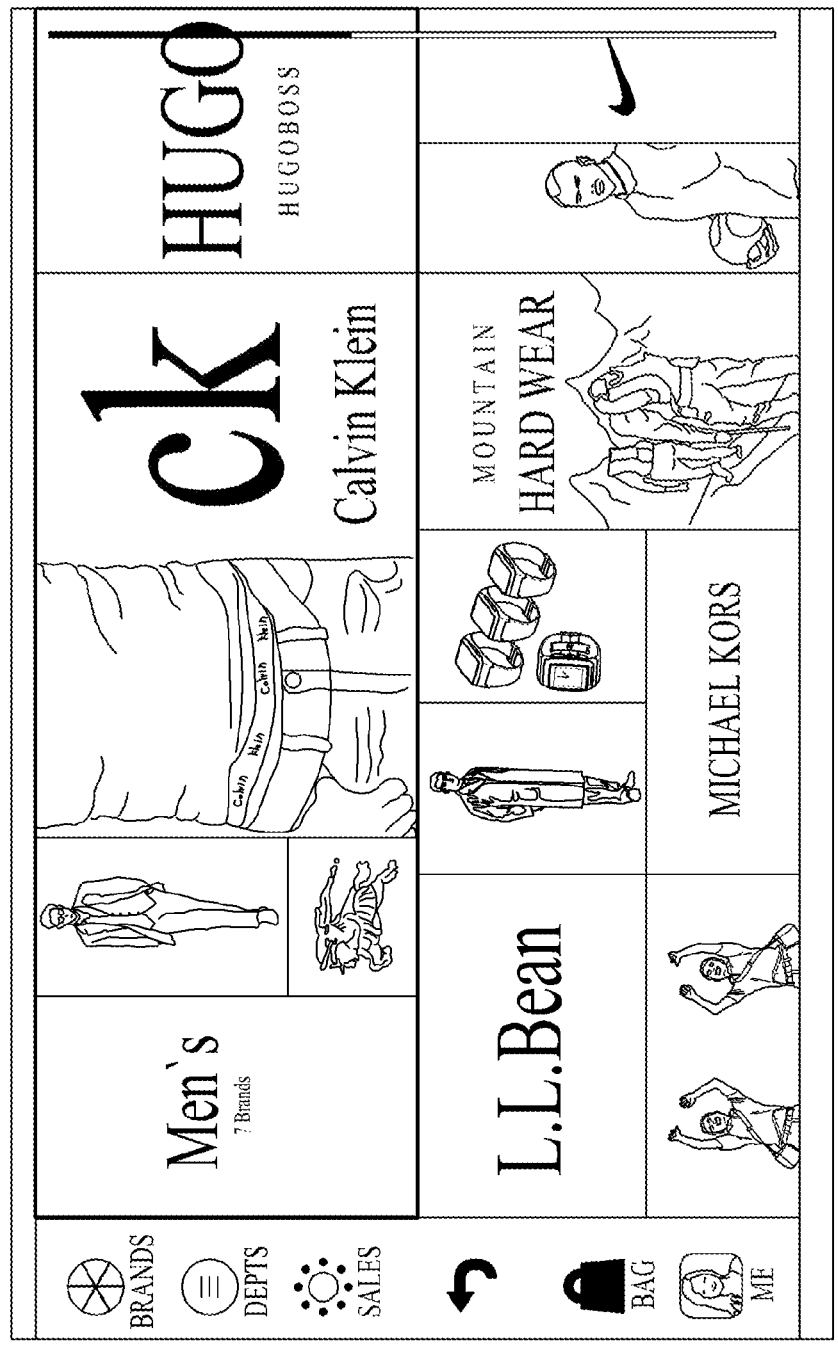
Figure 53B:
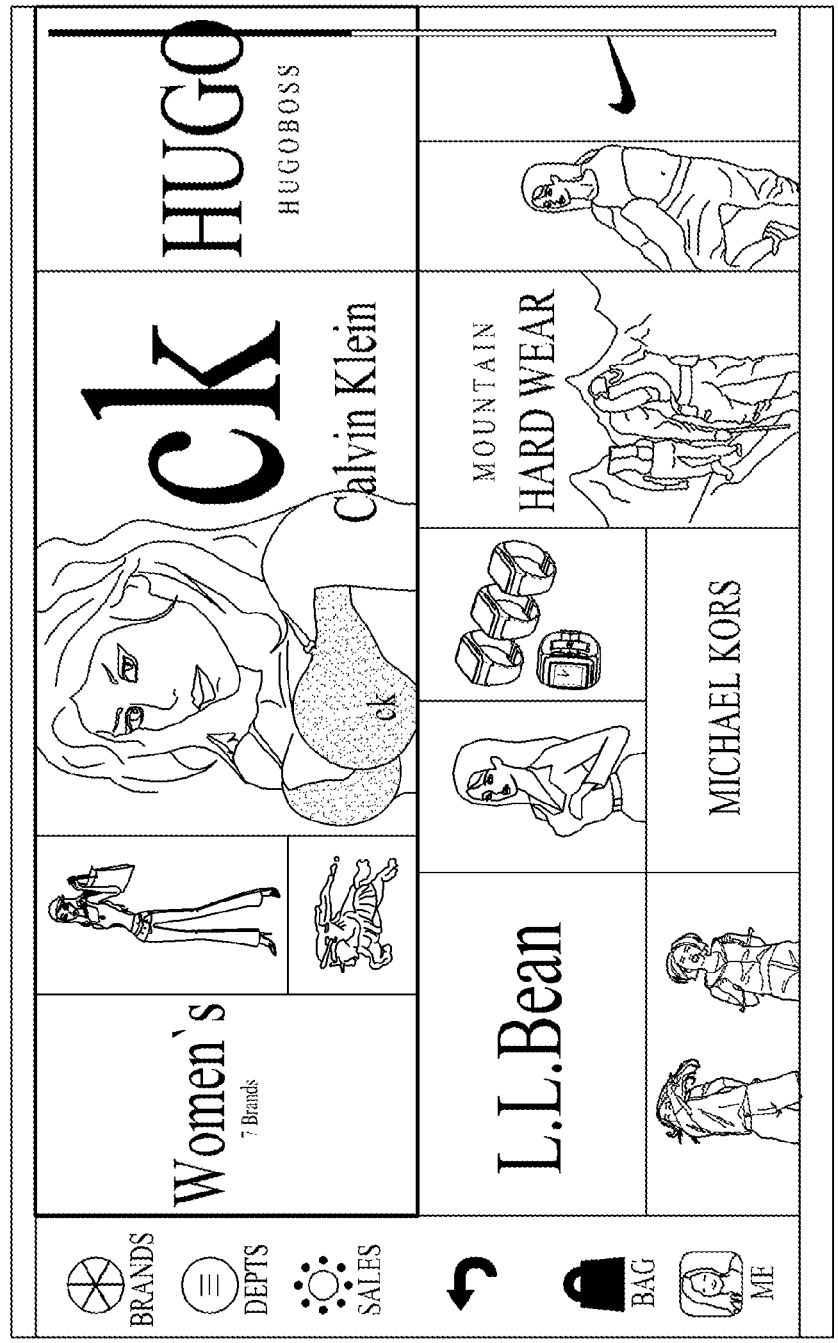

In addition, the editorial module may edit recent products of each brand as shown in FIGS. 51*a* to 51*c*, edit sales products according to brand as shown in FIGS. 52*a* to 52*c* or edit sales products of each brand according to category such as gender or age as shown in FIGS. 53*a* to 53*c*.

In some cases, the editorial module may configure a browser screen based on performance information of the CPE of the user. For example, when the CPE may support 3D images, the brand server can provide various 3D moving images on the browser screen so as to provide interest and convenience to the user, thereby increasing use of the multimedia commerce service.

Alternatively, the editorial module may configure a browser screen based on location information of the CPE of the user. For example, when the CPE is located in Africa, it is possible to edit summer wardrobe as brands and the items thereof provided on the browser screen according to the regional characteristics and climatic characteristics of Africa and to provide a variety of event information corresponding thereto.

Figure 54:
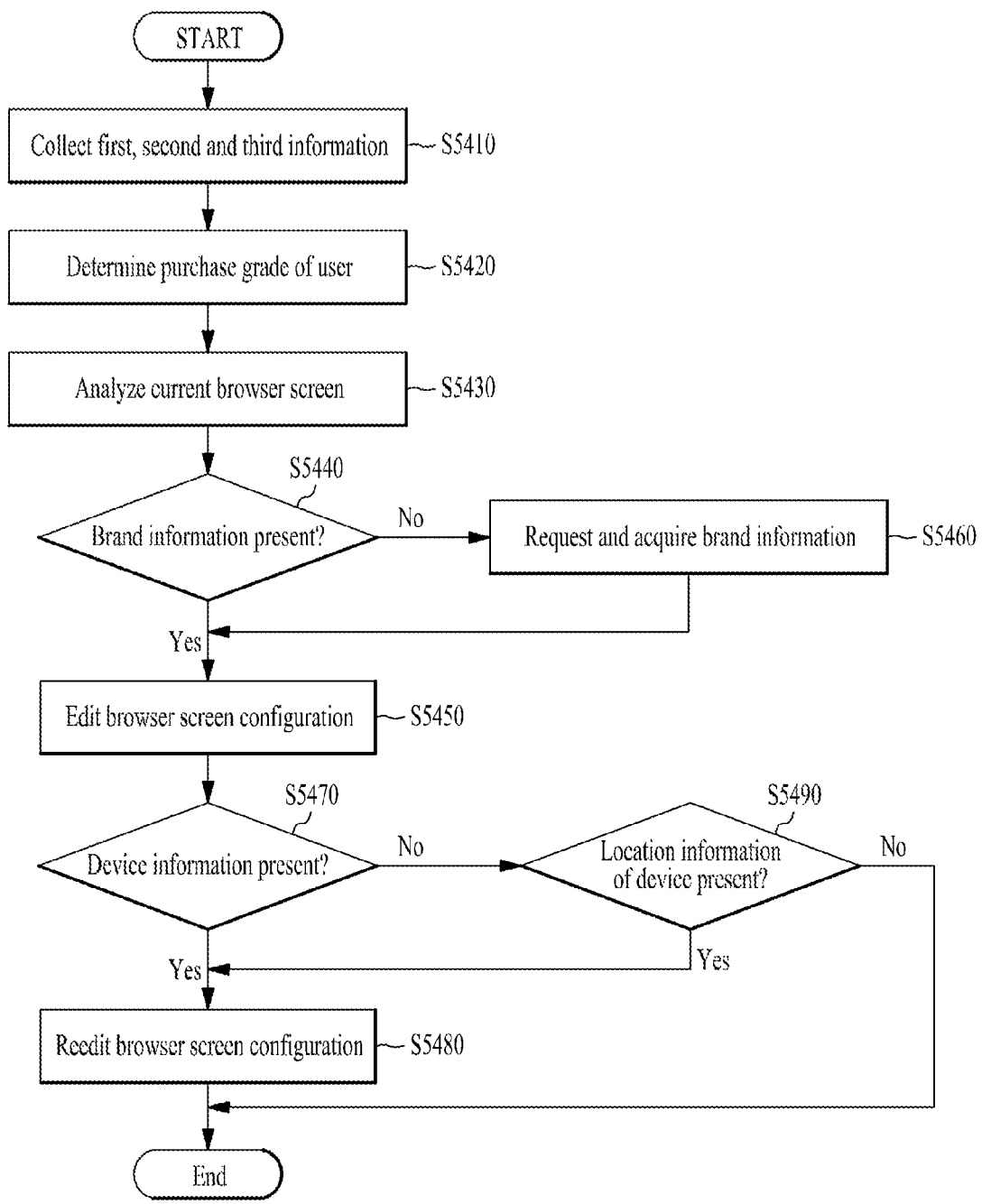
FIG. 54 is a flowchart illustrating a service processing method of a multimedia commerce service system of FIG. 49.

FIG. 54 is a flowchart illustrating a service processing method of a multimedia commerce service system of FIG. 49.

As shown in FIG. 54, the multimedia commerce service system collects first information of the CPE using the multimedia commerce service. In addition, the multimedia commerce service system collects second information from the brand server using the multimedia commerce service and collects third information of the product purchase of the user from the CPE (S10).

Here, the first information may include at least one of identification information, device information, location information and purchaser information of the CPE, the second information may include at least one of sales brand information, sales company information, sales product information, sales adverting information and event information of the brand server, and the third information may include at least one of item, price, brand name, category and user's commerce history information of a product purchased via the CPE. At this time, the commerce history information may include at least one of identification information of a user, a per-brand search time of a user, a per-brand search path of a user, a total use time of a multimedia commerce service, purchase performance according to use time and a repurchase time.

Subsequently, the multimedia commerce service system may analyze the collected first, second and third information and determine a purchase grade of a user. Determining the purchase grade of the user may include generating product purchase information of a user based on at least one of the collected first, second and third information, assigning a weight to the generated product purchase information to calculate a product purchase power and determining the purchase grade of the user based on the product purchase power. The product purchase information may include a brand grade, a brand use time of a user and loyalty. In the brand grade, average prices of items provided by brands are calculated, brands are classified according to the calculated average prices and grades are assigned to the classified brands. The loyalty may include a total purchase amount, the total number of times of purchase, purchase performance according to use time and a repurchase time.

The multimedia commerce service system analyzes the browser screen of the multimedia commerce service currently provided to the CPE of the user, whose purchase grade has been determined (S30).

Subsequently, whether brand information corresponding to the purchase grade of the user is included in the analyzed browser screen is checked (S40).

When the brand information corresponding to the purchase grade of the user is included, the currently provided browser screen configuration may be edited based on the brand information corresponding to the purchase grade of the user (S50).

Here, when the brand information corresponding to the purchase grade of the user is not included, the brand information corresponding to the purchase grade of the user may be acquired from the brand server (S60).

After the step of editing the currently provided browser screen configuration, the multimedia commerce service system may check whether device information of the CPE of the user is present, whose purchase grade has been determined (S70).

When the device information of the CPE of the user is present, the device information may be acquired and the browser screen configuration may be reedited according to the acquired device information (S80).

When the device information of the CPE of the user is not present, whether location information of the CPE of the user, whose purchase grade has been determined, is present is checked (S90).

When the location information of the CPE of the user is present, the location information of the CPE may be acquired and the browser screen configuration may be reedited according to the acquired location information of the CPE (S80).

According to one embodiment of the present invention, the commerce service varies according to a purchase grade of a customer or a living environment of a customer, thereby increasing user convenience.

Hereinafter, a payment processor of the above-described T-commerce service system and a T-commerce service processing method will be described in greater detail.

Electronic payment occupies an important part in an e-commerce system. An electronic payment system enables online financial transactions between a seller and a buyer. Content for transactions may be a general financial means such as an encrypted credit card number. A consumer web browser sends a payment command to a seller such as a brand for a T-commerce service and the seller sends the payment command to a network bank. The network bank performs an authentication procedure of the payment command to check personal information and provides a payment amount to the seller. Thereafter, the seller sends a purchased product when consumer information is checked.

In the electronic payment system, a security issue has arisen because hacking has increased as online electronic payment has been increased. Accordingly, in order to ensure secure electronic payment related to a T-commerce service, the following process may be performed. At this time, secure electronic payment may be made before a product or a service is actually provided. First, a consumer stably provides credit card information to a seller. The seller sends credit card payment information and digital signature to a credit card payment processor. A payment processing party sends the above information to a consumer financial institution for payment authorization. The financial institution confirms and certifies the received information and returns a response including credit card approval to the seller.

The payment process in the T-commerce system according to the present invention will be performed using the following method.

In a first embodiment, payment information of a user is pre-stored in a T-commerce channel processor and then payment is made according to a user request for purchase.

In a second embodiment, when a T-commerce channel processor generates and provides a unified user interface to a CPE, a user inputs payment information via the provided unified user interface. The input payment information of the user is sent to a brand channel processor via the T-commerce channel processor and the brand channel processor communicates with a predetermined payment processor to make payment.

First, the payment processing method according to the first embodiment will be described.

Figure 55:
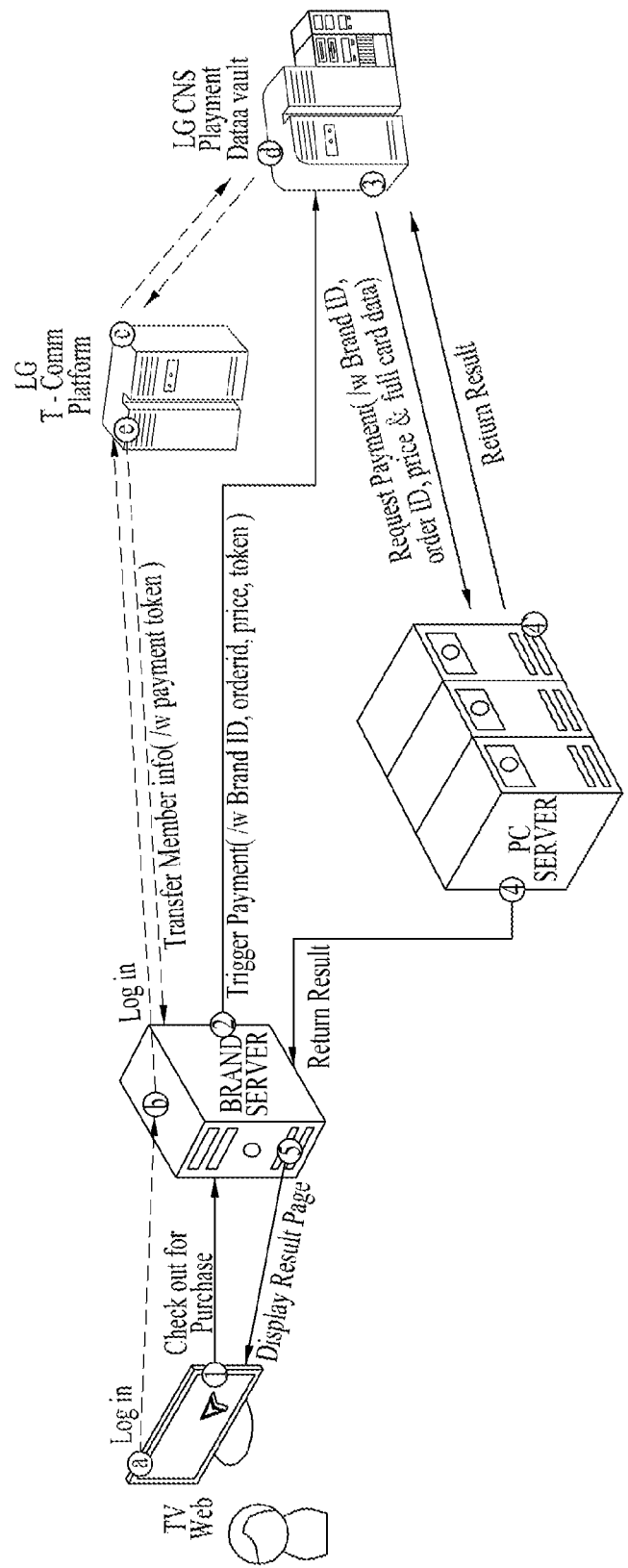
FIG. 55 is a block diagram of a payment process according to one embodiment of the present invention.
Figure 56:
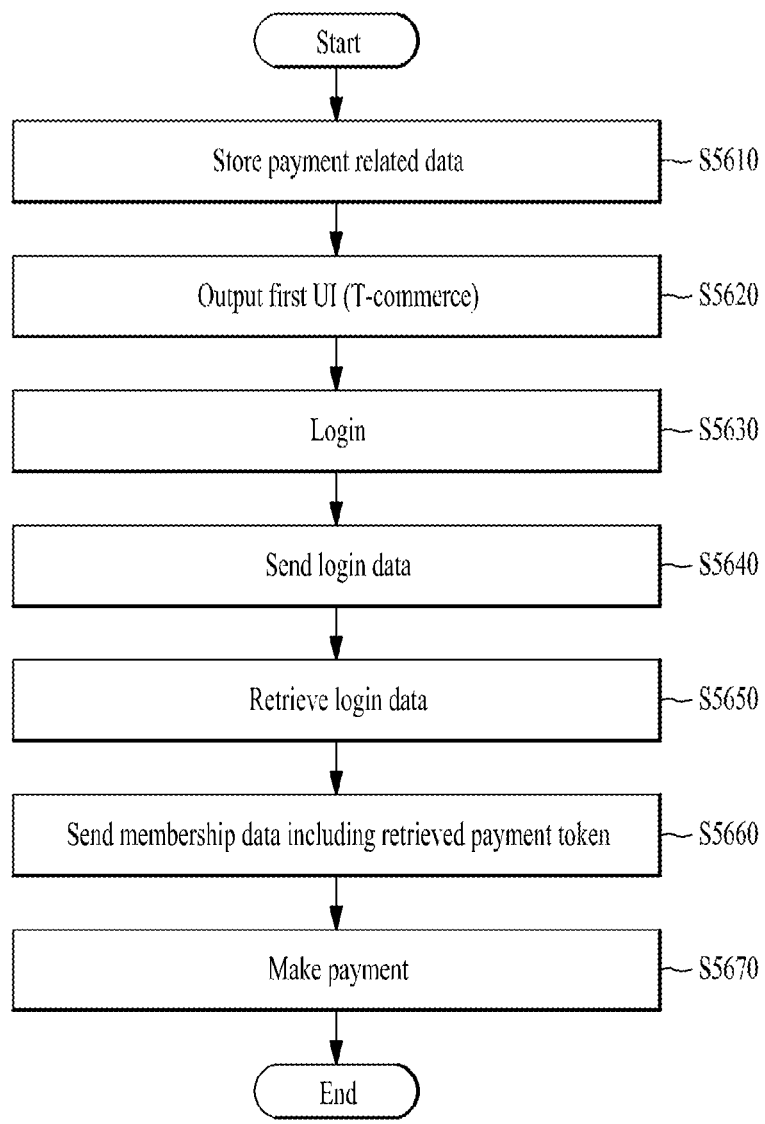
FIGS. 56 and 57 are flowcharts illustrating a payment processing method according to one embodiment of the present invention.
Figure 57:
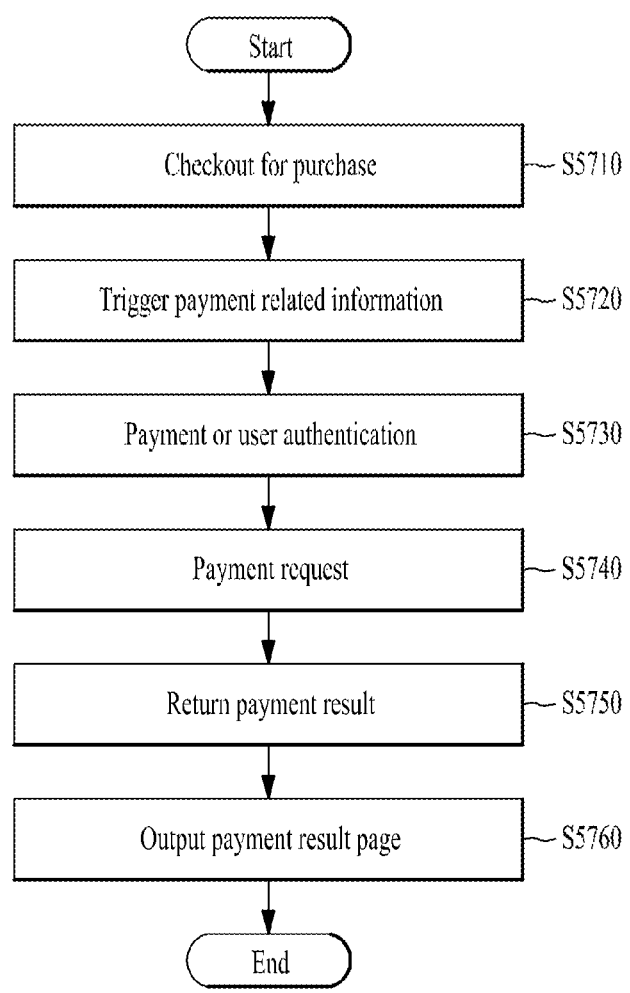

FIG. 55 is a block diagram of a payment process according to one embodiment of the present invention and FIGS. 56 and 57 are flowcharts illustrating a payment processing method according to one embodiment of the present invention.

Referring to FIG. 55, a configuration block supporting a payment process in a T-commerce system includes a CPE 5510, a brand channel processor 5520, a T-commerce channel processor 5530 and a payment processor 5540.

The T-commerce channel processor 5530 may include a T-commerce service information processor 5532 and a payment information processor 5534. The T-commerce service information processor 5532 corresponds to at least one of the above-described first and second processors and the payment information processor 5534 may correspond to the third processor.

Hereinafter, the functions of the components related to the payment process will be focused upon. For the other functions of the components, refer to the above description of the present specification and a detailed description thereof will be omitted herein.

The CPE 5510 outputs various UIs/UXs for the T-commerce service generated by the T-commerce channel processor. Here, the CPE 5510 provides the T-commerce service via a remote browser, not via an embedded browser. That is, the CPE 5510 does not receive, process and arrange or align the T-commerce service to configure and provide a UI for a T-commerce service but receives the remote browser configured and generated by processing and aligning or arranging data for the T-commerce service in the T-commerce channel processor and outputs the remote browser without change or converts or processes the remote browser according to the format of the digital supporting device and outputs the converted or processed remote browser.

When the user makes payment for at least one product item stored in a wish list among product item(s) shopped on the T-commerce service output via the remote browser, the CPE 5510 outputs a received T-commerce service payment UI via the T-commerce channel processor 5530.

The CPE 5510 may output a T-commerce service payment UI and receive payment related information via direct touch, a smartphone or a remote device such as a (motion) remote controller. The CPE 5510 may receive the information via a microphone provided on the remote device or the CPE 5510 in the audio form or receive the information via a camera sensor, a fingerprint sensor, etc.

The brand channel processor 5520 receives a request for purchase, a request for payment and payment related information of the user via the CPE 5510. The brand channel processor 5520 may receive and send login data of the user to the T-commerce channel processor 5530, the payment processor 5540, etc., in association with payment. The login data may include payment related membership identifier data, etc.

The brand channel processor 5520 may send a payment processing result according to the request for payment of the user to the CPE 5510 and output the payment processing result on the CPE 5510.

The T-commerce channel processor 5530 includes a T-commerce service information processor 5532 and a payment information processor 5534 as described above.

The T-commerce service information processor 5532 receives the login data of the user from the brand channel processor 5520 and sends the login data to the payment information processor 5534.

The payment information processor 5534 retrieves a stored payment token based on the login data received via the T-commerce service information processor 5532. Here, the payment information processor 5534 initially receives and stores payment related data from the user. The payment related data of the user may be received and stored i) from a device other than the CPE 5510, such as a personal computer (PC), or ii) via a UI encrypted and output via the CPE 5510, for example.

The payment information processor 5534 retrieves the payment token of the user based on the login data received via the T-commerce service information processor 1332 and returns the payment token to the T-commerce service information processor 5532, as described above.

The T-commerce service information processor 5532 returns membership information of the user including the returned payment token of the user to the brand channel processor 5520 again.

The brand channel processor 5520 corresponds to the request for purchase or request for payment of the user based on the returned membership information of the user.

Hereinafter, the payment process will be described in greater detail with reference to FIGS. 56 and 57.

More specifically, FIG. 56 is a flowchart of one embodiment of the above-described user authentication process and FIG. 57 is a flowchart of one embodiment of the payment process based on the user authentication result of FIG. 56.

Hereinafter, in the description of FIGS. 56 to 57, a description overlapping the above description will be omitted.

Referring to FIG. 56, first, the payment information processor 5534 receives and stores payment related data from the user (S5610). At this time, the user may input the payment related data via a device other than the CPE 5510 for providing the T-commerce service, such as a PC.

When the user logs in via the T-commerce service browser output on the CPE 5510 with a request for purchase or payment after the payment related data has been received and stored from the user in step S5610, a first UI is output (S5620).

When the user logs in via the first UI (S5630), the login information is sent to the T-commerce service information processor 5532 via the brand channel processor 5520 (S5640). Here, when the user inputs predetermined information via the first UI on the CPE 5510, the T-commerce service information processor 5532 may recognize the predetermined information and returns the recognized result and thus the user may recognize the login via the first UI output on the CPE 5510.

When the login information of the user received from the T-commerce service information processor 5532 is sent to the payment information processor 5534 again, the payment information processor 5534 retrieves the stored payment token based on the received login information of the user (S5650).

The payment token retrieved in step S5650 is combined with other data in the T-commerce service information processor 5532 to generate membership data and the generated membership data is sent to the brand channel processor 5520 (S5660).

Thereafter, payment is made based on the membership data sent to the brand channel processor 5520 (S5670).

Next, the payment process will be described with reference to FIG. 57 in detail.

Referring FIG. 57, as shown in FIGS. 55 to 56, the brand channel processor 5520 receives the membership data including the payment token. The brand channel processor 5520 may receive the membership data including the payment token via a checkout for purchase from the user (S5710) or via the T-commerce channel processor 5530 when the user logs in regardless of or in association with payment (S5720).

The brand channel processor 5520 triggers payment related information to the payment information processor 5534 directly or via the T-commerce service information processor 5532 when the user performs checkout for purchasing a specific product item on the CPE 5510 (S5620). Here, the triggered payment related information may include a brand ID, an order ID, a price and a token, etc. requested by the user via the CPE 5510. The token may be at least one of a payment token in the membership data received from the T-commerce service information processor 5532 and token data received in association with the payment token.

The payment information processor 5534 authenticates the payment information or the user based on the payment related information triggered via the brand channel processor 5520 (S5630). The payment information processor 5534 requests payment from the payment processor 5540 based on the authentication result of step S5630 (S5640). At this time, the payment information processor 5534 sends a brand identifier, an order identifier, a price, total card data, etc. in the triggered payment related information to the payment processor 5540.

The payment processor 5540 makes payment and returns the payment result to at least one of the brand channel processor 5520 and the payment information processor 5534 (S5650).

The brand channel processor 5520 and/or the payment information processor 5534 returns the returned payment processing result of the payment processor 5540 to the CPE

5510 and outputs the payment processing result on a screen (S5760). When the brand channel processor 5520 returns the payment processing result, the CPE 5510 may generate OSD data autonomously or via an embedded browser and output the returned payment processing result on the screen. In contrast, when the payment information processor 5534 returns the payment processing result, the payment information processor 5534 sends the returned payment processing result to the T-commerce service information processor 5532 and the T-commerce service information processor 5532 may stream the payment processing result to the CPE 5510 via the remote browser.

In the first embodiment, instead of the payment processor or the brand channel processor, the T-commerce channel processor pre-stores the payment related data and makes payment using a token method. In the first embodiment, payment may be made using a scrambled bitmap instead of the token method.

In the second embodiment, when the T-commerce channel processor generates and provides the unified user interface to the CPE, the user inputs payment information via the provided unified user interface. The input payment information of the user is sent to the brand channel processor via the T-commerce channel processor and the brand channel processor communicates with a predetermined payment processor to make payment.

Next, a payment processing method according to the second embodiment will be described.

Figure 58:
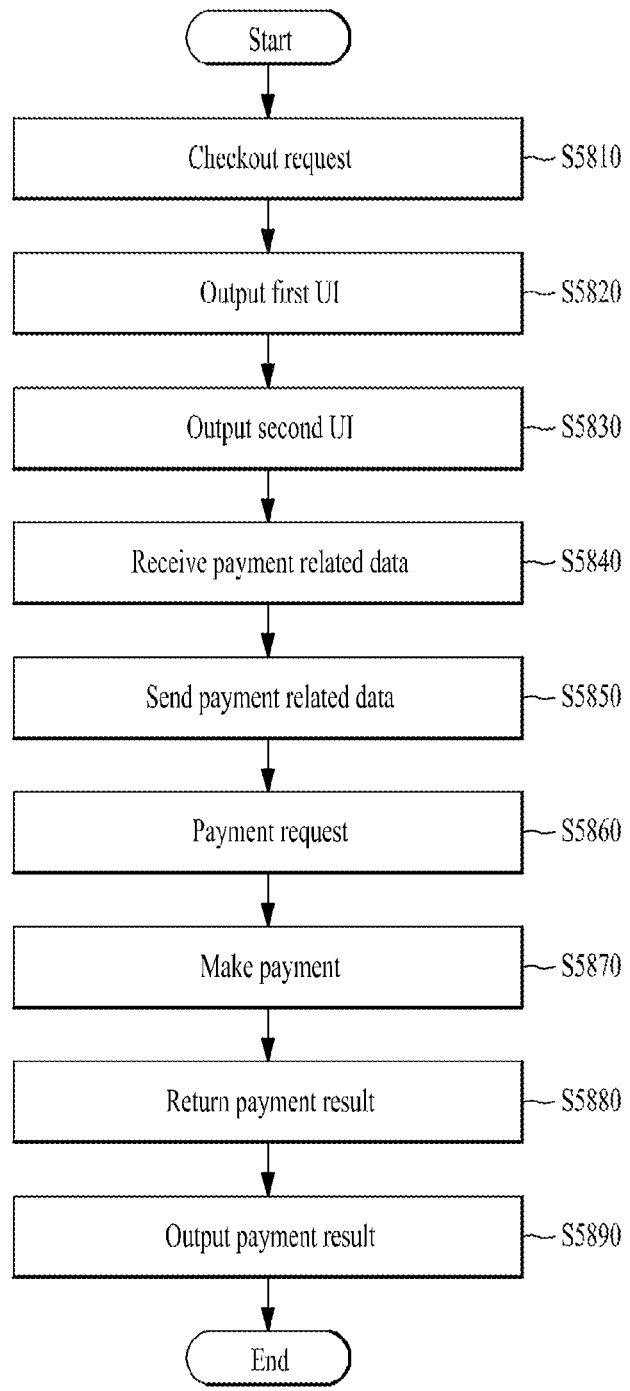
FIG. 58 is a flowchart illustrating a payment processing method according to another embodiment of the present invention.

FIG. 58 is a flowchart illustrating a payment processing method according to another embodiment of the present invention.

The payment processing method according to the second embodiment will be described with reference to FIG. 58.

A third processor may store payment information, membership information, etc. of the user. At this time, the payment information, membership information, etc. of the user may be received via the a device other than the CPE for outputting a T-commerce service via a remote browser, such as a PC or a remote device, or the CPE and may be stored in the third processor. The payment information stored in the third processor may be used for later payment using a method similar to that of the first embodiment.

In contrast, the first processor to the third processor of the T-commerce channel processor may not store the payment related information.

In this case, the user requests a checkout for purchase in the T-commerce service provided on the CPE via the remote browser (S5810).

When receiving the request for the checkout from the user, the T-commerce channel processor outputs a first UI corresponding to the request for checkout (S5820). Here, the first UI may be provided in the form of a second item, which is a sub-item of a first item, on a menu item of a T-commerce service UI executed via the remote browser. Meanwhile, the first UI may output purchasable items of wish list, shopping cart or brand units and the number of items, for selection. Each item or data of the first UI is generated by the T-commerce channel processor and provided on the screen of the CPE via the remote browser. The request for the checkout of the user may be recognized by tracking a pointer trajectory in the T-commerce channel processor.

When the user selects and requests to purchase at least one product item via the first UI, the T-commerce channel processor configures and outputs a second UI on the screen of the CPE (S5830). Here, the second UI is a unified payment UI generated for payment convenience by at least one of the first processor or the second processor in the T-commerce channel processor as a payment related UI. The unified payment UI includes a UI/UX configured to receive only necessary data in association with payment because requirements or data necessary for the payment process differ between brands or product items.

When the second UI is output, the user inputs payment related data requested by the second UI via the remote device, etc. and the T-commerce channel processor receives the payment related data (S5840). The T-commerce channel processor sends the received payment related data to the brand channel processor (S5850) and the brand channel processor requests payment from the payment processor based on the payment related data of the user (S5860).

The payment processor makes payment via a payment related authentication or verification process upon receiving the request for payment of the brand channel processor (S5870). Thereafter, the payment processor returns the payment processing result of step S5870 (S5880). Here, the payment processing result may be returned to at least one of the brand channel processor, the T-commerce channel processor, the CPE, the remote device, the mobile device, etc.

Finally, the CPE outputs the returned payment processing result on the screen (S5890). Here, the payment processing result may be output on the screen of the CPE via the remote browser of the T-commerce channel processor or the embedded browser of the CPE.

Step S5840 may not be performed in the T-commerce channel processor but may be directly performed in the brand channel processor. In this case, step S5850 may be omitted.

A payment process according to a third embodiment of a payment method may be performed via the payment processor 5540 by transmitting and receiving a payment token, etc. via a cloud server or an IP. Alternatively, at least one step of the payment process may not be performed in the CPE 5510 but may be performed in a remote device, a PC, etc.

Figure 59:
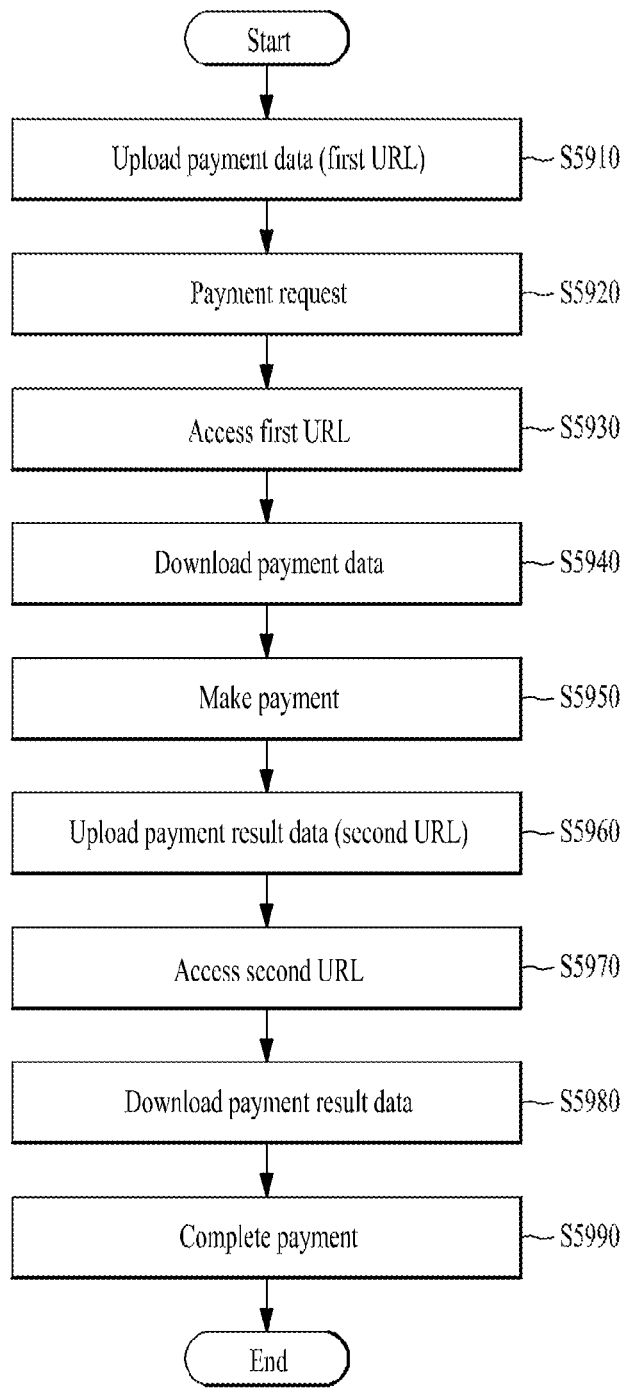
FIG. 59 is a flowchart illustrating a payment processing method according to another embodiment of the present invention.

FIG. 59 is a flowchart illustrating a payment processing method according to another embodiment of the present invention.

For example, the user uploads payment data to a cloud sever (S5910). Uploading may be performed via a digital device having an IP connectable to a cloud server, such as a CPE, a remote device, a mobile device, a PC, etc. Each device accesses the cloud server via the IP directly or indirectly and uploads and stores the payment data. An address at which the payment data is stored is referred to as a first uniform resource locator (URL) in the present embodiment.

After or simultaneously with step S5910, a request for payment for at least one product item is made (S5920). Meanwhile, when making a request for payment, the first URL may also be transmitted. Here, the request may be made using a method similar to the payment request process of the first embodiment or the second embodiment. For example, the T-commerce channel processor continuously tracks the pointer trajectory of the user provided on the CPE and provides a unified UI or an appropriate UI according to the request for payment when the pointer of the user makes a request for payment for a product item and sends the request for payment to the brand channel processor.

The T-commerce channel processor or the brand channel processor accesses the first URL data according to the request for payment and downloads payment data of the user stored at the first URL (S5940).

The payment processor makes payment based on the downloaded payment data (S5950).

For the description of a part of the payment process, refer to the above-described embodiment and a detailed description thereof will be omitted herein.

The payment processor makes payment, generates payment processing result data, and uploads and stores the payment processing result data in the cloud server (S5960). Here, the cloud server may be equal to or different from the cloud server related to the payment data. An address at which the payment processing result data is stored is referred to as a second URL.

When the payment processing result data is generated as the result of making payment, the payment processor informs at least one of the T-commerce channel processor, the brand channel processor, the remote device, the mobile device and the CPE that payment has been made and the payment processing data has been stored at the second URL.

Thereafter, a specific configuration accesses the second URL (S5970) and downloads the payment processing result data (S5980).

The payment processing result data downloaded in step S5980 is output on the screen via the CPE, the remote device, the mobile device, etc. and payment is finished (S5990).

Although the payment process is described as being appropriately performed in the present specification, if payment is not completed due to a certain problem in the payment process, an additional payment operation may be performed via the above-described payment process.

Although the first to third embodiments are respectively described in the present specification, the present invention is not limited thereto and components or steps of the embodiments may be wholly or partially combined such that a payment process may be performed using a method which is not shown in the figures or described in the present specification.

Hereinafter, in use of the T-commerce service, identification information and a payment process using the identification information will be described in greater detail. In particular, for the payment process using the identification information, refer to the first to third embodiments. If necessary, the payment process using the identification information will be described in detail. In the present specification, a plurality of pieces of identification information may be used when the T-commerce service is used. The identification information and functions thereof will be described. In addition, the identification information may be used for an advanced T-commerce service using a personalized or customized service in addition to payment.

The T-commerce service application described in the present specification may not support a payment processing function as in the second embodiment. Accordingly, for the payment process, the T-commerce service application may use a specific payment processing mechanism. Even in this case, the T-commerce service application may provide payment information requested by the brand channel payment system and provide a more complete commerce service experience at all brands. Within the T-commerce service, the user may receive a payment page when attempting to make payment via the T-commerce service application. The user may update payment information such as a billing destination, a product destination or a credit card number via the payment page.

Hereinafter, embodiments of the identification information and payment process will be described with reference to the accompanying drawings. A profile ID and a membership ID are used in one embodiment and a household ID, a CPE ID, a user ID and a membership ID are used in another embodiment.

Figure 60:
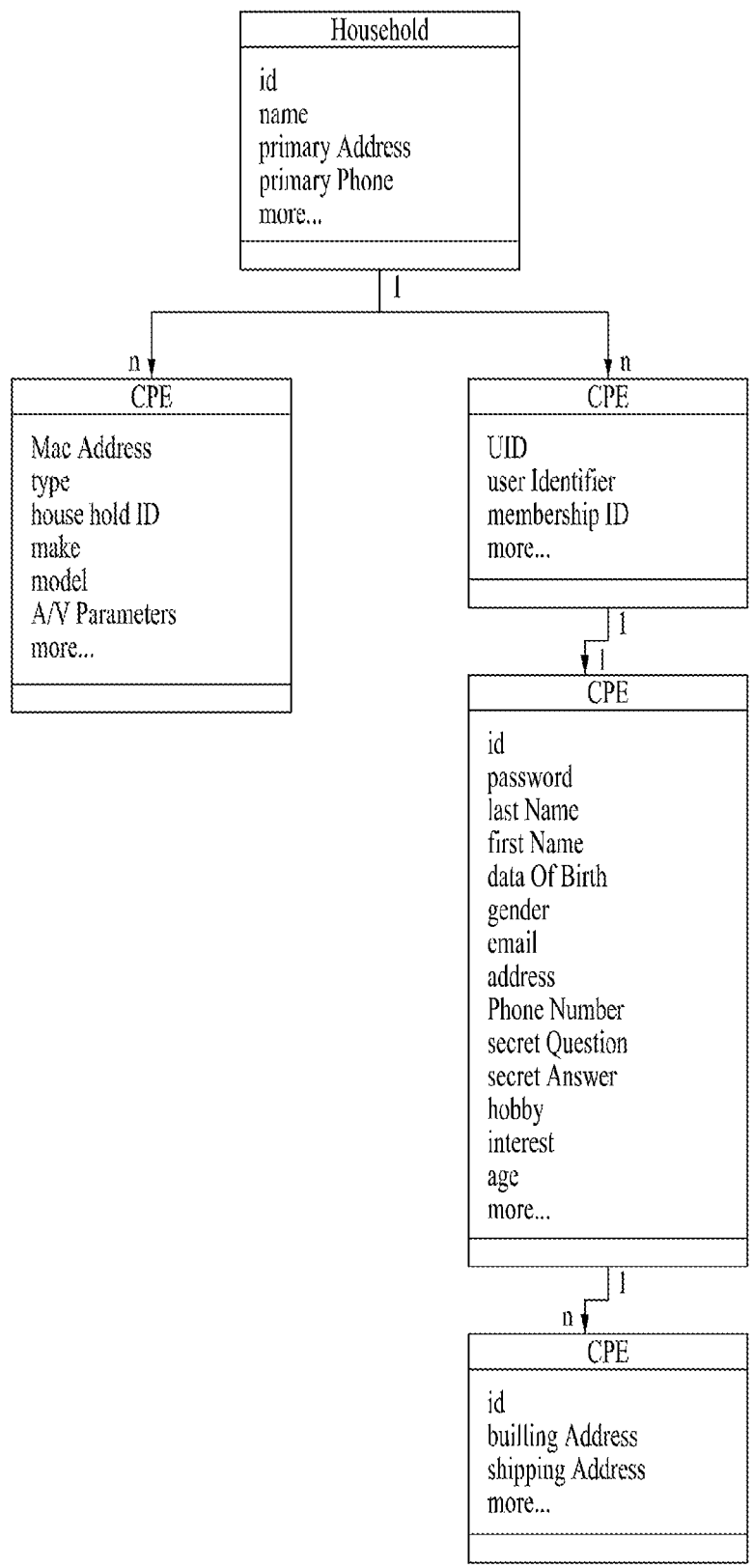
FIG. 60 shows a relationship between IDs according to one embodiment of the present invention.

FIG. 60 shows a relationship between IDs according to one embodiment of the present invention, FIG. 61 shows CPE identification information according to one embodiment of the present invention, FIG. 62 shows user identification information according to one embodiment of the present invention, and FIG. 63 shows user identification information according to another embodiment of the present invention.

It is difficult for a T-commerce service system including a T-commerce channel processor to identify a user who uses a T-commerce service via a CPE.

Referring to FIG. 60, in the present specification, identification information is used for payment and service differentiation and is used to divide different levels and access levels as necessary.

For example, in FIG. 60, a household ID is defined as a highest-level ID, a CPE ID and a user ID are present as a second highest-level ID, a membership ID is defined under the user ID. The membership ID is related to payment.

Although the level structure of the IDs is shown in FIG. 60, this is only exemplary and FIG. 60 is only shown in order to describe the relationship between IDs. That is, as described above, the membership ID may not be present under the user ID but may be based on or associated with the user ID.

Hereinafter, definition of the IDs will be described and associative or utilization relationship between IDs will be described with reference to the accompanying drawings.

First, the household ID identifies a household including one or a plurality of CPEs. Referring to FIG. 60, such a household ID may include an ID, a name, a primary address, a primary phone number, etc.

A plurality of CPEs may be present in a single household. In this case, the CPEs need to be individually identified. Here, the household ID may be set by a user or may be automatically set by detecting a single household in a T-commerce service system. In addition, the household ID may be equal to the CPE identifier when only one CPE is present. In this case, only one ID may be used. Such a household ID may be stored in the storage module of the T-commerce channel processor of the T-commerce service system.

In this case, the T-commerce service system may identify the household identifier based on a media access control (MAC) address of the CPE.

The CPE ID indicates identification information of a device and the device includes all digital devices capable of a T-commerce service, such as a CPE, a remote device, a mobile device, etc. The CPE ID is a unique ID of a device and includes a unique product serial number assigned to the device upon manufacture. The T-commerce channel processor may identify and manages the device based on the CPE ID.

Referring to FIG. 60, the CPE ID includes MAC address data, CPE type data, household ID data, CPE model name data, AV parameter data supported by the CPE, etc.

The T-commerce channel processor may provide a differentiated T-commerce service according to device via management. Such a CPE ID may be assigned in device units depending on the household ID of a high level. For example, when three CPEs are present in a single household, a single household ID-1 is present based on a MAC address and identifiers CPE ID-1, CPE ID-2 and CPE ID-3 of the CPE are present under the household ID-1.

In FIG. 61, identification information composed of the CPE ID, the household ID and the CPE type information is shown. Here, the identification information defined in FIG. 61 may indicate information stored in the storage module of the T-commerce channel processor, for example.

Referring to FIG. 61, if the household ID is H1, then it can be seen that three CPEs are assigned MAC1, MAC2 and MAC3 and a device type of each CPE is a TV. Even if the household ID is H2, then it can be seen that three CPEs are present and are assigned MAC4, MAC5 and MAC6 as CPE IDs and a device type of each CPE is a TV. In contrast, if the household ID is neither set nor defined, a household ID may be used instead of a CPE ID. Although the household ID is not defined in FIG. 61, the undefined household ID may be defined as MAC6 by referring to the CPE ID when the CPE ID is MAC6.

As another method of identifying the household ID or the CPE ID, an IP/UDP address of each CPE connected to a local network may be used in addition to the MAC address.

The user or another member of the household does not need to know the household ID or the CPE ID, because the household ID or the CPE ID is used to identify a user, a service, etc. at a provider for providing a T-commerce service.

In contrast, the user or another member of the household needs to know a user ID, a profile ID, a membership ID, etc.

The user ID is necessary to identify each member of a household.

Referring to FIG. 60, the user ID includes unique identification number (UID) data, user identifier data, membership identifier data, etc. Here, the membership ID may be equal to the membership ID. When the membership ID is not used for payment, the membership ID may not be included in the user ID.

The user ID may be defined as "father", "mother", son-1", "son-2", etc., for example. This is only exemplary and the user ID may be variously defined in order to identify each member in a single house.

FIG. 62 shows a user ID use data model.

Referring to FIG. 62, a relationship among a UID, a user identifier and a membership ID will be described.

The data model of FIG. 62 will now be described based on household identifiers H1 and H2.

Based on the first household identifier H1, the UIDs JK-674-HJ, JK-675-HJ, JK-676-HJ and JK-677-HJ correspond to H1-father (H1-Dad), H1-mother (H1-Mom), H1-daughter (H1-Daughter) and H1-son (H1-Son), respectively. Based on the first household identifier, data having a UID of JK-674-HJ and a user identifier of H1-father is mapped to the membership ID LoginID-1 and data having a UID of JK-676-HJ and a user identifier of H1-daughter is mapped to the membership ID LoginID-2. Based on the second household identifier, the UIDs JK-678-HJ, JK-679-HJ, JK-680-HJ and JK-681-HJ correspond to H2-father (H2-Dad), H2-mother (H2-Mom), H2-son (H2-Sonr) and MAC6-daughter (MAC6-Daughter), respectively. Based on the second household identifier, data having a UID of JK-678-HJ and a user identifier of H2-father is mapped to the membership ID LoginID-3 and data having a UID of JK-679-HJ and a user identifier of H2-mother is mapped to the membership ID LoginID-4.

In the T-commerce service, the user may be identified via at least one of the household identifier, the CPE identifier and the user identifier. For example, based on the user identifier, it is possible to manage the wish list or shopping cart of the user in distinction from that of another user. In addition, it is possible to perform communication with another user in the household using the user identifier to make a request for purchase or payment.

Although not shown in FIG. 60, the profile identifier refers to an arbitrary identifier assigned to a user who uses the T-commerce service. The profile identifier is assigned according to a user request based on a device and the user may be assigned a plurality of profile identifiers. However, since the profile identifier is arbitrarily assigned, the profile identifier does not include payment information unlike the membership identifier. The user may use the wish list or the shopping card in profile units and then make payment. The profile identifier and the user identifier may have the same meaning according to circumstance. The profile identifier and the user identifier may be different in that, while a user identifier is uniquely assigned to one user, a plurality of profile identifiers may be arbitrarily assigned to one user.

While the identification information, that is, the household identifier, the CPE identifier, the user identifier and the profile identifier do not directly include payment information, the membership identifier includes payment information of a product item shopped via the T-commerce service. That is, when the user purchases a product item or makes payment in a process of using the T-commerce service, the membership identifier is necessary. The membership identifier includes at least one piece of financial information related to payment of the user, such as bank account information, a credit card number, address(es) and phone numbers related to the bank or the credit card, other information, etc. Referring to FIG. 60, the membership identifier includes ID, password, last name, first name, date of birth, gender, e-mail address, phone number, secret question, secret answer, hobby, interest, age, etc. The membership identifier requires secure protection using technology of protecting or encrypting a password linked to the membership identifier, unlike other identifiers.

The membership identifier may be stored in the third processor of the T-commerce channel processor or a separate secure server. The membership identifier may be directly used for payment for a T-commerce service. Accordingly, the membership identifier is required upon payment when a user uses a T-commerce service but is not required upon shopping.

For example, the user may navigate the T-commerce service in order to find product items to be purchased and store desired product items in a wish list using a user identifier when the desired product items are found. The user may not immediately make payment but may continuously shop using the user identifier. Thereafter, when the user performs a payment process in order to purchase the product items included in the wish list, the T-commerce channel processor requests log-in data or a membership identifier. When user authentication and login are performed via the login data or the membership identifier, payment may be made. Payment may be made according to the first to third embodiments using the token identifier, direct payment or the pre-stored payment method.

The membership identifier may be only necessary in the payment process, because, if secure information such as the membership identifier is provided when the user only shops without purchasing a product item, inconvenience and risk may be caused.

Accordingly, the user may shop based on the user identifier, the profile identifier, etc. in a process other than payment based on the T-commerce service and use the membership identifier only when making payment.

Since such a method may be inconvenient, a method of equating the ID of the membership identifier with the user identifier and enabling the user to input the password of the membership identifier upon payment may be used. Accordingly, it is possible to increase user convenience.

The membership identifier may be generated from a primary household. The generated membership identifier does not depend on the device unlike the other identifiers and thus may be used even in devices of the same or different households. In addition, payment for a product item shopped for on a first device and stored in a wish list may be made using a membership identifier in a second device.

Each identifier may not be text. That is, each identifier may be image or video data such as avatar or a combination thereof. The identifier may be variously defined in terms of color, size, 3D effect, etc.

The membership identifier including payment information may be used before checkout for purchase in the T-commerce application.

The payment information may include a billing/shipping address, a credit card number, etc. and may be most fundamental information of the membership identifier.

FIG. 63 shows another embodiment of a user data model.

Referring to FIG. 63, a relationship between a UID and a brand of a user identifier is shown.

For example, a UID of JK-674-HJ most prefers a brand BR1, a UID of JK-675-HJ most prefers a brand BR2, a UID of JK-676-HJ most prefers a brand BR1, a UID of JK-677-HJ most prefers a brand BR3, a UID of JK-678-HJ most prefers a brand BR4, a UID of JK-679-HJ most prefers a brand BR10, a UID of JK-680-HJ most prefers a brand BR9, and a UID of JK-681-HJ most prefers a brand BR5.

As described above, the T-commerce service may provide a personalized service based on identifier information.

For example, the T-commerce service may implement and provide a personalized service based on user information, a shopping pattern, a list of purchased items, a list of items to be purchased, etc. For such a personalized T-commerce service, user identification may be important. At this time, user identification may be performed by in units of CPEs, input means, individuals, etc.

Such user identification may be performed using various methods. As the user identification method, for example, login, user identifier or fingerprint, face or voice sensing may be used.

Hereinafter, for convenience, the user identifier is used, for example.

The user identifier is determined or assigned by the CPE, the input means or the server or is directly selected by the user and is provided each configuration for a T-commerce service, that is, a commerce service, via data communication, thereby identifying the user. For example, any CPE may be only used by a specific user or any CPE, such as a TV, may be shared among household members. Accordingly, user identification in units of the CPEs may not be sufficient (in this case, a unique MAC address assigned to each CPE is used). Therefore, user identifiers may be assigned to a plurality of users who use one CPE to uniquely identify each user. The user identifier may be provided in various forms such as specific value, text, avatar, etc. Instead of user identification using the user identifier, a login process for the T-commerce service or a user authentication process necessary to perform a predetermined function in a CPE may be performed. An avatar may be used as a user identifier for identifying each household member together with the MAC address in a CPE.

Meanwhile, personalized implication may be performed at a user identifier level as follows. First, the CPE may capture user action such as "add to bookmark", "add to wish list" or "global cart" or information thereof in terms of user identifier. Such a process may be performed according to a request of a server. Thereafter, random brand tiles are output on a start page of a "window shop" and "random" is output in "on sale", "trending" or "brand promotion banner" for a favorite brand in the start page.

Each user (identified by a membership login ID) is provided together with an option for defining detailed membership information in a T-commerce application. The membership information may essentially include profile information (e.g., name, e-mail, login ID/password, etc.) and optional preference information (that is, hobby, interest, gender, age, etc.). Meanwhile, the membership login ID may not be related to the user identifier.

Figure 64:
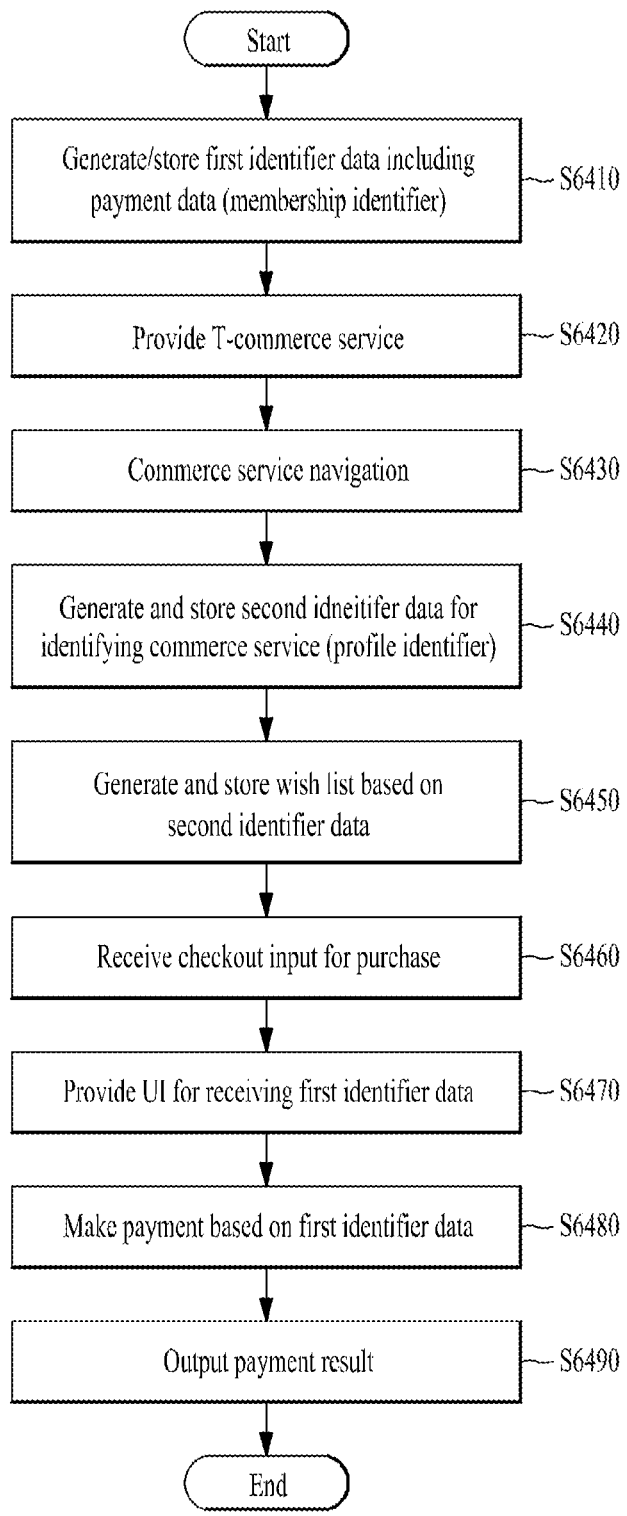
FIG. 64 is a flowchart illustrating a payment processing method using identification information according to one embodiment of the present invention.

FIG. 64 is a flowchart illustrating a payment processing method using identification information according to one embodiment of the present invention.

A payment processing method using the profile identifier and the membership identifier will be described with reference to FIG. 64.

First, a user generates a login or membership identifier (hereinafter, referred to as a membership identifier) in order to use a T-commerce service. The generated membership identifier is stored in a T-commerce channel processor or an external server (S6410).

Thereafter, the T-commerce channel processor configures a T-commerce service screen according to a user request and provides the T-commerce service screen via a CPE (S6420).

The T-commerce channel processor tracks a pointer trajectory of the user, processes data corresponding to commerce service navigation of the user, and streams the processed data to the CPE (S6430).

As described above, in a process of using the T-commerce service except for payment, the generated and stored membership identifier is not requested. However, when the user uses the T-commerce service, that is, when a desired product item is stored in a wish list or a shopping cart, the identifier may be requested. The T-commerce channel processor generates and stores a profile identifier according to a user request (S6440).

The T-commerce channel processor generates, temporarily stores and manages the wish list of the user based on the profile identifier (S6450).

The T-commerce channel processor continuously detects user actions such as tracking of the pointer of the user. When checkout input for purchase is received from the user (S6460), the T-commerce channel processor configures a UI for receiving a membership identifier necessary for payment and provides the UI on the CPE (S6470).

Thereafter, when the user inputs membership identifier data on the UI, payment is made based on the membership identifier data (S6480). For the payment process, refer to the above-described payment processing method and a description thereof will be omitted herein.

Thereafter, the payment processor makes payment based on the membership identifier and outputs the processed payment result on the CPE when the processed payment result is returned, thereby enabling the user to confirm the payment result (S6490). For the process of returning the payment result, refer to the above-described payment processing method.

The membership identifier may not be stored in step S6410 but the membership identifier including payment information may be received and used in step S6470 after step S6460.

A usage scenario of FIG. 64 will now be described. As described above, the profile ID depends on a specific device.

Accordingly, the user may not use commerce service data, which was previously used in a device, in another device only using the profile identifier. In this case, shopping information needs to be stored via the user identifier or the membership identifier.

Accordingly, the method shown in FIG. 64 may be limited to the case in which a commerce service is used and payment is made in a specific device. However, as described above, when user identifier data or membership identifier data is used, shopping history data may be used even in another device.

Figure 65:
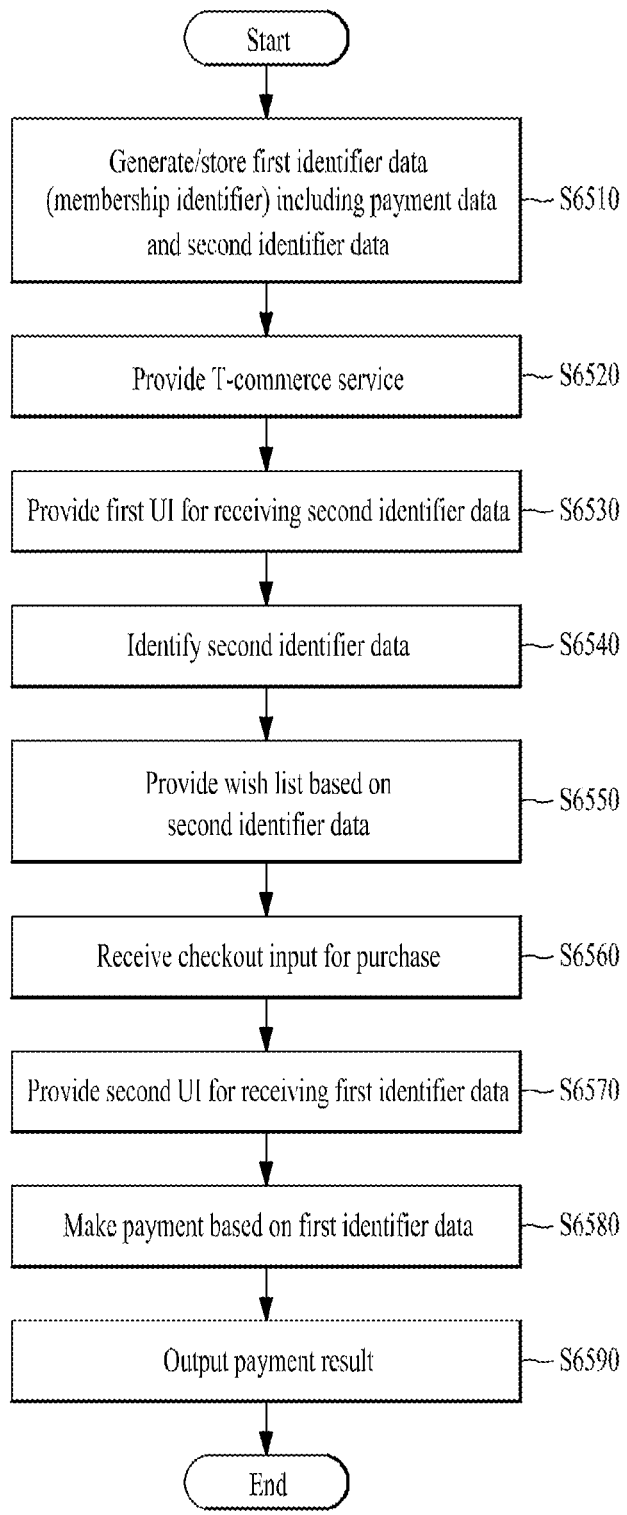
FIG. 65 is a flowchart illustrating a payment processing method using identification information according to another embodiment of the present invention.

FIG. 65 is a flowchart illustrating a payment processing method using identification information according to another embodiment of the present invention.

The payment processing method using another identifier in addition to the membership identifier will be described with reference to FIG. 65.

First, a user generates first identifier data and second identifier data including a login or membership identifier (hereinafter, referred to as a membership identifier) in order to use a T-commerce service. The generated first identifier data and/or second identifier data is stored in a T-commerce channel processor or an external server (S6510). The second identifier data includes at least one of a household identifier, a CPE identifier and a user identifier.

Thereafter, the T-commerce channel processor configures a T-commerce service screen according to a user request and provides the T-commerce service screen via a CPE (S6520).

The T-commerce channel processor tracks a pointer trajectory of the user, processes data corresponding to commerce service navigation of the user, and streams the processed data to the CPE (S6530). For example, when the user accesses a device other than a device which has been previously used by the user, the T-commerce channel processor configures and provides a first UI for receiving second identifier data (S6530).

The T-commerce channel processor identifies the second identifier data received via the first UI provided in step S6530 (S6540). For example, the T-commerce channel processor receives at least one of the household identifier data, the CPE identifier data and the user identifier data, authenticates the user and extracts commerce service history data of the authenticated user.

The T-commerce channel processor configures and provides a wish list suitable for the user based on the identified second identifier data (S6550).

When checkout input for purchase is received from the user (S6560), the T-commerce channel processor configures a second UI for receiving the membership identifier necessary for payment and provides the second UI on the CPE (S6570).

Thereafter, when the user inputs the membership identifier data on the second UI, payment is made based on the membership identifier data (S6580). For the payment process, refer to the above-described payment processing method and a description thereof will be omitted herein.

Thereafter, the payment processor makes payment based on the membership identifier and outputs the processed payment result on the CPE when the processed payment result is returned, thereby enabling the user to confirm the payment result (S6590). For the process of returning the payment result, refer to the above-described payment processing method.

In FIG. 65, whether the profile identifier data is used or not, the second identifier data including the household identifier data, the CPE identifier data and the user identifier data in addition to the membership identifier data is used such that the T-commerce service may be used in an environment different from that of FIG. 64.

For example, a plurality of CPEs, that is, CPEs, may be present in a single household. In this case, assume that a user uses a T-commerce service via a CPE mounted in a living room of the first floor and makes payment for product item(s) shopped via the commerce service using a CPE mounted in a user's room of the second floor.

In this case, the T-commerce channel processor may accurately identify a CPE, which is currently being accessed by the user, based on household identifier data and/or CPE identifier data received from the user.

Thereafter, the T-commerce channel processor may provide the wish list or history data of the commerce service which has been used in the CPE mounted in the living room, via the CPE mounted in the user's room based on the user identifier data of the user.

Thereafter, the T-commerce channel processor may further request the membership identifier data, performs the payment process based on the membership identifier data and provides the payment result received from the payment processor to the CPE, when the user makes payment for the product item using the CPE.

In the present specification, the profile identifier is used to identify the user or the commerce service when a plurality of users who uses the commerce service via a specific CPE or a specific user distinguishably uses a plurality of commerce services.

In contrast, through the user identifier data or the membership identifier data, it is possible to continuously use the commerce service based on previous history data anywhere and at any time in an environment in which the T-commerce service may be used without regard to location of a device or time.

While the user identifier is not used for payment but is used to identify the user who uses the commerce service, the membership identifier is used to identify the user and is essentially used for payment for a product item to be purchased.

According to the present invention, it is possible to provide a new commerce service different from a conventional e-commerce service via a CPE and to support or provide a platform, service system and method for providing the commerce service. In addition, according to the present invention, it is possible to provide a T-commerce channel processor for providing commerce service data output via a CPE using a remote browser and controlling and processing the commerce service data and to provide a payment method, etc. according to the commerce service output on the CPE. According to the present invention, it is possible to identify a plurality of users who use a commerce service, to continuously provide a commerce service to the identified user and to provide payment convenience.

One embodiment of a multimedia commerce service processing method includes collecting first information of a CPE using a multimedia commerce service, collecting second information from a brand server using the multimedia commerce service, collecting third information for purchase of a product of a user from the CPE, analyzing the collected first, second and third information to determine a purchase grade of the user, editing a browser screen configuration of the multimedia commerce service provided to the CPE according to the purchase grade of the user, and providing the edited browser screen to the CPE. The first information may include at least one of identification information of the CPE, device information thereof, location information thereof and purchaser information thereof. The second information may include at least one of sales brand information, sales company information, sales product information, sales adverting information and event information of the brand server. The third information may include at least one of item, price, brand name, category and user commerce history information of a product purchased via the CPE. The commerce history information may include at least one of identification information of a user, a per-brand search time of a user, a per-brand search path of a user, a total use time of a multimedia commerce service, purchase performance according to use time and a repurchase time. The determining the purchase grade of the user may include generating product purchase information of the user based on at least one of the collected first, second and third information, assigning a weight to the generated product purchase information to calculate a product purchase power and determining the purchase grade of the user based on the product purchase power.

The product purchase information of the user may include a brand grade, a brand use time of a user and loyalty. The brand grade may be used to calculate average price of items provided by each brand, classify brands according to the calculated average price and assign grades to the classified brands. The loyalty may include a total purchase amount, the total number of times of purchase, purchase performance according to use time and a repurchase time. The method may include editing the browser screen configuration of the multimedia commerce service provided to the CPE, analyzing the browser screen of the multimedia commerce service currently provided to the CPE of the user, whose purchase grade has been determined, checking whether brand information corresponding to the purchase grade of the user is included in the analyzed current browser screen, and editing the currently provided browser screen configuration based on the brand information corresponding to the purchase grade of the user if the brand information corresponding to the purchase grade of the user is included. In the step of checking whether the brand information corresponding to the purchase grade of the user is included, when the brand information corresponding to the purchase grade of the user is not included, it is possible to acquire the brand information corresponding to the purchase grade of the user from the brand server. After the step of editing the currently provided browser screen configuration, the method may include acquiring device information of the CPE of the user, whose purchase grade has been determined, and reediting the browser screen configuration according to the device information of the CPE.

A multimedia commerce service processing apparatus configuring a network in a CPE and a brand server according to the present invention may include a communication module for transmitting and receiving data, a storage module for storing first information received from the CPE, second information received from the brand server and third information for product purchase of a user received from the CPE, an analytical module for analyzing the stored first, second and third information and determining a purchase grade of the user, an editorial module for editing a browser screen configuration of a multimedia commerce service provided to the CPE according to the determined purchase grade of the user, and a controller for controlling the communication module, the storage module, the analytical module and the editing module and providing the edited browser screen to the CPE according to the purchase grade of the user. The first information may include at least one of identification information of the CPE, device information thereof, location information thereof and purchaser information thereof. The second information may include at least one of sales brand information, sales company information, sales product information, sales adverting information and event information of the brand server. The third information may include at least one of item, price, brand name, category and user commerce history information of a product purchased via the CPE. The analytical module may include a product purchase information generator for generating product purchase information of the user based on at least one of the collected first, second and third information, a product purchase calculator for assigning a weight to the generated product purchase information to calculate a product purchase power and a purchase grade determination unit for determining the purchase grade of the user based on the product purchase power. The controller may analyze the browser screen of the multimedia commerce service currently provided to the CPE of the user, whose purchase grade has been determined, check whether brand information corresponding to the purchase grade of the user is included in the analyzed current browser screen, and edit the currently provided browser screen configuration based on the brand information corresponding to the purchase grade of the user if the brand information corresponding to the purchase grad of the user is included. The controller may acquire location information of the CPE of the user, whose purchase grade has been determined, and reedit the browser screen configuration according to the location information of the CPE.

A method for processing a commerce service in a commerce processor communicating with a CPE of a user according to the present invention may include receiving a checkout request for purchase, configuring and transmitting a first UI for login via a remote browser, retrieving a payment token stored based on login data, transmitting membership data including the retrieved payment token, triggering payment information based on membership data and making payment based on the triggered payment information. The method may further include at least one of receiving and storing payment data and authenticating a user based on the login data. The payment data may be received via a PC rather than via the CPE. The triggered payment information may include at least one of a brand ID, an order ID, a price and a payment token included in membership data, etc. The membership data may include at least one of bank account information, a credit card number, address(es) and phone numbers related to the bank or the credit card, ID, password, last name, first name, date of birth, gender, e-mail address, phone number, secret question, secret answer, hobby, interest, age, etc.

A method of processing a commerce service in a commerce processor communicating with a CPE of a user according to the present invention may include receiving a checkout request for purchase, configuring and transmitting a first UI corresponding to the checkout request via a remote browser, selecting at least one product item on the first UI and receiving a request for purchasing the selected product item, configuring and transmitting a second UI for payment in correspondence with the request for purchase, receiving payment data via the transmitted second UI and sending the received payment data to a brand channel processor to make payment for the selected product item. The second UI may be a unified UI configured based on common features of all brands, to which the selected product item belongs, even when payment processes differ between brands. The CPE may receive and output the payment result via a remote browser or an embedded browser of the CPE. The checkout request may be recognized by tracking the pointer trajectory of the remote device.

A method of processing a commerce service in a commerce processor communicating with a CPE of a user according to the present invention may include receiving first URL data in which uploaded payment data is stored, receiving a request for payment, downloading payment data based on the received first URL data, making payment, and uploading a payment result and transmitting second URL data in which the uploaded payment result is stored.

In the present disclosure, example of completed execution of payment process has been described, however, if a problem arises during the payment process and the payment process is not completed, additional steps may be involved in the payment process.

Furthermore, in the present disclosure, the present disclosure is not limited only to the embodiments described and additional embodiments or combination of embodiments can be construed to implement the process as well.

In addition to the payment token explained in an embodiment and storing the payment information in the storage by the T-Commerce channel processor in another embodiment, the other embodiment using other payment methods can also be implemented.

Figure 66:
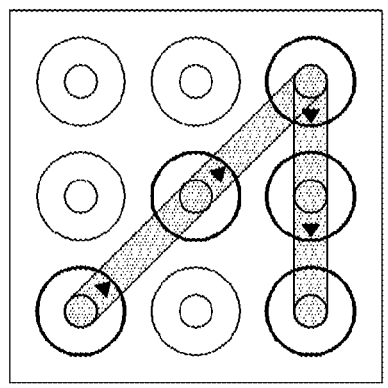
FIG. 66 describes a diagram of a pattern recognition method.

Other payment methods can be implemented by using a sensor, for example a scramble method, a pattern recognition method as illustrated in FIG. 66, a fingerprint sensing method, camera sensing method, and voice recognition method.

In the scramble method described above, separate texts other than numbers can be used as passwords and separate texts other than numbers can be used in the voice recognition method.

In other methods such as the pattern recognition, fingerprint recognition, camera recognition methods, the sensing through fingerprint, camera, and voice will be used instead of the numbers for password. For example, as shown in FIG. 66, in case of a pattern recognition method, identifiers such as login, household identifier, user identifier, profile identifier, membership identifier data, and avatar can be used in addition to passwords.

The embodiment explaining scrambled method of payment process will be described below and other payment methods will also be briefly explained.

The embodiments explaining the payment process in the present disclosure involves storing credit card information which basically is subject to Payment Card Industry (PCI) compliance. Transmitting non-credit card information instead of credit card number to a third party in order to bypass the PCI compliance by a method of using scrambled bitmap image through the coordinate values in the T-Commerce channel processor will be explained below.

Figure 67:
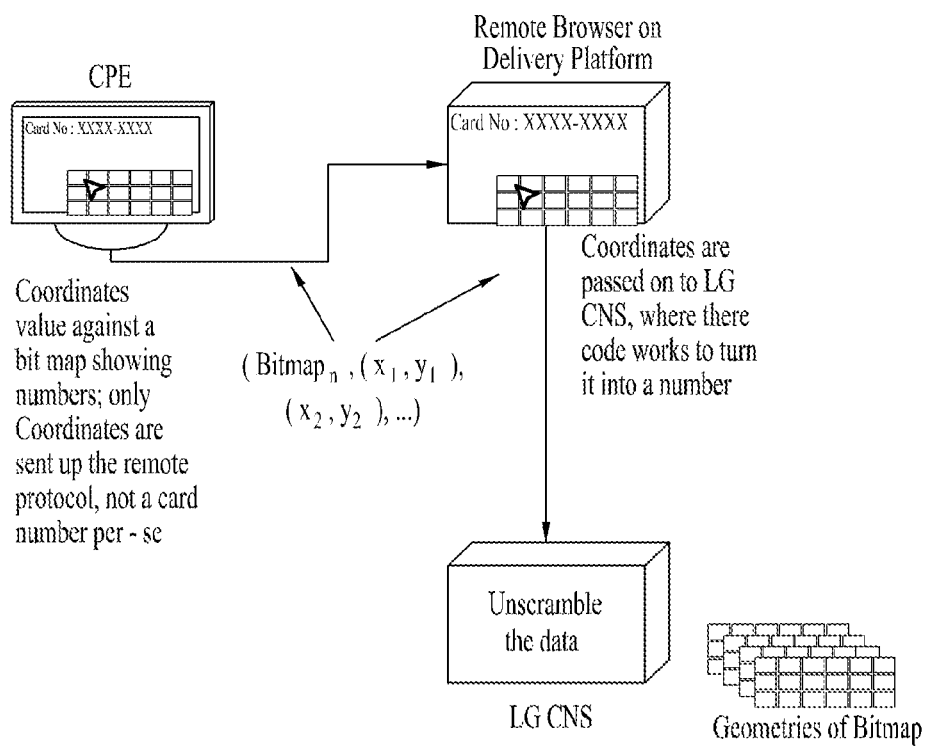
FIG. 67 describes a block diagram using another payment method according to an embodiment of the present disclosure.

FIG. 67 describes a block diagram using another payment method according to an embodiment of the present disclosure.

According to FIG. 67, CPE and T-Commerce channel processor is used for the payment process. Here, the T-Commerce channel includes remote browser and payment data processor. The payment data processor can also be included in a third-party and not having to be included in the T-Commerce channel processor.

The following describes a method of payment process involving PCI compliance according to an embodiment of the present disclosure.

i) Processing payment by using a scrambled bitmap technology in the CPE client and using an unscrambled technology in the payment data processor. PCI concern is a matter in this situation.

ii) Processing payment using a mobile device paired with the CPE or T-commerce channel processor through a specific T-Commerce service application. In this situation, concerns regarding PCI compliance can be a minor issue.

iii) Processing payment using a mobile device paired with a PC, tablet PC, or a smartphone. In this case, PCI compliance is not an issue.

iv) Processing payment using a local CPE browser, in other words, an embedded browser. In this case, PCI compliance is also not an issue.

v) Processing payment by fully complying with the PCI compliance.

Using an embedded browser, the CPE can output a coordinate value image corresponding to a bitmap showing the numbers as illustrated in FIG. 67 and according to payment method iv) described above.

Here, when a user inputs payment data such as credit card number through the outputted coordinate value image, the inputted data is transmitted to the remote browser of T-Commerce channel processor.

At this point, the information transmitted is only the coordinate value according to the remote protocol, and not the actual credit card number. In other words, the coordinate value $((X1, Y1), (X2, Y2), (X3, Y3) \ldots (Xn, Yn))$, including n-th bitmap is transmitted to the remote browser through remote protocol.

In this case, the actual bitmap can be transmitted or selected coordinate value pre-provided through CPE can be transmitted. However, in any case, only the scrambled coordinate value gets to be transmitted, not the actual credit card number, therefore, not violating the PCI compliance.

The remote browser delivers the received n-th bitmap image to the payment data processor. The payment data processor unscrambles the delivered data and stores bitmap geometries.

Afterwards, the bitmap geometries can be used for payment process.

Figure 68:
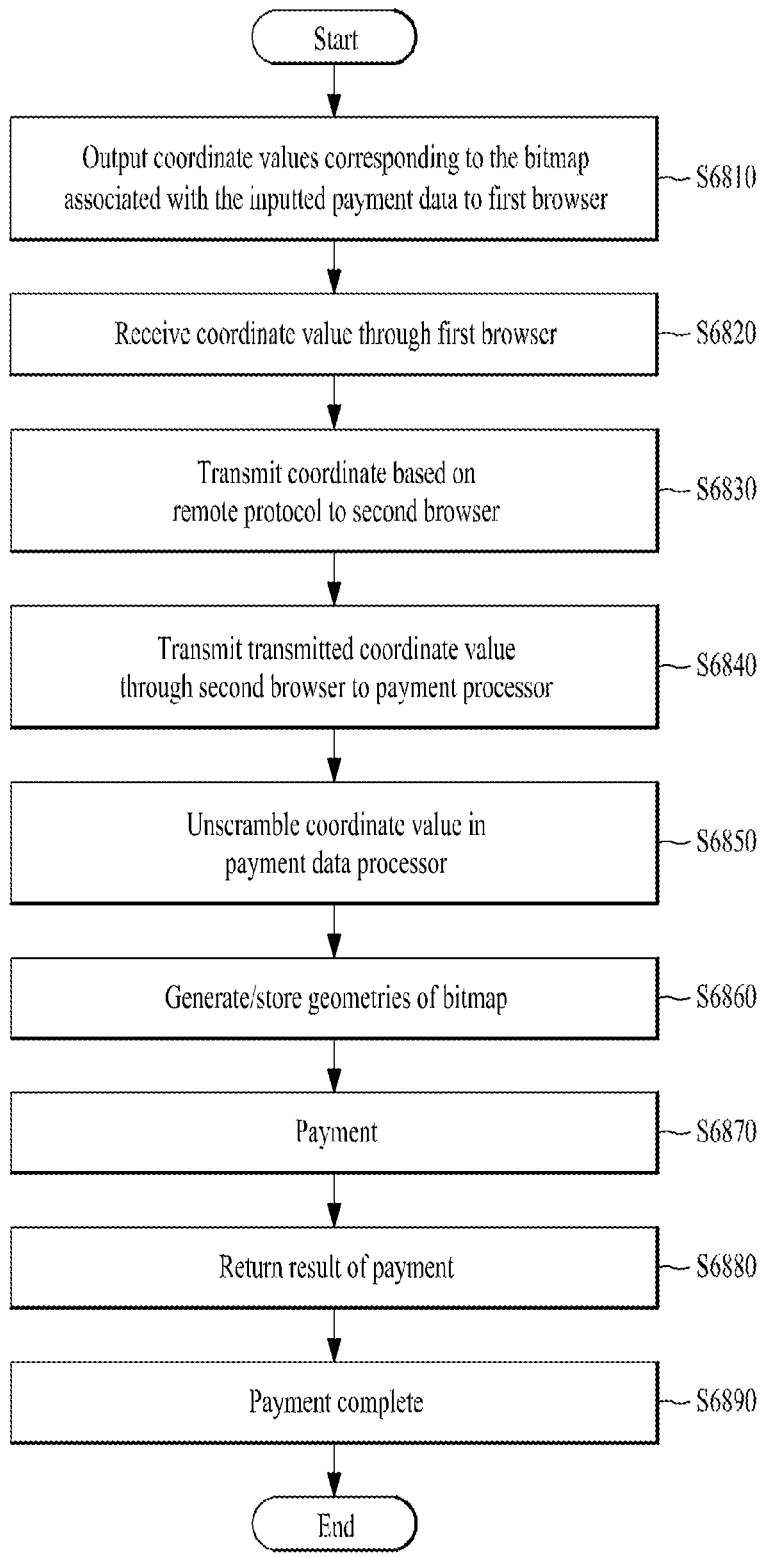
FIG. 68 is a flowchart illustrating another embodiment of the payment process according to the present disclosure.

FIG. 68 is a flowchart illustrating another embodiment of the payment process according to the present disclosure.

FIG. 68 will explain the payment process scenario illustrated in FIG. 67.

When CPE receives a request for an input of payment data such as a credit card number, CPE will execute the embedded browser and output on a screen the coordinate value corresponding to the scrambled bitmap associated with the inputted payment data (S6810).

Next the CPE receives the coordinate value corresponding to the payment data outputted on the screen (S6820). The coordinate value corresponds to form of a code and not the card number itself.

The CPE transmits the coordinate values corresponding to the received payment data according to the remote protocol to the remote browser of the T-Commerce channel processor (S6840).

The payment data processor unscrambles the transmitted coordinate value and converts to numbers (S6850), and generates and stores bitmap geometries (S6860).

The payment data processor communicates with the payment processor regarding the bitmap geometries and executes the payment (S6870), and returns the result back to the CPE (S6880).

The payment process is completed by executing the above process (S6890).

Figure 69:
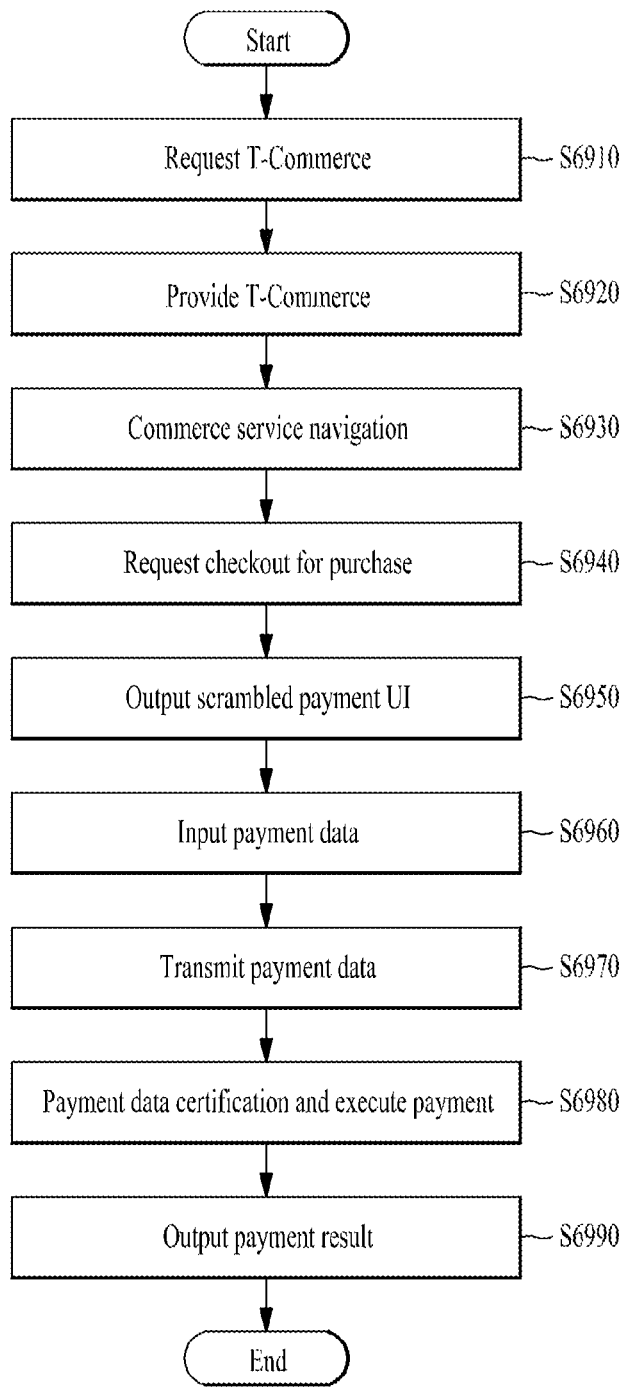
FIG. 69 is a flowchart illustrating another embodiment explaining a method of payment process according to the present disclosure.

FIG. 69 is a flowchart illustrating another embodiment explaining a method of payment process according to the present disclosure.

When a user executes an action by requesting a T-Commerce service (S6910), the T-Commerce channel processor communicates with the brand channel processor and the advertising processor to output on the remote browser of the CPE through streaming to the CPE (S6920).

The user, in normal circumstances, navigates the remote browser executed by the CPE through a remote device (S6930). Here, the T-Commerce channel processor continuously tracks the user action through the movement of a pointer, and corresponds to the user action.

Accordingly, when a user requests to save a specific item from the navigation to the wish list, the T-Commerce channel processor temporarily stores the wish list data for the corresponding user. Then, when the user requests for the wish list, the temporarily stored wish list is called to respond to the user request.

The T-Commerce channel processor continuously detects whether a request for a checkout for a purchase has been made or not on the items in the users wish list. If a detection is made that the request for a checkout through the screen of the remote browser of the T-Commerce channel processor (S6940), the T-Commerce channel processor transmits control command to proceed to the payment process.

Here, the control command, for example, is not a specific UI or payment data received directly through the remote browser of the T-Commerce channel processor, rather, is a request for outputting a scrambled payment UI for receiving an input through the embedded browser of the corresponding CPE (S6950).

After outputting the scrambled payment UI, the CPE continuously monitors user action. Since, the scrambled payment UI is executed through the embedded browser and not through the remote browser, the CPE receives the user's payment data (S6960). Here, the payment data includes financial information indicating at least one of bank account information, credit card number, and the address and phone number associated with the bank or the credit card. The payment data can further include at least one of an ID, password, last name, first name, date of birth, gender, e-mail, address, phone number, secret question, answer to the secret question, hobby, interest, and age. Here, the scrambled payment UI protects from the risk and attacks from getting user's payment information such as credit card number, exposed to others.

After the payment data is inputted, the CPE transmits the inputted data to the brand channel processor or the payment processor (S6970). Here, the transmitted data may be processed to change the data using a pre-determined format or using an encryption for security purposes.

The brand channel processor receives the payment data and delivers to the payment processor.

The payment processor finally certifies for authorization and error on the delivered payment data, and if there is no problem with the certification, the payment process is executed (S6980).

The payment processor transmits the result of the payment to any one of brand channel processor, T-Commerce channel processor, CPE, remote device, and mobile device through the embedded browser of the CPE so to intuitively acknowledge the payment (S6990).

On the other hand, when the result of the payment is returned to the brand channel, the process follows the process explained above, but in the case when the result is returned to the T-Commerce channel processor, the result is provided through the remote browser and not the embedded browser.

Moreover, the scrambled UI described in the present disclosure, not only provides payment information such as credit number, but also various user input through different CPE.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method of processing a commerce service, the method comprising:
   receiving, by a customer premises equipment (CPE), a request signal for an input of payment data;
   executing, by the CPE, a first browser and outputting a payment user interface (UI) for receiving the payment data on a screen of the first browser in response to the request signal, the first browser being an embedded browser included in the CPE;
   receiving, at the first browser, the payment data from a user;
   transmitting a specific coordinates value corresponding to the received payment data and a scrambled bitmap image corresponding to the specific coordinates value from the first browser to a second browser corresponding to a remote browser through a remote protocol;
   delivering, by the second browser, the scrambled bitmap image corresponding to the specific coordinates value, to a payment data processor included in a third party;
   unscrambling, by the payment data processor, the scrambled bitmap image to generate an unscrambled bitmap image;
   processing a payment process for a product item using the unscrambled bitmap image; and
   transmitting, by the second browser, a payment result based on the payment process to the first browser.

2. The method of claim 1, wherein the specific coordinates value includes a code which corresponds to a credit card number associated with the payment data.

3. The method of claim 2, wherein the specific coordinates value includes a number transformed from the code.

4. The method of claim 1, wherein the first browser receives the payment data from a third-party application, wherein the third-party application is included in a local browser on a mobile computing device.

5. The method of claim 1, wherein the payment data processor generates bitmap geometries corresponding to the payment data.

6. A system including a customer premise equipment (CPE) for processing a commerce service, the system comprising:
   the CPE including a processor and a first browser;
   a second browser corresponding to a remote browser; and
   a payment data processor,
   wherein the processor is configured to:
   receive a request signal for an input of payment data,
   execute a first browser and output a payment user interface (UI) for receiving the payment data on a screen of the first browser in response to the request signal, the first browser being an embedded browser included in the CPE,
   receive, at the first browser, the payment data from a user,
   transmit a specific coordinates value corresponding to the received payment data and a scrambled bitmap image corresponding to the specific coordinates value from the first browser to the second browser corresponding to a remote browser through a remote protocol, wherein the second browser delivers the scrambled bitmap image corresponding to the specific coordinates value to the payment data processor included in a third party and the payment data processor unscrambles the scrambled bitmap image to generate an unscrambled bitmap image, and receive, through the first browser, a payment result from the second browser based on a payment process for a product item.

7. The system of claim 6, wherein the specific coordinates value includes a code which corresponds to a credit card number associated with the payment data.

8. The system of claim 7, wherein the specific coordinates value includes a number transformed from the code.

9. The system of claim 6, wherein the first browser receives the payment data from a third-party application, wherein the third-party application is included in a local browser on a mobile computing device.

10. The system of claim 6, wherein the payment data processor generates bitmap geometries corresponding to the payment data.

* * * * *